US007952583B2

(12) United States Patent
Waechter et al.

(10) Patent No.: US 7,952,583 B2
(45) Date of Patent: May 31, 2011

(54) QUASI-MONTE CARLO LIGHT TRANSPORT SIMULATION BY EFFICIENT RAY TRACING

(75) Inventors: Carsten Waechter, Berlin (DE); Alexander Keller, Berlin (DE)

(73) Assignee: Mental Images GmbH, Berlin (DE)

( * ) Notice: Subject to any disclaimer, the term of this patent is extended or adjusted under 35 U.S.C. 154(b) by 235 days.

(21) Appl. No.: 12/245,763

(22) Filed: Oct. 5, 2008

(65) Prior Publication Data

US 2009/0167763 A1 Jul. 2, 2009

Related U.S. Application Data

(63) Continuation-in-part of application No. 11/474,517, filed on Jun. 23, 2006, now Pat. No. 7,499,053, and a continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 60/977,603, filed on Oct. 4, 2007, provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
*G06T 15/50* (2011.01)
(52) U.S. Cl. ........................................ 345/426
(58) Field of Classification Search ........................ None
See application file for complete search history.

(56) References Cited

U.S. PATENT DOCUMENTS

| 5,305,430 | A | 4/1994 | Glassner | |
|---|---|---|---|---|
| 5,847,711 | A | 12/1998 | Kaufman | |
| 6,028,606 | A | 2/2000 | Kolb | |
| 6,172,679 | B1 | 1/2001 | Lim | |
| 6,529,193 | B1 | 3/2003 | Herken | |
| 6,825,839 | B2 | 11/2004 | Huang | |
| 6,862,026 | B2 | 3/2005 | Zachmann | |
| 7,009,608 | B2 * | 3/2006 | Pharr et al. | 345/426 |
| 2003/0034968 | A1 | 2/2003 | Abramov | |
| 2003/0052874 | A1 | 3/2003 | Abramov | |
| 2004/0125103 | A1 | 7/2004 | Kaufman | |
| 2010/0060634 | A1 * | 3/2010 | Wald et al. | 345/420 |
| 2010/0073400 | A1 * | 3/2010 | Wald et al. | 345/619 |
| 2010/0194751 | A1 * | 8/2010 | Wald et al. | 345/426 |

OTHER PUBLICATIONS

Terdiman, P. "Memory-Optimized Bounding-Volume Hierarchies" (Mar. 2001) [online], [retrieved on Aug. 20, 2010]. Retrieved from the Internet <URL:http://www.codercorner.com/Opcode.pdf>.*
Havran, V. et al. "On the Fast Construction of Spatial Hierarchies for Ray Tracing." in: Proceedings of the IEEE Symposium on Interactive Ray Tracing 2006 (Sep. 18, 2006), pp. 71-80.*
Pharr et al. "Rendering Complex Scenes With Memory-Coherent Ray Tracing." in: Proceedings of the 24th Annual Conference on Computer Graphics and Interactive Techniques (Aug. 1997), pp. 101-108.*
Wald et al. "Interactive Global Illumination in Complex and Highly Occluded Environments." in: Proceedings of the 14th Eurographics workshop on Rendering (Jun. 25, 2003), pp. 74-81.*
Peter, I. et al. "Importance Driven Construction of Photon Maps." in: Rendering Techniques '98 (Oct. 9, 1998), pp. 269-280.*
Demers, V. et al. "A Combination of Randomized Quasi-Monte Carlo with Splitting for Rare-Event Simulation." in: Proceedings of the 2005 European Simulation and Modeling Conference (Jun. 1, 2005), pp. 25-32.*
Ize, T. et al. "An Evaluation of Parallel Grid Construction for Ray Tracing Dynamic Scenes." in: Proceedings of the IEEE Symposium on Interactive Ray Tracing 2006 (Sep. 18, 2006), pp. 47-55.*
Abrash, BSP Trees, Dr. Dobbs Sourcebook, 20(14):49-52, 1995.
Arvo, Fast Ray Tracing by Ray Classification, Computer Graphics (Proc. SIGGRAPH 1987), 21(4):55-64, 1987.
Arvo, Particle Transport and Image Synthesis, In Computer Graphics (Proc. SIGGRAPH 1990), pp. 63-66, 1990.
Amanatides, Regularization Problems in Ray Tracing., Proc. Graphics Interface, pp. 221-228, 1990.
Assarsson, Optimized View Frustum Culling Algorithms for Bounding Boxes, Journal of Graphics Tools, 5(1):9-22, 2000.
Akenine-Moller, Fast 3D Triangle-Box Overlap Testing, Journal of Graphics Tools, 6(1):29-33, 2001.
Appel, Techniques for shading machine renderings of solids, AFIPS 1968 Spring Joint Computer Conference, 32:37-45, 1968.
Ashikhmin, Microfacet-based BRDF Generator, Proc. SIGGRAPH 2000, pp. 65-74. ACM Press, Addison Wesley Longman, 2000.
Arenberg, Re: Ray/Triangle Intersection with Barycentric Coordinates, Ray Tracing News, 1(11), Nov. 1988.
Arvo, Backward Ray Tracing, SIGGRAPH 1986 Course Notes: Developments in Ray Tracing, 12, Aug. 1986.
Arvo, Transfer Equations in Global Illumination, SIGGRAPH 1993 Course Notes: Global Illumination, 42, 1993.
Ashikhmin, Anisotropic Phong BRDF Model, Journal of Graphics Tools, 5(2):25-32, 2000.
Ashikhmin, Distribution-based BRDFs, Technical report, Stony Brook University, 2006.
Badouel, Efficient ray-polygon intersection, In Graphics Gems, pp. 390-393, Academic Press Professional, 1990.
Bender, Cache-Oblivious B-Trees, IEEE Symposium on Foundations of Computer Science, pp. 399-409, 2000.
Boulos, Packet-based Whitted and Distribution Ray Tracing, In Proc. Graphics Interface, pp. 177-184, 2007.

(Continued)

*Primary Examiner* — Jason M Repko
(74) *Attorney, Agent, or Firm* — Jacobs & Kim LLP; David Jacobs

(57) ABSTRACT

Methods, systems, devices and computer program code (software) products operable within a computer graphics system or other computer system enable quasi-Monte Carlo (QMC) light transport simulation by ray tracing: and include constructing a bounding interval hierarchy (BIH), within a computer, using quantized planes to reduce memory requirements while maintaining a selected degree of precision.

13 Claims, 40 Drawing Sheets

OTHER PUBLICATIONS

Bentley, Multidimensional Binary Search Trees used for Associative Searching, Communications of the ACM, 18 (9):509-517, 1975.
Benthin, Realtime Ray Tracing on current CPU Architectures, PhD thesis, Saarland University, 2006.
Brodal, Cache Oblivious Search Trees via Binary Trees of Small Height, Proc. ACM-SIAM Symposium on Discrete Algorithms, pp. 39-48, 2002.
Bratley, Implementation and Tests of Low-Discrepancy Sequences, ACM Trans. Modeling and Comp. Simulation, 2 (3):195-213, 1992.
Bronnimann, Cost-Optimal Trees for Ray Shooting, In Proc. Latin American Symposium on Theoretical Informatics, 2003.
Bikker, Interactive Ray Tracing, Intel Software Network, 2005.
Bikker, Real-time Ray Tracing through the Eyes of a Game Developer, In Proc. 2007 IEEE/EG Symposium on Interactive Ray Tracing, pp. 1-10, 2007.
Bjorke, When Shaders and Textures Collide, Game Developers Conference Talk, 2006.
Bekaert, Hierarchical Monte Carlo Radiosity, Eurographics Rendering Workshop 1998, pp. 259-268, Jun. 1998.
Bonnedal, Master Thesis: SIMD accelerated ray tracing, Chalmers University of Technology, Department of Computer Engineering, Goteborg, 2002.
Boulos, Geometric and Arithmetic Culling Methods for Entire Ray Packets, Technical report no uucs-06-10, School of Computing, University of Utah, 2006.
Choi, Ray Tracing Triangular Meshes, In Proc. Eighth Western Computer Graphics Symposium, pp. 43-52, 1997.
Cook, The REYES Image Rendering Architecture, In Computer Graphics (Proc. SIGGRAPH 1987), pp. 95-102, Jul. 1987.
Cazals, Clustering and Hierarchy Construction: a New Solution for Ray-Tracing Complex Scenes, Computer Graphics Forum (Proc. Eurographics 1995), 14(3):371-382, 1995.
Christensen, Ray Tracing for the Movie 'Cars', In Proc. 2006 IEEE Symposium on Interactive Ray Tracing, pp. 1-6, Sep. 2006.
Chirkov, Fast 3D Line Segment-Triangle Intersection Test, Journal of Graphics Tools, 10(3):13-18, 2005.
Cook, Practical Aspects of Distributed Ray Tracing, SIGGRAPH 1986 Course Notes: Developments in Ray Tracing, Aug. 12, 1986.
Cook, Stochastic Sampling in Computer Graphics, ACM Transactions on Graphics, 5:51-72, 1986.
Cranlet, Randomization of Number Theoretic Methods for Multiple Integration, SIAM Journal on Numerical Analysis, 13:904-914, 1976.
Cook, Distributed Ray Tracing, In Computer Graphics (Proc. SIGGRAPH 1984), pp. 137-145, 1984.
Colbert, BRDF-Shop: Creating Physically Correct Bidirectional Reflectance Distribution Functions, IEEE Computer Graphics and Applications, 26(1), Jan./Feb. 2006.
Cline, Lightweight Bounding Volumes for Ray Tracing, Journal of Graphics Tools, 11(3), 2006.
Cook, A Reflectance Model for Computer Graphics, ACM Transactions on Graphics, 1(1):7-24, 1982.
Cuong, Master Thesis: Hybrid Acceleration Methods for Ray Tracing, Department of Computer Graphics and Multimedia, Technische Universitat Dresden, Jul. 1996.
Dammertz, Diploma Thesis: Floating-Point Precision Ray Tracing of Free-Form Surfaces, Ulm University, 2005.
Demaine, Cache-Oblivious Algorithms and Data Structures, In Lecture Notes from the EEF Summer School on Massive Data Sets, Lecture Notes in Computer Science, Springer, Jun. 27-Jul. 1, 2002.
DeMarle, Memory-Savvy Distributed Interactive Ray Tracing, In Proc. EGPGV, pp. 93-100, 2004.
Driemeyer, Programming mental ray, 3rd ed., Springer, 2005.
Dmitriev, Faster Ray Tracing with SIMD Shaft Culling, Technical Report MPI-I-2004-4-006, Max-Planck-Institut fur Informatik, Dec. 2004.
Dammertz, Improving Ray Tracing Precision by World Space Intersection Computation, In Proc. 2006 IEEE Symposium on Interactive Ray Tracing, pp. 25-32, Sep. 2006.
Dammertz, Image Synthesis by Rank-1 Lattices, In Monte Carlo and Quasi-Monte Carlo Methods 2006, Springer, 2007.
Demers, A Combination of Randomized quasi-Monte Carlo with Splitting for Rare-Event Simulation, In Proc. 2005 European Simulation and Modelling Conference, pp. 25-32. SCS Press, 2005.
Dorigo, Positive Feedback as a Search Strategy, Technical Report 91016, Dipartimento di Elettronica e Informatica, Politecnico di Milano, Italy, 1991.
Eberly, Intersection of Convex Objects: The Method of Separating Axes, 2001.
Edwards, The halfway vector disk for BRDF modeling, ACM Transactions on Graphics, 25(1):1-18, 2006.
Eisemann, Automatic Creation of Object Hierarchies for Ray Tracing Dynamic Scenes, In WSCG Short Papers Post-Conference Proceedings, WSCG, 1 2007.
Ericson, Memory Optimization, Game Developers Conference Talk, 2003.
Ericson, Numerical Robustness for Geometric Calculations, Game Developers Conference Talk, 2005.
Ericson, Plucker coordinates considered harmful, 2007, http://realtimecollisiondetection.net/blog/p=13.
Faure, Good Permutations for Extreme Discrepancy, J. Number Theory, 42:47-56, 1992.
Friedrich, Exploring the Use of Ray Tracing for Future Games, In Sandbox 2006: Proc. 2006 ACM SIGGRAPH Symposium on Videogames, pp. 41-50, New York, NY, USA, 2006. ACM Press.
Friedel, Fast Generation of Randomized Low-Discrepancy Point Sets, In Monte Carlo and Quasi-Monte Carlo Methods 2000, pp. 257-273, Springer, 2002.
Fournier, A Ray Tracing Accelerator Based on a Hierarchy of 1D Sorted Lists, In Proc. Graphics Interface, pp. 53-61, 1993.
Foley, kD-Tree Acceleration Structures for a GPU Raytracer, In Graphics Hardware, 2005.
Gunther, Efficient Acquisition and Realistic Rendering of Car Paint, In Proc. 10th International Fall Workshop—Vision, Modeling, and Visualization (VMV), pp. 487-494, 2005.
Gaede, Multidimensional Access Methods, ACM Computing Surveys, 30(2):170-231, Jun. 1998.
Grabenstein, A Comparison of Strictly Deterministic with (Pseudo-) Random Sampling Methods in Computer Graphics, mental images, 1997.
Gorski, HEALPix: A Framework for High-Resolution Discretization and Fast Analysis of Data Distributed on the Sphere, The Astrophysical Journal, 622(2):759-771, Apr. 2005.
Grunschloss, (t, m, s)-Nets and Maximized Minimum Distance, In Monte Carlo and Quasi-Monte Carlo Methods 2006, Springer, 2007.
Geimer, Cross-Platform Framework for Interactive Ray Tracing, Tagungsband Graphiktag der Gesellschaft fur Informatik, pp. 25-34, 2003.
Goldberg, What Every Computer Scientist Should Know About Floating-Point Arithmetic, ACM Computing Surveys, 23 (1):5-48, 1991.
Gunther, Realtime Ray Tracing on GPU with BVH-based Packet Traversal, In Proc. 2007 IEEE/EG Symposium on Interactive Ray Tracing, pp. 113-118, 2007.
Goldsmith, Automatic Creation of Object Hierarchies for Ray Tracing, IEEE Computer Graphics & Applications, 7 (5):14-20, May 1987.
Guttman, R-Trees: A Dynamic Index Structure for Spatial Searching, In Proc. 1984 ACM SIGMOD International Conference on Management of Data, pp. 47-57, 1984.
Gunther, Precomputed Light Sets for Fast High Quality Global Illumination, In ACM SIGGRAPH 2005: Sketches and Applications, 2005.
Haines, An Introductory Tour of Interactive Rendering, IEEE Computer Graphics & Applications, 26(1):76-87, 2006.
Hall, The AR250-A new Architecture for Ray Traced Rendering, In Proc. Eurographics/SIGGRAPH workshop on Graphics hardware-Hot Topics Session, pp. 39-42, 1999.
Hanika, Diploma Thesis: Fixed Point Ray Tracing on the FPGA, Ulm University, 2007.
Havran, Heuristic Ray Shooting Algorithms, PhD thesis, Czech Technical University, Praha, Czech Republic, 2001.

Havran, LCTS: Ray Shooting using Longest Common Traversal Sequences, In Proc. Eurographics 2000, pp. 59-70, Interlaken, Switzerland, 2000.
Havran, On Improving KD-Trees for Ray Shooting, Journal of WSCG, 10(1):209-216, Feb. 2002.
Hart, Direct illumination with lazy visibility evaluation, In Proc. SIGGRAPH 1999, pp. 147-154, 1999.
Havran, Fast Construction of Spatial Data Structures for Ray Tracing, In Proc. 2006 IEEE Symposium on Interactive Ray Tracing, pp. 71-80, Sep. 2006.
Heinrich, Quasi-Monte Carlo Methods in Computer Graphics, Part I: The QMC-Buffer, Interner Bericht 242/94, University of Kaiserslautern, 1994.
Heinrich, Quasi-Monte Carlo Methods in Computer Graphics, Part II: The Radiance Equation, Interner Bericht 243/94, University of Kaiserslautern, 1994.
Hanika, Towards Hardware Ray Tracing using Fixed Point Arithmetic, In Proc. 2007 IEEE/EG Symposium on Interactive Ray Tracing, pp. 119-128, 2007.
Havran, Fast Robust BSP Tree Traversal Algorithm for Ray Tracing, Journal of Graphics Tools, 2(4):15-24, 1997.
Hurley, Fast Ray Tracing for Modern General Purpose CPU, In Proc. Graphicon, pp. 255-261, 2002.
Hlawka, Discrepancy and Riemann Integration, In Studies in Pure Mathematics, pp. 121-129. Academic Press, New York, 1971.
El Haddad, Quasi-Monte Carlo Simulation of Discrete-Time Markov Chains in Multidimensional State Spaces, in Monte Carlo and Quasi-Monte Carlo Methods 2006, Springer, 2007.
Horn, Interactive k-D Tree GPU Raytracing, In Proc. Symposium on Interactive 3D Graphics and Games, pp. 167-174, New York, NY, USA, 2007. ACM Press.
Hurley, Ray Tracing goes Mainstream, Intel Technology Journal, 9(2), 2005.
Halton, Algorithm 247: Radical-inverse quasi-random point sequence, Communications of the ACM, 7(12):701-702, 1964.
Iones, Fast, Realistic Lighting for Video Games, IEEE Computer Graphics & Applications, 23(3):54-64, 2003.
Isenburg, Lossless Compression of Predicted Floating-Point Geometry, Computer-Aided Design, 37:869-877, 2005.
Ize, Grid Creation Strategies for Efficient Ray Tracing, In Proc. 2007 IEEE/EG Symposium on Interactive Ray Tracing, pp. 27-32, 2007.
Ize, Asynchronous BVH Construction for Ray Tracing Dynamic Scenes on Parallel Multi-Core Architectures, In Proc. Eurographics Symposium on Parallel Graphics and Visualization, pp. 101-108, 2007.
Ize, Evaluation of Parallel Grid Construction for Ray Tracing Dynamic Scenes, In Proc. 2006 IEEE Symposium on Interactive Ray Tracing, pp. 27-55, Sep. 2006.
Jensen, Global Illumination Using Photon Maps, In Rendering Techniques 1996 (Proc. 7th Eurographics Workshop on Rendering), pp. 21-30. Springer, 1996.
Jones, Intersecting a Ray and a Triangle with Plucker Coordinates, Ray Tracing News, 13(1), Jul. 2000.
Jevans, Adaptive Voxel Subdivision for Ray Tracing, In Proc. Graphics Interface, pp. 164-172, 1989.
Kajiya, The Rendering Equation, In Computer Graphics (Proc. SIGGRAPH 1986), pp. 143-150, 1986.
Kajiya, Radiometry and Photometry for computer graphics, SIGGRAPH 1990 Course Notes: Advanced Topics in Ray Tracing, 1990.
Kalem, Diploma Thesis: Realtime Ray Tracing in Computer Games, Ulm University, 2005.
Karp, Reducibility among Combinatorial Problems, In Complexity of Computer Computations, Advances in Computing Research, pp. 85-103, 1972.
Kautz, Interactive Editing and Modeling of Bidirectional Texture Functions, ACM Transactions on Graphics (Proc. SIGGRAPH 2007), 26(3):53, 2007.
Keller, Quasi-Monte Carlo Methods in Computer Graphics, ZAMM, 1995.
Keller, Instant Radiosity, In SIGGRAPH 1997: Proc. 24th annual conference on Computer graphics and interactive techniques, pp. 49-56, 1997.
Keller, Quasi-Monte Carlo Methods for Photorealistic Image Synthesis, PhD thesis, University of Kaiserslautern, Germany, 1998.
Keller, Strictly Deterministic Sampling Methods in Computer Graphics, SIGGRAPH 2003 Course Notes, Course #44: Monte Carlo Ray Tracing, 2003.
Keller, Myths of Computer Graphics, In Monte Carlo and Quasi-Monte Carlo Methods 2004, pp. 217-243. Springer, 2006.
Kay, Ray Tracing Complex Scenes, Computer Graphics (Proc. SIGGRAPH 1986), 20(4):269-278, Aug. 1986.
Kollig, Efficient Bidirectional Path Tracing by Randomized Quasi-Monte Carlo Integration, In Monte Carlo and Quasi-Monte Carlo Methods 2000, pp. 290-305, Springer, 2002.
Kollig, Efficient Multidimensional Sampling, Computer Graphics Forum (Proc. Eurographics 2002), 21(3):557-563, Sep. 2002.
Kollig, Illumination in the Presence of Weak Singularities, In Monte Carlo and Quasi-Monte Carlo Methods 2004, pp. 245-257. Springer, 2004.
El Khettabi, Quasi-Monte Carlo Simulation of Diffusion, J. Complexity, 15(3):342-359, 1999.
Kammaje, Study of Restricted BSP Trees for Ray Tracing, In Proc. 2007 IEEE/EG Symposium on Interactive Ray Tracing, pp. 55-62, 2007.
Knuth, Art of Computer Programming vol. 2: Seminumerical Algorithms, Addison Wesley, 1981.
Kollig, Efficient Sampling and Robust Algorithms for Photorealistic Image Synthesis, PhD thesis, University of Kaiserslautern, Germany, 2004.
Kollig, Personal Communication, 2004.
Klimaszewski, Faster Ray Tracing Using Adaptive Grids, IEEE Computer Graphics & Applications, 17(1):42-51, 1997.
Kuo, Quasi-Monte Carlo Methods can be efficient for Integration over Products of Spheres, J. Complexity, 21 (2):196-210, 2005.
Kensler, Optimizing Ray-Triangle Intersection via Automated Search, Proc. 2006 IEEE Symposium on Interactive Ray Tracing, pp. 33-38, Sep. 2006.
Kelemen, A Simple and Robust Mutation Strategy for the Metropolis Light Transport Algorithm, Computer Graphics Forum, 21(3):531-540, Sep. 2002.
Kalos, Monte Carlo Methods, vol. I: Basics, J. Wiley & Sons, 1986.
Keller, Efficient Importance Sampling Techniques for the Photon Map, In Proc. Vision, Modeling, and Visualization, pp. 271-279, IOS Press, 2000.
Lafortune, Mathematical Models and Monte Carlo Algorithms for Physically Based Rendering, PhD thesis, Katholieke Universitiet Leuven, Belgium, 1996.
Larsson, Strategies for Bounding Volume Hierarchy Updates for Ray Tracing of Deformable Models, Technical report mdh-mrtc-92/2003-1-se, MRTC, 2003.
Lofsted, An Evaluation Framework for Ray-Triangle Intersection Algorithms, Journal of Graphics Tools, 10(2):13-26, 2005.
Landis, Production-Ready Global Illumination, 2002, Industrial Light & Magic.
L'ecor, Quasi-Monte Carlo Scheme using Nets for a linear Boltzmann Equation, SIAM Journal on Numerical Analysis, 35(1):51-70, 1998.
L'Ecuyer, Splitting for Rare-Event Simulation, In Proc. 2006 Winter Simulation Conference, pp. 137-148, 2006.
L'Ecuyer, Rare Events, Splitting, and quasi-Monte Carlo, ACM Transactions on Modeling and Computer Simulation, 17 (2):9, 2007.
L'ecot, Direct Simulation Monte Carlo Scheme and Uniformly Distributed Sequences for Solving the Boltzmann Equation, Computing, 41(1-2):41-57, 1989.
L'ecot, Low Discrepancy Sequences for solving the Boltzmann Equation, Journal of Computational and Applied Mathematics, 25(2):237-249, 1989.
L'ecot, A quasi-Monte Carlo Method for the Boltzmann Equation, Mathematics of Computation, 56(194), 1991.
Lessig, Bachelor Thesis: Interaktives Raytracing and Raycasting auf programmierbaren Grafikkarten, 2004.
Lafortune, Non-Linear Approximation of Reflectance Functions, In Proc. SIGGRAPH 1997, Annual Conference Series, pp. 117-126, 1997.

Lischinski, Interactive Local Adjustment of Tonal Values, ACM Transactions on Graphics, 25(3):646-653, 2006.
Lindstrom, Fast and Efficient Compression of Floating-Point Data, IEEE Transactions on Visualization and Computer Graphics (Visualization 2006), 12(5):1245-1250, Sep.-Oct. 2006.
L'Ecuyer, Recent Advances in Randomized quasi-Monte Carlo methods, In Modeling Uncertainty: An Examination of Stochastic Theory, Methods, and Applications, pp. 419-474. Kluwer Academic Publishers, 2002.
L'Ecuyer, Randomized quasi-Monte Carlo Simulation Method for Markov Chains, Technical report g-2006-64, Operations Research, GERAD, Universite de Montreal, 2005.
L'Ecuyer, Randomized quasi-Monte Carlo Simulation of Markov Chains with an Ordered State Space, In Monte Carlo and quasi-Monte Carlo Methods 2004, pp. 331-342, Springer, 2006.
Lawrence, Efficient BRDF importance sampling using a factored representation, ACM Transactions on Graphics (Proc. SIGGRAPH 2004), 23(3):496-505, 2004.
Lee, Statistically Optimized Sampling for Distributed Ray Tracing, In Computer Graphics (Proc. SIGGRAPH 1985), pp. 61-67, 1985.
L'ecot, Comparison of quasi-Monte Carlo-Based Methods for the Simulation of Markov Chains, Monte Carlo Methods and Applications, 10(3-4):377-384, 2004.
L'ecot, Quasi-Monte Carlo Methods for Estimating Transient Measures of Discrete Time Markov Chains, In Monte Carlo and Quasi-Monte Carlo Methods in Scientific Computing 2002, pp. 329-344. Springer, 2004.
Lokovic, Deep Shadow Maps, In SIGGRAPH 2000: Proc. 27th annual Conference on Computer Graphics and Interactive Techniques, pp. 385-392, New York, NY, USA, 2000, ACM Press/Addison-Wesley Publishing Co.
Reinhard, Dynamic Acceleration Structures for Interactive Ray Tracing, Proc. 11th Eurographics Workshop on Rendering, pp. 299-306, 2000.
Reshetov, Multi-Level Ray Tracing Algorithm, ACM Transactions on Graphics (Proc. SIGGRAPH 2005), 24 (3):1176-1185, 2005.
Reinhard, Photographic tone reproduction for digital images, ACM Transactions on Graphics, 21(3):267-276, 2002.
Rusin, Topics on Sphere Distributions, www.math.niu.edu/simrusin/known-math/95/sphere.faq, 1998.
Rubin, A 3-dimensional representation for fast rendering of complex scenes, Computer Graphics (Proc. SIGGRAPH 1980), 14(3):110-116, 1980.
Rzehak, Diploma Thesis: Monte Carlo Simulation of Physical Surface Properties, Ulm University, 2005.
Stephens, Application of Scalable Massive Model Interaction using Shared Memory Systems, Proc. Eurographics Symposium on Parallel Graphics and Visualization, 2006.
Schumacker, Study for Applying Computer-Generated Images to Visual Simulation, Technical report AFHRL-TR-69-14, U.S. Air Force Human Resources Laboratory, 1969.
Shirley, Notes on Adaptive Quadrature on the Hemisphere, Technical Report TR-411, Dept. of Computer Science Indiana University, 1994.
Schlick, Inexpensive BRDF Model for Physically-Based Rendering, Computer Graphics Forum (Proc. Eurographics 1994), 13(3):233-246, 1994.
Scheib, The demo scene, SIGGRAPH 2002 Panel, 2002.
Seibert, Diploma Thesis: Robust Metropolis Light Transport with Participating Media, Ulm University, 2006.
Subramanian, Automatic Termination Criteria for Ray Tracing Hierarchies, Proc. Graphics Interface, pp. 93-100, Toronto, Ontario, 1991.
Segura, Algorithms to test Ray-Triangle Intersection, Proc. WSCG, 2001.
Shannon, Mathematical theory of communication, Bell System Technical Journal, 27:379-423 and 623-656, Jul. and Oct. 1948.
Shirley, Physically Based Lighting Calculations for Computer Graphics, PhD thesis, University of Illinois, 1990.
Shirley, Discrepancy as a Quality Measure for Sampling Distributions, Proc. Eurographics 1991, pp. 183-194, 1991.
Shirley, Monte Carlo Methods in Rendering, SIGGRAPH 1994 Course Notes, 1994.
Shirley, Practitioners' Assessment of Light Reflection Models, Proc. Pacific Graphics 1997.
Segovia, Bidirectional Instant Radiosity, Proc. 17th Eurographics Workshop on Rendering, 2006.
Segovia, Non-interleaved Deferred Shading of Interleaved Sample Patterns, Proceedings of SIGGRAPH/Eurographics Workshop on Graphics Hardware 2006.
Segovia, Metropolis Instant Radiosity, Proc. Eurographics 2007.
Szirmay-Kalos, Analysis of Quasi-Monte Carlo Integration Applied to Transillumination Radiosity Method, Computer Graphics Forum (Proc. Eurographics 1997), 16(3):271-282, 1997.
Saito, SIMD-oriented Fast Mersenne Twister: A 128-bit Pseudorandom Number Generator, in Monte Carlo and Quasi-Monte Carlo Methods 2006, Springer, 2007.
Stoll, Razor: An architecture for dynamic multiresolution ray tracing, Technical report 06-21, Department of Computer Science, University of Texas at Austin, 2006.
Smits, Efficiency Issues for Ray Tracing, Journal of Graphics Tools, 3(2):1-14, 1998.
Sobol, On the Distribution of Points in a Cube and the approximate Evaluation of Integrals, Zh. vychisl. Mat. mat. Fiz., 7(4)184-802, 1967.
Sobol, Die Monte-Carlo-Methode, Deutscher Verlag der Wissenschaften, 1991.
Schmittler, Realtime Ray Tracing for Current and Future Games, in 34. Jahrestagung der Gesellschaft fur Informatik, 2004.
Sung, Ray Tracing with the BSP-tree, in Graphics Gems III, pp. 271-274, Academic Press, 1992.
Shevtsov, Highly Parallel Fast KD-tree Construction for Interactive Ray Tracing of Dynamic Scenes, Computer Graphics Forum (Proc. Eurographics 2007), vol. 26, 2007.
Stich, Diploma Thesis: Photorealistic Image Generation for Air Traffic Control Simulation, Ulm University, 2006.
Shirley, Distribution Ray Tracing: Theory and Practice, in 3rd Eurographics Workshop on Rendering, pp. 33-43, 1992.
Stich, Efficient and Robust Shadow Volumes Using Hierarchical Occlusion Culling and Geometry Shaders, in GPU Gems 3: Programming Techniques for High-performance Graphics, pp. 239-256, Addison-Wesley, 2007.
Schmittler, Realtime Ray Tracing of Dynamic Scenes on an FPGA Chip, in Proc. Graphics Hardware, pp. 95-106, 2004.
Shirley, Monte Carlo Techniques for Direct Lighting Calculations, ACM Transactions on Graphics, 15(1):1-36, 1996.
Terdiman, Memory-Optimized Bounding-Volume Hierarchies, 2001.
Veach, Robust Monte Carlo Methods for Light Transport Simulation, PhD thesis, Stanford University, 1997.
Veach, Bidirectional Estimators for Light Transport, Proc. 5th Eurographics Worshop on Rendering, pp. 147-161, Jun. 1994.
Veach, Optimally Combining Sampling Techniques for Monte Carlo Rendering, Proc. SIGGRAPH 1995, Annual Conference Series, pp. 419-428, 1995.
Veach, Metropolis Light Transport, Proc. SIGGRAPH 1997, Annual Conference Series, pp. 65-76, ACM SIGGRAPH, Addison Wesley, Aug. 1997.
Waechter, Diploma Thesis: Realtime Ray Tracing, Ulm University, 2004.
Wall, Optimizing Memory Bandwidth, Game Developers Conference Talk, 2002.
Wald, Realtime Ray Tracing and Interactive Global Illumination, PhD thesis, Saarland University, 2004.
Wald, Fast Construction of SAH-based Bounding Volume Hierarchies, Proc. 2007 IEEE/EG Symposium on Interactive Ray Tracing, pp. 33-40, 2007.
Warnock, Hidden-Surface Algorithm for Computer Generated Half-Tone Pictures, Technical Report TR 4-15, NTIS AD-733 671, University of Utah, Computer Science Department, 1969.
Ward, Adaptive Shadow Testing for Ray Tracing, 2nd Eurographics Workshop on Rendering, 1991.
Ward, Real Pixels, in Graphics Gems II, pp. 80-83, 1991.
Williams, Efficient and Robust Ray-Box Intersection Algorithm, Journal of Graphics Tools, 10(1):49-54, 2005.

Wald, Distributed Interactive Ray Tracing of Dynamic Scenes, Proc. 2003 IEEE Symposium on Parallel and Large-Data Visualization 2003.
Wald, Interactive Global Illumination in Complex and Highly Occluded Environments, Proceedings of the 14th Eurographics Workshop on Rendering, 2003.
Wald, Ray Tracing Deformable Scenes using Dynamic Bounding Volume Hierarchies, ACM Transactions on Graphics, 26(1), 2006.
White, Poisson Disk Point Sets by Hierarchical Dart Throwing, Proc. 2007 IEEE/EG Symposium on Interactive Ray Tracing, pp. 129-132, 2007.
Wald, Interactive Out-of-Core Rendering Framework, in Rendering Techniques 2004 (Proc. 15th Eurographics Symposium on Rendering), pp. 81-92, 2004.
Wald, SIMD Ray Stream Tracing, Technical report, Poster at the 2007 IEEE/EG Symposium on Interactive Ray Tracing, 2007.
Wald, Building fast kD-trees for Ray Tracing, Proc. 2006 IEEE Symposium on Interactive Ray Tracing, pp. 61-69, Sep. 2006.
Weghorst, Improved computational methods for ray tracing, ACM Transactions on Graphics, 3(1):52-69, 1984.
Whitted, Improved Illumination Model for Shaded Display, Communications of the ACM, 23(6):343-349, Jun. 1980.
Wierum, Anwendung diskreter raumfullender Kurven, PhD thesis, Universitat Paderborn, 2003.
Wald, Ray Tracing Animated Scenes using Coherent Grid Traversal, ACM Transactions on Graphics (Proc. SIGGRAPH 2006), pp. 485-493, 2006.
Waechter, Instant Ray Tracing: The Bounding Interval Hierarchy, in Rendering Techniques 2006, pp. 139-149, 2006.
Wald, State of the Art in Ray Tracing Animated Scenes, In Eurographics State of the Art Reports, 2007.
Woop, B-KD Trees for Hardware Accelerated Ray Tracing of Dynamic Scenes, Proc. Graphics Hardware, pp. 67-77, 2006.
Woo, Efficient Shadow Computations in Ray Tracing, IEEE Computer Graphics & Applications, 13(5):78-83, 1993.
Woo, It's Really Not a Rendering Bug, You See, IEEE Computer Graphics & Applications, 16(5):21-25, 1996.
Wald, Interactive Distributed Ray Tracing of Highly Complex Models, in Rendering Techniques 2001 (Proc. 12th Eurographics Workshop on Rendering), pp. 277-288, Springer, 2001.
Woop, RPU: A Programmable Ray Processing Unit for Realtime Ray Tracing, ACM Transactions on Graphics (Proc. SIGGRAPH 2005), 24(3):434-444, 2005.
Wilkie, Analytical Model for Skylight Polarisation, in Rendering Techniques 2004 (Proc. 15th Eurographics Symposium on Rendering), pp. 387-399, 2004.
Yamaguchi, Unified Approach to Interference Problems using a Triangle Processor, Proc. SIGGRAPH 1985, pp. 141-149, 1985.
Yoon, Cache-Oblivious Mesh Layouts, ACM Transactions on Graphics (Proc. SIGGRAPH 2005), 24(3):886-893, 2005.
Yoon, Cache-Oblivious Layouts of Bounding Volume Hierarchies, Technical report, University of North Carolina at Chapel Hill, 2005.
Yamaguchi, Two Robust, Point-in-Polygon Tests based on the 4×4 Determinant Method, Advances on Design Automation (ASME), 23(1):89-95, 1990.
Zuniga, Ray Queries with Wide Object Isolation and the DE-Tree, Journal of Graphics Tools, 11(3):27-45, 2006.
Lafortune, Bidirectional Path Tracing, In Proc. 3rd International Conference on Computational Graphics and Visualization Techniques (Compugraphics), pp. 145-153, 1993.
Lafortune, Using the Modified Phong BRDF for Physically Based Rendering, Technical Report CW197, Department of Computer Science, K.U.Leuven, Belgium, 1994.
Lafortune, Rendering Participating Media with Bidirectional Path Tracing, Rendering Techniques 1996 (Proc. 7th Eurographics Workshop on Rendering), pp. 91-100, 1996.
Lauterbach, Ray-Strips: A Compact Mesh Representation for Interactive Ray Tracing, In Proc. 2007 IEEE/EG Symposium on Interactive Ray Tracing, pp. 19-26, 2007.
Mahovsky, Ray Tracing with Reduced-Precision Bounding Volume Hierarchies, PhD thesis, Department of Computer Science, Calgary, Alberta, Aug. 2005.
Maansson, Master Thesis: Ray Coherence Measures for Real-Time Ray Tracing, 2007.
Matouvsek, On the $L\_2$-discrepancy for anchored boxes, J. Complexity, 14(4):527-556, 1998.
Matusik, A Data-Driven Reflectance Model, PhD thesis, Massachusetts Institute of Technology, 2003.
MacDonald, Heuristics for Ray Tracing Using Space Subdivision, The Visual Computer, 6(3):153-166, Jun. 1990.
Morokoff, Quasi-Monte Carlo Approach to Particle Simulation of the Heat Equation, SIAM Journal on Numerical Analysis, 30(6):1558-1573, 1993.
Minor, Terrain Rendering Engine (TRE): Cell Broadband Engine Optimized Real-time Ray-caster, Technical report, IBM, 2005.
Moser, Interactive Realistic Simulation of Wireless Networks, In Proc. 2007 IEEE/EG Symposium on Interactive Ray Tracing, pp. 161-166, 2007.
Muller, Acquisition, Synthesis, and Rendering of Bidirectional Texture Functions, Computer Graphics Forum, 24 (1):83-109, Mar. 2005.
Minor, iRT: An Interactive Ray Tracer for the CELL Processor, Technical report, IBM, 2006.
Moore, Interval Analysism Prentice Hall, Englewood Cliffs, NJ, USA, 1966.
Morton, Computer-oriented Geodetic Data Base and a New Technique in File Sequencing, Technical report, IBM Ltd. Ottawa, Canada, 1966.
Mori, Bukimi no tani (The uncanny valley), Energy, 7(4):33-35, 1970.
Matusik, A Data-Driven Reflectance Model, ACM Transactions on Graphics (Proc. SIGGRAPH 2003), 22(3):759-769, Jul. 2003.
Motwani, Randomized Algorithms, Cambridge University Press, 1995.
Moller, Fast, Minimum Storage Ray/Triangle Intersection, Journal of Graphics Tools, 2(1):21-28, 1997.
Muller, Object Hierarchies for Efficient Rendering, PhD thesis, Technische Universitat Braunschweig, 2004.
Nawaz, Personal Communication, 2007.
Ngan, Experimental Analysis of BRDF Models, In Rendering Techniques 2005 (Proc. 13th Eurographics Symposium on Rendering), pp. 117-226. Eurographics Association, 2005.
Niederreiter, Random Number Generation and Quasi-Monte Carlo Methods, SIAM, Philadelphia, 1992.
Niederreiter, Error bounds for quasi-Monte Carlo integration with uniform point sets, J. Comput. Appl. Math., 150:283-292, 2003.
Nicodemus, Geometrical Considerations and Nomenclature for Reflectance, Technical report, U. S. Deptartment of Commerce, Oct. 1977.
Niederreiter, Quasirandom Points and Global Function Fields, Finite Fields and Applications, pp. 269-296, 1996.
Cornell University Program of Computer Graphics, Reflectance Data, www.graphics.cornell.edu/online/measurements/reflectance.
O'Rourke, Computational Geometry in C, 2nd Edition, Academic Press, 1998.
Overbeck, Real-time Beam Tracer with Application to Exact Soft Shadows, In Rendering Techniques 2007 (Proc. 15th Eurographics Symposium on Rendering), Eurographics and ACM/SIGGRAPH, the Eurographics Association, Jun. 2007.
Ogita, Accurate Sum and Dot Product, SIAM Journal on Scientific Computing (SISC), 26(6):1955-1988, 2005.
Olsen, Masters Thesis: Cache-Oblivious Algorithms in Practice, Department of Computer Science, University of Copenhagen, 2002.
Ooi, Spatial k-d tree: An indexing mechanism for spatial databases, IEEE International Computer Software and Applications Conference (COMPSAC), 1987.
Oudshoorn, Ray Tracing as the Future of Computer Games, 1999.
Owen, Randomly Permuted $(t,m,s)$-Nets and $(t,s)$-Sequences, In Monte Carlo and Quasi-Monte Carlo Methods in Scientific Computing, vol. 106 of Lecture Notes in Statistics, pp. 299-315. Springer, 1995.
Owen, Quasi-Monte Carlo Sampling, SIGGRAPH 2003 Course Notes, 2003.
Parker, RTSL: a Ray Tracing Shading Language, Proc. 2007 IEEE/EG Symposium on Interactive Ray Tracing, pp. 149-160, 2007.

Popov, Experiences with Streaming Construction of SAH KD-Trees, Proc. 2006 IEEE Symposium on Interactive Ray Tracing, pp. 89-94, Sep. 2006.

Popov, Stackless KD-Tree Traversal for High Performance GPU Ray Tracing, Computer Graphics Forum (Proc. Eurographics 2007), 26(3), Sep. 2007.

Phong, Illumination for computer generated images, Communications of the ACM, 18(6):311-317, 1975.

Pharr, Rendering Complex Scenes with Memory-Coherent Ray Tracing, SIGGRAPH 1997: Proc. 24th annual conference on Computer graphics and interactive techniques, pp. 101-108, New York, NY, USA, 1997, ACM Press/Addison-Wesley Publishing Co.

Pauly, Metropolis Light Transport for Participating Media, Rendering Techniques 2000 (Proc. 11th Eurographics Workshop on Rendering), pp. 11-22, Springer, 2000.

Press, Numerical Recipes in C, Cambridge University Press, 1992.

Purcell, Ray Tracing on a Stream Processor, PhD thesis, Stanford University, Mar. 2004.

Raab, Masters Thesis: Robust Global Illumination with Participating Media, Ulm University, 2005.

Roger, Whitted Ray-Tracing for Dynamic Scenes using a Ray-Space Hierarchy on the GPU, Rendering Techniques 2007 (Proc. 15th Eurographics Symposium on Rendering), pp. 99-110, Jun. 2007.

Reinelt, The Traveling Salesman—Computational Solutions for TSP Applications, Springer, 1994.

Reshetov, Omnidirectional Ray Tracing Traversal Algorithm for kd-trees, Proc. 2006 IEEE Symposium on Interactive Ray Tracing, pp. 57-60, Sep. 2006.

Reshetov, Faster Ray Packets—Triangle Intersection through Vertex Culling, Proc. 2007 IEEE/EG Symposium on Interactive Ray Tracing, pp. 105-112, 2007.

Ratanaworabhan, Fast Lossless Compression of Scientific Floating-Point Data, DCC 2006: Proc. Data Compression Conference, pp. 133-142, IEEE Computer Society, 2006.

* cited by examiner

```
//Calculate Point of Intersection
Point endPoint = ray .o + (ray .d*t):

//Refine Point (based on newly calculated "t")
t = RayPlaneIntersect (endPoint , ray . d , tri_index);
if(t < 0.0)
{
    backHitPoint = endPoint;
    frontHitPoint = endPoint + (ray . d*t);
}
else
{
    backHitPoint = endPoint + (ray . d*t);
    frontHitPoint = endPoint;
}

//Offset Final Points by Integer Arithmetic
if (n*ray . d > 0.0)
{
    backHitPoint . Offset (n);
    n = -n;
    frontHitPoint . Offset (n);
    backSide = false;
}
else
{
    backHitPoint . Offset(-n);
    frontHitPoint . Offset(n);
    backSide = true;
}
```

Listing 2.1: Refine the point of intersection and offset by using integer arithmetic afterwards.

FIG. 7

```
void Point::Offset (Vector &d)  { // Vector d should be normalized
   //Point component close to zero?
   if((uintCast(x)&0x7FFFFFFF) < uintCast(PT_SMALL))
       x += d.dx*PT_SMALL;
   else
       uintCast(x) += ( int )( PT_EPSF[uintCast(x)>>31]*d.dx );
       //Faster solution. but also demanding a larger offset;
       //uintCast(x) += PT_EPSI[uintCast(x)^uintCast(d.dx))>>31];

//...same for y , z
}
```

Listing 2.2: Offset point by integer arithmetic, weight by vector d. PT_EPSI/F stores the offset (positive and negative) that is addressed by the sign of the component.

FIG. 8

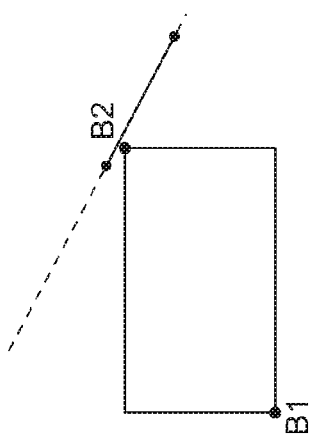
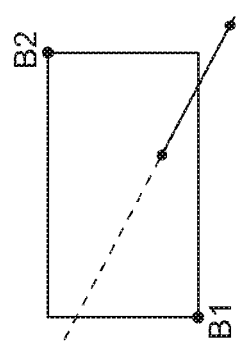
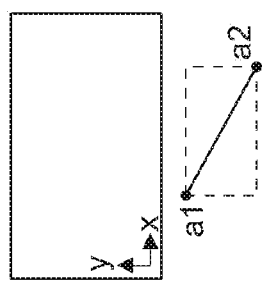
FIG. 14
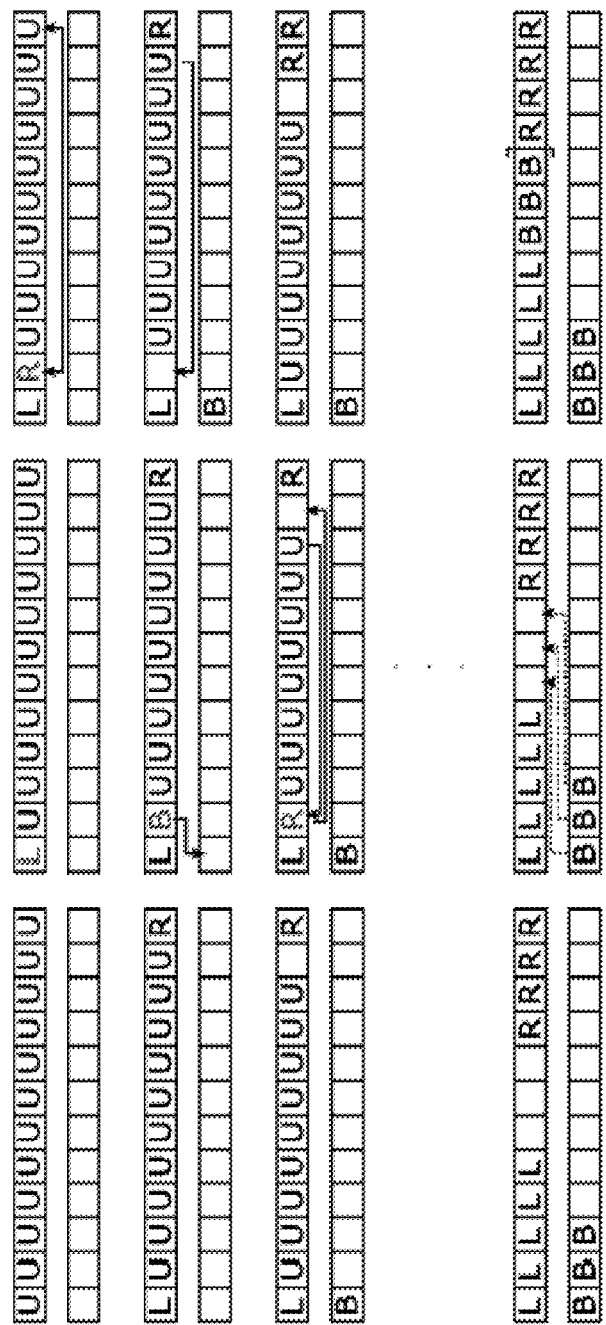
FIG. 15

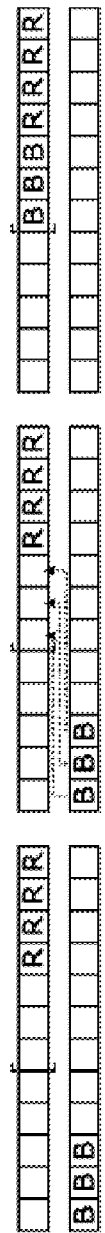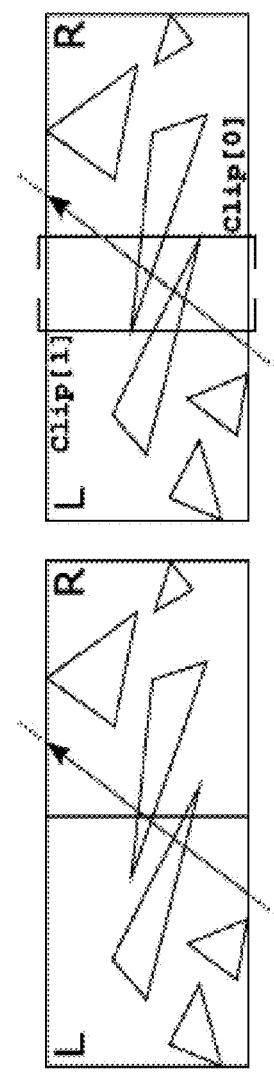
FIG. 16
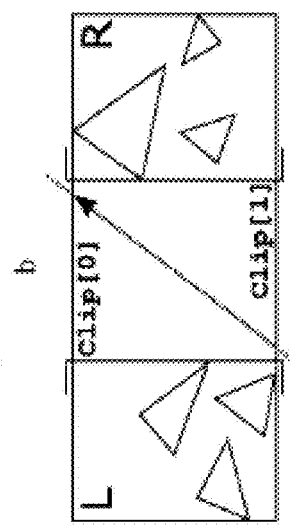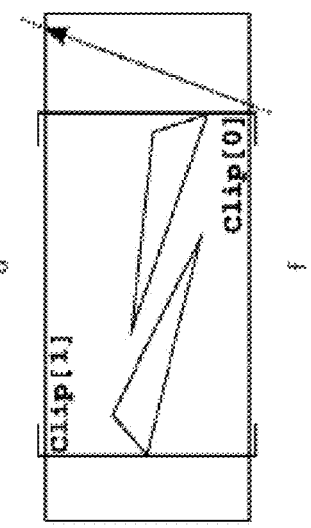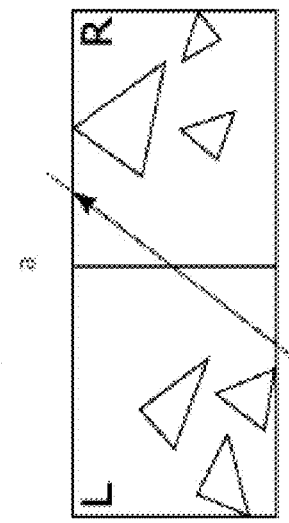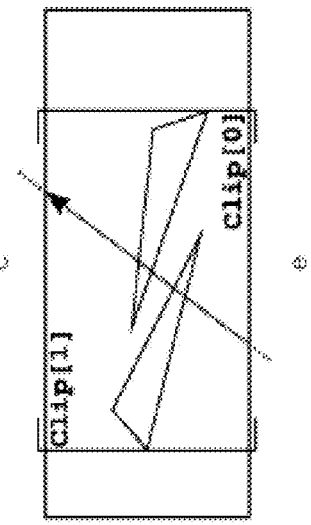
FIG. 17

```
//Traversal pre-calculation step (once per ray):
Point rf((worldBoxMin.x-ray.o.x)/ray.d.x,....);
Point wbh(((worldBoxMax.x-worldBoxMin.x)/65536)/ray.dx,....);
.
.
//Inside traversal loop :
dist[0] = newsplit[0]*wbh[axis]+rf[axis];
dist[1] = newsplit[1]*wbh[axis]+rf[axis];
```

Listing 2.3: Using the quantized data in the ray-hierarcy intersection implementation.

FIG. 18

```
//Traversal pre-calculation step (once per ray):
Point rf( ((worldBoxMin.x-ray.o.x -(worldBoxMax.x-worldoxMin.x)*128)/ray.d.x,....);
Point wbh(((worldBoxMax.x-worldBoxMin.x)*64)/ ray .d.x,....);
.
.
//Inside traversal loop :
uintCast(dist[0]) = (uint)newsplit[0]|0x40000000;
uintCast(dist[1]) = (uint)newsplit[1]|0x40000000;

dist[0] = dist[0]*wbh[axis]+rf[axis];
dist[1] = dist[1]*wbh[axis]+rf[axis];
```

FIG. 19

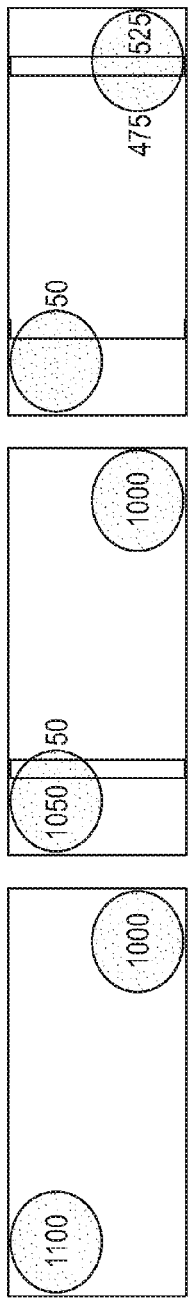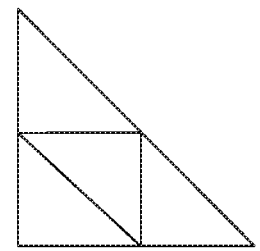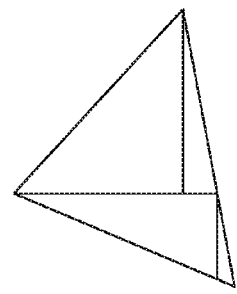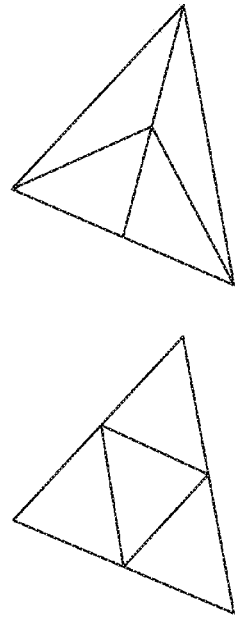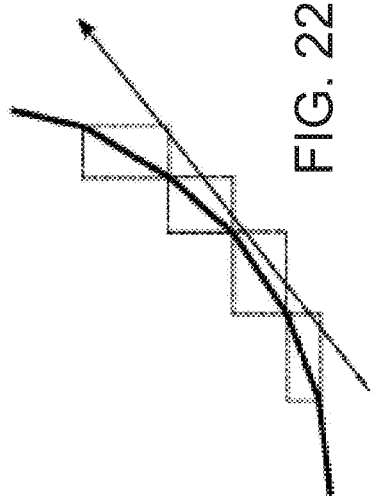

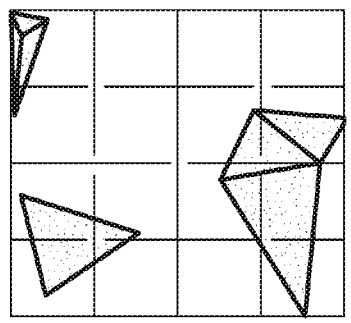 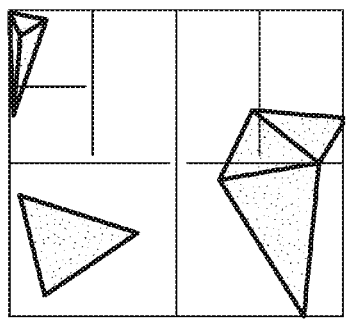 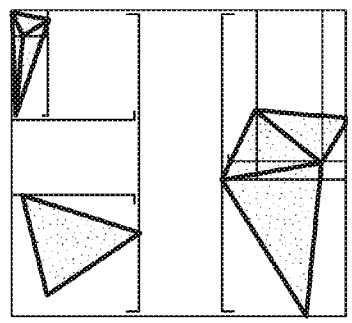
FIG. 23a   FIG. 23b   FIG. 23c
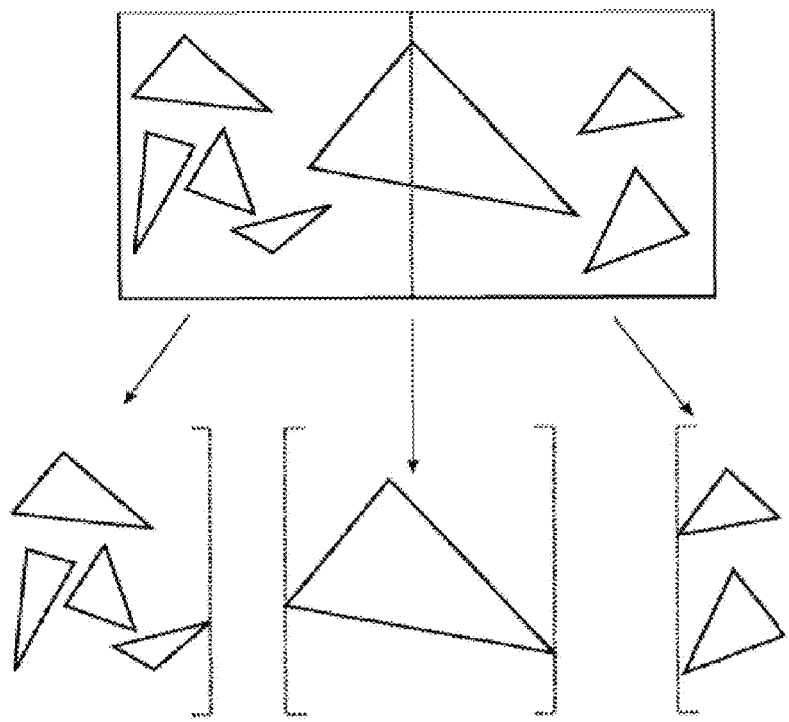
FIG. 24

```
__m128 LUT[16];
void precalcLookup() {
    for(unsigned int c = 0; c < 16; c++)
    {
        unsigned int i[4] = {-(c&1),-((c>>1)&1),-((c>>2)&1),-((c>>3)};
        LUT[c] = _mm_set_ps(floatCast(i[3]),floatCast(i[2]),
                            floatCast(i[1]),floatCast(i[0]));
    }
} double xiSSE(unsigned int i) {
    __m128 result = _mm_xor_ps(
    _mm_xor_ps(
        _mm_xor_ps(_mm_and_ps(LUT[i&15], matrix [0]),
                   _mm_and_ps(LUT[(i>>4)&15],matrix[1])),
        _mm_xor_ps(_mm_and_ps(LUT[(i>>8)&15],matrix[2]),
                   _mm_and_ps(LUT[(i>>12)&15],matrix[3]))),
    _mm_xor_ps(
        _mm_xor_ps(_mm_and_ps(LUT[(i>>16)&15],matrix[4]),
                   _mm_and_ps(LUT[(i>>20)&15],matrix[5])),
        _mm_xor_ps(_mm_and_ps(LUT[(i>>24)&15],matrix[6]),
                   _mm_and_ps(LUT[(i>>28)],matrix[7]))));

__m128 tmp = _mm_xor_ps(result, _mm_movehl_ps(result, result));
    unsigned int tmp2 = ((unsigned int*)&tmp)[0] ^ ((unsigned int*)&tmp)[1];
    return (double)tmp2 + (1.0/1ULL << 32));
}
```

FIG. 32

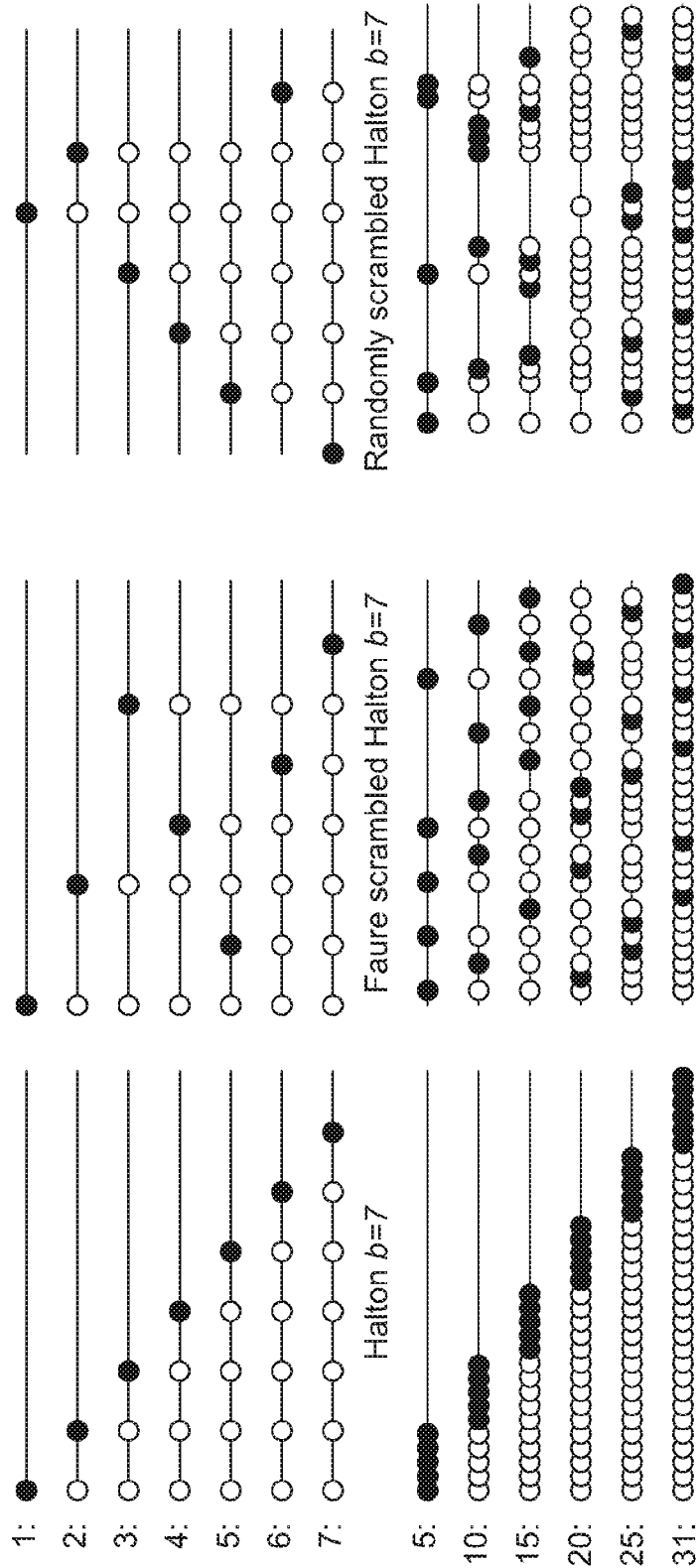
FIG. 36
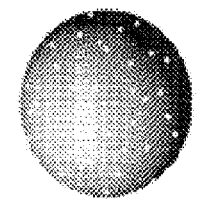
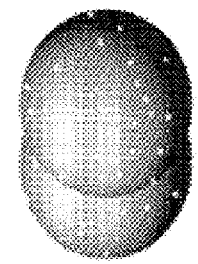
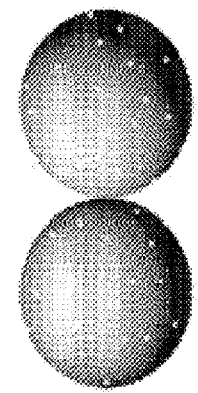
FIG. 37

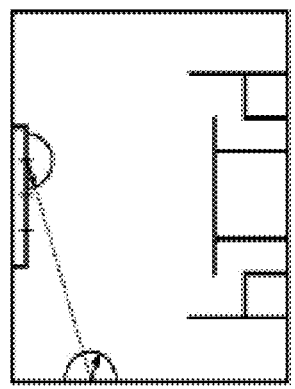
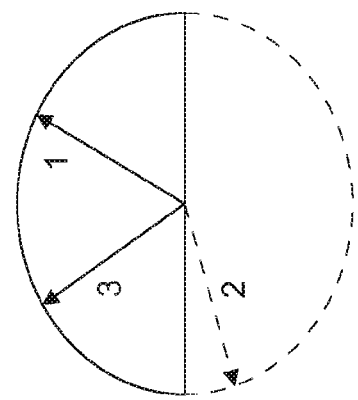
FIG. 42c
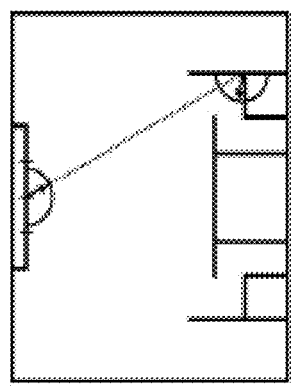
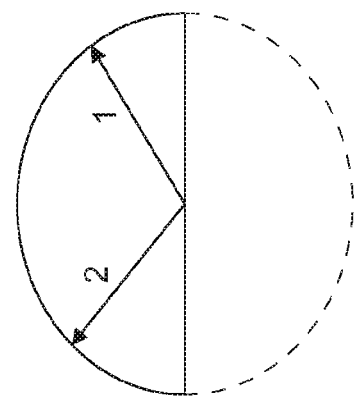
FIG. 42b
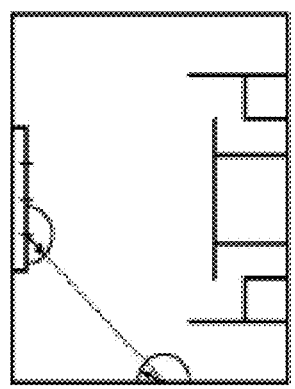
FIG. 41
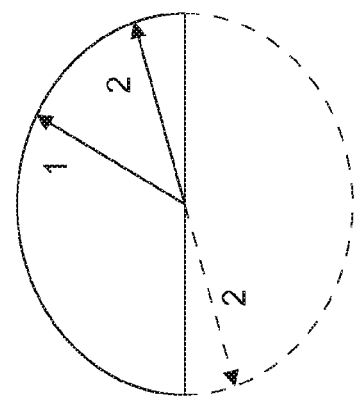
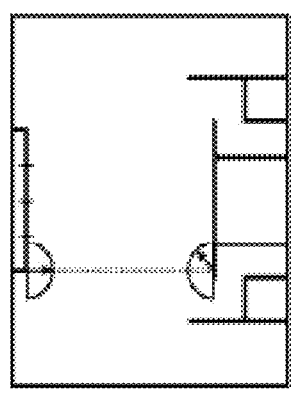
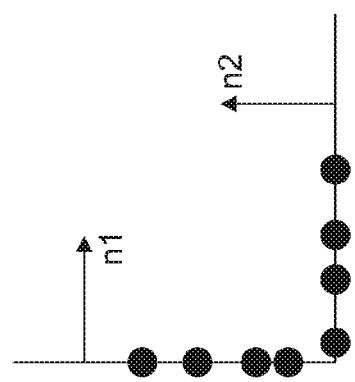
FIG. 42a

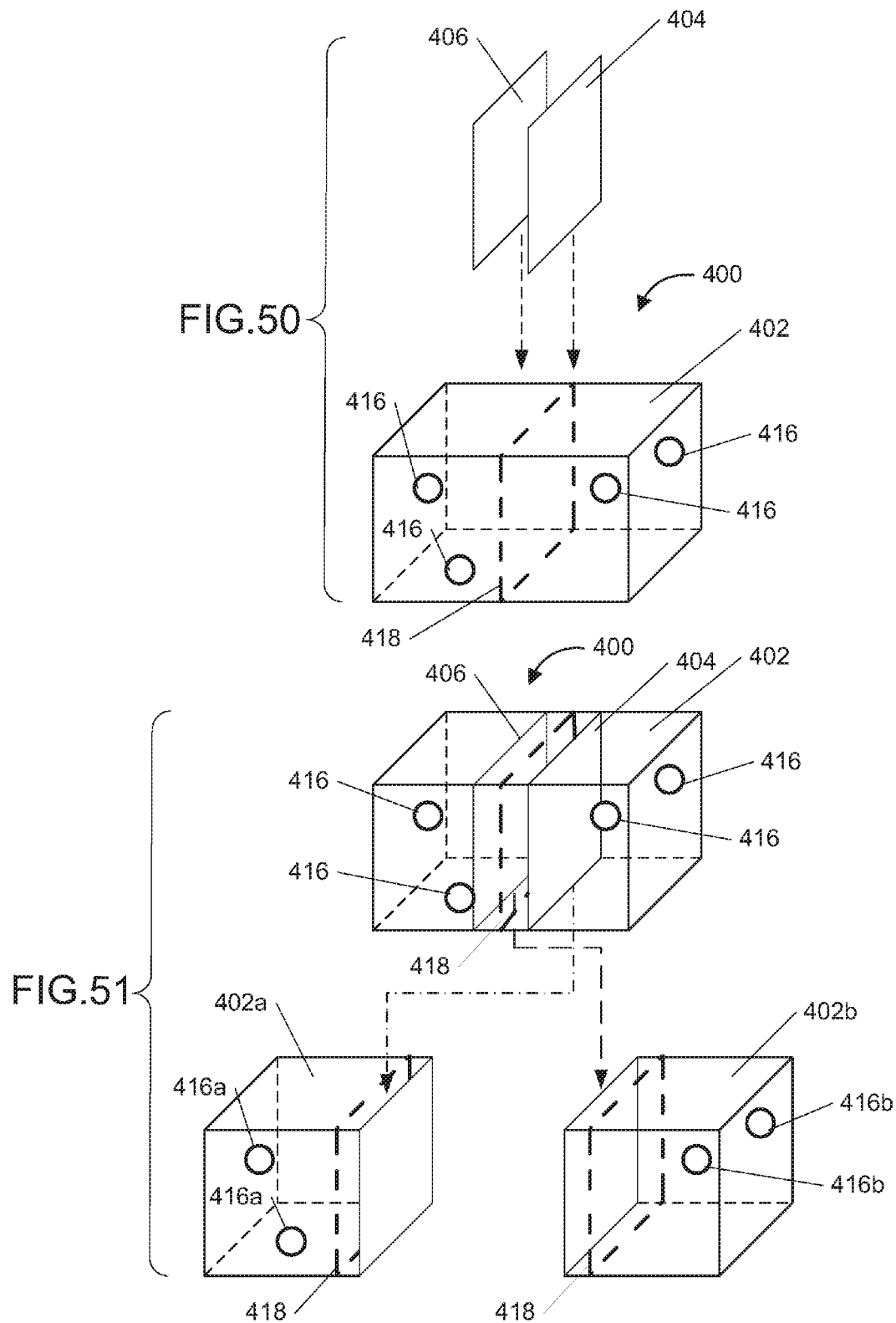

650
651. ALLOCATE A CONTIGUOUS BLOCK OF MEMORY
652. CONSTRUCT AN ACCELERATION DATA STRUCTURE IN THAT CONTIGUOUS BLOCK OF MEMORY COMPLETELY AHEAD OF RAY TRACING OR ON DEMAND DURING RAY TRACING.
653. COMPUTE ILLUMINATION SAMPLES FROM TRANSPORT PATHS ASSEMBLED OUT OF SEGMENTS FOUND BY TRACING RAYS.
654. USE THE SAMPLES TO COMPUTE AN IMAGE.
FIG. 54

700

701. CONFIGURE RAY-TRACING METHODOLOGY:

702. SIMULATE RAY SHOT FROM GIVEN PIXEL INTO SCENE (OR FROM SCENE INTO PIXEL) ALONG A SELECTED DIRECTION;

CALCULATE INTERSECTIONS OF RAYS AND SURFACES OF OBJECTS IN SCENE;

SIMULATE TRAJECTORIES OF RAYS ILLUMINATING OBJECTS IN SCENE

703. EMPLOY BOUNDING INTERVAL HIERARCHY (BIH) USING QUANTIZED PLANES TO REDUCE MEMORY REQUIREMENTS WHILE MAINTAINING SELECTED DEGREE OF PRECISION (CAN UTILIZE VARIANTS INCLUDING ONE-PLANE VERSION OR QUAD-PLANE VERSION)

711. CONFIGURE RAY-TRACING METHODOLOGY:

712. SIMULATE RAY SHOT FROM GIVEN PIXEL INTO SCENE (OR FROM SCENE INTO PIXEL) ALONG A SELECTED DIRECTION;

CALCULATE INTERSECTIONS OF RAYS AND SURFACES OF OBJECTS IN SCENE;

SIMULATE TRAJECTORIES OF RAYS ILLUMINATING OBJECTS IN SCENE

713. EMPLOY UNIFIED DATA STRUCTURE THAT CAN UTILIZE EITHER OR BOTH OF SPATIAL PARTITIONING AND OBJECT LIST PARTITIONING TO ACCELERATE RAY TRACING, WHEREIN UNIFIED DATA STRUCTURE CAN BE CONSTRUCTED ON DEMAND AND IN-PLACE WITHIN AN A PRIORI SELECTED AMOUNT OF MEMORY

721. CONFIGURE RAY-TRACING METHODOLOGY:

722. SIMULATE RAY SHOT FROM GIVEN PIXEL INTO SCENE (OR FROM SCENE INTO PIXEL) ALONG A SELECTED DIRECTION;

CALCULATE INTERSECTIONS OF RAYS AND SURFACES OF OBJECTS IN SCENE;

SIMULATE TRAJECTORIES OF RAYS ILLUMINATING OBJECTS IN SCENE

723. CONSTRUCT OBJECT LIST PARTITIONING IN LINEAR TIME, IN A BOTTOM UP MANNER (PARTITIONING CAN COMPRISE BVH, BIH, SINGLE PLANE, OR QUAD PLANE)

(CAN BE EXECUTED IN PARALLEL OR SUBSTANTIALLY PARALLEL MANNER):

723a. CREATE BOUNDING BOXES BASED ON REGULAR GRID TO ENABLE BUCKET SORT OPERATION,

723b. STORE, IN COUNTERS, ORIGINAL RESOLUTION OF GRID UTILIZED FOR BUCKET SORT,

723c. UTILIZE ROUND-ROBIN APPROACH TO SELECT A COUNTER HAVING A NON-ZERO VALUE,

723d. DIVIDE COUNTER VALUE OF SELECTED COUNTER BY SELECTED VALUE AND UTILIZE AN AXIS ASSIGNED TO THE SELECTED COUNTER, (SELECTED VALUE CAN BE 2)

723e. LOOP OVER ALL BOXES, INCLUDING MERGING DIRECTLY NEIGHBORING BOXES ALONG THE AXIS AND CREATING A PARTITIONING NODE IF ALL DIRECTLY NEIGHBORING BOXES ARE NON-EMPTY, OR IF ONLY ONE IS NON-EMPTY, DETERMINING WHETHER AN ADDITIONAL PARTITIONING NODE FOR EMPTY SPACE CUT-OFF IS TO BE CREATED, AND

723f. CONTINUE AT LEAST 723b THROUGH 723e UNTIL ONLY A ROOT BOX REMAINS.

731. CONFIGURE RAY-TRACING METHODOLOGY:

732. SIMULATE RAY SHOT FROM GIVEN PIXEL INTO SCENE (OR FROM SCENE INTO PIXEL) ALONG A SELECTED DIRECTION;

CALCULATE INTERSECTIONS OF RAYS AND SURFACES OF OBJECTS IN SCENE;

SIMULATE TRAJECTORIES OF RAYS ILLUMINATING OBJECTS IN SCENE

733. SORT GIVEN SET OF RAYS INTO RAY TRACING ACCELERATION DATA STRUCTURE (RAY TRACING ACCELERATION DATA STRUCTURE CAN COMPRISE SPATIAL HIERARCHY, OBJECT LIST PARTITIONING HIERARCHY, HYBRID HIERARCHY, OR COMBINATION OF ABOVE)

741. SORTING GIVEN SET OF RAYS INTO RAY TRACING ACCELERATION DATA STRUCTURE COMPRISES:

↓

742. WITHIN COMPUTER, PASSING PLURALITY OF RAYS IN THE SET OF RAYS IN A FIRST ARRAY, ALONG WITH A SECOND ARRAY OF REFERENCES 0 . . . N - 1 FOR EACH RAY (FIRST ARRAY CAN BE AN UN-ORDERED ARRAY)

↓

743. INITIALIZE ALL RAYS AND CLIP THEM TO AN ASSOCIATED SCENE BOUNDING BOX,

WHEREIN THE RAY REFERENCES ARE RE-SORTED IN-PLACE INTO A FIRST GROUP OF RAYS THAT INTERSECT THE BOUNDING BOX, WHICH DEFINE A LEFT SIDE OF THE ARRAY AND A SECOND GROUP OF RAYS THAT MISS THE BOUNDING BOX, WHICH DEFINE A RIGHT SIDE OF THE ARRAY

↓

744. PASS ALL RAYS OF THE FIRST GROUP OF RAYS TO A RAY TRAVERSAL PROCESS THAT BEGINS AT A ROOT NODE

761. CONFIGURE RAY-TRACING METHODOLOGY:

762. SIMULATE RAY SHOT FROM GIVEN PIXEL INTO SCENE (OR FROM SCENE INTO PIXEL) ALONG A SELECTED DIRECTION;

CALCULATE INTERSECTIONS OF RAYS AND SURFACES OF OBJECTS IN SCENE;

SIMULATE TRAJECTORIES OF RAYS ILLUMINATING OBJECTS IN SCENE

763. EXTEND SELECTED GLOBAL ILLUMINATION ALGORITHM BY UTILIZING DETERMINISTICALLY SELECTED SUBSET OF GENERATED POINT LIGHT SOURCES, WHICH IS MADE CONSISTENT OR UNBIASED BY SELECTING A SUBSET OF REMAINING POINT LIGHT SOURCES IN A CONSISTENT OR UNBIASED WAY

771. CONFIGURE RAY-TRACING METHODOLOGY:

772. SIMULATE RAY SHOT FROM GIVEN PIXEL INTO SCENE (OR FROM SCENE INTO PIXEL) ALONG A SELECTED DIRECTION;

CALCULATE INTERSECTIONS OF RAYS AND SURFACES OF OBJECTS IN SCENE;

SIMULATE TRAJECTORIES OF RAYS ILLUMINATING OBJECTS IN SCENE

773. EXTEND SELECTED GLOBAL ILLUMINATION ALGORITHM, PATH TRACING ALGORITHMS, AND BI-DIRECTIONAL PATH TRACING ALGORITHMS, WHEREIN:

(1) VERTICES OF THE LIGHT PATHS ARE SORTED BY SPATIAL PROXIMITY AND THEN (2) TRAJECTORY SPLITTING FROM A SORTED QUASI-MONTE CARLO OPERATION IS USED TO GENERATE PHOTON MAPS.

FIG. 62

QUASI-MONTE CARLO LIGHT TRANSPORT SIMULATION BY EFFICIENT RAY TRACING

CROSS-REFERENCE TO RELATED APPLICATIONS AND INCORPORATION BY REFERENCE

This application for patent claims the priority benefit of U.S. Provisional Patent App. Ser. No. 60/977,603 filed Oct. 4, 2007. This application is also a Continuation-in-Part of U.S. patent application Ser. No. 11/474,517, filed Jun. 23, 2006, issued as U.S. Pat. No. 7,499,053, which claims the benefit of U.S. Provisional Patent App. Ser. No. 60/693,231 filed Jun. 23, 2005, and which is also a Continuation-in-Part of U.S. patent application Ser. No. 10/299,574, filed Nov. 19, 2002, issued as U.S. Pat. No. 7,184,042.

U.S. Pat No. 7,184,042 is a Continuation-in-Part of U.S. Ser. No. 09/884,861, filed Jun. 19, 2001, issued as U.S. Pat. No. 7,227,547, which claims priority benefit from U.S. Provisional Patent App. Ser. No. 60/265,934, filed Feb. 1, 2001, (expired), and 60/212,286 filed Jun. 19, 2000 (expired).

Each of the above-listed patent applications and patents, including, but not limited to, U.S. Pat. Nos. 7,227,547, 7,184,042, 7,499,053 and U.S. Pat. App. 60/693,231, as well as their provisional counterparts, is incorporated by reference herein in its entirety as if set forth in its entirety herein.

FIELD OF THE INVENTION

The present invention relates generally to methods and systems for image rendering in and by digital computing systems, such as computer graphics methods and systems for motion pictures and other applications, and in particular, relates to methods, systems, devices, and computer software for enabling quasi-Monte Carlo (QMC) light transport simulation by efficient ray tracing.

BACKGROUND OF THE INVENTION

The term "ray tracing" describes a technique for synthesizing photorealistic images by identifying all light paths that connect light sources with cameras and summing up these contributions. The simulation traces rays along the line of sight to determine visibility, and traces rays from the light sources in order to determine illumination.

Ray tracing has become mainstream in motion pictures and other applications. However, current ray tracing techniques suffer from a number of known limitations and weaknesses, including numerical problems, limited capabilities to process dynamic scenes, slow setup of acceleration data structures, and large memory footprints. Thus, current ray tracing techniques lack the capability to deal efficiently with fully animated scenes, such as wind blowing through a forest or a person's hair. Overcoming the limitations of current ray tracing systems would also enable the rendering of, for example, higher quality motion blur in movie productions.

Current attempts to improve the performance of ray tracing systems have fallen short for a number of reasons. For example, current real-time ray tracing systems generally use 3D-trees as their acceleration structure, which are based on axis-aligned binary space partitions. Because the main focus of these systems is on rendering static scenes, they typically fail to address the significant amount of setup time required to construct the required data structures in connection with fully animated scenes.

Along these lines, one known approach seeks to build efficient 3D-trees and develop a technique able to shorten the time needed to traverse the tree. However, it can be shown that the expected memory requirement for the system increases quadratically with an increase in the number of objects to be ray-traced.

It would be desirable to provide improved and more efficient methods, systems, apparatus, devices and software program/code products relating to ray tracing.

More particularly, photorealistic image synthesis can be described by a path integral. This integral is numerically approximated by summing up contributions of transport paths that connect light sources and sensors, e.g., a camera, a human eye, or the like. The paths are trajectories of Markov processes, the edges of which are straight lines along rays of light and the vertices of which are light-scattering events.

Accordingly, it would be desirable to provide methods, systems, apparatus, devices and software program/code products that can accelerate the simulation of light transport, provide techniques and data structures to efficiently trace rays, and allow the better approximation of the distribution of light by using quasi-Monte Carlo techniques to simultaneously simulate an ensemble of paths instead of single trajectories. The present invention, as discussed in detail below, provides such methods, structures, techniques, processes, and technical advantages. The invention, as described below has applications not only in computer graphics, but also in other areas of computer science, mathematics, and other fields.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 7 shows an exemplary listing of a technique for refining the point of intersection and offset by using integer arithmetic afterwards.

FIG. 8 shows an exemplary listing of a technique for offsetting a point by integer arithmetic.

FIG. 14 illustrates testing of a line with respect to a rectangle.

FIG. 15 shows a series of diagrams illustrating kd-tree in-place sorting of object indices and storing on the global stack during tree construction.

FIG. 16 shows a series of diagrams illustrating the restoration of stacked object indices after a stack pop operation.

FIG. 17 illustrates geometric primitives overlapping the splitting plane of a kd-tree.

FIG. 18 shows an exemplary listing of an implementation using the quantized data in the ray-hierarchy intersection.

FIG. 19 shows a snippet of code for moving scaling to pre-calculation.

FIG. 20 is a diagram illustrating a split-plane only cutting off empty space by accident where the distribution of primitives in the children is not equal.

FIG. 21 illustrates a technique in which splits are allowed only along the principal planes.

FIG. 22 illustrates the problem of rays that just slightly miss the silhouette of a complex object.

FIG. 23 illustrates split-plane candidates in a boundary interval hierarchy.

FIG. 24 is a diagram illustrating ternary tree partitioning.

FIG. 32 shows an exemplary code listing for fast generation of digital nets and sequences using SIMD opcodes.

FIG. 36 shows a series of diagrams comparing successive samples drawn from Halton sequences its scrambled variants.

FIG. 37 shows a series of diagrams illustrating two neighboring states and uniformly sampling their corresponding hemispheres.

FIG. 41 is a series of drawings illustrating photon trajectories that are started from the light sources.

FIG. 42 is a series of drawings illustrating a problem of considering light transport as a Volterra integral equation.

FIGS. 49-51 are a series of diagrams, in isometric view, of the axis-aligned bounding box shown in FIG. 48, illustrating the partitioning of the bounding box with L- and R-planes.

FIGS. 54-62 are a series of flowcharts illustrating overall techniques according to various described aspects of the invention.

SUMMARY OF THE INVENTION

Figure 1:
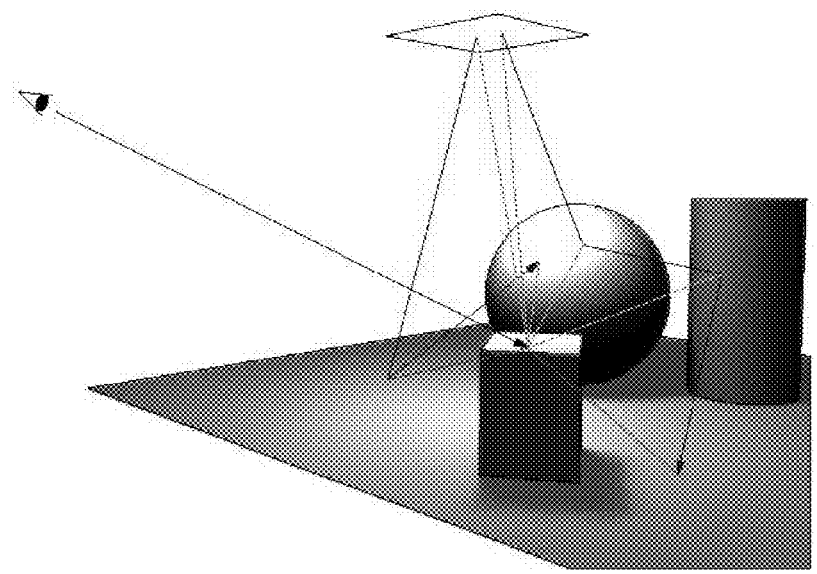
FIG. 1 shows an illustration of the sampling of a transport path space by path tracing.

The invention provides systems, devices, methods and computer program code (software) products for, among other aspects and possible applications, enabling computer graphics systems to accurately and efficiently render images. Systems, devices, methods and computer program code (software) products in accordance with the invention are suitable for implementation or execution in, or in conjunction with, a computer graphics system including a computer for rendering images for storage or for display, such as on a display element, wherein the rendering of an image comprises utilizing the computer and/or other elements of the computer graphics system to generate pixel values corresponding to pixels in an image representation. Systems, devices, methods and computer program code (software) products in accordance with the present invention are suitable for implementation or execution in, or in conjunction with, a wide range of commercially available computer graphics systems or software environments, such as those available from MENTAL IMAGES GMBH of Berlin, Germany.

One aspect of the present invention relates to a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene.

In conjunction with this aspect, the invention comprises methods, systems, devices and computer program code (software) for enabling a computer to employ a bounding interval hierarchy (BIH) using quantized planes to reduce memory requirements while maintaining a selected degree of precision.

In one practice or embodiment of the invention, the bounding interval hierarchy utilizing quantized planes can utilize variants including a one-plane version and a quad-plane version.

A further aspect of the invention includes methods, devices, systems or computer software code products (software) employing a unified data structure that can utilize either or both of spatial partitioning and object list partitioning to accelerate ray tracing, and wherein the unified data structure can be constructed on demand and in-place within an a-priori selected amount of memory.

Yet a further aspect of the invention includes methods, devices, systems or computer software code products (software) for constructing an object list partitioning in linear time, in a bottom up manner, by (1) creating bounding boxes based on a regular grid to enable a bucket sort operation, (2) storing an original resolution of the grid utilized for the bucket sort in counters, (3) utilizing a round-robin approach to select a counter having a non-zero value, (4) dividing the counter value of the selected counter by a selected value and utilizing an axis assigned to the selected counter, (5) looping over all boxes, including merging directly neighboring boxes along the axis and creating a partitioning node if all directly neighboring boxes are non-empty, or if only one is non-empty, determining whether an additional partitioning node for empty space cut-off is to be created, and (6) continuing at least (2) through (5) until only a root box remains.

In one practice or embodiment of the invention, the partitioning uses binary trees, and the selected value, by which the counter value of the selected counter is divided, is 2. The object list partitioning can include one or more of a bounding volume hierarchy (BVH), bounding interval hierarchy (BIH), single plane or quad-plane partitioning. The constructing of an object list partitioning can be executed in a parallel or a substantially parallel manner within the computer or computing elements.

A further aspect of the invention includes methods, devices, systems or computer software code products (software) for sorting a given set of rays into a ray tracing acceleration data structure, wherein the ray tracing acceleration data structure can comprise any of a spatial hierarchy, an object list partitioning hierarchy, or a hybrid hierarchy. In accordance with one practice or embodiment of the invention, this sorting can include sorting a given set of rays into a ray tracing acceleration data structure, which in turn can include the following:

(1) passing a plurality of rays in the set of rays in a first array, along with a second array of references 0 . . . N−1 for each ray, (2) initializing all rays and clipping them to an associated scene bounding box, and wherein the ray references are re-sorted in-place into a first group of rays that intersect the bounding box, which define a left side of the array and a second group of rays that miss the bounding box, which define a right side of the array, (3) passing all rays of the first group of rays to a ray traversal process that begins at a root node, the ray traversal process comprising:

(3a) testing whether a given node under test is a leaf, (3b) if the given node under test is not a leaf, all rays are intersected with the associated plane(s) and accordingly sorted into three groups, comprising: Left only; Right only; or Both, or, None, if a Bounding Volume Hierarchy, (3c) continuing the ray traversal process with one defined child, and storing the ray references that are required to visit both sides of a stack for later use;

(3d) if the given node under test is a leaf, then testing all rays against primitives in the leaf and (4) terminating the process if all rays have found an intersection or if the stack is empty.

In one practice or embodiment of the invention, the child can be defined as having the majority of rays passing through it; or the child can be defined otherwise, depending on a dominant direction of the rays.

In a further practice or embodiment of the invention, the sorting can further include, if using spatial partitioning or shadow rays, also executing the following: separating out rays that can stop the traversal and rays that have not yet found an intersection, while continuing traversal for active rays by extracting a node and its assigned references from the stack.

In one practice or embodiment of the invention, the first array referred to above can be an unordered array.

A further practice or embodiment of the invention can include methods, devices, systems or computer software code products (software) for defining an additional entry point search for all rays in the hierarchy after initializing and clipping the rays to the scene bounding box, and wherein the resulting points of intersection become implicitly sorted by spatial proximity.

Yet another practice or embodiment of the invention can include methods, devices, systems or computer software code products (software) for extending a selected global illumination algorithm by utilizing a deterministically selected subset of generated point light sources, which is made consistent or unbiased by selecting a subset of remaining point light sources in a consistent or unbiased manner.

A further practice or embodiment of the invention can include methods, devices, systems or computer software code products (software) for extending a selected global illumination algorithm, path tracing algorithms, and bi-directional path tracing algorithms, wherein: (1) vertices of the light paths are sorted by spatial proximity and then (2) trajectory splitting from a sorted quasi-Monte Carlo operation is used to generate photon maps.

These and other aspects, examples, embodiments and practices of the invention, whether in the form of methods, devices, systems or computer software code products (software), will be discussed in greater detail below in the following Detailed Description of the Invention and in connection with the attached drawing figures.

DETAILED DESCRIPTION OF THE INVENTION

Aspects of the present invention provide systems and techniques for quasi-Monte Carlo light transport simulation by efficient ray tracing.

Photorealistic image synthesis can be described by a path integral. This integral is numerically approximated by summing up contributions of transport paths that connect light sources and sensors, e.g., a camera, a human eye, or the like. The paths are trajectories of Markov processes, the edges of which are straight lines along rays of light and the vertices of which are light-scattering events.

Aspects of the presently described invention accelerate the simulation of light transport, provide techniques and data structures to efficiently trace rays, and allow the better approximation of the distribution of light by using quasi-Monte Carlo techniques to simultaneously simulate an ensemble of paths instead of single trajectories. The presently described systems and techniques have applications in computer science, mathematics, and other fields.

There are first presented new data structures and heuristics that feature a smaller memory footprint at improved numerical precision. In addition, it is possible to ray trace even massive scenes in a strictly limited, a priori fixed, memory block using rapid construction techniques that allow the complete data structure to be rebuilt at interactive frame rates. All efforts were combined in a unified framework that further allows the construction of an acceleration hierarchy using an on-demand policy and optionally balance the construction time versus the ray intersection time.

Besides finding faster ray tracing techniques, the total number of rays to be shot was reduced by mathematical means. By simplifying complicated mathematical schemes in a non-obvious way, the time complexity of the quasi-Monte Carlo simulation process was reduced. When concentrating on the fact that the underlying Fredholm integral equation is in fact of low-dimensional structure if not solved by the Neumann series, the resulting techniques are simpler and in addition much more efficient.

The combination of these new techniques allows photorealistic image synthesis at speeds approaching realtime.

The present discussion is organized into the following sections:

1. Introduction
   1.1 Light Transport
      1.1.1 Path Integral Formulation
      1.1.2 Scattering
   1.2 Structure of the Discussion
2. Ray Tracing
   2.1 Triangle Boundary Representation
      2.1.1 Survey of Ray-Triangle Intersection Tests
      2.1.2 Investigation of Numerical Precision and Performance
      2.1.3 Improving Ray Tracing Precision
      2.1.4 General Optimizations
   2.2 Acceleration by Spatial Partitioning
      2.2.1 Sorting Primitives into a W-Tree
      2.2.2 Managing Temporary Memory
   2.3 Acceleration by Object List Partitioning
      2.3.1 Bounding Interval Hierarchy (BIH)
      2.3.2 Ray Hierarchy Intersection
      2.3.3 Reducing the Memory Footprint
      2.3.4 Performance
   2.4 Partitioning Heuristics
      2.4.1 Survey of Partitioning Heuristics
      2.4.2 New and Improved Heuristics
   2.5 A Unified Acceleration Framework
      2.5.1 Constructing Hierarchies in an A Priori Fixed Memory Block
      2.5.2 Scheduling Available Memory by Prediction
      2.5.3 Time and Memory Complexity
      2.5.4 Acceleration by Hybrid Partitioning
      2.5.5 Construction on Demand
      2.5.6 Partially Updating and Rebuilding the Hierarchy
      2.5.7 Improving Time Complexity by Approximate Sorting
      2.5.8 Numerical Experiments and Results
   2.6 Efficient Implementation
      2.6.1 Hierarchy Traversal
      2.6.2 Tracing Sets of Rays
      2.6.3 Cache Oblivious Design
      2.6.4 Multi-Threaded Hierarchy Construction
   2.7 Summary
3. Quasi-Monte Carlo Simulation of Markov Chains
   3.1 Monte Carlo Integration
      3.1.1 Random Number and Pseudo Random Number Generation
      3.1.2 Error Bound
      3.1.3 Time Complexity
   3.2 Concepts of Uniformity
      3.2.1 Maximum Minimum Distance
      3.2.2 Discrepancy
      3.2.3 (M,µ)-Uniformity
   3.3 Quasi-Monte Carlo Integration
      3.3.1 Point Sequences by Radical Inversion
      3.3.2 Properties and Implementation of (t, s)-Sequences in Base b
      3.3.3 Rank-1 Lattices
      3.3.4 Deterministic Error Bounds
      3.3.5 Randomized Quasi-Monte Carlo Integration
   3.4 Simultaneous Simulation of Markov Chains
      3.4.1 Analysis of a Deterministic Technique in One Dimension
      3.4.2 New, Simplified Algorithm in s Dimensions
      3.4.3 Sorting Strategies
      3.4.4 Application to Light Transport Simulation
   3.5 Summary of Section 3
4. Applications and Results
   4.1 Compact Code: A 4 KB Demo
   4.2 Realtime Ray Tracing
   4.3 Interactive Visualization of Massive Scenes
   4.4 Realtime Photorealistic Image Synthesis
      4.4.1 Path Generation for the Robust Global Illumination Technique
      4.4.2 Simultaneous Simulation of Markov Chains
      4.4.3 Photon Mapping by Trajectory Splitting in the RGI Algorithm
   4.5 Interactive Car Visualization
      4.5.1 Example: Car
5. Digital Processing Environment; Efficient Construction of Acceleration Data Structures
6. Overall Techniques
7. Conclusion 1. Introduction Ray tracing is the core technology of global illumination simulation for photorealistic image synthesis. Graphics hardware cannot by itself efficiently handle all effects of global illumination. Software ray tracing can easily compete with high-end graphics hardware image synthesis for massive geometry. Although ray tracing has been known for a relatively long time, realtime ray tracing has only recently become available. It is even feasible to approximate global illumination effects at interactive frame rates on moderately sized multicore architectures.

Image synthesis itself comprises connecting light sources and pixels by light transport paths and summing up their contributions. Vertices along these transport paths are found by tracing straight rays from one point of interaction to the next one. Many other direct simulation methods in scientific computing rely on tracing particles along straight lines, too, and usually a considerable part of the total computation time is spent on ray tracing.

The time for tracing a large number of rays can be dramatically reduced by constructing an auxiliary acceleration data structure that allows for the efficient exclusion of large portions of the scene to be intersected, instead of intersecting each ray with all of the objects in a scene. Compared to immediate mode rendering on a rasterizer, however, the construction time of the acceleration data structures is relatively slow, and the memory footprint is relatively large.

As described hereinbelow, aspects of the present invention are directed to implementations of ray tracing as a backtracking technique that searches trees or directed acyclic graphs, because these schemes adapt best to general geometry. Constructing such a hierarchical data structure may be formulated as a recursive procedure, the construction time of which is amortized when tracing many rays.

While full hardware support for rasterization techniques is available on low-end personal computers and even handheld devices, a comparable solution, especially the capability to cope with dynamic scenes, has been missing in the context of ray tracing. Due to drawbacks of previously existing ray tracing implementations, such as the unpredictable memory usage and immense pre-processing times to construct the additional data structure along with numerical precision problems, the wide usage of ray tracing and suitable hardware has been delayed. Note that although ray tracing systems on current multicore architectures and even on the Cell and GPU platforms claim to offer full scalability, as ray tracing is generally believed to be a highly parallel technique, this is only true for the ray traversal phase and using simple light transport simulation techniques such as path tracing. With the upcoming availability of massive multicore architectures and its proposed use to efficiently handle software ray tracing, new problems, such as a simple, but also fully scalable hierarchy construction, arise.

At the same time, the need to overcome limitations of crude and complicated rasterization approximations, while still offering comparable performance to GPUs, is demanded by the professional rendering industry as well as the growing field of entertainment and games. While many global illumination effects can be precomputed by ray tracing based techniques, only walkthroughs of static scenes using the additional data stored on the surfaces, e.g., light maps, pre-baked lighting or photon maps, are possible, and approximations, e.g., ambient occlusion or deep shadow maps, are needed to support fully dynamic scenes or unpredictable user interaction with the geometry. Still, all pre-computation will become very difficult or even fail for highly specular and refractive materials. Although it is possible to combine the best of ray tracing and rasterization for some scenarios, the advantage of a completely ray tracing based implementation allows for unmatched picture quality and freedom in material design and lighting.

A modeling/rendering/compositing pipeline is commonly used in product design and in the movie industry. A scene is typically modeled by free-form surfaces, triangulated, and linked to different material properties. By approximating real world lighting by a high dynamic range environment map, the mesh can be illuminated and composited into existing background shots.

1.1 Light Transport

Over the years, there has been significant progress in the field of image synthesis based on ray tracing. Starting with the simulation of simple materials, Whitted style ray tracing was introduced to cope with perfectly refractive and reflective material properties. Distributed ray tracing incorporates the direct simulation of glossy surfaces and camera lenses, making a "real" integration step necessary as the probability distribution function of materials can no longer be described solely by Dirac distributions. This results in the need for multiple samples per scattering event on the surfaces, in order to properly approximate the illumination.

By introducing the concept of integral equations to computer graphics, a mathematical framework of the underlying light transport was presented. The following discussion presents a brief overview of the evaluation process, together with possible models for describing material properties.

The change of the radiance L in a point x along a unit direction ω is $$\frac{\partial}{\partial \omega} L(x, \omega) = L_{e,v}(x, \omega) + \sigma_s(x) \int_{S^2} f_p(\omega, x, \omega') L(x, \omega') d\sigma(\omega') - \sigma_t(x) L(x, \omega),$$  Eq. (1.1)

where the first term $L_{e,v}$ on the righthand side is the volume emission. The second term describes the increase due to inscattering from all directions of the unit sphere $S^2$, where $f_p$ is the phase function accounting for the angular distribution and $\sigma_s$ is the scattering coefficient depending on the location x. In order to solve the integro-differential equation, boundary conditions are required. These are given by the Rendering Equation:

$$L(x, \omega) = L_{e,\partial v}(x, \omega) + \int_{S^2} f_s(\omega, x, \omega') L(x, \omega') |\cos\theta_x| d\sigma(\omega')$$  Eq. (1.2)

governing light transport on the surface $\partial v$. Here, $f_s$ is the Bidirectional Scattering Distribution Function (BSDF), which describes the scattering behavior at $x \in \partial v$, and $\cos\theta_x$ is the cosine of the angle between direction $-\omega'$ and the surface normal in x. $L_{e,\partial v}$ is the emission on the boundary.

Usually, Equation 1.1 is integrated along straight light rays to the next surface interaction point $h(x, -\omega)$, which is found by a ray casting function h. This approach yields a Fredholm integral equation of the second kind, which can be efficiently handled by Monte Carlo techniques.

The present discussion focuses on vacuum transport, i.e., $\sigma_\theta = \sigma_s = 0$, which results in $$\frac{\partial}{\partial \omega} L(x, \omega) = 0.$$

Consequently, the radiance does not change along straight rays of light in vacuum, and the boundary condition in Equation 1.2 completely describes light transport.

This formulation is the most commonly used in current rendering systems as it allows for a reasonably fast implementation using ray tracing, while still incorporating the most important physical effects.

1.1.1 Path Integral Formulation

The previously presented local description of light transport can be recursively expanded to obtain an integral over the abstract space of complete transport paths, allowing for the evaluation of the integral by using Markov chain simulation, as further described in Section 3.4, below.

The path space P can be modeled as the union of spaces containing paths of a specific finite length, i.e., $$\mathcal{P} := \bigcup_{k \in \mathbb{N}} \mathcal{P}_k \text{ where } \mathcal{P}_k := \{\bar{x} = x_0 \dots x_k : x_i \in \mathbb{R}^3\}.$$

For each of these spaces a product measure $\mu_k$ is used, defined for a set $\mathcal{M}_k \subseteq \mathcal{P}_k$ by $$\mu_k(\mathcal{M}_k) := \int_{\mathcal{M}_k} d\lambda(x_0) d\lambda(x_1) \dots d\lambda(x_k),$$

of the corresponding Lebesgue measure on the surface, $d\lambda(x)$.

The measure $\mu$ of a set $\mathcal{M} \subseteq \mathcal{P}$ then is the natural expansion of those disjoint spaces' measures $$\mu(\mathcal{M}) := \sum_{k \in \mathbb{N}} \mu_k(\mathcal{M} \cap \mathcal{P}_k).$$

In this context, the sensor response $I_j$ of pixel j can be expressed as an integral over $\mathcal{P}$, $$I_j = \int_{\mathcal{P}} f_j(\bar{x}) d\mu(\bar{x}), \qquad \text{Eq. (1.3)}$$

where $f_j$ is called the Measurement Contribution Function. Equation 1.2 is now rewritten in Three Point Form:

$$L(y \to z) = L_e(y \to z) + \qquad \text{Eq. (1.4)}$$
$$\int_{\mathbb{R}^3} L(x \to y) f(x \to y \to z) G(x \leftrightarrow y) V(x \leftrightarrow y) d\lambda(x),$$

where the following abbreviations are used:
Three Point Scattering Function $$f(x \to y \to z) := f_s(\vec{yz}, y, \vec{xy}) \qquad \text{Eq. (1.5)}$$

Source Radiance Distribution $$L_e(x \to y) := L_{e, \partial v}(x, \vec{xy}) \qquad \text{Eq. (1.6)}$$

Geometric Term $$G(x \leftrightarrow y) := \frac{|\cos \theta_x||\cos \theta_y|}{\|y - x\|^2} \qquad \text{Eq. (1.7)}$$

with $\theta_x$ and $\theta_y$ the angles between $\vec{xy}$ and the surface normals at the respective points.

Visibility Function (Evaluated Through Ray Tracing)

$$V(x \leftrightarrow y) = \begin{cases} 1 & \text{if } \|y - x\| \le \|h(x, \vec{xy}) - x\| \\ 0 & \text{otherwise} \end{cases}$$

Finally, a function $\psi_j(x_{k-1} \to x_k)$ is needed to describe the sensor response of a pixel j to radiance arriving from $x_{k-1}$ at the point $x_k$ on the image plane. Along with the recursive expansion of the three point form (Eq. 1.4), this yields the measurement contribution function for a path $\bar{x} = x_0 \ldots x_k$ beginning on a light source and ending on the image plane:

$$f_j(\bar{x}) := L_e(x_0 \to x_1) G(x_0 \leftrightarrow x_1) V(x_0 \leftrightarrow x_1) \cdot \qquad \text{Eq. (1.8)}$$
$$\prod_{l=1}^{k-1} (f(x_{l-1} \to x_l \to x_{l+1}) G(x_l \leftrightarrow x_{l+1}) V(x_l \leftrightarrow x_{l+1})) \cdot$$
$$\psi_j(x_{k-1} \to x_k)$$

Numerical Techniques

Although the formulation seems to be fairly complicated, possible techniques to evaluate the presented path integral are as simple as summing up all contributions of transport paths that connect light sources and sensors.

Direct simulations in the form of Light and Path Tracing: The Light Tracing technique simply emits photons from the light sources and traces particle paths/scattering events until (hopefully) an intersection with the camera lens is found. Path Tracing inverts this technique as it starts the paths from the camera lens to find an intersection with the light sources. Both techniques can be refined by trying to directly connect to the camera (or light source respectively) at each scattering event.

Bidirectional Path Tracing and its special cases Instant Radiosity and Robust Global Illumination will start paths from both the camera lens and the light sources and search for "valuable" connections of the subpaths or simply connect all vertices of the subpaths with non-zero contribution.

FIG. 1 shows an illustration of the sampling of a transport path space by bidirectional path tracing. Trajectories from the eye and the light sources are generated by Markov chains, discussed below in Section 3.4, and connected to determine the transported amount of light.

Metropolis Light Transport is the most advanced technique of them all, as it can smear "valuable" paths to allow for an efficient simulation of extremely difficult light transport problems, e.g., light transmitted through narrow geometry like a keyhole, to perfectly adapt to the actual distribution of light.

In a mathematical context the stochastic creation of the transport paths corresponds to the simulation of Markov chains.

Still, finding all of the important light paths that actually deliver significant contributions to the final image is a difficult task. See Section 4.4.1, below, for more details on an actual implementation.

1.1.2 Scattering

To describe material properties and define transition probabilities on the surfaces for the Markov chain simulation one must model the Bidirectional Scattering Distribution Function (BSDF). The present discussion focuses on a subset of BSDFs, the Bidirectional Reflectance Distribution Function (BRDF) which does not address translucent materials. A BRDF is defined as $$f_r(\omega_o, x, \omega_i) := \frac{dL_o(\omega_o)}{L_i(\omega_i) \cos \theta_i d\sigma(\omega_i)} \qquad \text{Eq. (1.9)}$$

and describes the amount of radiance from incoming direction $\omega_i$, to be scattered in direction $\omega_o$ at point x. The term $dL_o(\omega_o)$ is the differential amount of radiance reflected in the outgoing direction and the term $L_i(\omega_i)$ is the amount of incoming radiance, $\cos \theta_i$ describes the angle between the incoming direction $\omega_i$ and the surface normal.

A physically plausible BRDF fulfills at least two constraints. First, it must respect the reciprocal nature of the reflection of light, i.e., Helmholtz-reciprocity:

$$f_r(\omega_o, x, \omega_i) \equiv f_r(-\omega_i, x, -\omega_o). \qquad \text{Eq. (1.10)}$$

Furthermore, it must not amplify the incoming energy by guaranteeing $$p(x, \omega_i) = \int_{S^2} f_r(\omega_o, x, \omega_i) |\cos \theta_o| d\omega_o \le 1, \forall x, \omega_i, \qquad \text{Eq. (1.11)}$$

i.e., not reflecting more light than incident.

Analytical Reflection Models

To describe $f_r$, a vast amount of analytical models were created to cope with existing real life materials. While early models such as the Phong model were mainly based on empirical experiments of simple materials, such as plastic, and the efficient computational evaluation, currently used models as the Ashikhmin-Shirley model allow one to model a large variety of materials at the cost of increased computation time. Some models even use microfacet theory to model the BRDF by defining a distribution of position and orientation of a set of small microfacets on the actual surface to simulate a micro structure (e.g., to imitate the appearance of brushed metal). One classical example is the Cook-Torrance model. A more recent example has been proposed; generally speaking, all half-vector based BRDF models are related to microfacet theory in one way or another.

While analytical models allow a material to be described with relatively few parameters and generally offer an easy way to employ importance sampling by inversion techniques, the biggest problem is the insufficient approximation of more complex real life materials. Note that common analytical models are of low-dimensional structure, usually 1-dimensional for isotropic and 2-dimensional for anisotropic materials, due to symmetry assumptions, while the BRDF function is in fact 4-dimensional.

Another negative aspect found in many available models is the problem of lobes intersecting the surface. If the incoming direction is close to parallel to the surface, the resulting lobe, e.g., of specular materials, will only partially be situated above the surface, resulting in rays penetrating the surface. Possible approaches to addressing this issue include: mirroring of these rays on the surface plane, which clearly changes the appearance of the BRDF model; or assuming a zero contribution and discarding these rays. While this may not appear to be much of a problem, this actually means a loss of energy for some of the incoming directions and can be clearly spotted in visual comparisons. An additional solution has been proposed, based on the halfway vector disc, however, sacrificing reciprocity.

Measured Reflection

By using a Gonio-reflectometer, or like device, it is possible to measure the BRDF in a region, ideally a single point, of a real life material. While the technique has reached an advanced stage of development, highly specular, glossy materials are still problematic. Available datasets can be received from MERL in isotropic and anisotropic form for non-commercial use. Cornell University also offers BRDF datasets, some of them even featuring 31 or 65 wavelength samples, but at a decreased overall resolution.

While measured BRDFs usually represent a full 2-dimensional (4-dimensional in the anisotropic case) approximation of existing material BRDFs, there are some drawbacks. Anisotropic datasets, in particular, can become exceptionally large e.g., several hundred MB. Isotropic datasets can fit in less than 10 MB if the underlying material features only fair complexity. However, an accompanying runtime interpolation of the BRDF data should be considered to avoid artifacts.

While mapping to existing analytical models seems to be an option to save memory and discard the interpolation, it mostly fails to exactly reproduce subtle, but still important, details of the function.

Other possibilities are the transformation/projection into other bases or the factorization of the data, which additionally allows for importance sampling.

Related to BRDFs is the Bidirectional Texturing Function (BTF). It holds the BRDF over a set of points, similar to a (high-dimensional) texture that can be assigned to a surface. Note that this increases the size of a single dataset again, often demanding a decrease of the local resolution of the BRDF to be able to keep multiple BTFs in memory at the same time.

One additional drawback is the missing user interaction when working with measured BRDF data. Generally speaking, it is not possible to make small adjustments to an existing BRDF in the fashion of an analytical model that often features intuitive parameters to slightly change the look of a material. While omitting physical correctness, one approach proposes the "drawing" of BRDFs to allow full artistic freedom. A physically correct implementation of artistically designed BRDFs can also be found in the art. Other approaches for editing BTFs are also known in the art.

It should be noted that although the general concern in rendering is currently focused on fast ray tracing, as this was long considered to be the bottleneck of every renderer, a modern rendering system working with measured BRDFs can easily spend in the range of one-third of the total time evaluating the BRDFs, including the transformation of ray directions and importance sampling. While it seems to be faster to use analytical models instead, a complex model typically will take far more cycles to evaluate than a properly implemented measured BRDF library.

1.2 Structure of the Discussion

The following discussion first separately treats ray tracing and the simulation of Markov chains. The results are then combined in applications.

Section 2 focuses on efficient ray tracing. To accelerate ray tracing, an additional data structure decreases the number of necessary intersection calculations with the objects of a scene dramatically. The chapter presents a new data structure, accompanied by new construction schemes, new partitioning heuristics, and a numerically stable implementation that allows for a simple, yet exceptionally fast construction phase and competitive ray traversal performance. A unified framework merges ray traversal and in-place construction in an a priori fixed memory block and proposes new techniques to fully amortize the time to build the data structure.

Section 3 uses ray tracing to simulate paths of light for photorealistic image synthesis. By introducing the principle of simulating many paths simultaneously, i.e., an ensemble of particles, quasi-Monte Carlo Markov chain simulation becomes more efficient. By sorting the states upon scattering events at the surfaces, a more uniform quasi-Monte Carlo sampling decreases the "variance" of the results. An analysis of a classical technique reveals a simpler and more efficient simulation scheme. Section 4 demonstrates the improvements that can be achieved in computer graphics by applying aspects of the invention described below in Sections 2 and 3.

2. Ray Tracing

This section presents several ray tracing engine approaches, culminating in a unified kernel, that will pick the best of all techniques while keeping the implementation effort low and still being flexible enough to inherit refinements necessary to efficiently support a diverge set of scenarios like fully dynamic scenes, massive geometry, or strict memory limitations.

First, an overview over currently popular triangle intersection techniques is provided and analyzed in terms of performance and numerical robustness, along with proposals to further increase performance and decrease the memory footprint. Secondly, a new acceleration data structure, the bounding interval hierarchy, featuring a relatively low memory footprint and rapid construction time is presented. Third, different heuristics to construct spatial and object list partitioning hierarchies are presented, culminating in new proposals for kd-trees and bounding volume hierarchies. Finally, a new technique that can construct hierarchies in place, using no temporary memory at all, and working in a priori fixed memory limitations is proposed. The previous findings are then combined into a unified framework that facilitates the incorporation of several techniques necessary to support fully dynamic or massive scenes at maximum performance and minimum memory footprint. By using a tight coupling of ray traversal and hierarchy construction, new techniques to further decrease the total time to image are provided. The present section ends with new findings to overcome several numerical problems and general implementation hurdles.

Accelerated Ray Tracing

When tracing huge numbers of rays for image synthesis it is obviously not efficient to intersect each ray with all objects in the scene in order to find the closest point of intersection for each ray. It amortizes to construct additional data structures that allow the exclusion of most of the objects from actual intersection testing.

Figure 2:
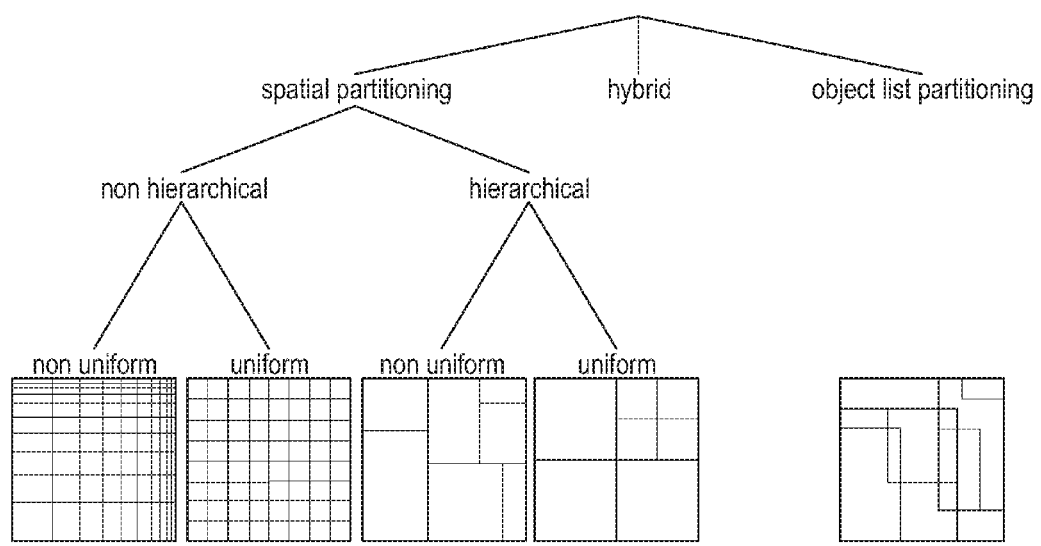
FIG. 2 shows a basic taxonomy of partitioning schemes.

To obtain such a data structure either the space containing the objects (see Section 2.2) or the list of objects (see Section 2.3) can be partitioned, or a hybrid approach may be used (see Section 2.5). The two pragmatic approaches are briefly sketched in FIG. 2, which sets forth a basic taxonomy of partitioning schemes. The first level of classification is the division between spatial partitioning and object list partitioning. The second level classification divides between non-hierarchical and hierarchical. The third level classification divides between non-uniform and uniform partitioning. While non-hierarchical data structures allow for rapid construction, a hierarchical scheme generally better adapts to the geometry. Partitioning the object list results in linear memory usage, while spatial partitioning copes better with complex surface structures. It should be noted that all commonly used data structures utilize axis-aligned bounding boxes for culling.

Top-Down Construction of Hierarchies

As the usage of uniform and regular structures is commonly inferior to hierarchies under practical concerns, the steps of a general recursive procedure to construct spatial hierarchies in a top-down manner are as follows:

Termination: The termination condition is a combination of controlling memory consumption and considering the amortization of appending more nodes to the tree to reduce the total amount of ray-triangle intersections later on. Usually, one clause terminates the tree by depth, which only results in an exponential bound on the number of nodes and thus memory. Another common clause avoids to further subdivide the tree if not enough references are provided. This clause saves memory and balances node versus leaf processing time.

Split selection: A heuristic is used to split the current volume element into two or more elements. Both the efficiency of the construction and the efficiency of ray tracing later on are heavily influenced by how the split is selected. Heuristics range from simple criteria as splitting axis-aligned volumes in the middle along the longest side, over global criteria to more costly methods like the surface area heuristic. Further details are presented in Section 2.4, below.

Classification: For each object referenced in the object list it is determined which of the new volumes it intersects.

Node creation: For each new child a list of references to objects is assembled according to the classification in the previous step. The case of concern is usually the reference duplication caused by objects that are assigned to more than one child, as it is difficult to a priori predict their number, an issue that will be addressed in Section 2.5.1.

Post-processing: After recursively processing the children, a post-processing step can perform several tree optimizations, such as reordering or quantization.

2.1 Triangle Boundary Representation

The core routine needed in any ray tracing engine is the intersection test of a ray with the geometric primitives in the scene. As the boundary of the objects in a scene is usually modeled using different descriptions for the geometry such as freeform surfaces, especially non-uniform rational basis splines (NURBS), voxelized datasets, or even fractal geometry, the inner loop of a generalized ray tracer cannot be optimized easily due to its high complexity. Restricting geometry descriptions to approximations using a simple single primitive, however, allows for a tight inner loop that can be optimized to exploit the used hardware. As triangles allow for an intersection test with small computational effort and triangulation techniques are available for most of the relevant complex primitives, the presented system adheres to the use of triangles as its basic scene elements.

Although this is a suitable approach for almost all current realtime ray tracing implementations, and even most of the big offline rendering packages, it should be noted that freeform surfaces might be feasible for future ray tracing implementations, as modern hardware platforms tend to increase the raw processing power while at the same time also increasing latencies for memory fetches. As such, the triangulation of freeform surfaces to multiple smaller triangles increases the total amount of memory used for the geometry, and thus memory traffic and cache pollution during ray tracing, but also decreases the number of operations needed to compute the intersection with a ray segment, resulting in idle cores waiting for new geometric data instead of doing useful work.

2.1.1 Survey of Ray-Triangle Intersection Tests

Current ray tracing systems rely on an acceleration structure, thus minimizing the necessary intersection tests with triangles to usually less than a dozen, ideally just one, primitives per ray. It should be noted that the strategy of measuring ray-triangle intersection performance must always be seen in this context, especially when thinking about early-out conditions that can skip non intersected triangles as early as possible to save a large part of unnecessary calculations.

Another important issue can be the numerical precision of the chosen triangle test, as it is fairly common that rays will slip "through" the edges of connected triangles due to numerical issues, especially when using techniques working in (32-bit) floating point precision. Though this seems to be not much of an issue in the context of computer graphics as the resulting artifacts mostly vanish with increasing sample numbers, the problems for simulations can be immense. For example, consider water in a triangulated bottle using a particle method for simulation.

Further it should be pointed out that all presented techniques allow to be transformed into each other, so several implementation variations of the tests and their combinations are possible. In the following subsections, only the Plücker and barycentric coordinate tests are presented in great detail, as they are amongst the most popular at the moment and the remaining techniques are easily transformed into these. Other ray-triangle tests are also known in the art. In one approach known in the art, single ray tracing is optimized in the context of single instruction, multiple data (SIMD) execution.

Plücker Coordinates

The basic idea of the Plücker test is to store the ray coordinates, i.e., starting point and direction, and the triangle edges in Plücker coordinates. This transformation allows for an easy intersection test by testing the orientation of the edges towards the ray for equality, along with the ability to solve the equations for the three edges in parallel, thus allowing the use of SIMD execution even for single rays. However, computing the intersection distance requires a separate step to solve the ray-triangle-plane intersection equation.

Conversion of a line through 3-dimensional-points X and Y to the Plücker coordinates 6-dimensional-vector L is defined by:

$$L = (L^\times, L^+) := (X \times Y, X - Y).$$

The orientation of two lines $L_1$ and $L_2$ is given by $$\alpha = L_1 * L_2 := L_1^+ L_2^\times + L_2^+ L_1^\times.$$

Defining a, b, c to be the edges and r the ray (all converted to Plücker representation), testing for intersection of the line through r with the triangle defined by a, b, c uses $$\mu_1 := (r*a > 0) \wedge (r*b > 0) \wedge (r*c > 0).$$

Triangles that must be two sided (e.g., transparent or non watertight meshes) require a second check to test if all orientations are negative:

$$\mu_2 := (r*a < 0) \wedge (r*b < 0) \wedge (r*c < 0).$$

Note that the case in which all orientations inner products deliver zero is a ray being coplanar to the triangle (and thus no intersection).

Figure 3:
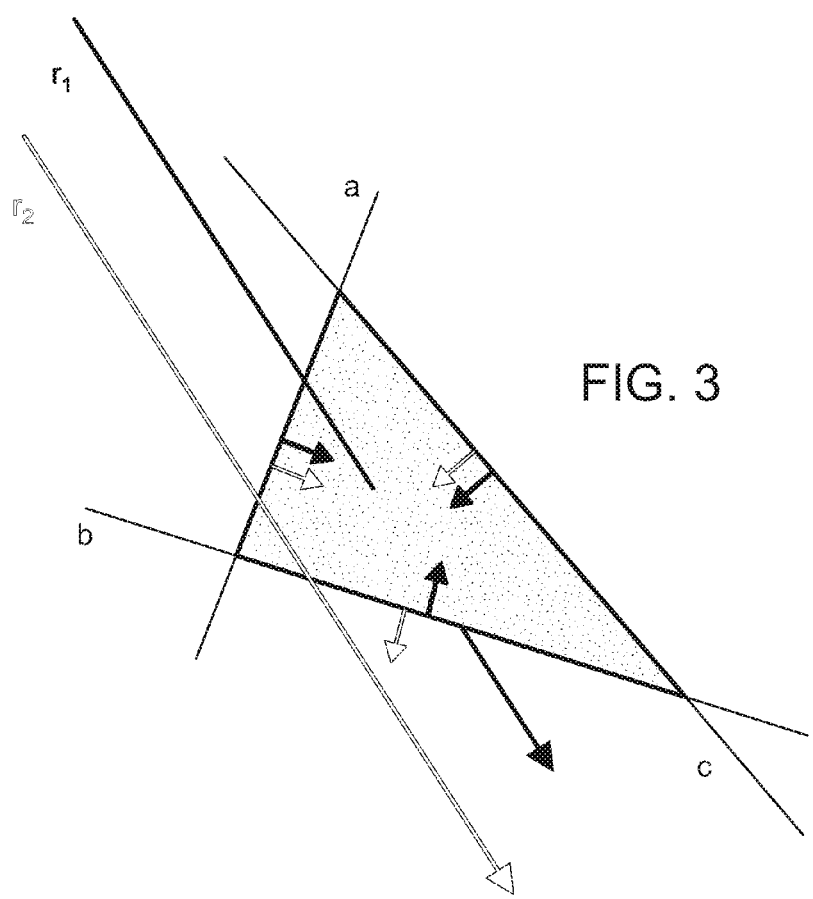
FIG. 3 is a diagram illustrating the Plücker test.

FIG. 3 is a diagram illustrating the Plücker test: a, b, c are the lines defined by the triangle edges, $r_1$ intersects the triangle, whereas $r_2$ does not. Arrows indicate the orientation of the edges towards the corresponding ray.

If $\mu_1$ (or one of the conditions $\mu_1$, $\mu_2$, respectively) is fulfilled, the last step is to solve the ray-triangle-plane equation to obtain the distance of the ray's original starting point $r_{from}$ with respect to the length of the original ray direction $r_{dir}$ to the point of intersection on the triangle-plane P (given through a point $P_{p_0}$ of the triangle and the normal of the triangle $P_n$):

$$\lambda := \frac{(P_{p_0} - r_{from}) * P_n}{r_{dir} * P_n}.$$

Optionally, the necessary data that must be stored for each triangle can be minimized by using $$P_d := P_{n_x} P_{p_{0_x}} + P_{n_y} P_{p_{0_y}} + P_{n_z} P_{p_{0_z}}, \text{ and}$$

$$\lambda := \frac{P_d - r_{from} * P_n}{r_{dir} * P_n}.$$

If $(\lambda > r_{near})$ and $(\lambda < r_{far})$ the triangle-plane lies in between the ray's valid segment and thus an intersection is detected in $$H := f_{dir} * \lambda + r_{from}.$$

The resulting data of one triangle is 3*6=18 floats for the edges, three floats for the triangle normal and another float for storing $P_d$ (although one of the three floats representing the normal can be discarded by scaling $P_n$ and $P_d$ value, so the i-th component of $P_n$ is constant). This results in a total of 21 floats.

As demonstrated in the art, the redundant memory increase can be reduced by storing per-edge-information rather than per-triangle-information. Neighboring triangles also share same edges, so a triangle can be represented by indices pointing to the three edge-vectors (one integer index vs. six floats each). Additionally, the art provides an implementation of a caching system that tries to save computed information about the edge-orientations towards the current ray for neighboring triangles (one bit for the sign bit of the inner product of that edge plus 31 bits for an ID of the current ray, resulting in one additional integer variable per face). Unfortunately, the benefit of this solution in the context of using an additional acceleration data structure for ray tracing is not convincing, though this scheme could still be exploited to increase numerical precision for the triangle intersections (see Section 2.1.3).

A slightly differing implementation of the test (mainly optimized for 4xSIMD hardware) has been presented in the art: Instead of storing transformed triangle data, the necessary transformations to Plücker coordinates are amortized by intersecting several rays at once. As the rays of the bundle additionally feature the same origin and the tested triangle must be oriented clockwise towards the rays, a large part of the calculations must only be computed once per bundle and triangle, while the rest can be done using SIMD for the multiple rays. A more general implementation allowing for both clockwise and counter clockwise orientations and/or differing ray origins is possible but at the same time less efficient.

To summarize, the Plücker test seems to be especially useful when considering single rays only and wanting to use SIMD optimizations, although this comes at the price of increased memory usage. The second option is to use ray bundles for SIMD execution and not doing any pre-calculation at all as proposed in the art, though the ray properties must be restricted to allow for a fast implementation.

Two features that are generally seen as advantages of the Plücker coordinate test, namely numerical precision (only signs are checked in the first tests) and the possibility for fast early-outs, did not hold in the context of this work's comparisons. The amount of rays slipping through closed geometry is actually the highest of all tests and the delayed ray-triangle-plane intersection test is of little use in the context of using an additional acceleration structure, as will be explained at the end of this section. Interestingly enough the precision problem did not arise as distinct in a variant, a phenomenon also described in detail at the end of this section.

Barycentric Coordinates

Different from the Plücker coordinate test, this technique first tests for an intersection of the ray segment with the plane of the triangle resulting in the distance A. If this initial test is successful, the resulting point of intersection H is used to determine whether it lies inside the triangle (thus an intersection) or outside (no intersection).

By assuming that the areas of the three sub-triangles $$A_0 := \text{Area}(H, P_{p_1}, P_{p_2}),$$

$$A_1 := \text{Area}(H, P_{p_0}, P_{p_2}),$$

$$A_2 := \text{Area}(H, P_{p_0}, P_{p_1})$$

must sum up to the overall triangle area $$A_t := \text{Area}(P_{p_0}, P_{p_1}, P_{p_2})$$

if H is located inside the triangle, one can formulate the following equations:

$$A_t = A_0 + A_1 + A_2, A_0 = u A_t, A_1 = v A_t, \text{ and } A_2 = w A_t$$

with $$0 \leq u, v, w \leq 1, \text{ and } u + v + w = 1.$$

Defining that a:=$P_{p_1} - P_{p_0}$, b:=$P_{p_2} - P_{p_1}$, c:=$P_{p_0} - P_{p_2}$, d:=H−$P_{p_0}$, e:=H−$P_{p_1}$ and f:=H−$P_{p_2}$, one can calculate the barycentric coordinates u, v, w by solving:

$$u = \frac{uA_t}{A_t} = \frac{A_0}{A_t} = \frac{\frac{1}{2}\|b \times f\|}{\frac{1}{2}\|a \times b\|},$$

$$v = \frac{vA_t}{A_t} = \frac{A_1}{A_t} = \frac{\frac{1}{2}\|c \times d\|}{\frac{1}{2}\|a \times b\|}, \text{ and}$$

$$w = \frac{wA_t}{A_t} = \frac{A_2}{A_t} = \frac{\frac{1}{2}\|a \times e\|}{\frac{1}{2}\|a \times b\|}.$$

By verifying that u+v+w=1, H is valid or not. Note that the equations can be simplified, since the constant $$\frac{1}{2}\Big/A_t$$

can be multiplied with a, b, c in a pre-calculation step.

Figure 4:
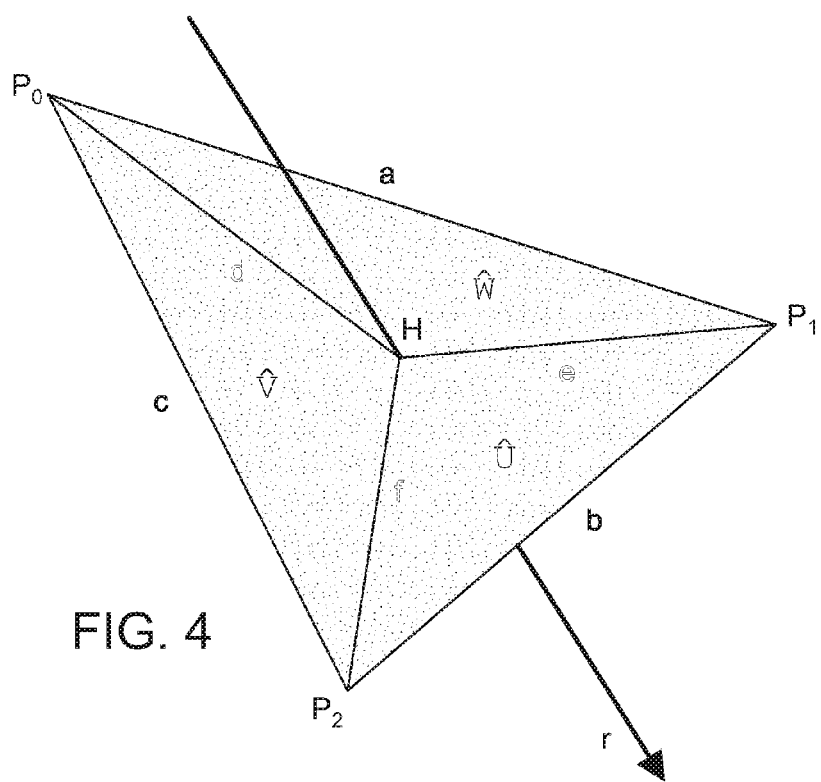
FIG. 4 is a diagram providing an illustration of the barycentric coordinate test.

FIG. 4 is a diagram providing an illustration of the barycentric coordinate test: a, b, c are the triangle edges, d, e, f the new edges needed for the three sub-triangles, r the ray intersecting P in H. Û, V̂, Ŵ are (the areas) corresponding to u, v, w.

An interesting simplification of this technique in the art is the projection of the triangle onto a principal plane and testing the barycentric coordinates in the simple 2-dimensional case. Since a random pick of the projection case could lead to numerical instability, the projection plane should be chosen as orthogonal as possible with respect to the triangle normal. Projecting the point of intersection H and the edge-vectors a, b, c onto this plane (by simply "discarding" the z-th component), the equations simplify to their 2-dimensional case with a', b', c' being the projected edges and H' the projected point of intersection along with the resulting sub-triangle edges d', e', f' and the corresponding areas $A'_0, A'_1, A'_2, A'_t$. The variables j, k of the edges represent the vector-component-indices not being discarded during the projection.

$$u = \frac{uA'_t}{A'_t} = \frac{A'_0}{A'_t} = \frac{\frac{1}{2}\|(b'_j, b'_k, 0) \times (f'_j, f'_k, 0)\|}{\frac{1}{2}\|(a'_j, a'_k, 0) \times (b'_j, b'_k, 0)\|} = \frac{|b'_j f'_k - b'_k f'_j|}{|a'_j b'_k - b'_j a'_k|},$$

$$v = \frac{vA'_t}{A'_t} = \frac{A'_1}{A'_t} = \frac{\frac{1}{2}\|(c'_j, c'_k, 0) \times (d'_j, d'_k, 0)\|}{\frac{1}{2}\|(a'_j, a'_k, 0) \times (b'_j, b'_k, 0)\|} = \frac{|c'_j d'_k - c'_k d'_j|}{|a'_j b'_k - b'_j a'_k|},$$

$$w = \frac{wA'_t}{A'_t} = \frac{A'_2}{A'_t} = \frac{\frac{1}{2}\|(a'_j, a'_k, 0) \times (e'_j, e'_k, 0)\|}{\frac{1}{2}\|(a'_j, a'_k, 0) \times (b'_j, b'_k, 0)\|} = \frac{|a'_j e'_k - a'_k e'_j|}{|a'_j b'_k - b'_j a'_k|}.$$

Since we are generally only interested in two of the three barycentric coordinates (since the third is implicitly given by u+v+w=1), the calculation of w can be discarded. Note though that u+v+w=1 can only hold if H lies inside the triangle. To get the missing case of H being outside, a closer look at the technique reveals that this can only be the case, if the signs of $(b'_j f'_k - b'_k f'_j)$, $(c'_j d'_k - c'_k d'_j)$ are not equal to the sign of $(a'_j b'_k - b'_j a'_k)$.

A geometrical interpretation: One or both edges d, f of the sub-triangles (b, f, e), (c, d, f) are in reverse direction compared to the clockwise orientation of the edges a, b, c defining the main triangle P and thus have to point outside the triangle. This leads to the following simplification:

$$u = \frac{b'_j f'_k - b'_k f'_j}{a'_j b'_k - b'_j a'_k},$$

$$v = \frac{c'_j d'_k - c'_k d'_j}{a'_j b'_k - b'_j a'_k}.$$

By testing for (u≧0), (v≧0) and (u+v≦1) to check for a valid point of intersection H' a complete intersection test is obtained, while $1/(a'_j b'_k - b'_j a'_k)$ can once again be pre-multiplied onto b', c' to save some more multiplications and divisions, while also providing a reduced memory footprint.

This leads to an overall data usage of three floats for the plane normal, three floats for $P_{p0}$ (or $P_d$ plus $P_{p0}$, discarding the i'-th component) and two floats each for the two projected edge vectors (3+3+2*2=10 floats plus an additional byte needed to store the chosen projection case making a total of 41 bytes). This can further be decreased by scaling the normal such that the i'-th component is always one (and thus need not be stored explicitly) and a different storage of the two bits used for the projection case (which will be shown later on), bringing the memory usage down to nine floats again. Note that the resulting u, v-coordinates can be used later on for interpolations of texture-coordinates, vertex-normals or similar information.

A large number of implementation variants (for example, reducing the memory footprint by quantization or omitting the division for the ray-plane test completely) can be found in the art.

Arenberg Test

The triangle data is defined by twelve floats (one of the original vertices plus nine additional floats of pre-transformed data). One of the positive aspects of the technique is the delay of the division for the ray-plane intersection, as it is actually the last operation of the test and only needed to test if the plane intersection is inside the active ray segment. Note that in this optimized variant it is only possible to test for clockwise (towards the ray) oriented triangles. When trying to optimize the amount of data used and allowing for both clockwise and counter clockwise oriented triangles the technique actually transforms into a variant of the Badouel test.

Another variant of this technique is proposed in the art. The authors first transform the triangle to be aligned to the Cartesian coordinate system to save some calculations, but then must use the inverse transform for the ray during intersection. While the original Arenberg test is numerically rather stable, this variant suffers from tremendous precision problems due to the excessive transformations that must be used (a problem inherent to instancing (see Section 2.1.3), as it is used in the context of these papers).

Chirkov Test

Chirkov's test needs to store only nine float values (when optimized, plus additional two bits for the projection axis of the triangle plane, thus comparable to Badouel), but is defined to work on origin and endpoint of a ray. Thus infinitely long rays are problematic, though under practical concerns this is not much of a problem as the ray can always be clipped to the scene's bounding box first to determine a stable endpoint. On the bright side, the test can omit divisions completely to just deliver a Boolean style ray-triangle intersection, however, in the context of ray tracing multiple objects the division has to be performed nevertheless to calculate the distance along the ray to determine the closest primitive and/or the point of intersection to continue ray tracing with second generation rays.

Segura/Feito Test

A rather different approach as proposed in the art (and based on a quite similar theory in the art), and refined in a more efficient form, uses the signed volumes of three tetrahedrons formed by the triangle vertices (thus only nine floats of data are used by this test) and the ray origin and endpoint. In fact this is actually closely related to the Plücker coordinate test. It was first proposed on the knowledge of an error-free 4×4 matrix determinant calculation, so the intersection computation was designed to be exceptionally robust as it only uses numerically stable computed signs to determine if an intersection takes place. The point of intersection itself (along with the distance along the ray) has to be calculated by solving the classic ray-plane equation after the intersection test, which made the implementation in the context of this work's ray tracing system too slow to be of practical use. Still, the technique is very interesting if only a Boolean intersection test is needed and additionally can be implemented to be completely error free.

Kensler/Shirley Test (Möller/Trumbore Test)

In the art, it has been proposed to find an optimal ray-triangle intersection test by using genetic/evolutionary algorithms to determine a test that uses either a minimum number of instructions or optimizes the runtime of the algorithm (when used in the context of ray bundles). The found algorithm is related to the Möller/Trumbore test but was found to be rather slow (compared to the other presented techniques in this section) in the context of using it in a real ray tracing system using an additional acceleration data structure. Thus the published implementation was successively hand-tuned, which resulted in a variant of the original barycentric coordinate test.

This again states the importance of the context in which the ray triangle test is used, as even different acceleration data structures (and the "quality" of the heuristic used to construct the data structure) can dramatically influence the amount of triangles forwarded to the triangle intersection loop, as well as the relative probability of early-outs and the actual fully calculated ray-triangle intersections.

2.1.2 Investigation of Numerical Precision and Performance

The following figures demonstrate some representative scenarios for the different tested triangle tests, omitting the Segura/Feito test (full precision possible, although performance not satisfying in the context of using an additional data structure) and Kensler/Shirley test (performance not satisfying in the context of using an additional data structure), while the original Plücker coordinate test was only included due to its current popularity:

Arenberg (CCW): Optimized Arenberg test (thus only usable for single sided, counter clockwise oriented triangles), working on pre-transformed data (12 floats);

Chirkov: Standard Chirkov test, working on pre-transformed data (9 floats);

Plücker: Standard Plücker coordinate test, working on pre-transformed data (21 floats);

Org. Data Plücker (CCW): Optimized Plücker coordinate test as proposed in the art (thus only usable for single-sided, counter clockwise oriented triangles), working on the original triangle data (9 floats);

Badouel: Standard Badouel test, using the scaling of the i'-th component of the normal to one and working on pre-transformed data (9 floats);

Org. Data Barycentric: Variant of the standard barycentric coordinate test, working on the original triangle data (9 floats).

The specific scenes and views (and thus numerical errors) were picked as representatives for a large amount of all tested scenes and scales. Note that the Org. Data Plücker (CCW) test can be additionally optimized for ray bundles featuring the same ray origin at the cost of flexibility. The results for the numerical precision were equal for both kd-tree and BIH (see Section 2.3.1) data structures (as expected when using stable construction and traversal implementations) while the overall performance was averaged for both cases (note that the relative results were quite similar for both scenarios).

What is actually astonishing is the performance of the rather uncommon Arenberg test along with its exceptionally robust numerical results. The only argument against using it is unfortunately the increased amount of data that needs to be kept in memory and caches. If this is not an issue in the used ray tracing environment, it can be seen as the best performing test of them all (not only for the presented scenes, but for all tested scenes during the progress of this work), at least when working in static scenes where the additional pre-transformation step can be amortized over several rendered frames.

The Badouel test performs rather well (as expected, as it is the choice in a large number of realtime ray tracing systems at the moment), but features an unexpected high number of numerical errors. This behavior is usually not recognized, as it is said to be a rather robust test due to the used projection and doing floating point calculation work on similar scales/exponents most of the time. The actual reason is directly related to the 2-dimensional projection of the triangles: As long as the projection axis remains the same for neighboring triangles, all rays will use related kind of data (same components of the original unprojected triangle data), thus "sharing" the same kind of rounding errors. At the switch to a new projection axis, rays close in space (as it is the case for sampling neighboring pixels for example) will perform vastly differing calculations, so all precision problems will suddenly become distinct in these cases. As there is a higher probability that neighboring triangles produce different results for their edges during the barycentric u, v-test, some floating point cells "between the triangles" will actually never be hit by these rays.

The Plücker coordinate test (as it was originally proposed) features an unusual high number of numerical errors, a problem directly inherent to the "wild" mixture of supposedly differing ranges of floating point values during the calculations. This poses additional problems as soon as the scene is scaled to a larger extent and/or the ray origin is located far away from the object(s) in the scene. So although the same edge information is shared by neighboring triangles, the calculations with the ray data expose numerical problems. Also note that the Plücker coordinate calculations should actually be replaced by equivalent scalar triple products (which are closely related to the Segura/Feito test), as they can be calculated much faster and additionally robust if needed.

Benthin's optimized variant proves to be more robust, as the optimization also delivers more floats on the same scale (floating point exponents that are likely to be similar) as well as featuring a pre-calculation step that includes the ray origin. This drastically helps to decrease the probability of missed intersections for all ray bundles originating from the same location, as the same calculations on similar data (up to a certain point) are executed, thus resulting in equal floating point errors. So the chance of rays slipping through edges is decreased (as neighboring triangles obviously feature shared edge data). As soon as the ray origins differ (as it is the case in the context of a distribution ray tracer, or more generally in global illumination simulations), similar problems as with the original version of the Plücker test arise, though. Still, it might provide some of the best results (performance and error-wise) when using it in the context of shared origin bundle tracing to accelerate primary rays and shadow rays to point-light sources.

The Chirkov test, which is able to place the division at the very end of the implementation, loses this advantage in the context of an acceleration data structure. The probability to actually intersect a triangle is drastically increased in this scenario as the ray is mostly already clipped to the bounding box of the triangle (or even smaller when using spatial partitioning), so the faster early-out for the edge tests does not amortize. Additionally, divisions were made a lot faster (latency and throughput-wise) in the last years, resulting in less demand for optimizing them by any needs.

Finally, the test that was actually found to be the most attractive in a general and practical context, is the variant of the original 3-dimensional barycentric coordinate test. It is rather fast, works on the original vertex-data (which is very useful for dynamic scenes or an on-demand acceleration data structure build, as will be seen in Section 2.5.5) and features only a small amount of numerical errors, a fact related again to preferring floating point calculations that work on a similar exponent.

2.1.3 Improving Ray Tracing Precision

Using floating point precision calculations in rendering software and especially ray tracing implementations can lead to all kinds of problems, as could already be seen in the last section. In this section more solutions to general numerical precision problems encountered during ray tracing are presented (unfortunately not for all of them), avoiding the common epsilon solutions if possible.

Geometry and Surface Normals (Terminator Problem)

A common hurdle when using interpolated vertex normals, bump-, or normal-maps is the terminator problem. As it only changes the shading calculations of a mesh, but not the underlying geometry, all calculations involving ray tracing or related approximations on the GPU, like shadow volumes (e.g., connecting to light sources or sampling the hemisphere) will introduce a bias. This is due to some rays being distributed underneath the geometric surface, resulting in blocky artifacts at shadow edges on smooth geometry. Adding a small epsilon offset to avoid the self intersection problem results in missed intersections in detailed regions though (see FIG. 5). While there exist solutions to blend between shading normal and geometric normal (or optionally their shading results) for problematic regions (a work around available in mental ray and blender) this only pushes the self-intersection problems slightly away, but still cannot fully avoid them without also dramatically changing the shading calculations (and thus the physical simulation) of otherwise non-problematic regions.

Unfortunately, the only true solution is to use a better approximation of the real surface (demanding more primitives and thus decreasing the overall approximation error) or to use surfaces that feature a higher degree of continuity such as freeform surfaces, avoiding the need for interpolating vertex normals, and to use displacement-maps (which provide real geometry) instead of bump- or normal-maps.

Surface Acne

Using path tracing techniques or even simple Whitted style ray tracing, second generation rays will start on the previously intersected primitives, thus demanding a small offset to avoid self intersection with the same primitive again, a very common problem known as surface acne. Common practice is to choose a global (user-defined) epsilon value that defines an offset from the primitive to start the next generation of rays. While this epsilon may work well for some parts of the scene, some parts may still feature self-intersections (as some points will not be changed at all by the offset, due to the limited floating point resolution for large exponents) or miss intersections in detailed (see FIG. 5) or concave regions due to a too large epsilon value. A more robust solution to the problem was already presented in the art, but as the implementation is rather slow it must be rated as completely impractical for realtime solutions.

Figure 5A:
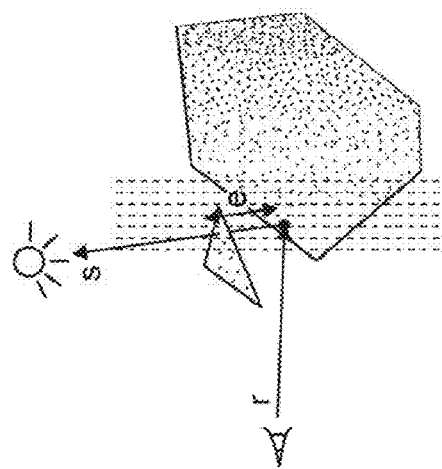
FIG. 5 illustrates the use of a small epsilon offset to avoid the self-intersection problem.
Figure 5B:
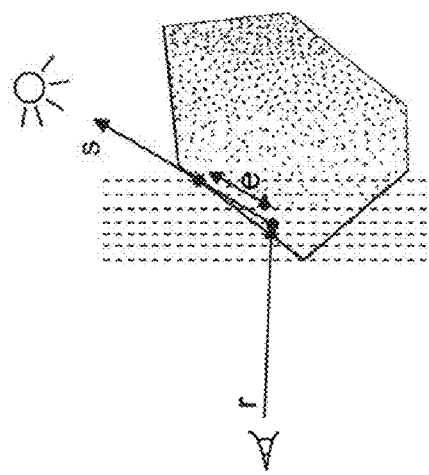
Figure 6:
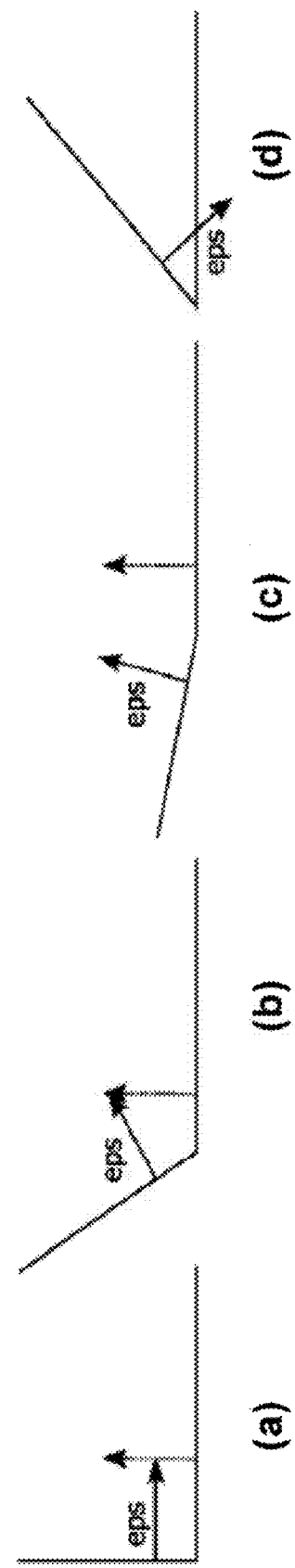
FIG. 6 illustrates the detection of a false intersection for concave geometry.

FIG. 5 illustrates choosing an epsilon offset for the ray to avoid self intersections that works for the left situation can result in missed intersections in the right scenario. FIG. 6 illustrates that while a pessimistic epsilon along the normal can avoid self intersections, a false intersection may still be detected for concave geometry: (a) corners will become too dark due to false intersections with neighboring primitives, though (b) and (c) will not be affected by the problem as the offset avoids self intersections for all primitives (but one may still spot dark lines on the primitive edges in some difficult scenes), (d) An offset being too large results in rays starting from beneath the surface. The only stable solution is to find an optimal epsilon for all primitives near-by, which, however, makes the approach impractical.

The following implementation uses iterations of the intersection along with a fully automatic local adaptation of the offset to the logarithmic floating point number scale by exploiting integer arithmetic and avoiding the need to fine-tune a global epsilon for each rendered scene.

The procedure starts as usual with determining the point of intersection with the primitive.

This point is then used to shoot a new ray reusing the direction vector of the original ray, resulting in a refined intersection point. This iteration smoothes numerical problems resulting from rays starting far away from the actual point of intersection (so the components feature highly differing floating point exponents).

The last step, adding a locally fixed offset to avoid a self intersection, offers several possible implementations:

using a weighted offset in direction of the outgoing ray;
using a (negative) weighted offset in the direction of the incoming ray;
using a weighted offset in direction of the normal;
using discrete versions of the previous proposals depending only on the signs; or
using a discrete offset only along the dominant component of the normal.

While offsetting the point along the outgoing or incoming ray exposes the need for a too large offset due to the special case of rays being almost parallel to the surface (see FIG. 5), offsetting along the normal always offers the maximum distance from the surface. Further, an offset solely based on the signs of the normal results in a simple and very efficient implementation, but the weighted variant being more stable in general (however, it demands an additional costly float to int conversion per axis). The last variant, offsetting only along the dominant component of the normal, is the fastest of them all and very stable on the average, but demands a too large offset for all primitives with about equally large normal components.

Note that the signs of the offset must depend on the side of the primitive the new ray starts from, thus rays that handle refractive or transparent effects must be treated different from rays handling reflective and diffuse paths. In a user-controlled ray tracing system featuring programmable shaders, it may be valuable to automatically calculate two points of intersection (one in front and one behind the primitive, relative to the ray that originally intersected the primitive).

FIG. 7 shows an exemplary listing of a technique for refining the point of intersection and offset by using integer arithmetic afterwards.

FIG. 8 shows an exemplary listing of a technique for offsetting a point by integer arithmetic, weighted by vector d. PT_EPSI stores the offset (positive and negative) that is addressed by the sign of the component.

Note that point components that are very close to zero must be handled separately due to the fact that the following ray-plane intersection of the new ray features direction components with floating point values of up to 1. As this largely differs from the rather small point component's exponent, the fixed integer epsilon is not able to handle these immense numerical errors that arise during the ray-plane calculations, demanding a larger, but also fixed, floating point offset for these special cases.

While it seems possible to choose the value of the integer epsilon depending on the number of floating point operations involved in the ray-plane intersection code and determining the worst case, the resulting value is totally impractical and so only practical experiments can estimate a useful value. This work's implementation uses a value of 32, which is very small but never resulted in any visible errors.

Still, there is one drawback of the method for some scenarios: Comparing the performance of this implementation with a simple globally fixed floating point value epsilon in the context of a path tracer, most scenes were found to feature close to no performance decrease, while some suffered a speed hit of few percent. The reasons are found in the nature of the used axis-aligned data acceleration structure. All of the almost axis-aligned primitives will offset the point of intersection into the same leaf again due to the very small locally adaptive epsilon value, while the fixed, and rather pessimistic global floating point epsilon will offset the points directly into the next neighboring leaf. Thus the more precise solution needs to traverse at least one more leaf, also resulting in an increased number of primitive intersections. Counting the number of shadow-ray-primitive intersections for extreme scenes, the overall amount rises by a factor of 5-10. While this seems like a lot of additional calculations, one must consider that most shadow rays in an axis-aligned, and so rather simple, scene will not need to do a single shadow-ray-primitive intersection at all, as rays are originating from within an empty leaf (neighboring the starting primitive) and end inside an empty leaf (neighboring the light source), without intersecting anything in between. By slightly rotating such a scene, the leafs axis-aligned bounding boxes will no longer tightly approximate the included surfaces and rays starting from these primitives will always need to traverse the same leaf again, even though the probability of an actual intersection is minimal. A pessimistic floating point based epsilon of course avoids this problem for such extreme (and also rather theoretical) scenarios, but at the cost of correctness of the image which will become visible in concave regions.

While the presented locally adaptive solution is able to handle the large majority of scenes with a ridiculously small local epsilon, the problem shown in FIG. 6 still holds and cannot be resolved differently than using surfaces with higher continuity and computing intersections in full floating point precision.

Missed Triangle Intersections

While the problem of missed triangle intersections has already been addressed in Sections 2.1.2 and 2.1.3, and some solutions to handle one part of the problem, namely missed or false intersections in the ray-plane intersection calculations, have been proposed in the previous subsections, rays may still slip through closed meshes in the vertices and along edges of neighboring triangles, and as such, this problem not only depends on the triangle test alone, but upon the whole design of the ray tracing kernel.

Obviously, a switch to error free floating point calculation can help to resolve the precision problems of the u, v test, but a (moderately) fast implementation must need hardware support for FMA and ADD3 operations (where FMA is at least announced to be included in the SSE5 instruction set). Using interval-arithmetic will demand a redesign of large parts of the ray tracing system and additionally suffers from performance problems due to the increased number of calculations and an immense amount of rounding mode switches of the FPU which harms throughput on most common hardware platforms. While a simple switch to double precision calculation for the primitive intersection test already helps, it only pushes the problem away. Though it can be seen as an adequate "temporary solution", especially as modern x86-CPUs can perform double precision calculations at equal speeds as single precision operations (or even faster, as verified in experiments using double precision ray-triangle intersections), some hardware platforms do not support the double type at full speed yet (e.g. Cell and GPU) or become less efficient when utilizing SIMD operations (e.g., x86 platforms only feature 2xSIMD support for doubles).

Figure 9:
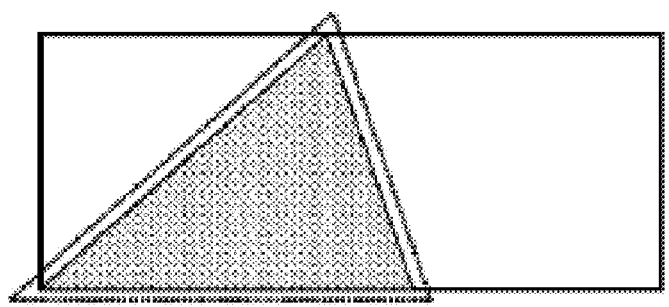
FIG. 9 is a drawing illustrating a bounding box featuring an aligned triangle edge/vertex and illustrates the extension of the triangle boundary.

FIG. 9 is a drawing illustrating a bounding box featuring an aligned triangle edge/vertex. Scaling the triangle after hierarchy construction will not resolve all possible errors.

One rather fast work around for missed edge and vertex intersections is the slight scaling of primitives (in the sense of a locally adaptive scaling as seen in the previous subsection) to force an overlap of neighboring triangles, thus fully resolving missed intersections, but at the price of false intersections happening for neighboring triangles and on the silhouettes of each mesh. Two variants are feasible: Scaling before the hierarchy construction will resolve additional numerical problems of the ray traversal for (partially) axis-aligned primitives and/or corner-vertices (see FIG. 8), while scaling afterwards does not harm performance of the ray traversal due to an increased number of primitive replications (when using spatial partitioning) or the increased bounding volume size (when using object list partitioning). Unfortunately, this simple extension will not work when using a vertex/index-array representation (see Section 2.1.4) of the meshes.

A stable solution to force a robust ray-scene intersection for primitive edges was proposed in the art: By using consistent ray-edge orientations and thus sharing calculations for neighboring triangles (in a way similar to a refined Plücker coordinate test that works on multiple triangles at once), it is impossible for a ray to slip through neighboring triangles. The only remaining possible error is a false index of the intersected primitive (e.g. left instead of right triangle plane). However, a fast implementation in the context of ray tracing has yet to be found, as the additional data structure complicates the calculation of multiple triangle edges at once, or at least demands storing additional edge information. Note that it has been proposed to optionally use fat rays to avoid intersections if the edge testing seems unpractical, though the intersection performance is greatly reduced for this implementation.

Another solution can be found in the 2-dimensional projection of triangles onto ray-aligned planes, in a way similar to the beam tracing algorithm found in the art, sharing calculations (and more important floating point calculation errors) between neighboring rays. Note that this proposal still needs more research to be fully applicable.

Additional hurdles that can lead to missed intersections:

Primitives should be tested using the full ray segment (especially when utilizing spatial partitioning (see Section 2.2)) instead of limiting the ray interval to the intersection with the bounding box of the current node, one reason being very thin nodes in the hierarchy (e.g. consisting solely of axis-aligned geometry).

Using a pre-calculated ray direction inverse $$\frac{1}{r_d},$$

one should force the consistent use of either the ray direction or its inverse for all intersection tests and traversal decisions to avoid hazards with all (nearly) axis-aligned geometry.

Traversal decisions and the ray-triangle test should correctly handle results with value $\infty$ and NaN, although it can be faster to fully avoid these cases beforehand (see following subsection).

Either the ray-triangle test should be able to handle degenerate and very small triangles (which is mainly an issue for all triangle tests that use pre-transformed data) or the hierarchy construction must sort these triangles out beforehand, which can result in small holes in the geometry though.

Instancing

While the use of object instances is rather popular, especially as it can help to animate simple objects in a complex scene in realtime, the numerical precision is drastically reduced by the additional forward and backward transformations of the ray and its intersection results. An additional variant that uses a pre-transformation of the triangles to save operations in a hardware implementation was presented in the art, but introduces additional errors due to the implicit second transformation that must be done per triangle.

Note that visible errors will in fact only evolve for neighboring objects that need a seamless fit, however this is already the case for simple meshes like a car model. In such a setting it is extremely difficult to propose a stable, but still efficient solution. Those objects that do not overlap will not pose a problem at all, but still demand special care for second generation rays to avoid self intersections.

Performance Issues

While a numerically stable algorithm is necessary for flawless simulations, a carefully designed implementation should also consider possible performance issues or missing features on the used hardware. Although modern x86-CPUs still offer IEEE 754 conformity, some platforms like the Cell or GPU only support a subset of IEEE 754, and even on x86, compilers allow to break IEEE 754 by using special instructions (like SSE and its successors) that allow for faster calculations. Even more important, some calculations can result in an unexpected performance loss, with total ray tracing performance dropping by a factor of 10 or even 100, and thus is actually not only a theoretical issue. Slowdowns can happen in calculations involving NaN, $\infty$ or denormalized numbers. While NaN and $\infty$ are no longer an issue on the very latest generations of x86 CPUs (like the Intel Core 2 Duo or current AMD Athlon and Opteron generations) and can be handled without performance losses, denormalized numbers are still a problem. Note that the current AMD Athlon architecture only has problems when loading and storing denormalized numbers, a fact seemingly related to all calculations supposedly being computed in higher precision internally and the denormalization only happening during the truncation to the standard 32-/64-bit values. Thus, many compilers offer a switch to automatically truncate denormalized numbers to zero.

Note that all implementations that still use x87 compatible (and thus fully compliant IEEE 754) FPU code will suffer from tremendous performance issues for all denormalized numbers, $\infty$ and NaN. In addition, performance of most standard x87 opcodes are significantly slower when compared to SSE operations (e.g. three times slower multiplication and six times slower division). This is related to all x87 calculations running internally on a 80-bit FPU, a feature that most likely is not supported directly in hardware anymore.

Another important fact of modern x86 architectures is the improved throughput (and latency) of divisions and square-root calculations that can even omit the usage of reciprocal approximations (available as specialized SSE opcodes) in some implementations.

Also, sine and cosine, amongst other trigonometric functions, can be automatically translated by the compiler into an array of SSE opcodes instead and so do not demand traditional x87 code anymore, thus further improving the calculation and throughput speed.

2.1.4 General Optimizations

After providing a short abstract overview and comparison of ray-triangle intersection techniques and insights on possible numerical issues, this section presents more detailed implementation details and practical aspects on the ray-triangle intersections.

Bounding Volume Optimization

Similar to the use of bounding volumes for the culling of primitives to optimize rasterization on the GPU, it is helpful to limit the ray-triangle-plane range check. By clipping the ray to the currently active segment $$[\max(r_{near}, \text{node}_{near}), \min(r_{far}, \text{node}_{far})],$$

which describes the intersection with the actual bounding volume, the ray is limited by the actual intersections with the currently visited leaf node. This is useful for every triangle test that needs to calculate the distance along the ray first (i.e., barycentric coordinate tests) as it decreases the probability of needing to do an additional u, v-test. When using this simple trick, the relevance of an early-out due to an early u, v-test is further decreased, especially if there is a large amount of triangles stored in the leaf (see FIG. 10). Note that this trick may harm the performance of spatial partitioning schemes such as the kd-tree, as primitives can extent over multiple leaf nodes. As a result, the same triangle will be tested multiple times (as no mail-boxing will work in that case) and additionally increases the probability of missing triangles during the hierarchy traversal due to numerical precision issues, especially in the case of triangles being aligned to the principal planes. So in the case of spatial partitioning it is more stable to use the full ray segment $[r_{near}, r_{far}]$ (not even clipped to the actual scene bounding box) to avoid missed intersections.

A more general approach that builds upon this idea was just recently presented in the art to better balance construction and ray traversal time. It proposes a dynamic construction of shafts for each visited leaf to allow for a fast culling of multiple rays against the triangles.

Figure 10:
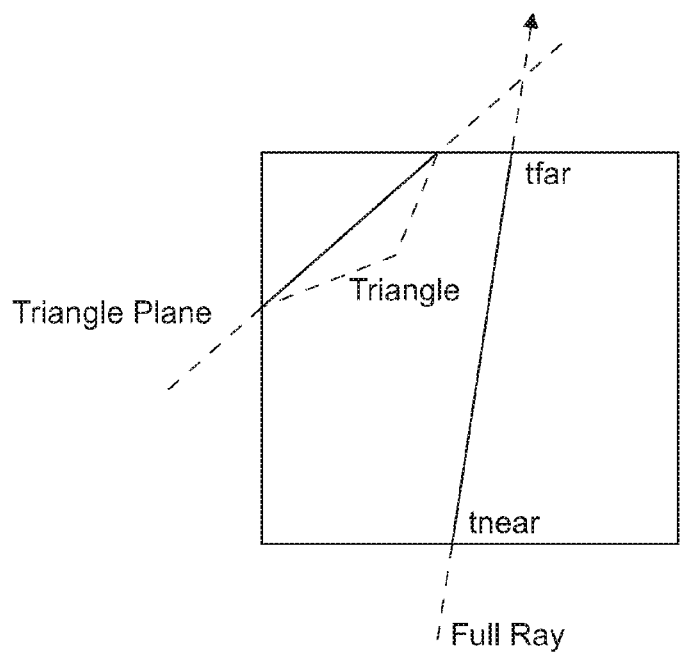
FIG. 10 is a diagram illustrating limiting the ray-triangle test to the currently active ray-segment.

FIG. 10 is a diagram illustrating limiting the ray-triangle test to the currently active ray-segment (intersection of the leaf volume with the ray) increases the probability of an early-out for the ray-triangle-plane test.

Reducing Branches

Apart from the standard way to avoid branches, namely the masking of results (which proves to be especially useful on SIMD capable hardware), this section will present some elegant simplifications that allow to save a large portion of the rather unpredictable branches during ray-triangle tests, especially as these are able to drastically decrease performance by flushing the long pipelines of modern hardware architectures.

All tests that only need to check signs of results (e.g., barycentric coordinates, Segura/Feito or Plücker coordinates) can be optimized by using integer arithmetic instead of using floating point comparisons, as the sign of a floating point number is always stored in the upper bit. This will be demonstrated for the barycentric u, v test:

if ((u<0.0)||(v<0.0)||(u+v>1.0)) return;

can be simply replaced by testing the combined signs of h OR v:

if (((intCast(u)|intCast(v))<0)||(u+v>1.0)) return;

In the case of testing multiple signs (e.g., Segura/Feito or Plücker coordinates) this simple combination of tests will help when using branchless SIMD masking as it allows to only do the masking of the result once.

A more advanced trick is to use unsigned integer arithmetic for certain tasks. In the case of the baryentric test, it would be possible to replace u+v>1 by the almost equivalent intCast(u+v)>0x3F800000

Figure 11:
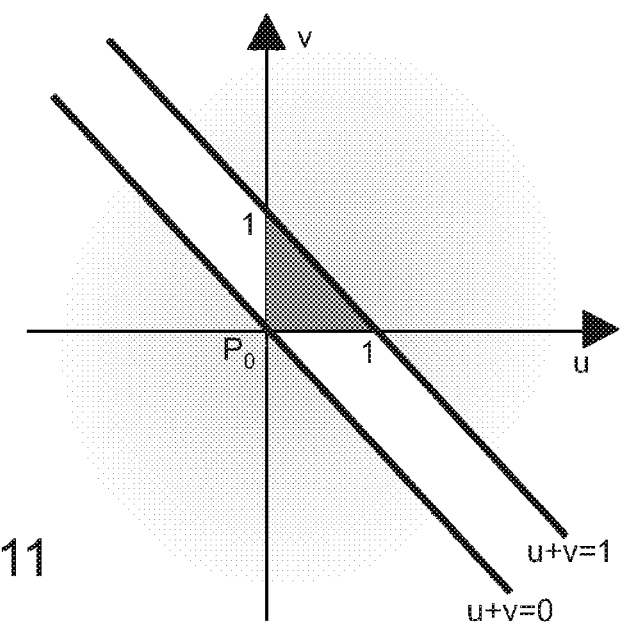
FIG. 11 illustrates a triangle projected to the barycentric coordinate space.

(almost, as it will not handle NaN the same way as will be shown later on). Doing the same test using unsigned integer arithmetic uintCast(u+v)>0x3F800000, the case of both u<0 and v<0 is additionally tested for free, as then the sign of u+v will be set (0x80000000 or greater in the unsigned integer representation). Actually this single test will already handle a large fraction of rays missing the triangle as can be seen in FIG. 11, which illustrates a triangle projected to the barycentric coordinate space. Triangle vertex $p_0$ equals (u, v)=(0,0).

The test to discard the remaining cases can then be inserted afterwards by testing either u*v<0 intcast(u)|intcast(v))<0 or intcast(u) XOR intcast(v))<0

(whatever is fastest).

Still, the test must use two separate conditions for testing u, v. Taking a closer look at the tests reveals the following situation: If scaling both u and v by two (which can be achieved in the pre-calculation step of the barycentric test for free), the test uintCast (u+v)>0x3F800000 can be replaced by uintCast (u+v)>0x40000000.

This does not seem like much, but it actually allows this test to be combined with (intCast(u)|intCast(v))<0 by just using uintcast(u+v)|uintCast (u)|uintCast (v))> 0x40000000.

In the context of a hardware implementation, this trick is rewarding as it means that no floating point comparison at all has to be implemented and a simple bit-test on positions 0x40000000 and 0x80000000 is enough to know that a ray actually missed the triangle. A fact that also saves a lot of operations when implementing a branchless SIMD version of the barycentric triangle test using masking.

if ((uintCast (u+v)|uintCast(u)|uintCast(v))>0x40000000) return;

As mentioned earlier the special case of NaN wont be handled exactly the same as before (depending on the test using > to exit the test, or < to continue), but this does not pose a problem here. As the case of u or v being NaN should mean that the ray missed the triangle, the presented tests will always handle this special case correctly.

Directly related to the previous arithmetic simplifications, the ray segment-triangle plane range check of the intersection distance t along the ray to the segment [0, $r_{far}$] can also be simplified from if ((!(t>=0.0))||(t>rayFar)) return;

(the NOT-operation being used to handle the case of t being NaN, as comparisons with NaN always result in false) to if (uintCast(t)>uintCast(rayFar)) return;

Reducing the Memory Footprint

As stated earlier, triangle tests that perform a projection onto a principal plane (i.e., the Badouel test or its variants) must store the axis of the projection for each triangle, resulting in two bits of additional data (so at least one byte if stored in a brute force manner). There has been proposed in the art a padding of the data from nine floats (plus these two bits) to 48 bytes, mainly due to cache-line alignment issues (two triangles combined are aligned to 32-byte, four to 64-byte boundaries). Although a performance increase was reported by this alignment, the results of this work's experiments were always slower when increasing the memory footprint of the triangle data (no matter how much). This may be a result of the increased cache usage due to the bloated dataset.

In the following some possible variants are presented to hide the two bits in other data, thus keeping the transformed data at nine floats (as it is the case with the original data-set of three triangle vertices).

The first (and most elegant) variant was proposed in the art and uses the projected normal vector of the triangle plane to store the bits. Remember that the third component was set to a constant (usually one, to be able to discard multiplications with this component) and that this component is the dominant value of the normal, thus leaving the remaining components $|n_u|, |n_v| \leq 1$. In the corresponding integer representation, both values have their 0x40000000-bit set to constant zero. Thus it is possible to abuse these bits to store the projection axis bits. The only problem of this neat trick is that extracting the bits and AND-ing the normal components bits back to zero costs a lot of rendering performance (usually 5-10 percent, depending on the overall number of triangles tested per ray).

The second variant proposed in the art makes use of an additional degree of freedom in the barycentric coordinate test. When transforming the triangle-data, the selection of the vertex $p_0$ to compute the edge-data for is actually not determined. Thus it can be selected such that the (projected) edge-vectors will feature both positive u or both positive v components (see FIG. 12), leaving the sign-bits of the respective floating point values at constant zero. Again, the problem is extracting the bits and AND-ing the edge components bits back to zero, resulting in a similar performance drop as the previous variant.

Another variant using an additional degree of freedom involves the usage of the accompanied data acceleration structure: As triangles are referenced in the leaves of the tree, it is possible to keep these references sorted by their respective projection axis. This variant however needs to store three counters in the leaves (one for each principal axis) instead of the standard single reference-counter. In practice this does not pose much of a problem as the counter is usually four bytes long, due to alignment issues, so it is possible to split this counter into three smaller counters, each eight or even ten/eleven bits long. This is usually enough for real life scenes, though it is theoretically possible to have some leaves featuring more than 255 or 1023/2047 references. One example being brute force tesselated cones (resulting in a lot of thin triangles, all sharing the same vertex) or more generally speaking, vertices featuring an extremely high valence.

The last presented variant is also the fastest of them all and uses the alignment of the triangle references stored in the leaves of the acceleration data structure. When using pointers, the lowest two (or three) bits of the pointers can be forced to be constant zero (due to the references being four (or eight) byte wide). Using indices for the references, the upper two (or three) bits can be forced to be constant zero (the only exception being 32-bit indices used on 64-bit hardware). Then the projection case can be stored in these two unused bits.

Figure 12:
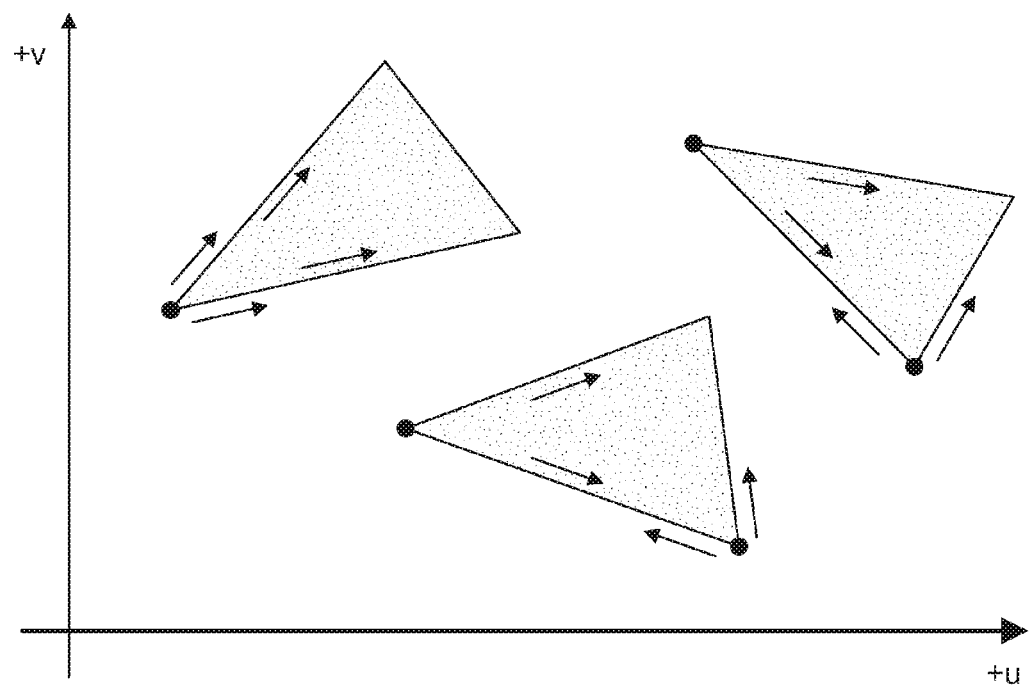
FIG. 12 is a diagram illustrating possible selections for the triangle vertex $p_0$.

FIG. 12 is a diagram illustrating possible selections for the triangle vertex $p_0$ to compute (projected) edge vectors featuring positive u or v components.

An additional problem can be the lost signs of the normal vector, using the optimized Badouel test. As the dominant component was re-scaled to one in the transformation process, the signs of all components have been flipped if this component was negative before. This can become a problem if the original orientation (and not just direction) of the geometric normal is needed in the shading computations (e.g., to handle refractive materials). In this case it is possible to reconstruct the original sign of the component by the cross-product of the edge-vectors.

Amortizing Pre-Computation

In the context of dynamic scenes all primitive tests that use transformed data must actually be rated differently: Does it amortize to transform the primitives to be used for one frame only? As the primitive might only be intersected with few rays or even no ray at all, the pre-computation might result in more memory traffic and operations than it actually saved for the ray tracing step itself. An additional problem arises if some of the original data (i.e., the triangle vertices) is needed during shading computations or an on demand tree construction, as some triangle tests need costly computations (or even some additional data) to calculate the backward transformation to receive the original vertices again, demanding the original data to be saved along with the transformed data. In the context of games (which need to share memory with additional textures, etc.) or in massive geometry scenarios this is clearly not possible.

Compact Vertex/Index-Array Representation

Although most realtime ray tracing implementations currently used prefer to store triangle data on a per triangle basis (e.g., to allow for pre-transformations like the presented Badouel test), it can be worth to use the common vertex/index-array representation of meshes that separates vertex data from triangle connectivity, thus omitting the multiple storage of vertices that are shared amongst triangles. In practice (rule of thumb) this can save up to half the amount of memory used for a triangulated scene (of course this depends on the exact scene, leaving a large gap between a scene consisting of almost randomly scattered unconnected triangles, and closed triangle meshes with an extremely high vertex valence (such as a triangulated cone)). In this work's experiments, the use of the vertex/index representation resulted in almost no performance loss at all (on the average), as the reduced cache thrashing (vertices in the CPU cache can be reused for neighboring triangles during ray tracing) seems to outbalance the additional indirection due to the index-list. Further, omitting a pre-transformation leaves more freedom for the on demand build of the data acceleration structure (see Section 2.5.5) and the possibility of an easier update of the tree (see Section 2.5.6).

If a certain pre-transformation of the triangle data proves to be faster in a certain implementation, it is also possible to use a caching mechanism to combine the best from both worlds: When visiting a leaf, the contained triangles are pre-transformed and the data is stored in a cache for other rays visiting the same leaf later (or in the case of a spatial partitioning scheme, when the same triangle is intersected again).

It is also possible to store the index-list directly into the leaves of an acceleration data structure to save one indirection. This is easy in the case of leaves guaranteed to feature only one triangle (as it can simply be hardwired into tree construction and traversal when using this fixed leaf size) or by using the three references (to each vertex of a triangle) as a substitute for the usually used single one (to reference a whole triangle in memory). This is actually the way to go for bounding volume hierarchies as it decreases the overall memory used (due to the completely missing triangle reference list in the leaves), but can harm all spatial partitioning schemes due to the tripled amount of data needed per triangle reference (whether this outweighs the missing triangle reference list is strongly depending on the used scene).

2.2 Acceleration by Spatial Partitioning

This section will describe some everyday problems that arise using spatial partitioning data structures and present efficient solutions in the context of using a kd-tree for acceleration. For more details see the art, which presents various implementation details, data structure layouts, and low level optimization possibilities.

But first, a small introduction of spatial partitioning schemes: The space containing the objects is partitioned into disjoint volume elements. Efficiency is obtained by enumerating the volumes intersected by a ray and then testing the objects in the volumes for intersection. A major disadvantage of space partitions is that objects are often referenced more than once, since they may have non-empty intersections with more than one of the volume elements. This results in larger memory footprint and requires a mailbox mechanism to avoid performance losses when intersecting one ray with the same geometric object multiple times.

Regular Grids: The space is partitioned into a raster of identical rectangular axis-aligned volumes. This regular structure allows for simple techniques that enumerate the volume elements along a given ray. As each volume contains a list of the objects that it intersects, only their objects are intersected with the ray.

The memory footprint of the acceleration data structure cannot be determined in advance, because objects can intersect multiple volume elements and thus requires dynamic memory management. The data structure is constructed by rasterizing the objects. This requires variants of an object-volume element intersection routine, which is numerically unreliable due to the finite precision of floating point arithmetic. Rasterizing the bounding box of the object is numerically stable, but increases the memory footprint due to unnecessary replications of the references.

The efficiency of this straightforward approach severely suffers from traversing empty volume elements, as explored for massive scenes and the teapot-in-a-stadium scenario. A solution to this problem is found in hierarchical grids that allow empty space to be traversed faster while still having a moderate number of objects per volume element. Switching between the levels of the hierarchy, however, is expensive and can be achieved more efficiently by other spatially adaptive schemes.

Hierarchical Space Partition: One example of a hierarchical data structure is the binary space partition. The general idea is to adaptively subdivide space by using arbitrary planes, which allows one to overcome the efficiency issues of regular grids caused by empty volumes elements. In polygonal scenes an obvious choice is to use the planes determined by the polygons themselves. However, it is not known how to do this in an optimal way and randomized algorithms are expected to yield trees of quadratic size in the number of objects in the scene. Even when restricting the construction to only a tiny subset of all possible split-planes, the construction could take several hours or even days for common scenes.

kd-trees restrict binary space partitions to using only planes that are perpendicular to the canonical axes. Since all normals of the subdivision planes coincide with one of the canonical axes unit vectors, scalar products and object-volume element intersection tests become more efficient and numerically robust than for the original binary space partitions. Still, the decision of how a partitioning plane intersects an object remains a numerical issue. Along with heuristics for subdivision, kd-trees have been used very successfully for accelerating ray tracing.

As with all spatial partitioning schemes, objects can reside in more than one volume element. Although the number of multiple references can be effectively reduced by allowing only partitioning planes through the vertices of the objects, the number of references cannot efficiently be bounded a priori. Consequently, memory management becomes an issue during the construction of the hierarchy. Heuristics used for memory estimation and allocation only hold for common scenes of low complexity, but can be way too pessimistic for others, or even worse, can result in various reallocations if the lists need to grow during the construction phase. This results in performance losses by memory fragmentation.

2.2.1 Sorting Primitives into a kd-Tree

A general problem of spatial partitioning is the determination of which primitives intersect which voxels of the partitioning scheme. While several techniques exist to test for an intersection of an axis-aligned box and a triangle (efficient implementations are known in the art), a less general implementation can achieve better performance when optimized for a specific spatial partitioning scheme. A kd-tree implementation can rely on the following assumptions to design an efficient triangle-box test:

The primitive is guaranteed to (at least partially) intersect the current node and thus must intersect at least one of its children.

Thus, if the primitive's bounding box is completely situated on one side of the splitting plane, it is guaranteed to exactly intersect one child.

If the primitive is situated in the split-plane, a heuristic can choose in which of the children it will be sorted into.

Thus, the following optimized test is proposed:

Test the primitive if it is aligned with the split plane (see Section 2.3.4).

Test the primitive's bounding box for an intersection with the split-plane. If no intersection is found, sort the primitive into the one child it intersects.

Otherwise, the primitive has to be intersected with the rectangular resulting from the intersection of the split-plane and the node bounding box.

Figure 13A:
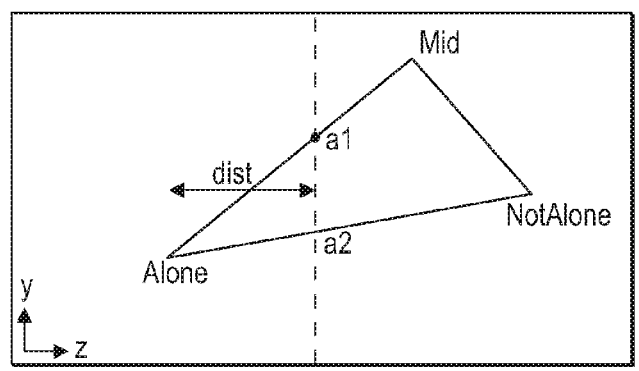
FIG. 13 shows a pair of diagrams illustrating triangle classification with respect to voxels/bounding boxes.
Figure 13B:
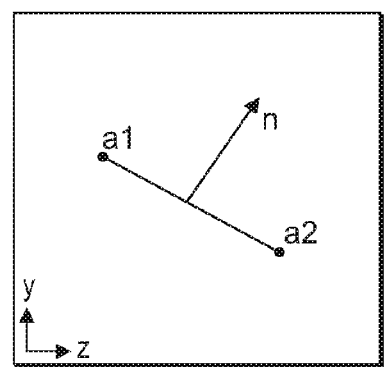

Determine the vertex situated alone on one side of the split-plane and find the intersections $a_1$, $a_2$ of the two triangle edges (connected in that vertex) with the split-plane (see FIG. 13).

Test the bounding rectangle of $a_1$, $a_2$ for an overlap with the node-split-plane rectangular (see FIG. 14). If no overlap is found, the triangle is only sorted into one child.

Otherwise, calculate a vector n orthogonal to the line through $a_1$; $a_2$ (see FIG. 13). The signs of the components of n are then used to index the two corners $B_1$, $B_2$ of the rectangular that feature the largest distance from the line through $a_1$, $a_2$. By testing the signs of $(a_1-B_1) \cdot n$ and $(a_1-B_2) \cdot n$ for equality it can be determined if both corners are on different sides of the line and thus if the line intersects the rectangle, resulting in both children being intersected by the primitive.

FIG. 13 shows a pair of diagrams illustrating a triangle overlapping the split-plane. dist is used to calculate the $a_1$, $a_2$ intersection points, n to determine the two corners of the rectangular featuring the largest distance to the line through $a_1$, $a_2$.

FIG. 14 illustrates the following: First, test $a_1$, $a_2$ to be completely on one side, outside of the rectangle. Then test the line through $a_1$, $a_2$ against the rectangle.

Note, that the test features the highest possible numerical precision by postponing numerically unstable operations as possible, with the only critical operations being the calculation of the 2-dimensional intersection points $a_1$, $a_2$ and the signed distance test of the bounding rectangle corners with respect to the line through $a_1$, $a_2$. Additionally, the test can be designed to use just a minimum of branches, thus increasing throughput on modern hardware architectures.

Faster, Approximate Construction

It is of course also possible to omit the detailed triangle test and just test the primitive's bounding box for an intersection with the split-plane and sort the primitive into both children without further testing. Note that this can only work well for the upper levels of a hierarchy and/or scenes consisting solely of small triangles. Otherwise a lot of leaves will inherit primitives that are actually not intersecting these leaves, resulting in a lot of unnecessary ray-triangle intersection tests later on. In fact this introduces a problem that is usually only inherent to the nature of a BVH (see Section 2.4.2). Optionally, it is possible to use the approximate sorting only for some levels of the tree and an exact sorting for the rest. While this increases the quality of the trees, it also introduces the need for a full box-triangle intersection test again, as the assumptions made to formulate a faster test as in Section 2.2.1 do not hold anymore, thus also decreasing the construction speed. Note that the resulting tree is still of lower quality compared to the full exact solution, as the partitioning heuristics will also be working on a temporary approximate solution.

Exact, but Memory Intense Construction for Void Area Clipping

Additionally it is possible to formulate a computationally slightly simplified exact version, however resulting in a dramatic increase of temporary memory. Instead of duplicating primitive references during the hierarchy construction, the actual primitives themselves are replicated into a temporary buffer by clipping overlapping primitives on the split-plane. This allows to use a fairly simple primitive sorting (the approximate solution found in the previous section is then exact), but at the price of clipping the newly created triangles (which somehow resembles the exact solution presented earlier in this section) and an increased overall memory footprint. Note that the duplicated triangles can be removed from the hierarchy in a post-processing step by keeping an index to the original primitive for each replicated triangle, thus removing all temporary memory and resulting in a memory layout using only references to primitives again.

Still, numerical precision is greatly reduced in comparison to the previous solutions, as the clipping process results in an increased amount of numerically unstable operations, due to the newly created triangles being used afterwards to again create new triangles, recursively over various levels of the hierarchy, thus spreading previous calculation errors.

The interesting fact about this implementation actually is not the computational speed (which is rather disappointing for scenes that do not fit into the caches anymore due to the increased memory usage), but rather the ability to easily determine empty volume cut off splits (see Section 2.4.2).

These would otherwise require an immense computational effort by clipping all triangles to the full node bounding box to determine the "real" bounding box of the primitives in order to propose efficient split-planes for the cut off of the surrounding void area.

2.2.2 Managing Temporary Memory

Spatial partitioning schemes need to handle objects that overlap volume elements. For example, the recursive kd-tree construction needs a vast amount of temporary data to be placed on the stack for the continuation later on, due to the replication of primitive references. The straightforward method of handling this problem is to allocate new arrays consisting of the references for each child of a node.

A variant of the quicksort technique can alleviate these inefficiencies and makes in-place sorting available for kd-trees. The procedure requires a second global array of object references that is used to keep the objects that are classified both left and right, similar to a self managed stack. Testing with a large number of scenes revealed that the size of this array can be chosen by a default value (a length equal to the number of objects is far more than one will ever need in 99 percent of the cases). However, because the real length of the array cannot be predicted and the worst case memory usage being quadratic in the number of objects, it might be necessary to reallocate memory. The procedure is illustrated in FIGS. 15 and 16.

FIG. 15 is a series of diagrams illustrating kd-tree in-place sorting of object indices (upper array) and storing on the global stack (lower array) during tree construction. From left to right, from top to bottom: In this illustration, sorting the unordered array first reveals a left element which stays in place. The second element must go to the right and is exchanged with an unsorted element from the right end of the array. In the third case an object has to be sorted into both volumes and, therefore, is moved to the stack. After sorting all objects, the stacked elements are copied to the middle segment of the index array and the tree construction continues with the left child.

FIG. 16 shows a series of diagrams illustrating the restoration of stacked object indices after a stack pop operation.

2.3 Acceleration by Object List Partitioning

When partitioning a list of objects, each object remains referenced at most once and it becomes possible to a priori predict memory requirements. In addition each object is intersected at most once with a ray and consequently mailboxes (that can accelerate spatial partitioning schemes) become redundant. As an unavoidable consequence the volumes enclosing groups of objects often cannot be disjoint.

Bounding Volume Hierarchies have been introduced in the art and are often used in industry since memory requirements can be bounded a priori linear by the number of objects. However, limits of the classic approaches were explored in the first ray tracing chip and efficient software implementations that remained inferior in performance compared to d-trees.

Implementing bounding volume hierarchies does not require object-plane intersection routines (see Section 2.2.1). As a consequence they are simpler to implement than spatial partitioning schemes. Using axis-aligned rectangular bounding volumes avoids any numerical stability issues during construction as only minimum/maximum operations are used.

There exist heuristics for both the bottom-up and top-down construction, which have been summarized in the art. The usual heuristic is to minimize the overall volume of all volume elements along with a tight packaging of the included primitives. These optimization procedures are prohibitively slow and in fact it is not clear what the most efficient construction technique is.

Severe performance penalties stem from the fact that opposite to binary space partitions the volume elements are not ordered. Usually all child nodes have to be intersected with a ray, because an early pruning was impossible due to a lack of a spatial order. This problem has already been identified in the art.

Another reason is found in the packaging of the objects into voxels that do not allow to efficiently discard empty volume around non-axis-aligned geometry, as the minimum volume of a leaf is limited by the included primitives, thus resulting in an increased number of primitive intersections for rays that just slightly miss geometry on the silhouettes of an object. More details on this problem will be listed in Section 2.4.2.

Note that a uniform and regular structure similar to spatial grids is yet unexplored for object list partitioning as it is difficult to efficiently handle large, overlapping objects. One step into this direction will be presented in Section 2.5.7 though.

While the principles of implementing bounding volume hierarchies to accelerate ray tracing are well understood, only little research has been carried out concerning the efficient construction of the acceleration data structure and advances for massive geometry and/or dynamic geometry were rather moderate until recently.

This section proposes a hierarchical acceleration data structure for ray tracing that can be constructed much more efficiently than previous approaches. The procedure is so fast that interactive ray tracing of dynamic scenes becomes available on even mono-processor systems (see Section 4.2).

The basic underlying idea is to save calculations and data memory for BVHs by decreasing the number of stored clipping planes per node. As fast construction methods are mostly based upon top-down construction, the partitioning of a node results in most changes happening on one axis only, thus making the storage of additional clip planes for the remaining axes unnecessary, a behavior spottable in the upper levels of a hierarchy especially.

When sticking to partitioning on solely one axis, the traversal can be implemented to resemble the most efficient kd-tree implementations, while memory control and numerical precision of BVIIs still hold, as will be demonstrated in this section where a new and efficient data structure will be presented.

2.3.1 Bounding Interval Hierarchy (BIH)

So unlike classic bounding volume hierarchies, which store a full axis-aligned bounding box for each child, the idea of the bounding interval hierarchy is to only store two parallel planes perpendicular to either one of x, y, and z-axis. Given a bounding box and the axis, the left child L results from replacing the maximum value along that axis by the first plane. In an analogous way the right child R results from replacing the minimum value by the second plane (see FIG. 17). Resulting zero volumes are used to represent empty children.

FIG. 17 illustrates geometric primitives overlapping the splitting plane of a kd-tree have to be referenced in both child volume elements in (a), while the bounding interval hierarchy in (b) assigns an object to either the left L or right R child. Traversing a node of the kd-tree in (c) requires to distinguish the four cases L, R, LR, or RL, whereas for the bounding interval hierarchy in (d) the additional fifth case of traversing empty volume has to be considered. Optionally, the cases (e) and (f) can be introduced by allowing splitting planes to tighten the node volume instead of partitioning it.

```
typedef struct {
    long Index; //lowest bits: axis (00,01,10) or leaf (11)
    union
    {
        long    Items;      //leaf only
        float   Clip[2];    //internal node only
    };
} BIH_Node:
```

The inner nodes of the tree are described by the two clipping planes and a pointer to a pair of children. As this sums up to 12 bytes (or 16 when using 64-bit hardware) in total, all nodes are aligned on four-byte-boundaries. This allows one to use the lower two bits of the children-pointer to indicate the axis (00: x, 01: y, 10: z) or a leaf (case 11). Leaf nodes consist of a 32-/64-bit-pointer to the referenced objects and their overall number. The overhead of four bytes when using 32-bit-pointers in the leaves (as they only use eight bytes out of the node data structure) can be resolved by a careful implementation.

Note that a slightly faster implementation (about five percent) can be achieved by storing the encoding of a node to be a leaf or an internal node in the sign bit of the integer index, but as such also decreases the maximum number of addressable nodes.

Furthermore, it proves valuable to introduce an additional encoding for the clip planes to allow for an efficient cut off of empty volume (also see Section 2.4.2) on both sides of the included primitives of a node at once. By using the clip planes to tighten the volume instead of partitioning it (see FIG. 17(e) and (f)), the overall memory usage can be decreased along with receiving faster traversal times. Note that the node in this case obviously only features one single child instead of the commonly used two.

Note that the BIH is in fact rather similar to the earlier proposed R-trees and the s-kD. Also techniques described in later released publications, like the loose kd, the DE-tree and the kd-tree are based on similar ideas. Additionally, proposes a hardware implementation based on a data structure similar to a variant of the BIH (using four clipping planes per node though). Still, the following sections will extend the basic BIH data structure even further and propose new and faster construction schemes, partitioning heuristics and general optimizations that were not possible before.

In-Place Construction

Because the bounding interval hierarchy is an object partitioning scheme, all object sorting can be done in-place and no temporary memory management is required. The recursive construction procedure only requires two pointers to the left and right objects in the index array similar to a quicksort implementation.

The implementation can then either compute the array straight forward from left to the right, which is very simple (but can result in an "unnecessary" scrambling of the primitive references), or use standard optimizations of the quicksort technique like computing the array from left and right "simultaneously" until elements are found on both sides that need to be exchanged. This not only reduces the number of necessary memory transfers, but also tries to keep the original input array unscrambled. The total construction time is decreased by an average of about ten percent over the straight forward solution.

Note that the in-place sorting holds for any kind of bounding volume hierarchy and can additionally be extended to be used for spatial partitioning schemes as was shown in Section 2.2.2.

Additionally, it is also possible to directly exchange the primitive data during the sorting step instead of using a reference list. This allows the additional reference array for the leaves to be discarded, as the leaf can directly refer to the primitive array. Although this should help memory transfers (as triangles of the same leaf will be stored in same cache lines or at least following memory addresses) and saves the additional indirection, the total improvement for the tracing time averages at two-three percent only. This comes at the cost of an increased hierarchy construction time (bigger memory blocks that need to be moved) and the scrambled order of the primitives, which is unfortunate if additional data like texture coordinates and materials is needed for rendering, as it demands to reintroduce an inverse reference list.

Numerical Precision

The bounding interval hierarchy construction only uses bounding box information and minimum/maximum operations in the canonical coordinate system. As such the construction procedure is numerically unconditionally robust. In contrary, spatial partitioning schemes require object plane intersection routines that rely on operations that suffer from floating point imprecisions. In order to make the techniques completely stable, tolerances must be added. As a consequence, performance suffers. See Section 2.1.3 for details.

Memory Complexity

Since the construction technique matches split-planes to object bounding boxes, the number of inner nodes in the hierarchy is bounded by six times the number of objects. In the case of polygons, this number is bounded by the minimum of the previous bound and three times the number of vertices. Note that the number of object references in the leaves always exactly matches the number of objects in the scene.

Due to multiple object references, the latter bound is not available for spatial partitioning schemes as for example the kd-tree. The problem becomes apparent where objects feature a locally high number of overlapping bounding boxes or almost random distribution. This problem is intrinsic to kd-trees, as the first top level splits already duplicate a lot of triangle references, an effect which is continued during recursion. This behavior will be investigated in Section 2.5.3 in detail.

Variants of the Data Structure

In contrary to standard bounding volume hierarchies, the number of clip planes in a BIH node is completely flexible. Thus two additional variants are proposed and rated against the original dual plane implementation.

The first variant tries to decrease the traversal complexity while increasing the construction flexibility by reducing the number of clip planes to one. While this resembles a kd-tree implementation even more, it has been found that the resulting trees will actually be very similar to the dual plane variant, regarding the number of total split-planes and their positions. This is due to the fact, that the only case where the single plane variant case can save one of the otherwise used two split-planes, is an empty volume cut off on only one side. In the other cases, the single plane always leaves one of the children at the original size of the father node, so heuristics based on the volume of a node (see Section 2.4) will propose a split on the same axis again, resulting in exactly the same two clip planes as if directly using the dual plane variant. As such, this variant can be seen as unpractical as it only increases the total number of pointers in the tree, while just slightly decreasing the total amount of split planes. Additionally the ray traversal is slowed down due to increased memory bandwidth, additional overhead due to the increased number of branches in the tree plus more stack operations due to one child being always the size of the father.

The second variant increases the number of split-planes to four. This can be seen as the one-dimensional variant of a classical three-dimensional axis-aligned bounding volume hierarchy. The additional two planes are used to automatically clip empty volume surrounding the included primitives (note that this variant was also proposed in the art, independent from the presently described systems and techniques). While this variant decreases some of the overhead used for empty volume splits that are necessary for the performance of the dual plane variant, it at the same time increases the amount of unused clip planes. Especially on the top levels of the hierarchy the additional two clip planes do not pay off, same when coming down to the object level of a scene, as the triangle distribution will then be rather dense and useful empty volume cut offs can not happen every split. Thus the increased overhead for memory transfers and intersection operations during the ray traversal make this variant slightly slower, for some scenes even dramatically slower than the dual variant, at an increased total memory footprint.

2.3.2 Ray Hierarchy Intersection

Intersecting a ray with the bounding interval hierarchy binary tree is similar to traversing a bounding volume hierarchy. However, since the children are spatially ordered in the new data structure this can be implemented much more efficiently, since it is possible to directly access the child that is closer to the ray origin by the sign of the ray direction. The traversal thus becomes almost identical to that of a kd-tree, as illustrated in FIG. 17. Recently, the advantage of ordering the children of general BVHs along one axis was also demonstrated in the art, though the implementation needs to store additional data inside the nodes to be able to retrieve the ordering during traversal.

In analogy to bounding volume hierarchies, it is also possible to not intersect any child at all if the valid ray segment is between two non-overlapping children (see (d) in FIG. 17). Handling this additional case is even beneficial, because it implicitly skips empty leaves. Consequently, empty leaves can never be accessed and therefore do not need to be stored.

Opposite to spatial partitions, the volume elements of a bounding interval hierarchy can overlap and consequently the recursive traversal cannot stop as soon as an intersection is found. It is always necessary to test all remaining volume elements on the stack for closer intersections. However, as soon as an intersection is found, branches of the hierarchy can be pruned if they represent volume elements further away than the current intersection.

Note that an additional performance increase can be gained by implementing a specialized ray-hierarchy intersection for shadow rays. As these rays can skip further traversal and intersection calculations as soon as an intersection with any primitive has been found, the costly popping of the complete stack can also be discarded, an optimization which is usually only possible for spatial partitioning. Consequently, the optimization of shadow ray intersections in a complete global illumination simulation results in an overall 5 percent performance increase on the average using the BIH, while not providing any measurable gain at all for the kd-tree version.

2.3.3 Reducing the Memory Footprint

A major problem for current and especially upcoming and future hardware is the latency of memory fetches, so ever-growing caches are included to hide latencies at least for recurring data. To better utilize the rather small caches (when compared to the total size of the geometry and/or hierarchy). The two following subsections will concentrate on further reducing the memory footprint of the acceleration data structure.

Quantization

A straight forward solution to compress floating point data is an additional (post-process) quantization step at the loss of numerical precision, however, in the case of BVHs, a quantization of the split-planes can be achieved that still provides full precision for the ray tracing step. Along the lines of art that uses BVH quantization to 16 bits for collision detection and the recently released art which uses quantization to 16 or 8 bits in a k-ary BVH for ray tracing, a comparable implementation will be presented for the BIH.

When quantizing the clip planes of a BIH, the left child's plane has to be rounded to the next larger value, the right child's plane to the next smaller value (note that this can also be implemented without switching rounding modes by adding constants and always truncating). This slightly increases the volume of the child bounding volumes, thus preventing rays of missing triangle intersections due to quantization errors later on. The presented implementation uses a quantization to 16 bits per float to reduce the memory footprint for each node from 12 to 8 bytes, thus also achieving a better cache line alignment:

newsplit[0]=(split[0]−worldBoxMin·x)*65536/
(worldBoxMax·x−worldBoxMin·x);

newsplit[1]=(split[1]−worldBoxMin·x)*65536/
(worldBoxMax·x−worldBoxMin·x);

While the inverse mapping is straight forward to compute during the ray tracing phase, it can be optimized to use exactly the same number of floating point operations as the non-quantized version (see FIG. 18).

Still, the code must use two 16-bit-integers to float conversions per traversal, an operation that can easily harm performance over the non-quantized traversal. Also note that the pre-calculation must use six additional multiplications and three subtractions per ray (which, however, easily amortizes over the complete traversal phase).

FIG. 18 shows an exemplary listing of an implementation using the quantized data in the ray-hierarchy intersection.

Testing with the Stanford models Happy Buddha, That Statue and (the extremely detailed) Lucy, an average of 10 percent total ray tracing performance loss is experienced (compared to the original BIH implementation). While this seems to stem from the slightly larger bounding boxes, the amount of total traversal steps only slightly increases by an average of 1-2 percent. At the same time the number of triangle intersections rises from 2-3 percent (Happy Buddha) up to 15 percent (Lucy). This is directly related to the limited amount of partitioning possible when using a uniform quantization, thus leading to an increased number of primitives per leaf. Still, this rather good and unexpected initial performance, even for these extremely detailed scenes, can be further optimized.

When analyzing the converted floating point value in detail, it can be seen that only 19 of the 32 bits are actually used (the others are constant when discarding the converted integer numbers 0 and 1). But a simple binary shift of the data, OR-ing the constant bits to it, and loading into a floating point register afterwards is unfortunately not enough as the 19 bits obviously do not fit into the 16-bit-data that is available.

Instead it is possible to load the 16-bit-data directly into the mantissa of a floating point number, OR-ing an exponent to it and scale it afterwards so it matches the range of 0 . . . 65535 again. Moving the scaling to the pre-calculation part and using 0x40000000 (=2.0) as exponent bits results in the code snippet shown in FIG. 19.

This variant can be a lot faster as it trades the two 16-bit-integer to float conversions against just two OR-operations (note though that an optimized version of the int to float cast version that must use SSE2 is a bit faster). This neat trick does actually not harm the ray tracing precision at all and the number of operations for an optimized pre-calculation step remains equal.

To summarize, the two low-level optimizations (either using integer arithmetic or a SSE2 optimized 16-bit-int to float cast) of the quantized BIH brings the total ray tracing performance at least on par with the non-quantized version, thus outperforming or at least matching the results found in the art while saving 33 percent of the total BIH node memory. As the second variant is even more hardware friendly (as no int to float cast needed), it could become useful for future hardware implementations.

However, the main problem of such regular quantization is found in its missing adaptivity, thus introducing the exact same problems to ray tracing as utilizing uniform grids as data acceleration structure. At the lower levels of the quantized hierarchy it is not possible to further partition a node, as the resulting quantized children will feature the same bounding planes as the father node again. Thus, the art provides more details on a hierarchical quantization of BVHs, though even using this hierarchical encoding, the published statistics show a demand for at least 8 bits per quantized float to not drastically decrease the overall ray tracing performance. Still, this relative encoding of quantized floating point numbers could also allow to easily include fixed point integer arithmetic for ray tracing or even a full precision integer triangle test.

Compression

Instead of using a simple difference encoding with a fixed bit budget per float for BVHs as proposed in the art, it should also be possible to use more advanced predictors and/or varying bit counts to allow for even less cache usage per node. Especially if an additional incorporation of the original primitive data into the compressed tree is used, the overall memory footprint for geometry and hierarchy could be drastically reduced. While this is still an open topic for research in the context of ray tracing, the art delivers results for efficient mesh compression implementations that are at the same time computationally simple, thus a runtime mesh decompression for ray tracing seems feasible. First experiments using the bounding interval hierarchy and an additional simple compression based on prediction and RLE were significantly slower due to the overhead of the decompression step, but could still pay off in a full hardware implementation, using a separate decompression unit that can work in parallel to the traversal and intersection unit(s). Additionally, scenes that are not fitting into main memory and must use disk swapping (see Section 4.3) already can profit from the optional compression step to save roughly half of the disk reads and writes (mileage will vary as the ratio obviously depends on the compression scheme used and the underlying geometry data).

2.3.4 Performance

Certainly the simplicity, numerical robustness, and predictable memory footprint make bounding volume hierarchies most attractive for accelerating ray tracing. However, performance was generally below what is obtained using kd-trees. At the price of hardly predictable memory requirements and numerical issues during the construction of the spatial acceleration data structure, realtime performance is obtained for static and moderately dynamics scenes.

Both principle approaches of either dividing space or object lists suffered from construction routines that were far from realtime and additionally use greedy techniques, which certainly is another disadvantage. The most successful concept is the surface area heuristic (also see Section 2.4.1). As it requires a fair amount of analysis of scene geometry and twiddling, the construction for a complex mesh can easily be in the range of minutes to even days. Although a lot of research (especially on the faster construction by approximating the cost function) has been achieved, the resulting hierarchies are either of moderate quality or still take a lot of time to be constructed.

While the construction times amortize for static scenes, very moderate dynamics, or deformables only, they are much more difficult to amortize in fully dynamic settings. Attempts to deal with fully dynamic scenes so far use regular grids with all their disadvantages and are only efficient for scenes of moderate complexity.

2.4 Partitioning Heuristics

As mentioned in the previous sections the choice of the right partitioning heuristic to build the data acceleration structure is crucial for both construction and ray tracing time. Furthermore, there is an increasing demand for fully dynamic scenes (as it is possible to a certain extent in modern game and especially demoscene graphics engines). Therefore the merging of these normally separated steps is necessary to minimize the total time to image, but this also poses new problems for the partitioning heuristic, as will be seen later.

This section will take a closer look at some of the popular partitioning heuristics in the context of both object list and spatial partitioning using binary trees. In a second step some rather simple (and thus computationally fast) but still very efficient heuristics are proposed, concentrating on top-down hierarchy constructions which are preferred over bottom-up heuristics in current ray tracing system implementations due to their generally faster implementations. The art provides more information regarding "optimal" partitioning heuristics, as well as a general overview of currently used acceleration structures and the inherent partitioning heuristics.

2.4.1 Survey of Partitioning Heuristics

Perfect Volume Split

The most simplistic split-plane proposal for spatial partitioning, closely related to the partitioning using a hierarchical grid or octree, is the perfect volume split as it splits the volume of the current node in two equally sized halves. The only degree of freedom is the selection of the split-plane axis, with some possible heuristics being the round robin tactic, a randomly picked axis or using the axis featuring the longest extend (with the last heuristic usually delivering the best performance).

As the heuristic has no relation at all to the distribution of the primitives in a scene (as it never touches any triangle at all to determine the position of the splitting planes), the same problems as for hierarchical grids arise: Large spaces of empty volume are only discarded by accident (as it's always possible for some lonely objects to be scattered in a vast potion of empty space) combined with a huge amount of duplicated references (which is directly related to an increased probability for numerical errors, see Section 2.2.1), especially around vertices that feature a high valence. Still, the regularity of this partitioning can be exploited to reduce the memory footprint of a kd-tree, as one can completely omit to store split-plane positions.

Perfect Vertex Split

This (greedy) heuristic refines the previous (global) heuristic, as it uses the split-plane proposal of the perfect volume split to search for the primitive of the current node that features the smallest distance to it. This primitive is then used to determine the split-plane that will actually be used for partitioning. In the case of triangles, it is possible to either choose the triangle's vertex or bounding box edge closest to the split-plane proposal. Even considering only one vertex of each triangle as possible candidate can be an option if the mesh is closed.

By using this additional pass over the primitives, the heuristic relates the split-plane proposal to the geometry, resulting in an increased probability of empty volume being discarded (as the split-planes adapt themselves to the edges of separated objects) and less reference replications (as usually at least one primitive less is duplicated per split).

The heuristics efficiency can be further increased by considering all intersections of the triangles with the current node's bounding box to allow for more or better empty volume cut offs, though this operation is very costly in general (see Section 2.2.1).

Perfect Object Median Split (Leftish Tree)

The last presented simple heuristic concentrates on a perfect object list splitting resulting in leftish (or also called balanced) trees, similar to classical search tree partitioning, and was used for a long time as the standard partitioning scheme to accelerate ray tracing. However, with increasing scene complexity this simple heuristic was found to be of little use (especially when used in combination with spatial partitioning) and additionally features slow construction times due to the necessary median element search for every internal node of the tree. The main reason why this usually good performing heuristic (in the context of databases and searching techniques) fails when used to accelerate ray tracing is found in the actual non-uniform distribution of objects in real life scenes, especially for all so called teapot-in-a-stadium scenarios. The leftish tree construction assumes that every primitive of the tree has the same probability to be intersected by a ray, while in fact surface area, volume of the surrounding bounding box and local primitive density are more important. Also, ray tracing is nowadays implemented as a backtracking technique to find the closest intersection along a ray, so the empty volume gap in-between objects is usually of great interest, as it is usually wanted to step over empty gaps along the ray in few steps (ideally one visited empty leaf if spatial partitioning is used) and finding an intersection directly in the next visited leaf. As the median split does not take empty volume into account (as it is designed to deliver a fast result for a point search only). A resulting problem can be seen in FIG. 20. The split-plane will only cut off empty space by accident, as long as the distribution of primitives in the children is not equal. This results in fragmented empty volume with most leaves of the resulting hierarchy being large, but very thin slices of empty volume featuring one (or more, depending on tree depth) triangle on one of their sides. During ray tracing the ray has to traverse an extreme amount of leaves to step over empty volume resulting in a drastic performance decrease. Experiments delivered that some rays, especially those just slightly missing the objects of a scene (e.g., on silhouettes), have to visit up to 10.000 leaves for complex meshes due to the volume fragmentation, resulting in some scenes with factor 50-100 increased rendering times compared to the perfect vertex split heuristic. Note, that the same problems hold for the BIH and its variants that use single and quadruple partitioning planes (although the last variant can automatically cut off more empty volume on the lower levels and is thus significantly faster, especially when using simple scenes like 3-dimensional scanning data) along with every BVH implementation in general.

FIG. 20 is a series of diagrams illustrating a general problem of the perfect object median partitioning (using the BIH as an example): Unequal distribution (illustrated by using slightly differing triangulated spheres in this simple example scene) results in a continuous splitting of the objects instead of removing empty volume, which is crucial for ray tracing performance.

An additional problem that needs to be addressed is the search for the median element when using a kd-tree, as it is difficult to predict the median due to the inherent reference replication. The art proposes a solution using two quicksorts of the minima and maxima of the bounding boxes of the primitives to determine the median element. Although its author claims that this solution is proven correct, this can only be seen as an approximate solution, as finding an "optimal" median element must involve an exact clipping of the triangles to the node bounding box. Nevertheless, this approximation works rather well, especially for the higher levels of the hierarchy build.

Still, leftish trees also feature some nice properties that can be exploited. As shown in the art, leftish trees can be used to build ray tracing acceleration structures that do not need to store pointers for their children explicitly (as their index can be calculated out of the current node's index) and additionally any stack operation during ray traversal can be omitted, as a back-pointer to the parent of a node is implicitly defined by the data structure itself. These properties might prove valuable in the context of certain hardware architectures like GPUs, where the art has proposed short/fixed size stack or even stack-less ray tracing variants. Note that leftish trees also feature (by design) the smallest memory footprint possible for hierarchies, as the total amount of nodes and empty leaves is minimized.

Surface Area Heuristic

Presented only for the sake of completeness, a complete discussion of this widely used heuristic is out of context for the purpose of this work, as the main weakness of the heuristic is found in extremely long precalculation times that only deliver minimal improvements (if any at all) for most common scenes (compared to the partitioning heuristics developed in the present discussion, see Section 2.4.2). Although there are various publications dealing with decreasing the precalculation times, either by using additional memory to store temporary information and/or decreasing the amount of tested split-plane proposals by quantization, it can still be seen as the most complicated heuristic (especially when using the additional runtime optimization tricks) that also features the by far longest construction times. Also note that decreasing the amount of used proposals to approximate the cost-function will result in a decreased quality of the thus approximated SAH hierarchy. Nevertheless, the resulting data structures of the originally proposed, fully computed SAH are still amongst the most efficient (especially for complicated scenes) when only considering pure ray tracing time (and thus completely omitting the necessary construction time), so it can pay off to use full SAH trees in the context of static scene walkthroughs, where precalculation times are not too much of an issue.

It must be pointed out that the SAH is commonly seen as an "optimal" heuristic when used for building ray tracing acceleration data structures, while in fact a lot of assumptions were necessary to formulate the heuristic that clearly do not hold for practical ray tracing: The distribution of the rays is assumed to be uniform over the whole ray space (while a heuristic based on the real ray distribution as in Section 2.4.2 should generally lead to better ray tracing performance). Further, these rays are assumed to not intersect anything on their path to the node (which omits the fact that ray tracing is a backtracking algorithm that needs to find the closest intersection by inspecting multiple leaves along the ray) and the time to traverse a node or intersect a primitive is fixed to a constant (while it is obvious that e.g., top-level nodes that will remain in the caches can be traversed a lot faster, along with a lot of local issues depending on the primitive distribution and overlap). Additionally, building a non-greedy SAH hierarchy is also non-trivial and as such most of the time greedy implementations are utilized.

2.4.2 New and Improved Heuristics

As seen in the previous section each of the presented simple heuristics has certain useful properties:

Perfect Volume Split: Places split-planes independent of the underlying geometry.

Perfect Vertex Split: Generally the overall most efficient simple heuristic, considering the total time to image.

Perfect Object Median Split: Effectively limits the total amount of used memory.

Thus, a solution that tries to combine the best from these simple heuristics should generally be outperforming the stand-alone solutions. Starting with the perfect vertex split as the base algorithm, it must be noticed that hierarchies resulting from this heuristic generally feature a lot more nodes than trees constructed using the SAH. Simply decreasing the maximum tree depth or increasing the maximum number of primitives that can be stored in a leaf (both classic, but way to simple construction termination criteria, see Section 2.5) unfortunately results in proportional performance decreases. So one idea is to locally limit the memory by using the perfect object median split on the lower levels of the tree instead. Finally, the third heuristic (perfect volume split) will be of use on the lowest levels of the tree, as soon as no more regular vertex (and thus also object median) splits can be found, in order to voxelize big nodes that still consist of many primitives.

So the first step is integrating the object median into the regular vertex split heuristic to automatically terminate the tree construction much earlier than before. The art has proposed the use of a ray tracing system consisting of a top-level BVH along with low-level regular grids for the local objects of a scene, while these "objects" are actually determined by testing the local distribution of the primitives. If this distribution is rather uniform, the tree construction switches from the BVH to use a regular grid instead. In this work, that unfortunately uses rather abstract and simple scenes as testing scenarios, this proved to be a well performing heuristic when compared to eleven other heuristics. Even more interesting, the just recently released art uses a top-level BVH and a triangle-strip like storage of triangles on the lower levels that is organized in an object median tree. The results are rather promising, especially for massive scenes consisting of several millions of triangles. Additionally the art has hinted that an "optimal" split (in the sense of using the SAH) must always be found in between the perfect volume and perfect object median split.

The key explanation why such heuristics can work is actually the distribution of triangles in a scene. While the upper levels of the hierarchy must first of all try to separate the objects of a scene (and thus maximizing the empty volume gaps between them, see Section 2.4.1), the lower levels can assume that the triangle distribution is rather uniform (teapot-in-a-stadium problem), thus an object median tree or regular grid being an obvious choice for a low-level tree. Additionally, the object median split can keep the memory usage low for locally highly detailed objects, thus preventing a portion of cache thrashing that is inherent to some rays.

The problem that remains is the detection of when to make the switch to the object median split. The heuristic proposed in the art is clearly too computationally expensive. A simpler heuristic is to use the current tree depth and/or number of primitives in a node instead to determine when to make the switch. Unfortunately, both proposals only depend upon the scene's triangle count, where actually the switch should depend upon the local distribution. In reality this simple heuristic works rather well though, even when testing very different scenes. While a tree depth of 28 seems like the best trade-off between trace time and node memory used for the massive UNC Power Plant scene, it is 23 for the multiple times smaller Quake II game geometry. As several ideas to propose a simplistic estimator for a locally adaptive switch did not work out (otherwise a more advanced method like the one in the art must be used), a fixed tree depth of 25 was found to be a rather good trade-off for all kinds of tested scenes.

An additional small refinement to the combination of these two heuristics can be made by abusing a heuristic popular for the construction of BSP trees: By using large triangles as split-planes, as the probability of hitting exactly those are rather high (as they can be considered ray blockers), the traversal steps for some rays are drastically decreased. While this heuristic only partially holds with increasing scene complexity (even for architectural scenes), the basic idea of the herein used variant is to only assume blockers to exist on the lowest levels of the tree. Thus, only primitives whose plane-normal is more or less aligned with the split-plane axis are considered for the perfect vertex split and/or object median search. Note the amount of memory that can be saved while providing almost constant ray tracing times.

Note that the combination of the presented heuristics did not prove successful for the BIH and its variants, a fact related to the natural memory limit inherent to bounding volume hierarchies. By additionally limiting the memory by using median splits not much memory can be saved, but instead only the picking of better suited split planes is avoided. So the performance drop is directly related to the amount of memory saved.

The second step consists of including the perfect volume split heuristic into the combination of the heuristics. As such, a volume split can only be useful as soon as no more vertices are located inside the current node, or more generally speaking, if the vertex nearest to the middle of the node volume is too far away from the middle to still deliver a "valuable" split-plane. While the latter case is rather difficult to detect and rate (as there are two cases that must be distinguished: is the vertex too far away because there is a lot of empty space in-between two objects (so a vertex aligned split would prove useful) or is it too far away because the node mostly consists of a lot of long triangles that occupy the whole node (in which a real volume split would be useful)), the case of no more vertices found inside a node is easily detectable as in that case a leaf needs to be created. If additionally the number of primitives in the node is rather high or the volume or surface area rather large (e.g. when related to the total scene size), then a volume split can help to further voxelize the problematic node. Such nodes mostly feature lengthy and/or non-axis-aligned primitives that still have a lot of empty space around them (one example being a 45 degree rotated pipe consisting of hundreds of thin, but long triangles, such as the cranes standing in front of the UNC Power Plant or the huge pipe system inside the building), a problematic scenario even for the SAH. Further subdivisions utilizing pure volume splits allow the primitives to be approximated by a large amount of small voxels. While this does not seem like a wise idea as all rays that will intersect such primitives will have to do much more traversal steps than usual to get to the actual leaves that contain the primitive, all rays that actually miss the primitives will profit from the newly created empty leaves, as only these leaves must be traversed instead of intersecting all primitives (which is especially important if many primitives were located inside the original node).

Note that this additional heuristic is obviously useless for bounding volume hierarchies as they cannot feature volume splits by design. In that case, two possible solutions can be thought of:

Simply split triangles, either in a pre-process, so all triangles in a scene are more or less of the same size, or, only when needed (see above criteria). A neat trick that can help to increase performance is to not split triangles in a classical way, but to resemble the axis-aligned nature of the acceleration data structure by just allowing splits along the principal planes (see FIG. 21). This can be of great help to reduce the overlap of the newly created children of the hierarchy. Additionally, the newly created triangles can share data amongst them, as long as a ray-triangle intersection test is used that demands for a pre-transformation step: As the triangle-plane will always be equal for all created triangles, the normal can be shared, as well as the edge-vectors of the newly created triangles. Note, however, that an actual implementation that could make use of shared data needs to be designed radically different.

It is also possible to simply ignore the fact that bounding volume hierarchies cannot employ duplicated face references by design, thus implicitly creating a kind of hybrid data structure (see Section 2.5.4) that combines object list with spatial partitioning.

FIG. 22 illustrates one problem of axis-aligned hierarchies (especially when only using split-planes aligned to vertices): All rays that just slightly miss the silhouette of a complex object will visit a large amount of leaves, resulting in multiple triangle tests along silhouettes. Such a case is not uncommon and even moderately complex scenes can feature some rays that need to test hundreds of triangles. Main problem of such rays is not the time it takes to trace (as they represent just a very small portion of the total amount of rays), but rather the cache thrashing they induce: A normal Pentium IV CPU features 8 KB of L1 cache, which can be completely flushed by the data that is fetched by just one single ray.

An additional variant presented in the art uses a 3-dimensional BSP tree at the lower levels of regular axis-aligned hierarchies to help encapsulate long and thin triangles. Though the results are promising, it is also accompanied by a overcomplicated tree build (how to sort triangles into these convex polyhedra) and numerical precision issues, both for construction and traversal. The additional degree of freedom on how to optimally pick the 3-dimensional split-plane is an unsolved problem, especially as simple approximations like only using triangle-planes as proposals will not deliver optimal results on the lower levels of the tree. One way to tackle these problems is found in the art. Only few split-plane proposals are allowed (the normals of the proposed planes are determined before tree-construction, so only a point on the plane along with the index of the plane-normal must be selected by a heuristic). The published results show a decreased number of triangle intersections and traversals, along with a decreased memory footprint, due to the better approximation possibilities of the nodes of the underlying scene geometry. The downside is an extremely slow tree construction, due to the complex sorting of the triangles into the tree and the more difficult split selection procedure.

Rapid Split Proposals by the Global Heuristic

As pointed out in the previous section, the combination of the three simple heuristics did not work out for bounding volume hierarchies, so this section proposes a new efficient heuristic, originally designed for the BIH and its variants, but which was also found to perform better than other heuristics when used to construct general axis-aligned BVHs.

The key to the performance of the new heuristic is the efficient construction. Assuming a split-plane to be given, the algorithm is fairly simple: Each object is classified either left or right depending on the overlap (see Section 2.4.2 for details). Then the two partitioning plane values of the child nodes are determined by the maximum and minimum coordinate of the left and right objects, respectively. What remains is to determine the split-planes. Unlike previous approaches, a non-greedy heuristic is used that is cheap to evaluate, because it does not explicitly analyze the objects to be ray traced (similar to the simple heuristic presented in Section 2.4.1).

As illustrated in FIG. 23(a), the heuristic uses candidate planes resulting from hierarchically subdividing the axis-aligned scene bounding box along the longest side in the middle. Note that all candidates in fact form a regular grid. If a candidate plane is outside the bounding box of a volume element to subdivide, the recursion continues with candidates from the half, where the volume element resides (see FIG. 23(b)).

FIG. 23 illustrates (a) split-plane candidates from hierarchically subdividing along the longest side of the axis-aligned bounding box (b) used candidates and c) resulting boundary interval hierarchy.

The object list is recursively partitioned and bounding boxes are always aligned to object bounding boxes: If a split-plane candidate separates objects without overlap of the new child nodes, the resulting split-planes implicitly become tightly fitted to the objects on the left and right thus maximizing empty space (see FIG. 17(d)). Although the recursion automatically terminates when only one object is left, it is possible to define a number of objects for which a recursion is still efficient. Thus trees become flatter, memory requirements are reduced and the traversal cost is balanced against the cost of primitive intersections. A better (locally adaptive) heuristic will be presented in Section 2.5.

It is important to note that the split-plane candidates themselves are not adapted to actual bounding boxes of the inner nodes, but are solely determined by the global bounding box of the scene. This is the actual difference to previous approaches, which results in an adaptive approximation of the global regular grid as close as possible and node bounding boxes as cubic as possible throughout the hierarchy.

Another reason for the high quality of the hierarchy: During construction, a large portion of the nodes will be partitioned into overlapping children. By neglecting the fact that no more useful split proposals can be found inside these overlapping regions, as it is the case when using the traditional heuristic (middle of the current node's bounding box), some split-plane proposals will not be able to partition the current node at all, thus resulting in a too early termination. The global heuristic avoids exactly these cases too, as it does not adapt itself to the real bounding box of a newly created child node.

It is worth to mention that building kd-trees based on the global heuristic results in ray tracing times almost similar to the otherwise highly optimized kd-tree implementation for most scenes (at increased memory usage though). Actually, this behavior is not unexpected as the global heuristic will only resemble a mixture of the perfect volume split and perfect vertex split heuristic when used for spatial partitioning schemes.

Impact of Void Area

An additional criterion that has been found useful in various ray tracing implementations is to discard or pack empty volume as early as possible in the hierarchy construction. The theoretical background can be found in the art, where the authors propose the term of void area to describe the difference in the projected areas of the bounding volume and the bounded primitives, where the bounding volume with the minimal void area consists of the primitives themselves. It is shown that the minimization of void area automatically leads to fewer intersection calculations necessary, a fact that also can be spotted in practical experiments using non-axis-aligned hierarchies. To efficiently discard empty space around primitives in a node, Section 2.3.1 proposes the use of an additional encoding for BIH nodes to cut off empty volume on both sides at once. To detect these cases where it pays off to actually encapsulate primitives into a tighter volume instead of partitioning the node, the loop that sorts primitives to the left and right (during a partitioning step) additionally calculates the real bounding interval of the primitives in a node simultaneously. Afterwards, the primitive interval is checked against the size of the node interval to determine if the node interval should be tightened to better fit the primitives. Experiments delivered a value of at least ten percent space that should be empty to insert these special nodes. While it is obvious that an adaptive value (e.g., depending on the node volume or surface area in respect to the total scene size) should deliver far better results, no simple criteria were found that resulted in an overall better ray tracing performance. Note that the same procedure proves to be quite difficult for spatial partitioning hierarchies like the d-tree, as a lot more analysis of the geometry in a node has to be made to find optimal clipping planes to tighten a node, due to primitives that only partially intersect a node. A solution (at increased memory usage though) can be found in Section 2.2.1.

Another generally useful heuristic refinement that is closely related to the topic was first described in the art: Primitives being part of the split-plane (e.g., in axis-aligned architectural scenes) may demand special treatment. Instead of sorting the primitives into both children (which should rather be resolved by a stable ray traversal) or a random assignment, it is proposed to sort the primitives into the smaller volume, thus decreasing the probability of it being intersected by the traversed rays. While this seems like an obvious extension, it must be noted that the assumption of the smaller volume featuring less traversed rays did not hold for all experiments of this work. Thus, the heuristic was extended to only change the default sorting of these primitives if it results in one node being completely empty and such an empty leaf can be created.

Dealing with Bad Split Proposals

Although the presented heuristics tend to be pretty robust, bad split proposals can occur due to the simplistic nature inherent to the presented techniques. One case for the BIH and its variants being a partitioning that results in one child being empty and the other child holding all triangles, but having the same volume as the father node. This can happen if the node mainly consists of large triangles spanning (almost) the full volume (also see the following subsection). If this happens, no more splits on this axis are allowed (or a leaf is created if the same already happened on the two remaining axes). Optionally one can also use a counter for each axis to be able to continue with different splits later on. In that case, giving each axis the chance to retry five times has been found to provide a rather well performing trade-off. Apart from being completely unnecessary anyway, increasing the number of possible retries further can lead to a quadratic behavior of the runtime for the tree construction and should thus be omitted.

Additionally, some heuristics can profit from testing the split plane proposal to the perfect volume split proposal of the current node box. If the distance amongst the proposals is too large (related to the total length of the box on this axis), so resulting in one child to feature a much smaller volume than the other one, the heuristic can be switched to temporarily use the perfect volume split. Note, however, that this cannot be used successfully for the global heuristic.

Sorting Primitives into a BVH

As noted earlier, a top-down tree construction usually picks a split plane proposal and, in the case of utilizing a BVH, needs a second heuristic to decide what triangles will be sorted into the left or right child of the current node. While it seems obvious to just use the center of the primitive or of the bounding box (which directly relates to the amount of overlap with the estimate of the child volumes), first sorting all objects that overlap the potential splitting plane into a separate left-and-right block (like it is also needed in spatial partitioning) can prove useful. After scanning all objects, it is decided whether all objects in that block are appended completely to either the left or right block. Compared to single decisions for each object as described in the art the overlap is minimized much more. Consequently, empty volume is maximized and in turn the overall performance improves.

Note that this heuristic actually resembles the behavior of a ternary tree, in which the large and/or overlapping triangles will be sorted into the middle child of a node. FIG. 24 is a diagram illustrating ternary tree partitioning. The new heuristic just delays the construction of this (now optional) third child by one partitioning step and thus even improves the results that can be achieved by using a ternary hierarchy. Experimental results running a highly optimized ternary hierarchy showed that the third child actually is of little use for a large percentage of the nodes' partitioning, thus making the extra cases that must be handled during ray traversal and construction obsolete.

A second option which is especially popular for BSP trees is the optional storage of primitives in inner nodes (e.g., as they extend the whole volume). While it can work wonders for some simple (and especially axis-aligned) architectural scenes, as large ray blockers (e.g., walls, floor and ceiling) will be stored directly inside internal nodes, thus leading to immediate intersections with the ray(s), this has not proven to be successful for more complex scenes, especially as the number of triangles that would need to be stored into one single node can become fairly high. However, see the art for a possible and very interesting implementation.

BIH and Large Primitives

One might argue that the bounding interval hierarchy (and also its variants) performance suffers when encountering a mixture of small and large geometric elements. While this is partially true, it is also true for spatial partitioning schemes.

In this situation a kd-tree subdivides the scene by inserting more splitting planes. This results in deeper trees, a duplication of object references, and an overall increased memory footprint. Deeper trees increase traversal steps and the hierarchy construction timings.

Figure 25:
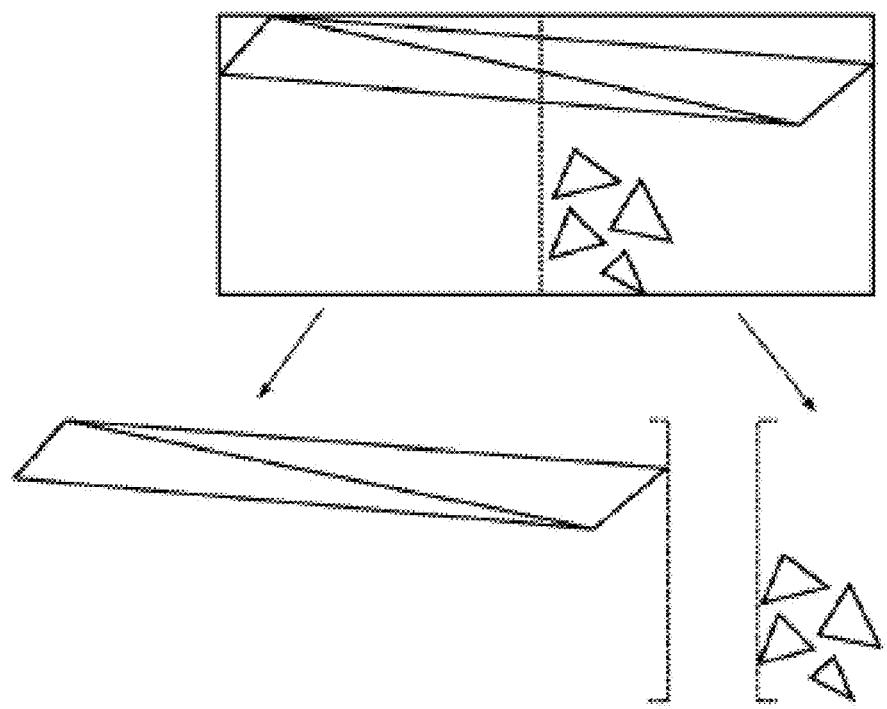
FIG. 25 is a diagram of a simplified situation illustrating a mixture of large and small triangles.

Another simple example of an unfortunate mixture of large and small triangles, that is exceptionally hard to handle for simple heuristics, would be a pipe (triangulated by large but also very thin triangles) featuring a detailed valve (see the simplified situation in FIG. 25). To detect the (seemingly obvious) partitioning of these objects is actually very difficult: Sorting by overlap will most certainly result in some of the large triangles going to the left, some to the right child. While the previously presented left-and-right sorting heuristic offers at least a 50 percent chance to successfully partition these objects, this heuristic can be even further improved to handle such special cases: In the case of one side being completely empty and the left-and-right section non-empty, the overlapping primitives may be forced to go to the empty section if the extent is large enough. This allows the hierarchy construction to insert further nodes later on that will either cut off more empty space or even achieve a better partitioning of both separated objects.

Still, a classic workaround in a rendering system is to subdivide large objects beforehand. In order to moderately increase memory, the objects should be divided by planes perpendicular to the canonical axis (see FIG. 21). While the memory consumption now increases similar to the kd-tree, it is still possible to a priori determine memory consumption.

View Dependence

By merging the tree construction with the ray tracing phase (one step of it being the easy inclusion of an on demand tree construction as will be demonstrated in Section 2.5.5), a general increase in performance can be expected. In the context of non-static scenes the hierarchy can then be optimized for the real distribution of the used rays, resulting in better performance for both construction and tracing time. A simple trick to optimize the hierarchy for a specific set of rays is to minimize the number of leaves that need to be visited by the primary rays, which can be achieved by forcing the first split-planes to be aligned to the camera (see FIG. 26).

Figure 26:
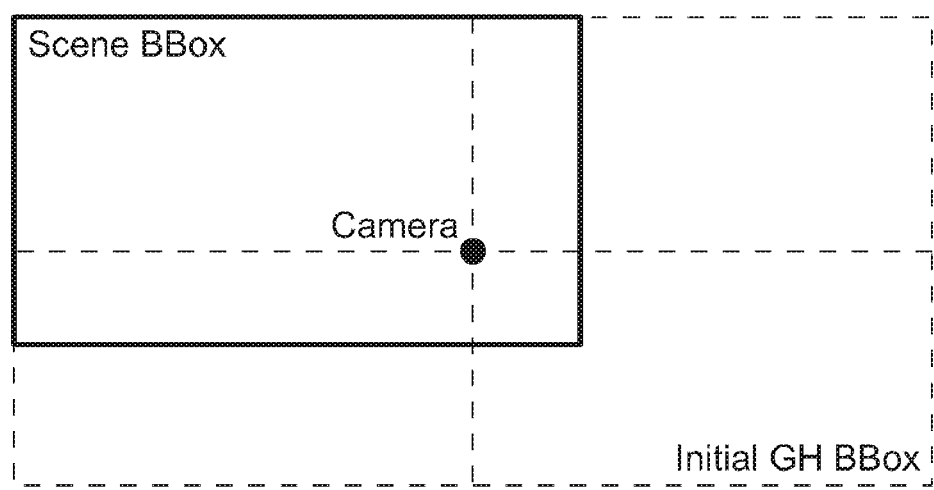
FIG. 26 shows a drawing illustrating forcing the first split-planes to be aligned to the camera.

FIG. 26 shows a drawing illustrating forcing the first split-planes to be aligned to the camera can be achieved easily for the global heuristic, as only the initial bounding box for the split-plane candidates needs to be adapted.

An obvious extension to this simple scheme is to choose split-plane proposals in a more general way, depending on all the actually used ray positions and directions, although more research on this open topic will be necessary to propose a generally usable on demand partitioning heuristic.

2.5 A Unified Acceleration Framework

As there are still problems inherent to the actual construction process of acceleration data structures, especially in the practical implementation of common techniques and partitioning schemes, this section proposes a new in-place construction scheme working on an a priori limited memory block. In the following, the framework will even allow for a simple inclusion of advanced ray tracing features such as an on demand construction and support for highly massive scenes that demand disk swapping functionality on consumer hardware. The new method additionally allows the formulation of new techniques that further decrease die total time to image by inspecting and finally merging ray (bundle) traversal, hierarchy construction, and partitioning heuristic.

Limited Memory: While the efficiency of the ray tracing technique heavily depends on how the search structures are built, memory management during construction is an important, but often neglected issue. While hierarchically partitioning the list of objects allows one to predict the memory footprint, these techniques based on bounding volumes can suffer from inefficiencies caused by large objects and the convexity of the applied bounding volumes (see Section 2.4.2). Partitioning space ameliorates these problems, however, objects now can be referenced multiple times as they may intersect multiple elements of a spatial hierarchy and it had been infeasible to efficiently predict this multiplicity and thus the memory footprint in a general way. While standard implementations use growing memory pools or a self managed scheduler of all available memory, some applications (like games and industrial rendering packages) demand complete memory control and may need to force a limitation of the usable memory due to other data like texture-maps and the geometry itself or, in the case of special hardware (video game consoles, GPUs or upcoming ray tracing hardware), because there is no possibility of using virtual memory as a fall back solution. While it is of course also possible to limit memory in a standard construction process of the hierarchy, a depth first constructed tree will spend the available memory unevenly, resulting in extremely fat leaves for some branches of the tree. Constructing the tree breadth first (by using an optional priority queue) resolves this issue, but demands large portions of temporary memory, due to the replication of primitive references that need to be kept on a stack (see Section 2.2.2).

Automatic Termination Criterion: Another criterion for the quality of the ray tracing acceleration structure is the truncation of branches of the tree. While the standard procedure involves a maximum tree depth and a minimum number of primitives per leaf to avoid excessive splitting, resulting in too many traversal steps later on, the art proposes a maximum tree depth $d_{max} := k_1 \log_2(N) + k_2$ and experimentally fixing $k_1$ and $k_2$, but this global criterion cannot adapt itself to locally changing behavior of the geometry (as it is the case for all teapot-in-a-stadium problems). The same problem happens for the SAH (see Section 2.4.1), as it features global parameters that control the automatic termination.

While the partitioning heuristic presented in Section 2.4.2 also features an automatic termination criterion by building a leftish tree at the deeper levels of the hierarchy to limit the number of traversals, it is still unclear on how to efficiently propose a locally based switch to the median split heuristic.

2.5.1 Constructing Hierarchies in an A Priori Fixed Memory Block

In the following a solution to the memory footprint prediction problem of spatial partition hierarchies is presented, which in addition can avoid memory fragmentation completely and can work completely in-place, using no additional temporary memory. As a result of this new technique, a fully automatic, locally adaptive termination criterion that can be used in addition to previously used heuristics is proposed.

Termination by Bounding Available Memory

In fact only two modifications of the construction procedure described above are sufficient to construct a tree in an a priori fixed piece of memory.

First, the argument list of the construction procedure is extended by passing along a continuous piece of memory along with its size. Instead of terminating the hierarchy by controlling the maximum depth of the tree, a leaf node is constructed, if the reference lists resulting from the classification step plus the size of the new tree nodes for the children do not fit into the given memory block anymore.

Second, we predict the memory consumption of the new sub-trees in the sorting step and accordingly schedule the available memory to the new children when continuing recursively. We therefore compute a prediction $p \in [0, 1]$, which schedules the fraction of memory for the left child. The remainder of the memory is scheduled for the right child. Note that for branches with more than two children we need a prediction $p \in [0, 1]$ for each child/with the condition that all $p_i$ sum up to one, so in fact any convex combination will do.

Contrary to the classical clause, which terminated the tree by one global depth parameter, the depth now is implicitly controlled by the scheduled memory. The scheduling allows the depth to be locally adapted, which is superior to the previous exponential bound. Scheduling in addition replaces the second classical termination clause, which limited the number of items worth a further tree subdivision. The same effect now can be obtained by just providing a smaller memory block upon the initial call of the construction procedure.

The procedure succeeds as long as there is sufficient memory to store at least one node along with the list of references to all objects in the scene. This is a reasonable assumption as exactly this data must be provided upon each procedure call anyhow.

Figure 27:
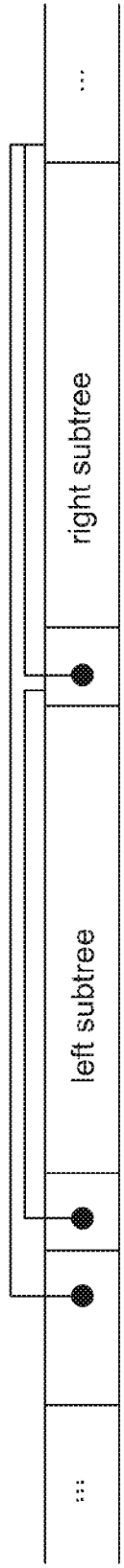
FIG. 27 is a diagram illustrating a contiguous block of memory for a binary kd-tree.

The construction technique now can be implemented to run on limited memory and in-place (see the illustration for a binary tree in FIG. 27). Instead of single memory allocations for nodes and lists, the memory management reduces to one block allocation before the initial call of the construction routine.

Implementation

The new concept is easily verified by just implementing the termination condition using any existing hierarchy construction implementation at hand. Although the memory allocation remains untouched in that case, the memory footprint then implicitly becomes controlled by the new termination criterion.

A more efficient implementation still follows the outline of Sections 2 and 2.5.1, however, memory management can be simplified: Before calling the construction routine a memory block is allocated in which a root node along with the object references is stored in sequential order (similar to FIG. 27(a)). Inside the routine the classification uses the memory layout as illustrated in FIG. 27(b): For the next unclassified object we decide, whether it belongs to the left, right, or both children in the subtree. The first case just requires that the l variable be incremented. For the second case the last element of the left-and-right block is moved to the front to make space for the new element on the right. In addition the last unclassified element is moved to the vacancy left by the element classified right. The last case requires the replication of a reference: The current element is moved to the front of the left-and-right-block and again the last unclassified element needs to be moved to the just created vacant memory position. If not enough memory is available for replication, the routine has to create a leaf node by copying back the right block and left-and-right block.

The creation of the children will only be performed, if there was sufficient memory for two nodes and the total number of references including the replicated ones. According to the memory layout in FIG. 27(c), some elements from the left list have to be moved to its end to make space for the nodes and the left-and-right block has to be copied to the end of the left list. Based on the classification we can use the proportional heuristic (see Equation 2.1) to compute the offset $m'_b + \lfloor p \cdot (m_r - m'_b) \rfloor$ of memory scheduled for the right subtree. Then the memory block of the left-and-right with the only-right items has to be moved to this offset.

Using this memory layout, the optimization of sharing the left-and-right block of two leaf nodes comes in handy and allows for one additional partitioning level in the tree without the cost of additional memory by directly using the overlapping reference blocks.

While the above description treated kd-tree construction, it applies as well to bounding volume hierarchies by just omitting the part that allows for reference replication. It is obvious, too, how to generalize the technique for m-ary trees.

Taking a closer look reveals memory fragmentation, unless the memory scheduled for a subtree is completely used. This is trivially avoided by recognizing the prediction p as an upper bound on the memory scheduled to the left child and just linearly writing the tree data structure into the memory. This in addition increases data coherency which is beneficial with modern processor cache architectures. A practical solution is to simply move the primitive references of the still to be constructed subtree to fill the previously unused memory and as such the free memory at the end of the array is maximized again.

FIG. 27 shows an illustration of a contiguous block of memory for a binary kd-tree: (a) Upon a call the construction procedure is provided the memory block starting at $m_b$ and ending at $m_e$ along with the number n of objects, (b) In order to enable in-place sorting the array is partitioned into regions for objects either on the left or right, or in both children, the unclassified items to be processed, and the remaining free memory area. See the text for the complete technique description, (c) If children are created, the memory for two nodes is taken from the provided memory block and the remainder starting at $m_b'$ is scheduled for the two children according to the prediction $p \in [0, 1]$. (d) A memory layout in pre-order improves cache performance, because less memory must be accessed.

Proceeding that way may seem unfair, as the rightmost branch potentially receives the most memory, however, this can be compensated by modifying p. A simple improvement is to change the order, in which the children are built recursively. This can be done randomly or by changing the order if the tree depth is odd. Another possibility is to delay the construction of the larger child, in the hope of the smaller child not using all of its memory.

Alternative Memory Layout

The classic technique of storing the children as an array (see FIG. 27(c)) allows one the use of only one pointer. Storing the tree in pre-order (see FIG. 27(d)) even more memory can be saved though: A pointer followed by its subtree points to the next subtree. While leaf nodes are directly followed by references to objects or the objects themselves, an inner node is followed by e.g., the splitting plane offset. This saves one level of indirections and results in more cache coherent memory access, but actually did not perform noticeably different from the classic layout due to a slightly more complicated traversal. In addition it does not allow for the last level optimization possible in kd-trees (sharing of references in neighboring leaves).

Especially for a hardware design it would be beneficial to have two separate memory areas with each a separate memory controller for die inner and leaf nodes, respectively. The ray tracing implementation in the Intel Performance Primitives uses such a layout: First the tree nodes are enumerated, which are followed by the object references. With our technique it is also possible to schedule a chunk of nodes in order to increase cache performance. Ideally this would be in van der Emde Boas layout (see Section 2.6.3); however, a penalty is paid, if nodes must remain empty.

2.5.2 Scheduling Available Memory by Prediction

In order to predict the ratios $p_i$, we first take a look at bounding volume hierarchies, which recursively partition the list of objects and thus lack reference replication. Built to full depth, the number of inner nodes in the tree plus one is equal to the total number of objects, which is true for any subtree, too. As a consequence the relative frequency $$p_i = \frac{e_i}{\sum_{j=1}^{m} e_j} \qquad \text{Eq. (2.1)}$$

determined by the count $e_i$, of objects to be sorted into the i-th child of an m-ary node, respectively, exactly predicts the fraction of memory to be scheduled for the i-th subtree.

If the tree is not built to full depth, the prediction remains optimal in the sense that all subtrees will receive memory proportional to their number of objects. This means that all leaves will store about equal numbers of objects as they become about uniformly pruned and subtrees containing more objects will be deeper. To summarize, the new termination criterion along with proportional prediction allows one to build efficient bounding volume hierarchies in a predetermined contiguous block of memory.

Prediction in the Presence of Reference Replication

There are situations, where bounding volume hierarchies suffer from severe performance penalties: For example these are encountered when bounding boxes of objects expose big regions of overlap, when axis-aligned boxes are used to bound non-convex objects, or when empty space cannot be separated as, e.g., for diagonal pipes. Then, instead of subdividing object lists, usually spatial partition schemes are employed.

Considering hierarchies such as, e.g., kd-trees that potentially replicate references to objects that intersect splitting planes, we still can use the prediction in Equation 2.1 to schedule the memory for the children. This simple prediction overcomes the static termination by tree depth as it does not just cut the deepest branches of the tree but uniformly bounds memory proportional to the number of references in a subtree as mentioned before.

However, the prediction relies on local information only and cannot predict the reference replication in the lower levels of the tree. Hence there may be a discrepancy between the prediction and the optimal subtree memory footprint. As a consequence some subtrees can be pruned by insufficient memory, while others cannot use the scheduled memory. Although this effect vanishes as more memory becomes available, it strongly implies that reference duplication should be minimized by e.g., preferring split-planes aligned to the bounding boxes of the objects in order to allow for potentially deeper trees and consequently more efficient culling.

Our experiments indicate that the aforementioned degradations in performance are hardly noticeable. This is strongly supported by in the art: The $\mathcal{O}(n_r \log n_r)$ behavior allows to draw the conclusion that the observed average case reference replication is at most linear in the number $n_r$ of objects, which is a perfect justification of the proportional heuristic.

Optimal Scheduling

However, from theory a worst case behavior of $\mathcal{O}(n_r^2)$ is known and thus, although may be rare, situations must exist, where the prediction will not work well: The number of replicated references is proportional to the surface area of the object. Long, thin objects will create references proportional to the length of their longest side, while more extended objects will create references quadratic in the longest side. As long as objects are small with respect to the total scene size, this effect will not be noticeable as it happens only on some levels of the hierarchy. For a Mikado/Jackstraws-game like scene, however, the effect will be quite noticeable (see e.g., the BART Museum scene as mentioned in Section 2.3.1). Note that this is true for any ray tracing technique.

Another situation, where proportional prediction will fail locally is a prediction of p=0.5, where all objects sorted to the left are randomly placed, whereas the objects on the right describe regular structures. While the right subtree will have minimal reference replication, the left one will have a lot, however, both subtrees were given the same amount of memory. Situations like this are not theoretical: Trees around a building are a setting, where the prediction can be not optimal locally. A similar scenario are highly detailed objects (like 3D scans) in an otherwise rat her crude modeled (architectural) environment.

Possible worst case scenarios for the proportional prediction (see Equation 2.1) were characterized. However, a vast set of experiments did not show any failures of the proportional heuristic, and in fact any probability density, relative frequency, or measure of importance p∈[0, 1] can be chosen instead.

While it seems obvious to include the SAH (see Section 2.4.1) as an estimator, one must note that the SAH tries to estimate costs for finding ray intersections, not predicting the total memory usage of a hierarchy or subtree. Instead an "optimal" prediction must estimate the local complexity or overlap of the underlying geometry of a node. As such, estimators including the surface area, volume and (projected) lengths of the included primitives were tested. While the results of these predictors (and also their combinations) were rather disappointing, simply summing up the projected lengths of the children primitives onto the current axis and averaging with the proportional prediction resulted in a slight speed increase (about 10 percent on the average) over using only the proportional prediction. Actually, the problem of estimating the total "optimal" memory needed for a subtree is once again coupled to estimating the local distribution and overlap of the included primitives and as such a computationally intense problem as the prediction must differentiate between a rather linear or rather quadratic behavior of reference replication happening in the complete subtrees.

An additional possibility to optimally estimate the amount of memory for each subtree in the context of an on demand construction (see Section 2.5.5) for dynamic scenes is to reuse intersection information from previous frames. By marking each primitive that was previously intersected, then counting the flagged primitives for each child during construction and using these numbers instead of the total number of primitives to estimate p, the construction will adapt itself to previously intersected geometry. Note that this not only works when intersecting exactly the same geometry in the new frame again, but due to the natural locality of neighboring triangles during the sorting process, implicitly includes nearby geometry. As this prediction may fail for rapidly changing scenes or fast camera movements, it is still possible to average the estimator with the standard proportional prediction to be able to better adapt to newly visible geometry.

2.5.3 Time and Memory Complexity

The construction procedure actually coincides with a quicksort. While it is easy to see that finding the pivot element in fact corresponds to selecting a splitting plane, it is rather unconventional that some elements are generated by reference duplication during sorting. However, their maximum number is bounded by the a priori fixed memory footprint.

The analysis of the quicksort technique is readily available in standard textbooks on techniques and data structures and states an average $\mathcal{O}(n \log n)$ runtime in the number of n of object references to be sorted. This matches the findings in the art. The actual runtime depends on how the split is selected and on how the references are ordered. Of course there exist geometric configurations, which violate the assumptions of the art and cause the worst case runtime of $\mathcal{O}(n^2)$ as can be seen in the initial segment behavior of the graphs documented in the art and the experiments using the BART Museum scene as mentioned in Section 2.3.1. This is in accordance with the theoretical results in the art. By limiting the maximum amount of reference replications (as it is implicitly done by providing the fixed memory block of size m), the runtime of the construction can now actually be forced to always run on an average of $\mathcal{O}(m \log m)$ instead.

The question is now how to choose the size m of the memory footprint. It must be sufficiently large to store at least one node along with all object references. But there are more choices and considerations:

Providing memory $m = \alpha \cdot n_r$ proportional to the number of objects to be ray traced is more reasonable. The factor a>1 then represents the amount of allowed reference replication. This is the most practical choice and was actually motivated by the findings in the art, because an $\mathcal{O}(n \log n)$ quicksort can only touch $\mathcal{O}(n)$ memory.

Choosing $m = \beta \cdot n_r$ proportional to the number n, of rays to be shot, which in some path tracing techniques is proportional to the number of pixels, exposes an interesting relation to the classical Z-buffer used for rasterization: The memory footprint is linear in the number of pixels, however, only if the memory required to store the scene objects does not exceed this limit. As will be illustrated in Section 2.5.8 on numerical experiments, it becomes feasible to amortize the hierarchy construction time by controlling it by the number of rays shot. An extreme example is a single ray, where no hierarchy needs to be built and the triangles are just tested in linear order.

Providing the maximum available memory reduces the risk of penalties from bad memory predictions. However, building the tree adaptively then can result in subtrees incoherently scattered over the whole memory block. Even worse, the construction of kd-trees can fill arbitrary amounts of memory due to reference replication. Consequently this last option is a bad choice.

Besides these obvious sizes and combinations thereof, it is convincing that there exist other useful methods. Note that ray tracing complexity is not only determined by the cost of constructing the hierarchy; in fact the complexity later on is ruled by the backtracking search, as indicated by the second item of the above enumeration.

Improving Amortization and Prediction

An improved balancing of the cost of building the acceleration data structure and traversing it by rays can be achieved by building the data structure deeper, where actually more rays traverse. Therefore, an on demand procedure can be modified: Instead of building the hierarchy, where the ray traverses, only a certain number of levels of the hierarchy are built. When a next ray intersects the same parts of the hierarchy, the hierarchy is extended again by a certain number of levels. The more rays share the same parts of the hierarchy, the better the building cost becomes amortized, so if only one ray passes through a certain region of space, building the hierarchy does not pay off and automatically is omitted. The number of levels to be built at once should be higher in regions of higher ray density. Thus the number of additional ray object intersections can be reduced.

As the hierarchy is not fully built, but objects of the parts under construction become already intersected, marking these objects or arranging them in a priority queue by a least-recently used strategy allows for improving memory prediction as well as split-plane selection heuristics. It is reasonable to assume that unmarked objects or objects at the end of a priority queue will be intersected less probably. Thus they could be separated by selecting suited split-planes and only marked or least recently intersected objects could be considered to select split-planes. On the other hand memory scheduling can be adapted to count only marked or more recently used objects instead of all objects. Similar information can be inferred by using intersection information from a previous frame.

To justify the assumptions, the early rays must be distributed proportional to their final density in space. This is approximately achieved by first computing an image in a low resolution and then increasing resolution (even in a multi-resolution fashion). Another possibility is to trace a full ensemble of rays simultaneously to improve the predictions; this will be discussed in more detail in Section 2.6.2.

2.5.4 Acceleration by Hybrid Partitioning

As now both approaches of partitioning space (e.g., kd-trees) and partitioning object lists (e.g., bounding volume hierarchies) fit a unified framework, it becomes straightforward to use a hybrid approach to optimize performance. The split selection then tries to first divide the list of objects unless this is inefficient and reference replication by spatial partition becomes unavoidable. The corresponding ray traversal must distinguish between nodes with and without reference replication.

Otherwise it is also possible to allow a BVH implementation to simply replicate primitive references by setting the left and right child clip planes to the same value and sorting overlapping triangles into both children. While the ray traversal can still be used unchanged, the construction procedure must switch to the kd-tree implementation as some primitives will now only partially intersect the node volume (see Section 2.2.1).

The problem of when to switch from BVH to kd-tree or vice versa is topic of future research, as it demands a lot of analysis of the underlying geometry, a fact which makes dynamic scenes impossible right now. Some simple heuristics can include the overlap of the BVH children or the depth of the tree, while the latter depends too much on a particular scene type, as some scenes like architectural meshes may demand kd-tree style splits on the top levels of the tree to split large triangles, while others such as 3D scans or other highly tesselated geometry may demand BVH splits on the top levels and fed splits only to cut off empty volume of single, rather big triangles at the bottom levels.

2.5.5 Construction on Demand

Construction time and memory footprint of the acceleration data structure can be further optimized by constructing it only where rays traverse, i.e., where geometry is "visible". The on demand construction removes the classic separation of traversal and construction routines and as such is beneficial for all kinds of dynamic scenes and/or large scenes that feature a high depth complexity, thus blocking a big portion of the total geometry. While traditional approaches tend to be rather impractical due to the immense amount of temporary data and as such are rarely used in industrial rendering packages, the scheme presented in this section allows the omission of temporary memory completely while at the same time feature an efficient on demand construction. Since all object sorting is done in-place, only a flag is required to mark nodes that have not yet been subdivided. Upon traversal of a ray, the subdivision routine is called if the flag is set.

Therefore, all non-finalized nodes have to store the temporary information necessary for the construction procedure to proceed upon the next visit, into the free memory section at the end of the current block. If the scheduled free memory does not allow the storing of this additional information due to the locally limited free memory, or if all objects contained in it fit into the caches (e.g., L1- or L2-cache), the regular recursive construction routine is called to build the complete subtree fitting in that memory block.

While the implementation is rather simple and elegant, it only saves computation time, but leaves unused memory regions, as the complete memory block is allocated once before. These empty gaps can additionally harm performance due to decreased locality resulting in cache thrashing.

However, if used in a fully dynamic environment, the information of old frames and the previously intersected geometry can be reused to get a tighter memory block by reducing the existing empty gaps and additionally limiting the total memory usage of the new hierarchy (see Section 2.5.2 for details).

In a static environment though, the limitation of memory and avoiding empty gaps in the on demand construction at the same time is a much harder problem. The implementation in that case must fall back to use a classical separation of one node array and one reference list for the leaves that both grow dynamically during the build process. As such, a complete in-place construction is no longer possible unless the temporary information to continue the construction of unfinished subtrees fits into the standard node-data. So using the BIH and a simple partitioning heuristic, a simple on demand construction is still possible.

By using the proposed simple on demand extension to the ray tracing framework it is possible to render a fully detailed Boeing 777 mesh at 1280×1024 resolution in 3-9 minutes (depending on camera position) from scratch on a single core of an Opteron 875 2.2 GHz machine with 32 GB RAM. Compared to previous approaches the system only use a fraction of memory. The total rendering time of one view thus matches the time that InTrace's InView/OpenRT 1.4 uses to just build the acceleration data structure of the more than 350 times smaller "Conference Room".

Note, that apart from the decreased total time to image, the merging of ray traversal and hierarchy construction also offers new possibilities to further increase performance by formulating locally adaptive construction techniques, as in Section 2.5.3.

2.5.6 Partially Updating and Rebuilding the Hierarchy

A rather standard extension to support deformable scenes (i.e., scenes with constant topology of the underlying geometry), is updating an existing data structure instead of rebuilding it from scratch. This is especially easy for all kinds of BVIIs, as a simple bottom-up update starting in all leaves that feature changed primitives is straight forward, updating the bounding volume of each father node out of the merged children bounding volumes, without needing to change pointers. As soon as the bounding volume is not changed from the updates anymore, the subtree update is finished. It's also possible to stop as soon as the updated bounding volume is smaller, at the cost of a decreased quality of the hierarchy though. Note that the update process is of course also possible for the BIH and its variants.

Using the proposed in-place hierarchy build, the update process can be refined and extended to also work with spatial partitioning, like kd-trees. By searching for the root node of the subtree that includes all changed primitives using a bottom-up process, the underlying subtree can be completely rebuild afterwards. If the root of this subtree is found to be on the upper levels of the tree (thus demanding most of the whole tree to be rebuild), the procedure should restart searching for multiple, but far smaller subtrees. This results in better hierarchies than just updating the planes of the tree, while no additional temporary memory or a complicated implementation is needed, as the already existing construction code can be used without changes. If a structure of the dynamic primitives is known beforehand, as it is the case for transformations of complete objects like an avatar or a car, the splitting into multiple subtrees that must be updated or rebuilt is greatly simplified. By having such additional object information, it is also possible to add additional triangles to an object (as long as all primitive indices will still fit into the subtree memory), as the subtree can be fully rebuild and does not depend on a fixed number of primitive indices.

The rebuild procedure will work well for all kinds of local changes, like moving objects in an otherwise static scene, but will fail if locally only few triangles are animated, but simultaneously in all parts of the scene, thus resulting in a complete rebuild of the whole hierarchy. Otherwise such a scenario can only be handled efficiently by updating the nodes.

Figure 28A:
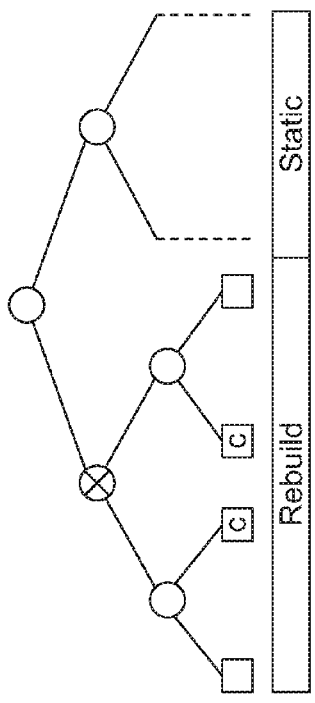
FIG. 28 shows a pair of diagram illustrating bottom-up, in-place update of that hierarchy.
Figure 28B:
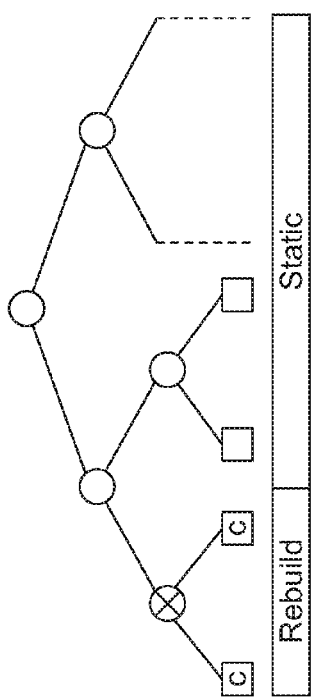

FIG. 28 shows a pair of diagrams (a) and (b) illustrating bottom-up, in-place update of the hierarchy. While existing solutions can only update the planes of a tree, the presented in-place hierarchy construction allows one to completely discard the whole subtree and rebuild it from scratch to increase ray tracing efficiency for chaotic animations.

2.5.7 Improving Time Complexity by Approximate Sorting

As the hierarchy construction in fact is a sorting technique with a structure identical to quicksort and consequently runs in $\mathcal{O}(n \log n)$ on the average (see Section 2.5.3), using a bucket sorting preprocess similar to that in the art, the constant of the order can be decreased. Therefore the objects are processed in three steps:

1. The resolution of the regular grid is determined by the ratio of the scene bounding box divided by the average object size. As a spatially uniform distribution of objects is highly unlikely, this number is scaled down by a user g parameter (for example, ⅙) in order to avoid too many empty cells. Each grid cell consists of a counter that is initialized to zero.

2. One point of every object (e.g., one corner of its bounding box) is used to increment the counter in the grid cell containing that point. In the end the sum of all counters equals the number of objects. Now the counters are transformed to offsets by replacing each counter by the sum of all previous counters.

3. A global object index array is allocated and using the same point of every object, the objects now can be sorted into the buckets using the offsets from the previous step. For each bucket the bounding box of the objects it contains is computed on the fly.

By sorting the bounding boxes instead of the contained objects, construction can be typically sped up by a factor of two to three. If a volume element during hierarchy construction consists of one container only, the container is replaced by the objects within. The resulting trees are very similar in rendering performance and size. This simple technique partitions a scene in linear time using a limited amount of memory. Even the index array can be processed in chunks. While it removes the need for a conservative 3D-rasterization of the triangles into a regular grid, the resulting partitioning suffers from similar problems as every object list partitioning (see Section 2.4.2).

Optionally, a pre-process may combine neighboring, sparsely populated voxels or free the list of all empty voxels to reduce the amount of containers for the following hierarchy construction.

Visualization of Massive Geometry

Current data sets used in industrial applications and production rendering consist of massive amounts of geometry, which usually range from hundreds of megabytes to several gigabytes of raw data. Although it was demonstrated (see Section 2.5.5) that the small memory footprint of the new construction allows massive scenes to be efficiently ray traced by simple means there still may be situations where the data does not fit into the main memory and a special handling of these massive scenes is necessary.

A minimal memory footprint renderer was implemented which is able to render pictures of the Boeing 777 (349,569, 456 triangles amounting 12,584,500,416 bytes) using only 50 MB of RAM. If more RAM is available (1 GB were assumed for the measurements) it is possible to render a picture from scratch in less than an hour even on a standard consumer desktop PC with the option to render further pictures (using the preprocessed, cached data on the hard disk) and different views in only a fraction of this time.

To achieve the minimal memory usage, the previously proposed preprocessing step was used to sort the triangles into buckets and store these on the hard disk. For the rendering step, a top level bounding interval hierarchy is created out of the buckets (without needing to touch any triangle). Each bucket that is intersected by a ray creates its own tree using the on demand policy. The bucket's triangles and the acceleration data structure are kept in a cache of either dynamic (able to grow until no more RAM is available) or fixed user-defined size. The bucket with the largest number of triangles defines the maximum memory footprint. Note that this results for free from the bucket sorting preprocess.

In this scenario the processing speed is dominated by the speed of the hard disks, although the implementation uses software caching along with an automatic global reordering of the voxels using a Peano-curve to exploit hardware caching mechanisms when writing/reading the reordered primitives to/from disk. As mentioned in Section 2.3.3, an accompanying transformation and compression of the triangle data can further reduce disk transfers (note that this was not yet used in the presented measurements). Additionally, as the tree construction technique is so fast, that if parts of the acceleration data structure have to be flushed, they are just thrown away and rebuilt on demand, so no additional hard disk traffic for the acceleration structure is created during the rendering process.

When a scene description does not fit into main memory, one can also just rely on virtual memory mechanisms of the operating system to manage the memory block. In order to reduce page thrashing, the upper part of the inner nodes of the spatial hierarchy can be stored in a part of memory that permanently remains in main memory. As the subtrees memory consumption can be fixed during the construction it is also exceptionally simple to prefetch needed subtrees.

In addition, two separate memory blocks for the upper part and lower parts of the hierarchy were considered. The new termination criterion can efficiently fit the upper part of a hierarchy into the a priori fixed first memory block. The lower parts are built on demand in the second block of memory. The least recently used parts of the hierarchy become flushed, if memory is not sufficient. This procedure then somewhat resembles multi-pass algorithms on rasterization hardware.

A further possible refinement is including the usage of prefetching (see Section 2.6.1) to amortize the latency of hard disk reads, especially when using multiple threads.

Highly Parallel, Completely Linear, Bottom-Up Construction

Instead of using the bounding boxes as containers for a regular top down hierarchy construction, it is also possible to use the ordered boxes of the preprocessing bucket sort step directly for a bottom-up approach. As the boxes were created based on a regular grid, all containers still feature an implicit spatial ordering. This ordering can be exploited for a crude bottom-up construction:

1. The original resolution of the grid used for the bucket sort is stored in three counters (note that these will be of different size for all non cubic scenes). Utilize a round robin approach to pick one counter that also must be non-zero. Divide the counter by 2 and use the axis assigned to this counter. This keeps volumes as cubic as possible during the hierarchy construction.

2. Loop over all boxes (divided by 2): Merge two directly neighboring boxes along that axis and create a BIH node if both are non empty. If only one is empty, decide if an additional BIH node for empty space cut off is useful.

3. Continue until only one box (the root) is left.

This hierarchical partitioning scheme does not need to sort or even touch any primitives except for the initial bucket-sorting phase, resulting in a guaranteed linear construction time $\mathcal{O}(n+m)$, where m is the resolution of the grid. Additionally, the construction can be trivially parallelized, as each thread can work on a different part of the current set of boxes due to the implicit spatial ordering. Note, however, that the number of maximally possible threads gets halved after each step, a natural limit when constructing binary hierarchies. Also note that if some of the leaves/original boxes still feature too many primitives, a regular top-down process can still be done for each of these leaves separately afterwards or even better using the on-demand policy.

Obviously, the resulting tree is not of the same quality as using one of the presented top-down approaches, e.g. using the global heuristic (see Section 2.4.2), it omits one degree of freedom: the individual selection of the splitting axis for each node is discarded in favor of a global decision. While the split proposals will still match (most of the time) on a more global scale, local decisions can and will differ. Numerical results show that the time to trace rays is mostly equal, hinting that the simple bottom-up heuristic is comparable to the global heuristic for most "well-behaved" scenes. Though, the time to construct the tree is reduced by only 20-30 percent. This can be explained by comparing the complexities of the constructions: While the top-down approach using the additional bucket sort features a $\mathcal{O}(n+l \log l)$ complexity, with l being the amount of non-empty containers, the bottom-up approach features $\mathcal{O}(n+m)$, with m being the resolution of the full grid. So, as the ratio of non-empty containers rises, the completely linear hierarchy construction will get on par with the non-linear construction scheme which is a problem for all sparsely populated scenes. Another possible limitation of the runtime might be memory bandwidth problems, as reported in the art.

Note that the merging of the boxes can be done in-place (offering perfect streaming capabilities) in the already available memory block allocated for the bucket sorting, but still a dynamic allocation of nodes for the resulting BIH structure must be used.

2.5.8 Numerical Experiments and Results

It is important to note that the new termination criterion is not a new technique for building hierarchies. Rather, it is much more a way to efficiently control memory consumption and allowing for a simple in-place construction. Also note that providing sufficient memory results in hierarchies identical to the ones built using the classic criteria.

The new termination criterion was verified using the kd-tree and the bounding interval hierarchy. Measurements were done using one processor core on a Core2Duo Laptop running at 1.66 GHz.

For the first set of numerical experiments three scenes have been used: A car scene represents a currently very attractive domain for ray tracing, a kitchen that has a mixture of small and big, partially overlapping triangles, and the Stanford Happy Buddha as a very simple scene. As split-plane heuristics four different and current widely used schemes for the measurements were used: fast, but yet efficient heuristics for kd-tree (nearest vertex to the middle split on the longest axis of the node bounding box) and BIH (global heuristic including the refinement from Section 2.5.4) as well as two different $\mathcal{O}(n \log n)$ SAH implementation for kd-tree (using only 20 SAH candidates on each axis) and BIH (featuring the full SAH computations). The BIH SAH implementation variant requires additional precomputation time and memory for the presorted lists (16 bytes times the number of triangles in the scene) to achieve $\mathcal{O}(n \log n)$ runtime.

In the second set of experiments the Stanford That statue was used to investigate how the construction time can be amortized over rendering time, i.e., how the total time needed to render a frame from scratch can be minimized. This minimum depends on both the number of rays and the memory block provided. In other words: The quality of the hierarchy needs to be traded for its construction time. While the "valley" of the minimum is clearly visible for the kd-tree, it is less visible for the BIH (though similar), because the BIH can be constructed much faster due to the lack of checks for reference replication (see Section 2.2.1). With increasing resolution first the construction time dominates before the ray tracing time takes over. The more rays are shot the deeper, i.e., better, hierarchies pay off. This depth is controlled by the new termination criterion and thus by the size of the available memory.

The above observation together with the new termination criterion is especially useful in a dynamic setting, where each frame must be computed from scratch. Here the frame rate is easily maximized by measuring the total time to image and then increasing or decreasing the size of the provided memory block from frame to frame. This allows for automatically determining a close to optimal memory block size for offline animation rendering, too.

This section introduced a new termination criterion and memory scheduling heuristic that allows the construction of an efficient ray tracing acceleration data structure in an a priori fixed memory block. The resulting simplified memory management is beneficial for both software and especially hardware implementations.

Although strong arguments for the proportional memory scheduling heuristic were given, still other heuristics could be developed and explored that must be based on the local distribution and overlap of the primitives. In addition the further exploration of locally adaptive heuristics, taking the actual ray distribution into account as proposed in Sections 2.4.2 and 2.5.3 seems very promising due to experiments.

The new construction concept allows one to finally merge spatial and object list partitioning in one simple unified framework, enabling a trivial inclusion of hybrid partitioning schemes.

By providing simple implementations for an on-demand construction and a completely linear hierarchy construction, that are both useful for the visualization of massive geometry, unmatched performance is received for rendering images from scratch. These timings can be even further reduced by using locally adaptive predictions or even simpler by just limiting the a priori fixed memory block, thus balancing the construction time against the actual tracing time.

The principle of terminating hierarchies by memory consumption applies to other ray tracing acceleration schemes, too, as for example hierarchical grids, octrees, or even ray classification. It is straightforward to apply the scheme to classic BSP trees (see, e.g., current games and other art) in order to determine visibility and to point clouds (e.g., photon mapping) for faster range searching.

Finally, the presently described techniques may be explored in the field of collision detection and occlusion culling with graphics hardware, where a first step was already presented in the art.

2.6 Efficient Implementation

Hierarchy traversal is generally implemented as a backtracking technique. This section presents more details that should be considered upon an actual implementation and proposes concepts that are worthwhile to be considered for future ray tracing hardware.

2.6.1 Hierarchy Traversal

As the present discussion focuses mainly on the efficient construction of the acceleration data structures, it will not treat efficient traversal implementations in detail, which, however, can be found in the art, as well as a more stable implementation working completely in 3 dimensions instead of using distances along the ray.

Ray Initialization

Each data acceleration structure that does not store complete bounding boxes per node (note that these are available implicitly when using a grid or octree) needs a proper initialization routine of the active ray segment by intersecting the scene bounding box (a robust technique can be found in the art, together with further optimized variants), to allow for an optimized ray traversal implementation. Additionally, the ray traversal loop itself also has to update the active ray segment to avoid extra traversal steps.

If the initialization is "optimized" by omitting the ray/bounding box test, the ray will traverse nodes that actually do not intersect the ray (as in FIG. 29), as the traversal determines intersections with the children solely by comparing the plane intersection(s) to the active ray segment. As such, unnecessary nodes will be traversed or put onto the stack due to plane intersections found along the original ray which are actually situated outside the actual node volume. Note, however, that secondary rays with fixed length (e.g., shadow rays) can omit the initial bounding box test completely.

Figure 29:
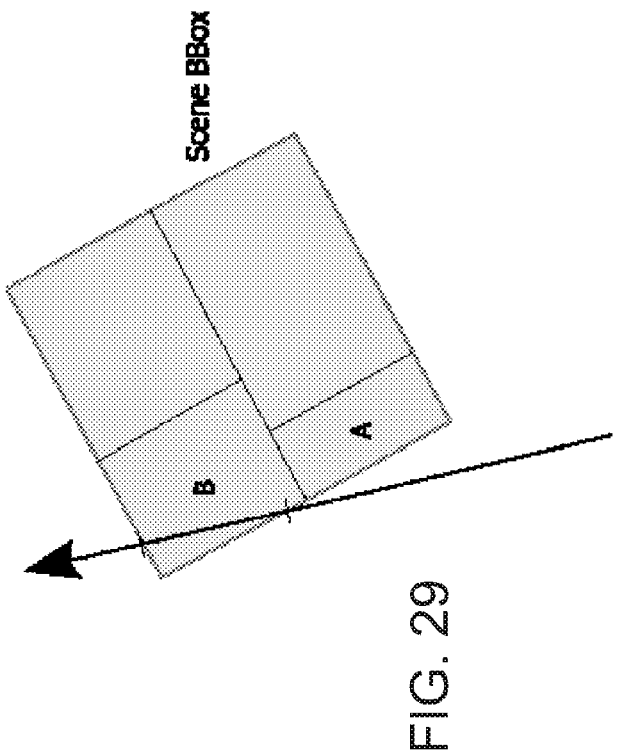
FIG. 29 is a diagram illustrating ray traversal, without clipping.

FIG. 29 is a diagram illustrating that, without clipping, A will be traversed, as an optimized traversal-implementation must assume completely valid ray segments to be able to decrease the number of calculations.

Ray Traversal Loop

When working with spatial partitioning, rays not intersecting any primitives at all will empty the stack completely. Thus a test before every pop operation is needed, to see if there are still nodes on the stack. If the scene is guaranteed to be closed, this test can theoretically be completely omitted. Note though that it is still possible (due to numerical errors, see Section 2.1.3) that some rays slip through the edges of the surrounding primitives and thus crash the implementation. A better solution is to use a sentinel as the first entry of the stack array to guarantee a stable completion of the traversal. In addition, this optimization can also be used for object list partitioning, too.

While the standard way for binary hierarchies to save memory is the neighboring storage of the child nodes, so one pointer or index can be omitted, the traversal implementation can also make use of this alignment. In the case of $2^n$ sized nodes (e.g., 8 bytes as used in the 32-bit kd-tree), the lowest bits of the node index can directly be used to address the child node by a simple OR-operation with the sign of the ray component matching the current split axis.

Note that this can be excessively optimized when having specialized implementations for each ray octant, for example when using SIMD ray tracing. However, a more general solution found in the art might be better suited for a compact ray tracing implementation.

Prefetching

Modern CPUs allow the manual prefetch of data into the caches by offering specialized opcodes. As such, several experiments were made to include simple prefetching mechanisms into the ray traversal and/or ray-primitive intersection implementation. A general problem of manual prefetching is to avoid fetching an unnecessarily high number of later unused data, while still fetching additional useful data that the automatic hardware prefetcher would have missed, so the increased number of opcodes in the traversal code is amortized. As classical ray tracing can generally be seen as a rather incoherent and thus unpredictable technique, the only rather useful nodes that can be fetched are the ones that are put onto the stack as these are very likely to be visited later on (for object list partitioning these are even guaranteed to be visited). Unfortunately, this rather promising optimization already resulted in a slight overall speed decrease during experiments.

Another approach is to prefetch primitives when visiting the leaves of the data structure. As leaves only store references to the primitives, an early fetch of the actual (not necessarily neighboring in memory) primitive data should reduce latencies. Unfortunately, this approach did not result in notable differences either.

Variations of the presented implementations and additional excessive speculative prefetching (e.g., by inserting special prefetch nodes into the hierarchy that keep information about the underlying subtree) resulted in even more performance loss. One explanation can be found in the coherency of successive ray traversals. As a large portion of the upper level hierarchy is reused amongst rays, the caches will keep this information available and as such, prefetches cannot help here. For the lower levels of the tree, the data can be assumed to be stored cache friendly, as spatially neighboring leaves and nodes are most of the time also close in memory (due to the construction implementation) and so should be automatically fetched by the hardware prediction or are located in previously loaded cache-lines. While a prefetch of the primitive data should at least theoretically result in a performance increase due to the additional indirection, real life scenes mostly feature some kind of implicit spatial ordering. Thus neighboring triangles are likely to be already loaded into the caches. When working on permutated triangle data, prefetching can have positive effects on the ray tracing performance though.

2.6.2 Tracing Sets of Rays

Aside from amortizing the construction cost of the acceleration data structure (see Section 2.5.3), there are situations, where the additional cost of not only tracing single rays but sets of rays can amortize, too, if rays are coherent. While primary rays easily can be grouped in coherent sets, it becomes already difficult to get the same benefits for sets of shadow rays from point light sources. Refracted, reflected, or rays from random walk simulations are even more difficult. This also demands a change in paradigms, as shaders can no longer be using traditional recursive implementations, but must be able to be delayed to wait for the result of intersection calculations due to tracing. A better way is to fix the design of shaders to only allow for fully iterative computations, thus simplifying the program flow.

Using SIMD

As almost all current available hardware architectures feature some kind of SIMD units (mostly 2× or 4× wide), with even wider SIMD units proposed for upcoming hardware, the obvious way to receive more performance on the same hardware is the optimization of the ray traversal for SIMD. While it is common to implement a SIMD parallelization by tracing and intersecting n rays at once, renderings using a large number of secondary rays (e.g., for global illumination simulation) might prefer a SIMD optimized single ray implementation due to a loss of efficiency for diverging rays that are traced as one bundle.

Note that increasing n to be larger than the supported SIMD word width only is interesting for primary rays, and only to a certain extent, due to a certain loss in coherency on the lower levels of the hierarchy, resulting in too much overhead managing the single SIMD packages and masking too many rays, thus wasting computational power on later unused results. The art provides statistics on the efficiency using various package sizes of SIMD style ray tracing.

Bounding Interval Hierarchy

Nevertheless, given a set of coherent rays, the approaches to trace sets of rays benefit from the new data structure proposed in Section 2.3.1. This is certainly due to the reduced memory bandwidth and increased cache coherency resulting from the small memory footprint and the fact that the bounding interval hierarchy always is flatter than the kd-tree. Furthermore the volume elements appear generally larger than the corresponding volumes of a H-tree, which relaxes the conditions on coherency. Our experiments reveal that the speedup-ratio from single ray to 2×2-ray-bundle-tracing (see previous subsection) is slightly higher for the bounding interval hierarchy as compared to a kd-tree.

Also note that it is possible to incorporate the optimized BVH traversal for a set of rays as found in the art into the BIH by using a traditional axis-aligned bounding box hierarchy traversal and keeping full bounding boxes on the stack. The BIH is then used to only update the bounding boxes, resulting in fewer memory transfers as when using the complete six floats stored in a BVH.

A similar transition can be done for the Multi-Level Ray Tracing Algorithm known in the art, although the practical usage of this algorithm is highly dubious, due to reported real life implementations gaining only a 20-30 percent performance increase instead of magnitudes (for few scenes though) that are stated in the publication.

Reordering

As divergent rays, especially when allowing user-defined shaders or high-dimensional simulations such as particle tracing, will fail to be traced as ray bundles, an obvious idea is the resorting and repackaging of rays into coherent sets. While even excessive resorting strategies deliver only mild coherency improvements, this work's ray tracing system uses a straight forward ray direction octant based reordered package tracing (along with an optional spatial sorting, see Section 3.4.3 for details). By collecting a fixed number of rays per octant (1024 has proven to be a good trade-off) before starting the trace, the implementation can also increase cache coherence, as the data used in the shaders (e.g., texture maps) cannot interfere with the geometry and data structure.

Note that of course tracing coherent SIMD packages directly in the shader, instead of storing and regrouping single rays, is always preferable as it increases the performance, but cannot be achieved for complex shaders and/or all secondary rays. The art provides additional information on grouping and repacking and especially the efficiency of different schemes.

Sorting into the Hierarchy

While reordering seems like a good idea to increase coherence amongst neighboring rays, the sorting algorithm itself is difficult to formulate as it has been unclear which sorting criteria of a set of rays lead to a coherent bundle.

To get the best coherency that is theoretically possible out of a given set of rays, this section proposes the combination and merge of the reordering with the ray traversal itself. Note that it does not pose any assumptions on the ray input at all, so completely unordered or divergent rays do not result in problems. The technique in detail:

1. The rays are passed in an (unordered) array, along with an additional array of references 0 . . . N−1 for each ray.
2. All rays are then initialized and clipped to the scene bounding box. The references are resorted in-place into two groups: rays that intersect the bounding box (left side of the array) and rays that miss it (right side).
3. All rays of the first group are passed on to the ray traversal, starting at the root node:
   3a. It is tested whether the node is a leaf:
   3b. If not, all rays are intersected with the plane(s) and accordingly sorted into three groups: Left only. Right only or Both (or None for a BVH) (see Section 2.2.2 for an in-place implementation).
   3c. The traversal continues with one of the children (e.g., the one with the majority of rays passing through it, or depending on the dominant direction of the rays) and storing the ray references that need to visit both sides on a stack (see Section 2.2.2) for later use.
   3d. If the node is a leaf, all rays are tested against the primitives in the leaf. When using spatial partitioning, an additional step is needed: Rays that can stop the traversal and rays that did not find an intersection yet need to be separated and the traversal continues for the active rays by popping a node and its assigned references from the stack (see Section 2.2.2).
4. The procedure can stop if all rays have found an intersection or if the stack is empty.

While this implementation is using the exact same amount of primitive intersections and overall number of ray traversals as using a standard single ray traversal, the proposed solution increases the coherency to a maximum, as all rays that visit similar branches of the tree are automatically regrouped and separated from the rest of the rays. Each node and each primitive has to be loaded exactly once and so the active rays can be linearly streamed as they all work on the same data. Although no experiments have been made using an optimized SIMD implementation, the presented algorithm perfectly fits a streaming model.

The technique can be interpreted in several ways. It can be seen as a sorting of the rays into the hierarchy, similar to the hierarchy construction itself, when sorting primitives into the nodes. It is also a repackaging of the rays, similar to SIMD regrouping. In addition it is possible to look at it as a ray tracing variant of Warnock's area subdivision algorithm.

While the implementation is still unoptimized, first results are already promising: The overall framerate is just slightly decreased over the standard (but highly optimized) ray traversal. Hardware architectures that favor a streaming implementation (such as Cell or GPU) might further profit from this algorithm, especially as the rather chaotic standard ray traversal with unpredictable branches and memory fetches is reordered to a fully linear and streamable implementation working on fixed data. While the working set (the ray array and the references) can also be kept as compact as needed (the Cell SPEs e.g. only feature very limited local memory), the memory fetches needed for the hierarchy are additionally fully predictable (expressed by the nodes on the stack) and can easily be transferred during the computation of the current traversal step. This could also be exploited for massive scenes that do not fit into memory and as such directly results in less disk swapping.

A further bonus is the implicit spatial sorting of the intersection results. By passing intersection results to the shaders in the order they were computed, neighboring intersections will be passed directly afterwards, increasing the probability of sharing the same shaders and/or textures, thus enabling the use of SIMD and increasing cache coherence. The benefits are obviously increased with a growing number of rays passed to the procedure (ideally all rays that will be intersected with the scene). Note that this automatic resorting of ray tracing and shading indeed perfectly fits the idea of simultaneously simulating Markov chains (see Section 3.4), but that the actual implementation demands more research and experiments.

An additional entry point search for all rays in the hierarchy can be done after initializing and clipping the rays to the scene bounding box. To avoid losing performance for all cases where a deep entry point cannot be found, the implementation only uses an axis-aligned box (instead of the usually employed frustums) to encapsulate the rays, which in turn can be constructed very fast, compared to the rest of the traversal procedure, so not finding a suitable entry point comes at almost no cost. Still, the performance can increase by up to 20 percent, but usually remains equal, especially when used for simple scenes.

Additionally it is also possible to more tightly encapsulate the rays into a frustum or shaft for the entry point search and to clip this shaft during the ray traversal itself to the geometry which should allow for even fewer operations needed during the traversal step. Note, however, that this limits the otherwise available generality of the technique, as it demands that rays feature some kind of coherence to find a tight hull surrounding all rays.

Along the proposals given in Section 2.5, it should further be interesting to tightly merge the in-place tree construction with the proposed sorting of rays into the hierarchy, resulting in an optimal amortization of the tree construction time and additionally allows for a self-adopting partitioning heuristic.

Shaft Tracing

A very popular technique, especially for accelerating the tracing of primary rays, is the packaging of a set of rays into a shaft by calculating a more or less tight hull around the rays and using the intersection results of this hull as a generalization for the inherited rays. A general overview, practical results and implementations can be found in the art, including some new and rather elegant techniques.

As including shafts into a generally usable rendering system is rather difficult, due to user defined shaders and the resulting loss in coherence (see Section 2.6.2) the presently described implementation relies on a known corner ray technique to only accelerate primary rays. Note, however, that shaft culling techniques become problematic anyhow for diverging sets of rays as it naturally happens over the distance and secondary rays, which is a very active topic in research.

When tracing corner rays only to accelerate the shaft tracing, the traversal has to stop (or fall back to regular ray tracing) as soon as the rays take different decisions. As this is a very conservative technique, the results are rather disappointing, especially when using it in highly detailed scenes.

Figures 30A, 30B, 30C, 30D:
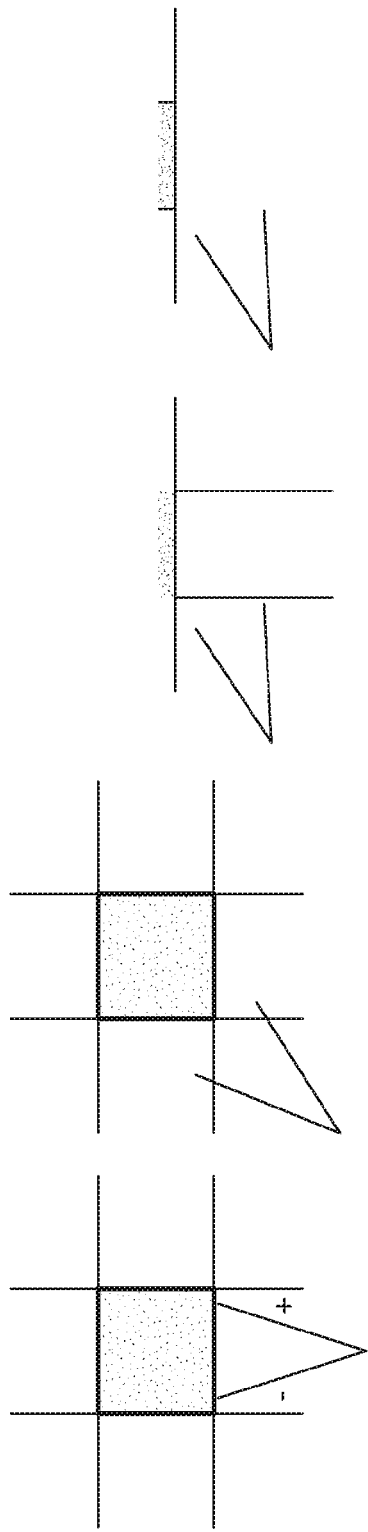
FIG. 30 is a series of diagrams illustrating issues in the corner ray shaft tracing implementation.

FIG. 30 is a series of diagrams illustrating issues in the corner ray shaft tracing implementation: Ray signs will always differ if the spread of the shaft is rather large (a). In the other case, corner rays will take different traversal decisions (b, c). This can only be solved by a specialized tree construction that tries to encapsulate as much empty space as possible in one single piece (d).

Another, but completely different approach is as follows: If using dynamic scenes, the data acceleration structure construction can be changed to use the shaft to sort the primitives into, instead of the complete scene bounding box. So split-planes will be selected depending on the structure of the inherited rays and the primitives, to find intersections more efficiently during a combined shaft traversal/construction phase. As such, primitives outside of the shaft can be discarded rather quickly as they will not be intersected by the shaft anyway. Note, however, that this can only work for either a limited amount of shafts or moderately complex scenes, as it demands to sort all primitives into each shaft separately (thus featuring the same problems as rasterization hardware). The sorting performance can be increased though, by using a crude acceleration hierarchy for the primitives and/or rays.

2.6.3 Cache Oblivious Design

Optimally using existing hardware caches and memory bandwidth is one of the keys to performance on modern hardware, especially for ray tracing implementations. Using a cache oblivious design, e.g., cache oblivious hierarchies, the applied techniques are vastly independent of the actual cache size and the structure of the underlying cache hierarchy.

One popular reordering of hierarchies is the van der Emde Boas layout, a variation of the original technique that was actually proposed to accelerate the search for values in a specialized tree. The reordering results in a hierarchy of hierarchies, and as such, nodes of each individual subtree are stored close in memory. As it is likely for ray tracing to visit neighboring nodes during traversal, especially on the lower levels of the tree, implicitly fetching neighboring nodes, as these are stored in the same cache-line, can increase performance.

The actual problem implementing the van der Emde Boas layout for non-balanced trees is the ordered on-the-fly storage of the nodes, and as such it is generally used as an optional post-processing step to increase performance. Using the in-place construction proposed in Section 2.5.1, the implementation can be easily tweaked to become at least cache friendlier than before. By allocating more than two nodes at once out of the free memory block, subtree nodes are direct successors in memory. A useful allocation size can be 128 bytes of memory (as, e.g., the P4 fetches 2*64 bytes), enough memory for 16 kd-nodes (16*8=128 bytes). The construction implementation can then use this block to store the nodes of a complete three level subtree. As such, the block can only be filled by a maximum of 1+2+4+8=15 nodes, on the lower levels this will even feature less nodes as the subtrees will not be balanced anymore. Note that actually implementing this scheme requires some subtrees to hold 16 nodes, some only 14 nodes, due to the requirement that the two children of a node need to be stored directly next to each other.

An additional refinement of the implementation allows to omit the storage of pointers on a per-node basis (thus, each node only stores the split-plane(s)), and favor a storage per complete subtree. This can be combined with a new form of the traversal, intersecting n nodes of the tree "simultaneously," resulting in m children that are put onto the slack. Note that still using cache line alignment (31 nodes for a four level subtree and one pointer to the 15 child subtrees, 31*4+ 4=128 bytes) must result in a large amount of unused memory, due to the original tree being unbalanced. While this could prove valuable to resolve latencies, as the amount of calculations per memory fetch is increased, the overall amount of loaded and computed nodes will increase, too.

Another possible post-processing step is the reordering of references (and even the triangles themselves) in the leaves to support hardware prefetching mechanisms. One possible extension is the complete re-clustering of neighboring nodes/ leaves.

2.6.4 Multi-Threaded Hierarchy Construction

Although ray tracing is generally seen as a highly parallel technique, this is only true for static scenes and when omitting the construction phase completely. This is subject to change and, in fact, much current research is dedicated to parallel hierarchy construction on symmetric multiprocessing (SMP) architectures. However, current approaches typically either demand a lot of temporary memory or cannot offer full scalability for multiple CPUs, despite claims in the literature to the contrary. This will pose additional problems for upcoming multicore architectures, especially as the cores must share available memory bandwidth; a problem already visible on current multicore CPUs. Note that an SMP-capable bottom-up technique featuring exceptionally low bandwidth and offering perfect streaming capability has already been proposed in Section 2.5.7 and so this section will concentrate on the parallelization of a classical top-down construction.

If using an on-demand construction policy (see Section 2.5.5), a quick SMP implementation is straightforward using the presented framework. If a thread visits an unfinished node, the node is marked as on construction and is build by the thread. If other threads visit the node they will be stopped until the construction is complete. Note that this can be achieved by only inserting few OpenMP pragmas into the source and is rather efficient considering the low implementation effort. Of course, due to practical reasons such as the limited number of atomic operations that can be achieved per second, the implementation is far from optimal. Also, the first levels of the hierarchy construction will only include few threads that can actually do work in parallel, due to the blocking of nodes currently under construction. But without these nodes it is not possible to further descend the tree, thus leaving all other threads idle.

This can either be solved by using a bucketsort pre-processing step (see Section 2.5.7), which can be rather trivially parallelized and continue with the on demand implementation only for the lower levels, thus decreasing the probability of blocking other threads. Or, by additionally implementing a parallelized sorting step of the primitives during the construction of one single node, which however is difficult to balance.

A variation of the implementation is the use of an additional worklist that holds nodes that still need to be constructed and each idle thread taking one of the lists. This resolves the need of using locks or atomic operations during the traversal as this is now solely needed for the queue implementation where it does not pose performance problems anymore. Note that this can also be used for a classical static scene hierarchy construction.

Offering full multi-host scalability is even harder to achieve and thus is out of scope of this work's ray tracing implementation. Though practical solutions exist to accelerate offline rendering or static walkthroughs, interactive and dynamic scenes still pose problems for memory bandwidth and communication overhead amongst the hosts.

2.6.5 Ray Tracing Hardware

Based on the recent findings in realtime ray tracing several ray tracing chips have been designed. While these architectures can efficiently perform ray tracing and shade bundles of rays, they can be improved by the presently described techniques. The bounding interval hierarchy has a smaller memory footprint and the proposed simple in-place construction scheme using the global heuristic should make a full frame-per-frame hardware construction of the data structure possible as the techniques only use simple operations and therefore the unified framework is a very good candidate for hardware implementation. Optionally, the highly parallel bottom-up approach presented in Section 2.5.7 can be used to get an approximation of the global heuristic based hierarchy construction in even linear time.

Furthermore, the described techniques may be advantageously modified by adding specialized compression/decompression or quantization/dequantization units (see Section 2.3.3) to reduce memory bandwidth, similar to texture compression schemes that are already used in rasterization hardware.

Maximizing the coherency of all traversal and intersection calculations by using the ray-hierarchy sorting proposed in Section 2.6.2 will additionally help to reduce cache thrashing and is also able to work on a very limited amount of local memory.

2.7 Summary

The work inferred a unified, hybrid framework for accelerating ray tracing using hierarchical auxiliary data structures for both spatial and object list partitioning schemes. The construction is a quicksort technique that consequently runs, on the average, in $\mathcal{O}(n \log n)$ (and even faster when using the on-demand policy), achieved by a simplified memory management that uses an a priori allocated block of memory of fixed size. The overall memory consumption is considerably reduced by the in-place construction and the proposed bounding interval hierarchy. The work further derived new heuristics for building high quality hierarchies two orders of magnitude faster than the previous state of the art, which allows the performance of ray tracing on fully dynamic geometry.

While the surface area heuristic (SAH) is mainly used to optimize the ray tracing of static scenes (as a full computation is too expensive for dynamic scenes), the techniques described herein are not only faster to evaluate, but can often outperform the SAH. The remaining benefits of the SAH may be the subject of further inquiry.

While ray bundles are generally problematic for all secondary rays (i.e., global illumination simulations), assembling ray sets and exploiting coherence by efficiently computing transient data structures is a remaining challenge.

3. Quasi-Monte Carlo Simulation of Markov Chains

While the previous section described efficient ray tracing techniques, the present section focuses on the actual selection and generation of the path space samples to achieve a "variance" reduction of the results. After surveying the basics of Monte Carlo (MC) and quasi-Monte Carlo (QMC) integration, some general problems regarding the simulation of Markov chains using MC and QMC methods are discussed in detail. Then, new techniques to overcome these problems are proposed along with embedding the findings into existing rendering solutions. By tightly coupling the sampling with the evaluation step (using ray tracing), the efficiency of light transport simulations can be increased.

A Brief History of Quasi-Monte Carlo Methods in Computer Graphics

While Monte Carlo integration has been in use for simulations since the 1950's, developed in the context of neutron collisions, and in the context of computer graphics since 1968, a growing interest in deterministic methods, later called quasi-Monte Carlo methods, only started in the late 1990's. The Monte Carlo method relies on unpredictable, independent, and uniform random numbers to derive the probabilistic error bound. Quasi-Monte Carlo methods, on the other hand, exploit the fact that in practical applications the uniform distribution alone is crucial for obtaining good performance, thus avoiding locally higher or lower densities. Although the use of these fully deterministic, and thus correlated, quasi-Monte Carlo samples introduces a bias into the calculations, the method is consistent as it converges to the correct solution for Riemann-integrable functions and generalized for the space of square integrable functions $\mathcal{L}^2$ with the Lebesgue measure.

In the context of computer graphics, there was proposed the randomization of primary rays. This idea was extended to sample higher dimensions. While random samples were mainly used to map aliasing artifacts (a problem inherent to simple deterministic techniques such as Cartesian grids) to noise, the field of computer graphics delivered more insight on the nature of when and how to use Monte Carlo integration, and provided further applications to extended path tracing techniques.

Although fully deterministic techniques like stratified or Latin hypercube sampling and also randomized versions such as jittered sampling were already common in use, there was subsequently provided a broad application of quasi-Monte Carlo techniques along with mathematical insight, as well as validation in a practice environment.

3.1 Monte Carlo Integration

To evaluate the path integral formulation of the light transport derived in Section 1.1.1, it is necessary to approximate s-dimensional integrals by the means of Monte Carlo integration. The integral is approximated of a function $f:[0,1) \mapsto \mathbb{R}$ $$\int_{[0,1)^s} f(x)\,dx \approx \frac{1}{n}\sum_{i=0}^{n-1} f(x_i)$$

it is possible to evaluate the integrand at uniformly distributed and independent random sample positions $x_i$. The integrand thus is interpreted and estimated as an average. The big advantage of the Monte Carlo method is its simplicity and linear complexity.

3.1.1 Random Number and Pseudo Random Number Generation

The samples $x_i$ are independent realizations of a uniformly distributed random variable on the s-dimensional unit cube. In addition real random numbers must be unpredictable, which is more important in the context of cryptography though.

As it is currently difficult or expensive (e.g., id Quantique provides a quantum-based measurement hardware solution; Havege provides a computationally intense software package) to have real random number generators on standard computer hardware (a fact that may change with future PC architectures), deterministic techniques must be employed to generate pseudo-random samples featuring the above properties when a fast generation is necessary. This actually makes the random numbers predictable and the independence of the samples only an approximate property. The most commonly used generator is the Mersenne Twister, which has recently been extended and SIMD-optimized, delivering high quality, yet ultra-fast pseudo-random numbers.

3.1.2 Error Bound

As the Monte Carlo method is also called the method of statistical trials, the basic idea is to construct a random variable whose expectation is the desired integral. Then n independent realizations of the random variable are averaged in order to estimate the integral value. With the high probability $$\mu\left(\left\{\left|\int_{[0,1)^s} f(x)\,dx - \frac{1}{n}\sum_{i=0}^{n-1} f(x_i)\right| < \frac{3\sigma(f)}{\sqrt{n}}\right\}\right) \approx 0.997$$

the error of the integral estimation is bounded by three times the standard deviation $\sigma(f)$ of the integrand f divided by the square root of the number n of observations. The proof uses basic ingredients of probability theory, namely the law of large numbers and independence. This stochastic error bound can be derived by assuming that f is square integrable, i.e., $f \in \mathcal{L}^2([0,1)^s)$, which guarantees the variance $\sigma^2(f)$ to be finite. Additionally, it must be possible to point sample the integrand to evaluate at positions $x_i$ except for sets of zero measure. Note that f can always be designed to be of finite energy in the case of light transport simulation as it is physically motivated.

The convergence rate indicates that by increasing the number of samples by two orders of magnitude, one digit in precision can be gained, which is not very fast. However, the error bound is completely independent of smoothness properties and especially the dimension s so unlike standard tensor product quadrature there is no curse of dimension.

3.1.3 Time Complexity

The time complexity of Monte Carlo techniques is defined as $$t_S \cdot \sigma^2(f) = t_S \cdot E(f - Ef)^2,$$

where E is the expectation. Usually the focus is on reducing the variance $\sigma^2(f)$, while in fact the time $t_S$ to generate a sample must be considered, too.

A common technique is to stratify the domain of integration in order to increase the uniformity of the samples. Stratification can easily be proven to be never worse than the original Monte Carlo method and is especially popular in computer graphics as it is exceptionally cheap to evaluate and efficiently reduces noise in images. However, most implementations are affected by the curse of dimension, as they require to draw $n = N^s$ samples for a full uniform stratification.

3.2 Concepts of Uniformity

Using Monte Carlo and quasi-Monte Carlo integration, the distribution of a chosen point set (and even its subsets, as will become clear in Section 3.4.1)

$$P_n := \{x_0, \ldots, x_{n-1}\} \subset [0,1)^s$$

is directly related to the quality of the obtained result. Thus, various constructions and error bounds have been proposed to determine the quality of sequences and point sets and measure their distribution.

3.2.1 Maximum Minimum Distance

Utilizing samples based on the spectrum of blue noise has a long tradition in computer graphics, because the otherwise disturbing aliasing artifacts are mapped to noise, which perfectly matches the characteristics of the human visual system. One possible construction is using the Poisson disk random process or applying an iterative Lloyd relaxation to random points. Note that such point sets are difficult to generate in an incremental way.

The quality of such point sets can be measured by using the mutual maximum minimum distance amongst the points on the torus. This actually provides an isotropic and shift invariant measurement of the uniformity of a point set. As found for rank-1 lattices (see Section 3.3.3), maximizing the mutual minimum distance $$d_{min}(P_n) := \min_{0 \le i < n} \min_{i < j < n} \|x_j - x_i\|_T$$

the regions of the Voronoi-diagram of the rank-1 lattice approximate spheres as much as possible, resulting in approximately hexagonal regions (in two dimensions). Note that $\|\cdot\|_T$ denotes the Euclidean distance on the unit torus.

3.2.2 Discrepancy

One measure of the deviation from a uniform distribution is the discrepancy, with one form of discrepancy measure being the star discrepancy:

$$D^*(P_n) := \sup_{A = \prod_{j=1}^s [0, a_j) \subseteq [0,1)^s} \left| \int_{[0,1)^s} \chi_A(x) dx - \frac{1}{n} \sum_{i=0}^{n-1} \chi_A(x_i) \right|,$$

which measures the uniformity of the point set $P_n$ by employing the maximum integration error of a point set when integrating axis-aligned bounded boxes anchored in the origin. If $D^*$ vanishes for $n \to \infty$ the point set is uniform.

While uniform random points only achieve a discrepancy of, roughly $$O\left(\frac{1}{\sqrt{n}}\right),$$

speaking, $$O\left(\frac{1}{\sqrt{n}}\right),$$

the lower bound of discrepancy is about $$O\left(\frac{1}{n}\right).$$

The deterministic low discrepancy point sequences in the following Sections 3.3.1-3.3.3 in fact reach this lower bound and thus are much better uniformly distributed than random numbers can be.

3.2.3 ($\mathcal{M}, \mu$)-Uniformity

The notion of ($\mathcal{M}, \mu$)-uniformity relates to the stratification properties of a point set. Let (X, $\beta$, $\mu$) be an arbitrary probability space, i.e., X is an arbitrary nonempty set, $\beta$ is a $\sigma$-algebra of subsets of X, and $\mu$ is a probability measure defined on $\beta$, and let $\mathcal{M}$ be a nonempty subset of $\beta$. A point set $P_n$ of n elements of X is called ($\mathcal{M}, \mu$)-uniform if $$\sum_{i=0}^{n-1} \chi_M(x_i) = \mu(M) \cdot n \quad \text{for all } M \in \mathcal{M},$$

where $x_M(x_i) = 1$ if $x_i \in M$, zero otherwise.

Examples of ($\mathcal{M}, \mu$)-uniform point sets known in the art are the Cartesian product midpoint rule and radical inversion (see Section 3.3.1) based points. In addition, rank-1 lattices (see Section 3.3.3) are ($\mathcal{M}, \mu$)-uniform also: The Voronoi-diagram of a lattice partitions the unit cube n-1 into n sets of identical shape and volume. This underlines that for ($\mathcal{M}, \mu$)-uniformity all $\mu(M)$ must have the same denominator n.

3.3 Quasi-Monte Carlo Integration

As Monte Carlo simulation must employ deterministic pseudo-random number generation on current hardware, and the averaging of the samples for integration makes the independence property imperceptible anyway, omitting independence allows one to increase uniformity. Using such deterministic samples in Monte Carlo integration has been named quasi-Monte Carlo.

3.3.1 Point Sequences by Radical Inversion

Classical quasi-Monte Carlo sequences like Halton and Sobol' are radical inverse based constructions. The calculation of the radical inverse $\Phi_b(i)$ of an integer $i \in \mathbb{N}_0$ relies on its representation $(a_j)_{j=0}^\infty$ in base b. By mirroring the digits $a_j$ at the decimal point, the radical inverse (or van der Corput sequence) in base b is obtained as follows:

$$\Phi'_b : \mathbb{N}_0 \to \mathbb{Q} \cap [0, 1)$$

$$i = \sum_{j=0}^\infty a_j(i) b^j \mapsto \Phi_b(i) := \sum_{j=0}^\infty a_j(i) b^{-j-1}$$

Faure Scrambling

Using the radical inverse, a full uniform stratification is only obtained when drawing an amount of samples that is a power of the base b. As this decreases the discrepancy, Faure proposed a simple remedy by a deterministic scrambling of the van der Corput sequence. The radical inverse is replaced by the scrambled radical inverse $$\Phi'_b : \mathbb{N}_0 \to \mathbb{Q} \cap [0, 1) \qquad \text{Eq. 3.1}$$

$$i = \sum_{l=0}^\infty a_l(i) b^l \mapsto \sum_{l=0}^\infty \pi_b(a_l(i)) b^{-l-1}$$

yielding a scrambled van der Corput sequence. The scrambling permutations $\pi_b$ applied to the digits $a_j(i)$ are determined by a recursion starting with the identity $\pi_2 = (0, 1)$. It b is odd, $\pi_b$ is constructed from $\pi_{b-1}$ by incrementing each value $\geq$ $$\text{each value} \geq \frac{b-1}{2}$$

and inserting $$\frac{b-1}{2}$$

in the middle. Otherwise $\pi_b$ is constructed by concatenating $$2\pi_{\frac{b}{2}} \text{ and } 2\pi_{\frac{b}{2}} + 1.$$

This technique yields $$\pi_2 = (0, 1)$$
$$\pi_3 = (0, 1, 2)$$
$$\pi_4 = (0, 2, 1, 3)$$
$$\pi_5 = (0, 3, 2, 1, 4)$$
$$\pi_6 = (0, 2, 4, 1, 3, 5)$$
$$\pi_7 = (0, 2, 5, 3, 1, 4, 6)$$
$$\pi_8 = (0, 4, 2, 6, 1, 5, 3, 7)$$
$$\vdots$$

The scrambling actually increases the distance of subsequent points and breaks the otherwise linear enumeration (also see FIG. 36 for a visual comparison).

Halton Sequence

Unlike pseudo-random numbers, the van der Corput sequence can by default not be used for high dimensional integration: For example, generating 2-dimensional samples out of $\Phi_2$, $$\text{all samples will be } \leq \frac{1}{2}.$$

in the first dimension(all even indices i), the components of the $$\text{second dimension (odd indices)} > \frac{1}{2}.$$

Therefore, Halton introduced $$X_j := (\Phi_{b_1}(i), \ldots, \Phi_{b_s}(i))$$

where $b_i$, is the i-th prime number.

A problem when using the radical inverse can be spotted when picking low-dimensional projections of the Halton sequence. While usually not perceptible, these low-dimensional correlations often interfere with the integrands in computer graphics. For example, correlation can slow down convergence in a sequence of two-dimensional scattering events as used in Markov chain simulations. In this case, scrambling improves the uniformity (even of subsets as can be seen in FIG. 36). In addition the minimum distance of samples is increased, which indicates an increased uniformity, while keeping its original discrepancy properties.

3.3.2 Properties and Implementation of (t, s)-Sequences in Base b

One disadvantage of the Halton sequence is its demand for inexact floating point calculations: most prime fractions cannot be exactly represented in the floating point precision format. Additionally, decomposing i into $a_j$ is expensive for varying b. Therefore, a construction working within only one base for all dimensions should be preferred.

(t, m, s)-Nets in Base b

For two integers $0 < t < m$, a finite point set of $b^m$ points in s dimensions is called a (t, m, s)-net in base b, if every elementary interval $$E := \prod_{j=1}^s \left[ \frac{a_j}{b^{l_j}}, \frac{a_j+1}{b^{l_j}} \right) \subseteq I^s$$

for integers $l_j \geq 0$ and $0 \leq a_j < b^{l_j}$ of volume $$\lambda_s(E) = \prod_{j=1}^{s} \frac{1}{b^{l_j}} = \frac{1}{b^{\sum_{j=1}^{s} l_j}} = b^{t-m}$$

contain exactly $b^t$ points. The star discrepancy for such sequences is:

$$D^*(P_n) \leq B(s, b) b^t \frac{\log^{s-1} n}{n} + O\left(b^t \frac{\log^{s-2} n}{n}\right).$$

Figure 31:
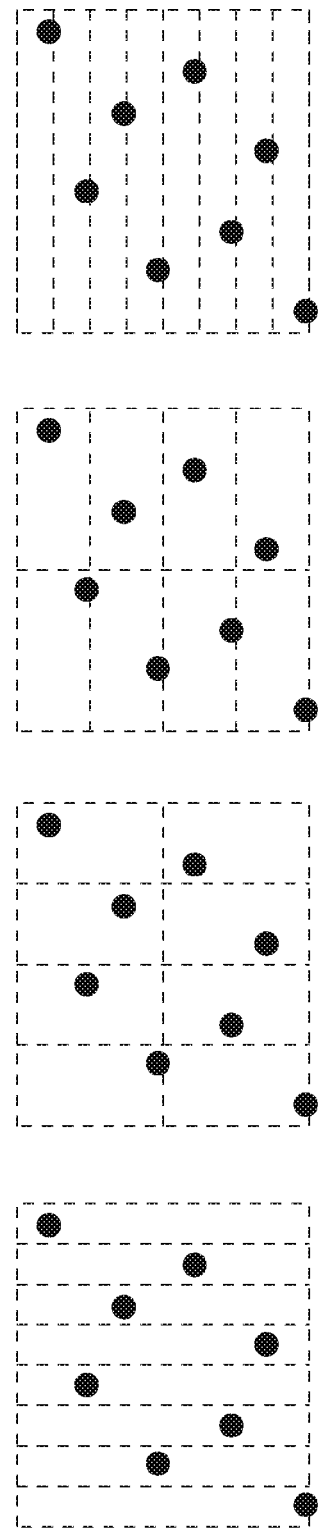
FIG. 31 is a diagram illustrating a technique using a (t, m, s)-net in base b.

Smaller t values result in better nets, as t the quality parameter controlling the stratification properties of the net, which are best for t=0, because then every elementary interval (see FIG. 31 for an example) contains exactly one point. Thus, the pattern is both Latin hypercube sampling and stratified. Note that for base 2, (0, m, s)-nets can only exist up to dimension s=3.

(t, s)-Sequences in Base b

For $t \geq 0$, an infinite point sequence is called a (t, s)-sequence in base b, if for all $k \geq 0$ and $m \geq t$, the vectors $x_{kb^m}, \ldots x_{(k+1)b^m-1} \in I^s$ form a (t, m, s)-net. Note, however, that (0, s)-sequences can only exist for $b \geq s$.

For a (t, s)-sequence in base b the following star discrepancy is achieved $$D^*(P_n) \leq C(s, b) b^t \frac{\log^s n}{n} + O\left(b^t \frac{\log^{s-1} n}{n}\right)$$

Adding the component $$\frac{i}{n} = \frac{i}{b^m}$$

to a (t, s)-sequence yields a (t, m, s+1)-net, one example being the van der Corput sequences ((0, 1)-sequence in base b). Adding the component $$\frac{i}{n}$$

with $n=b^m$ yields a (0, m, 2)-net, e.g., Hammersley point set for s=2 and $n=2^m$ points. While this adds one dimension "for free," it also restricts the maximum and minimum number of samples, as these will be obviously fixed to $b^m$, which will not allow for incremental sampling.

Digital (t, m, s)-Nets and (t, s)-Sequences

One construction of (t, s)-sequences is based on the use of generator matrices as it also allows for an efficient implementation, especially if working in base 2:

An s-dimensional point set $P_n := \{x_0, \ldots, x_{n-1}\}$ with $n=2^m$ and $x_i := (x_i^{(1)}, \ldots, x_i^{(s)}) \in [0,1)^s$ is called a $C_1 \ldots C_s$-generated point set in base 2 and dimension s, if $C_1, \ldots, C_s \in \mathbb{F}_2^{m \times m}$ with $$x_i^{(j)} = \left(\frac{1}{2} \cdots \frac{1}{2^m}\right)\left[C_j \begin{pmatrix} d_0(i) \\ \vdots \\ d_{m-1}(i) \end{pmatrix}\right], \text{ where } i = \sum_{k=0}^{m-1} d_k(i) 2^k$$

and the matrix-vector product in brackets being performed in $\mathbb{F}_2$. The matrices $C_j$ for $j=1, \ldots, s$ are called generators of the point set $P_n$, more precisely, the matrix $C_j$ is the generator of the j-th coordinate of the point set.

Some examples of digital (t, s)-sequences are the van der Corput, Sobol', Faure, Niederreiter, and Niederreiter-Xing sequences.

While the construction using generator matrices already delivers a vast amount of (t, m, s)-nets and (t, s)-sequences, using additional permutations can result in (t, m, s)-nets featuring a larger maximum minimum distance. Note that the additional permutations of course result in a further increase of the total search space for the construction. In addition, for some of the new nets the permutation has to be stored explicitly, which is a disadvantage.

While (t, s)-sequences will always feature a uniform distribution, a full stratification of the domain can only be guaranteed when using $n=b^m$ points. This can even be a problem for similar constructions like Halton that must use large valued $b_i$ for high-dimensional problems as it increases the number n of points needed for a full stratification ($b_1^m \ldots b_s^m$ points are needed to form a sub-net that uniformly stratifies the unit cube) and will also result in a worse distribution when picking only small sub-sets of the whole sequence, which is implicitly the case for all Markov chain simulations (see Section 3.4). So the problem of full stratification implicitly reintroduces the curse of dimension.

Efficient Implementation

Computations in base 2 allow for an exact representation of the coordinates in the IEEE floating point standard, as long as the mantissa holds enough bits (23 in the case of using 32-bit floating point, 53 for double precision). Using 32-bit floats allows only $2^{23}$ samples to be distinguished, meaning that the same samples will be computed after fewer than 8.5 million samples.

Interpreting unsigned integers as bit vectors, i.e., elements of $\mathbb{F}_2^{32}$ with $\mathbb{F}_2 = \mathbb{Z}/2\mathbb{Z}$, allows one to use standard bitwise operations for vector operations on $\mathbb{F}_2^{32}$. The matrix-vector multiplication $C_j(d_0(i), \ldots d_{m-1}(i))$, which has to be performed in $F_2$, then becomes very efficient by exploiting the fact that addition corresponds to XOR in $F_2$. An exemplary code listing is provided:

```
unsigned int x_i(unsigned int i) {
    unsigned int result = 0;
    for(unsigned int k = 0; i; i >>= 1. k++)
        if(i & 1) //only if corresponding bit set
            result ^= C_j[k]; //vector addition of (k+1)-th
                              leftmost column of C_j
    return result;
}
```

The art provides additional optimized implementation variants of the radical inverse, the second component of Sobol' points and Larcher-Pillichshammer points. An optimized implementation using additional permutations is also known in the art. Note that even using 32-bit integers and mapping to double precision floats, the amount of possible samples may still be insufficient for large resolutions, thus industrial rendering implementations should rely on the full 53-bits of double precision.

Performing the mapping to floating point representation in [0, 1) can be achieved by either dividing the integer by the largest representable number plus one (double) result/

(double) (1ULL<<m) or by directly mapping the bit vector into the corresponding mantissa bits and correcting the range afterwards:

```
double map(unsigned int result) {
    double tmp;
    uintCast(tmp) = 0x3FF0000000000000ULL
        | (((unsigned long long)result)<<20);
    return tmp−1.0;
}
```

Note that the latter variant allows for a simpler hardware implementation, but can be a bit slower on current x86 hardware when compared to just multiplying the result by 1.0/(1ULL<<m).

While it is possible to further optimize the implementation by using a gray-code permutation of a sequence, such that only one of the input bits $d_k(i)$ changes for neighboring indices, the user will be limited by the fixed order that requires to draw successive samples from the sequence. Additionally, the local distribution of subsets of the samples will be different, a fact that will become apparent in simulations, as will be explained in Section 3.4.2.

A better possibility is the parallel computation of bits using SIMD opcodes. By masking the XOR matrix operation with the bits of the index, the previously needed conditional branches can be avoided and it is possible to (theoretically) compute all bits in parallel as illustrated above.

FIG. 32 shows an exemplary code listing for fast generation of digital nets and sequences using SIMD opcodes. precalcLookup generates a bitmask (0 or 0xFFFFFFFF) for every bit of numbers 0, . . . , 15 in a precomputation step. These are stored in pairs of 4 bitmasks each in the array LUT. x-iSSE then decomposes the incoming index i into 8 pairs of 4 bits each. By using the previously generated look-up table, the corresponding matrix entries are in fact only XOR-ed onto the temporary result if the stored bitmask is set (0xFFFFFFFF). Using a hierarchically organized XOR for the partial results, the compiler can then decide the best execution order to get the final result. Finally, the single 32-bit integer is mapped to the range of [0, 1).

While drawing QMC samples usually has been recognized as computationally slow as compared to pseudo random number generation, this optimized implementation is on par with the recently presented and also SIMD based, refined variant of the Mersenne Twister.

3.3.3 Rank-1 Lattice Sequences

As compared to (t, s)-sequences and the Halton sequence, there exists an even simpler technique to generate highly uniform point sets:

$$x_i : \mathbb{N}_0 \to \mathbb{Q}^s \cap [0, 1)^s$$

$$i \mapsto \phi_b(i) \cdot \mathbf{g} \bmod [0, 1)^s$$

generates rank-1 lattice sequences from a suitable generator vector $\mathbf{g} \in \mathbb{N}^s$. For $n=b^m$ his results in a full rank-1 lattice, since $$(\phi_b(i))_{i=0}^{b^m-1} = \left(0, \ldots, \frac{b^m-1}{b^m}\right).$$

Other than Cartesian grids, which suffer from a bad discrepancy of $$O\left(\frac{1}{\sqrt[s]{n}}\right),$$

rank-1 lattice sequences of low discrepancy exist. Note that rank-1 lattices exist for any n and s. One example for a rank-1 lattice $$x_i := \frac{i}{n} \cdot \mathbf{g} \bmod [0, 1]^s$$

that features a simple construction for s=2 is the Fibonacci lattice with generator vector $$\mathbf{g} = (1, F_{k-1}) \text{ at } n = F_k, k \geq 2$$

where the Fibonacci numbers are defined by $$F_k := F_{k-1} + F_{k-2} \text{ with } F_2 := F_1 := 1$$

FIG. 32 shows an exemplary code listing for fast generation of digital nets and sequences using SIMD opcodes. precalcLookup generates a bitmask (0 or 0xFFFFFFFF) for every bit of numbers 0, . . . , 15 in a precomputation step. These are stored in pairs of 4 bitmasks each in the array LUT. x-iSSE then decomposes the incoming index i into 8 pairs of 4 bits each. By using the previously generated look-up table, the corresponding matrix entries are in fact only XOR-ed onto the temporary result if the stored bitmask is set (0xFFFFFFFF). Using a hierarchically organized XOR for the partial results, the compiler can then decide the best execution order to get the final result. Finally, the single 32-bit integer is mapped to the range of [0, 1).

Figure 33:
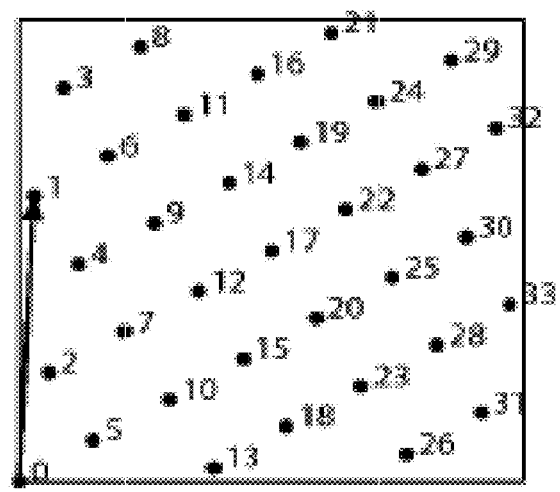
FIG. 33 shows a diagram illustrating the n=34 points of a Fibonacci lattice.

FIG. 33 shows a diagram illustrating the n=34 points of the Fibonacci lattice $L_{34,21}$ with generator vector g=(1, 21).

While the computation is exceptionally fast the pattern and enumeration of rank-1 lattices is difficult to handle in the context of Markov chain simulations (see Section 3.4). The regularity of the samples will result in distinct artifact patterns which will only vanish for a large number of samples. Additionally, adaptive sampling techniques are even harder to include as lattices only feature a fixed number n of samples by default. Also the search for an optimal generator vector g (in the sense of maximizing the minimum distance of the samples) must be done for every number of samples n and the dimension s of a problem. This is even more problematic for rank-1 lattice sequences as the choice of the right $\phi_b$ is an additional degree of freedom.

Another open problem is how to achieve properties similar to (t, s)-sequences, in the sense that small subsets are again lattices featuring high uniformity.

3.3.4 Deterministic Error Bounds

Using the deterministic low discrepancy point sets of the previous Section 3.2 allows the proof of error bounds for quasi-Monte Carlo integration. Unlike the Monte Carlo case which features a probabilistic bound, the quasi-Monte Carlo point sets allow to formulate deterministic upper bounds. These error bounds obviously depend on the integrand function classes. From all possibilities, only those are mentioned that are important in the computer graphics setting.

Error Bound Using Maximum Minimum Distance

Given the radius r(n, g) of a rank-1 lattice (the smallest circumcircle of the fundamental Voronoi cell), f being a Lipschitz function periodic on $[0, 1]^s$ with Lipschitz constant L and $P_n=\{x_0, \ldots, x_{n-1}\}$ a rank-1 lattice, the integration error $$\left| \int_{[0,1]^s} f(x)\,dx - \frac{1}{n}\sum_{i=0}^{n-1} f(x_i) \right| \le L \cdot r(n, g)$$

is bounded by the Lipschitz constant multiplied by the maximum minimum distance. As a result, the quality of the integration will depend on the well behavior of the function (expressed by the Lipschitz constant), and the uniform distribution of the samples.

It is interesting to note that comparing constructions like Hammersley, Sobol', and Larcher-Pillichshammer, a smaller discrepancy often also features a larger maximum minimum distance. The same can be spotted comparing Halton against the Faure permutated Halton sequence. The art provides an application for (t, m, s)-nets.

Error Bound Using Spectral Properties

One drawback of using the maximum minimum distance error bound is its implicit curse of dimension, which is intrinsic to the radius r(n, g). Actually, a much better error bound can be formulated if the function class is further restricted by demanding a certain decay of the Fourier coefficients of the integrand.

Error Bound Using Discrepancy

The Koksma-Hlawka inequality $$\left| \int_{[0,1)^s} f(x)\,dx - \frac{1}{n}\sum_{i=0}^{n-1} f(x_i) \right| \le V(f) D^*(P_n)$$

bounds the integration error by a product of the variation V(f) of the integrand in the sense of Hardy and Krause and the star discrepancy of the samples. Note that the function class of functions of bounded variation is much smaller than $\mathcal{L}^2$.

The star discrepancy is an anisotropic error bound as it is based on axis-aligned boxes anchored in the origin. Rotating the point set changes discrepancy and even shifting the point set on the torus (see Section 3.3.5) can change discrepancy.

Rotating a function instead illustrates the potentially catastrophic behavior of the error bound: The variation of $$f(x, y) = \begin{cases} 1 & y > x \\ 0 & \text{else} \end{cases}$$

is infinite; however, using the Hammersley point set (see Section 3.3.2) it can be shown that the error is in fact between $\dfrac{1}{2\sqrt{n}}$ (using an even amount of samples) and $\dfrac{1}{\sqrt{2n}}$ (for an uneven number).

Note that discontinuities that are not aligned to the canonical axes are quite common in the real world.

Error Bound Using $(\mathcal{M}, \mu)$-Uniformity

Let $(X, \beta, \mu)$ be an arbitrary probability space (see Section 3.2.3) and let $\mathcal{M}=\{M_1, \ldots, M_k\}$ be a partition of X with $M_j \in \beta$ for $1 \le j \le k$. Then for any $(\mathcal{M}, \mu)$-uniform point set $P_n=\{x_0, \ldots, x_{n-1}\}$ and any bounded $\mu$-integrable function $f$ on X we have:

$$\left| \int_X f(x)\,d\mu(x) - \frac{1}{n}\sum_{i=0}^{n-1} f(x_i) \right| \le \sum_{j=1}^{k} \mu(M_j)\left( \sup_{x \in M_j} f(x) - \inf_{x \in M_j} f(x) \right).$$

Note that this works for any function $f \in \mathcal{L}^2([0, 1)^s)$, but unlike other QMC error bounds, does not feature a distinct separation of function and sample properties.

With $(X, \beta, \mu)=([0, 1)^s, \beta, \lambda_s)$ the theorem is applicable in the setting of computer graphics. For the example function in Equation 3.2, the deterministic error $$O\!\left(n^{-\frac{1}{2}}\right)$$

bound can be obtained by selecting an $(\mathcal{M}, \mu)$-uniform point set with k=n. The difference of the supremum and the infimum can only be one in the $$O\!\left(n^{\frac{1}{2}}\right)$$

sets of the partition, which are crossed by the discontinuity otherwise it must be zero. With $$\mu(M_j) = \frac{1}{n}$$

the bound is obtained. This argument is similar to an argument used in the art but, what is more important, does not use probabilistic arguments for a deterministic technique. However, note that this only holds for two dimensions.

3.3.5 Randomized Quasi-Monte Carlo Integration

As was seen in the previous sections, QMC patterns suffer from a rather pessimistic or difficult error bound analysis. To be able to use the original MC probabilistic error bound, it is possible to randomize any deterministic point set and obtain an unbiased estimator. In the following, different practical randomizations will be presented that can also be used in the context of padded replications sampling (also see Section 3.4.2). Using low discrepancy point sets with these randomizations results in a variance reduction technique for Monte Carlo integration. Note that the randomizations are random bijections.

Cranley Patterson Rotation

A rather trivial technique is to randomly shift deterministic points $$x_i \mapsto x_i + \xi \bmod 1,$$

where $\xi=(\xi^{(1)} \ldots \xi^{(s)}) \in [0,1)^s$ is a vector of s independent realizations of uniform random numbers on the unit interval. While the shift can change the discrepancy measure, it leaves the maximum minimum distance unaffected.

Scrambling

The earlier presented, deterministic Faure scrambling is in fact only one subset of the more general (but also more computationally intense) random scrambling that can be used to randomize (t, m, s)-nets and (t, s)-sequences. The technique first subdivides the domain $I^s$ on one axis into b equally sized volumes $H_1, H_2, \ldots, H_b$. Then these volumes are randomly permutated and the process continues recursively with the $H_h$ and on each axis. As the computation on finite precision numbers terminates the technique automatically, the scrambling becomes practical for all digital constructions (see Section 3.3.2). Note that scrambling does not affect the quality t parameter.

A simplified but sufficient randomization for digital constructions in base 2 can be found in the art and only needs to use one additional XOR operation on the integer bit-vector to achieve a scrambling of base 2 sequences.

3.4 Simultaneous Simulation of Markov Chains

A Markov chain describes a memoryless stochastic process, where the transition probabilities do not depend on the history of the process. For example, the English language has been modeled by a Markov chain by comparing the relative frequencies of one word following another from an English book. Using these transition probabilities it is possible to generate seemingly English sentences. Many more evolution processes, e.g., Brownian motion or particle trajectories, can be described as Markov chains.

Properties of processes can be estimated by averaging the contributions of multiple Markov chains. Instead of simulating each trajectory independently, it has been found that simultaneously simulating Markov chains using correlated samples and sorting the ensemble of states after each transition step can notably improve convergence.

In a light transport setting, the underlying integral equation can be reformulated as a path integral (also see Section 1.1.1). Sampling path space (see FIG. 1) corresponds to simulating Markov chains, where the paths are established by ray tracing and scattering. The initial distribution is determined by the emission characteristics of the light sources and the transition probabilities are given by bidirectional reflectance distribution functions (see Section 1.1.2) on the surface.

Markov chain simulation using deterministic samples was indistinguishable from using Monte Carlo methods in a practical context as the resulting convergence rates were similar or even worse as soon as the dimension of the problem setting increases. The usage of quasi-Monte Carlo methods in Markov chain simulation could not be successfully applied as a result.

The idea of improving the simultaneous simulation of Markov chains with quasi-Monte Carlo methods by an intermediate sorting step was originally introduced in the field of quasi-Monte Carlo methods. This idea was then used and refined by others to solve the heat equation on a grid, and recently extended to incorporate randomized versions of the technique and splitting for rare event simulation. In addition, independent research, but in a way related to the above approaches, has been conducted by in the field of computer graphics.

In the following discussion, the deterministic version of the scheme will be analyzed and simplified. The derivation the technique is taken from the art. The results give practical insight, when and why the scheme is superior to approaches without sorting and how to implement it.

3.4.1 Analysis of a Deterministic Technique in One Dimension

A technique known in the art simultaneously simulates Markov chains on a discrete state space E with an initial distribution $\mu := (\mu_i)_{i \in E}$ and a transition matrix $P := (p_{i,j})_{i,j \in E}$. Using a (t, 2)-sequence $(x_i)_{i \in N_0}$ in base b, $N = b^m$ chains are simulated in parallel, where $X_{n,l}$ is the state of chain l time step n. Furthermore, the technique requires that for m>t the $N = b^m$ subsequent components $x_{i,l}$ form a (0, m, 1)-net in base b. As shown in the art, the technique converges if $$\forall k \in E: \sum_{l=1}^{N-1} \left| \sum_{n=1}^{k-1} p_{l+1,n} - \sum_{n=1}^{k-1} p_{l,n} \right| \leq 1 \qquad \text{Eq. (3.3)}$$

Simplification of the Algorithm

Now the Sobol' sequence $$x_l = (x_{l,1}, x_{l,2}) = (\Phi_2(l), \Phi_S(l)) \in [0,1)^2$$

will be considered, which is a (0, 2)-sequence in base b=2 and fulfills the assumptions required for the convergence condition to hold. The original Sobol' sequence is defined in the art. Also provided by the art is a simple code example for $(\Phi_2(l), \Phi_S(l))$ The simulation itself starts at time step n=0, initializing state $X_{0, \lfloor N \cdot x_{l,1} \rfloor}$ for $0 \leq l < N_2$ using $x_{l,2}$ for the realization of $\mu$. The technique then continues by sorting the states (discussed below in Section 3.4.3) and continues the chains by computing $X_{n, \lfloor N \cdot x_{(l+n \cdot N),1} \rfloor}$ using $X_{(l+n \cdot N),2}$ for $0 \leq l < N$ to realize transitions according to P. The index $$\sigma(l) := \lfloor N \cdot x_{(l+n \cdot N),1} \rfloor$$

for selecting the next state for transition in fact uses the van der Corput sequence $\phi_2$ in base 2, which is a (0, 1)-sequence and thus a sequence of (0, m, 1)-nets (see Section 3.3.2). For example choosing m=3>t=0 results in $N=2^3=8$ and $$(\lfloor 8 \cdot \phi_2(l+n \cdot 8) \rfloor)_{l=0}^7 = \{0,4,2,6,1,5,3,7\}.$$

for $n \in N_0$. Hence all indices used during the different timesteps n are in fact identical for all m Assuming uniform probabilities $$p_{i,j} = \frac{1}{|E|}$$

the convergence theorem still applies, but more important, stable sorting does not change the state order. It thus follows that in fact the index permutation can be chosen as identity without touching the convergence conditions. The same applies for selecting the initial states $X_{0,l}$ and it results the simplified, but equivalent algorithm:

n:=0
initialize $x_{0,l}$ using $x_{l,2}$ for $0 \leq l < 2^m$
loop
    sort state vector using a suitable order
    n:=n+1
    continue chain by computing $x_{n,l}$ using $\Phi_s(l+n \cdot 2^m)$ for
        $0 \leq l < 2^m$ using only the second component of the (0,2)-sequence $x_l$.

When and Why It Works

The improved convergence of the scheme, which has been observed in many applications must be caused by the structure of the samples $\Phi_S(l+n \cdot 2^m)$ used to realize the transitions of $X_{n,l}$ according to P. This can be understood by decomposing the radical inverse $$\Phi_S(l+n \cdot 2^m) = \Phi_S(l) + \frac{1}{2^m} \Phi_S(n),$$

which reveals an implicit stratification: $\phi_s(l)$ is an offset with spacing $$\frac{1}{2^m}$$

depending on the state number l, while the shift $\phi_s(n)$ is identical for all the intervals at timestep n.

Figure 34:
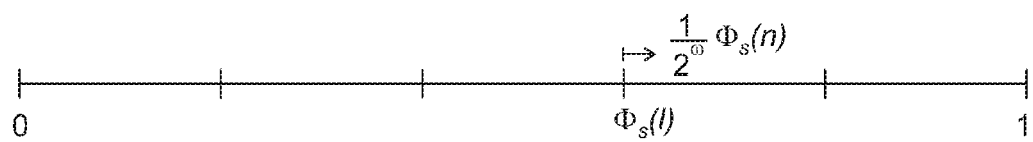
FIG. 34 is a diagram illustrating the improved convergence achieved by the described simplified deterministic technique.

FIG. 34 is a diagram that illustrates this relationship.

Here the low dimensional setting allows for a misleading interpretation of the samples being a shifted lattice or stratified samples, as the entirety of the $\Phi_S(l)$ for $l=0 \ldots 2^m-1$ in fact must be an (0, m, 1)-net and thus an equidistant set of samples.

However, the good performance stems from the property that $\phi_s(l)$ is a (t, s)-sequence and thus a sequence of (t, m', s)-nets for any m' with t≦m'≦m. This means that $b^{m'}$ states, that are similar in state space and, therefore, subsequent by order after sorting, will sample their transition by a (t, m', s)-net, which guarantees for good discrete density approximation. The maximum improvement would be obtained if all $2^m$ chains were in the same state (see FIG. 35). The more the states of the chains are separated in state space, the smaller the performance improvements will be.

Figure 35:
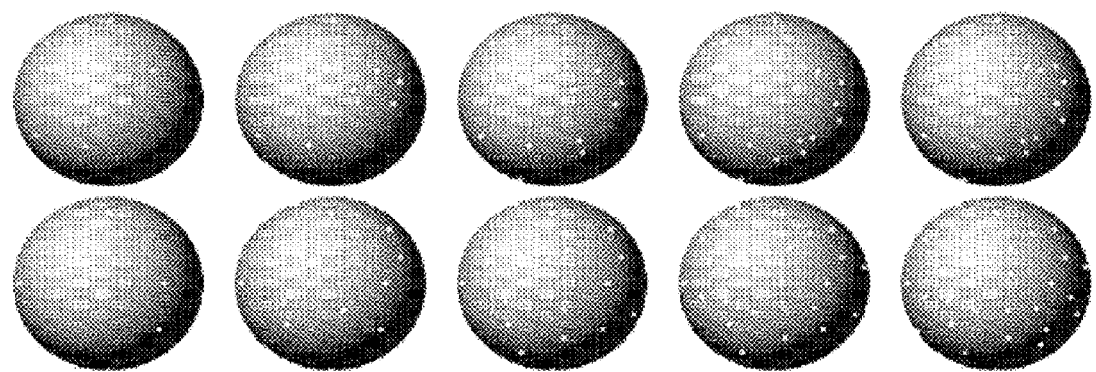
FIG. 35 is a diagram illustrating uniform sampling of the hemisphere originating in a single point, adding six successive samples at a time.

FIG. 35 is a diagram illustrating uniform sampling of the hemisphere originating in a single point, adding six successive samples at a time. Note the varying local uniform distributions when comparing random sampling (top row) versus the Halton sequence (bottom row).

3.4.2 New, Simplified Algorithm in s Dimensions

Using a (t, s)-sequence in base b, which is a sequence of (t, m, s)-nets, the scheme also works in s dimensions: Markov chains, the states of which are similar after sorting are guaranteed to sample the transition probability by low discrepancy samples. The simplified algorithm in s dimensions now looks like:

n:=0
initialize $x_{0,l}$ using quasi-Monte Carlo points $x_l$
loop
   sort state vector using a suitable order
   n := n+ 1
   continue chain by computing $x_{n,l}$ using subsequent samples $x_l$ from a (t, s)-sequence Some simulations require trajectory splitting in order to capture certain local subtle effects. While this has already been addressed in the art, it can in fact be achieved in a simpler way by just drawing more samples out of the (t, s)-sequence for states to be split.

This is a consequence of the fact that it is not even necessary to simultaneously simulate exactly $b^m$ chains. It is only important to draw subsequent samples from the (t, s)-sequence and to minimize the number $b^m$ of points in the subsequent (t, m, s)-nets in order to enable the maximal performance gain. The choice of the (t, s)-sequence, however, is restricted by the condition that (0, s)-sequences only exist for b>s and that m>t. Note that other radical inversion based points sets like the Halton sequence or its scrambled variants fulfill properties similar to (t, s)-sequences and will result in similar performance gains (see Section 3.3.2).

Randomization

While there exists no general proof for convergence of the deterministic algorithm in higher dimensions yet, the technique becomes unbiased by freshly randomizing the quasi-Monte Carlo points in each timestep n. Since this is in fact an instance of padded replications sampling as introduced in the art, the argument for unbiasedness becomes simpler. Randomization, however, deserves special attention.

The most efficient implementation along the lines of the art consists of choosing a (f, s) sequence in base b=2, from which subsequent samples are drawn, which are XOR-ed by an s-dimensional random vector. This random vector is freshly drawn after each transition step. However, as random scrambling changes the order in which the points are enumerated, the local properties of the sequences of (t, m, s)-nets are changed, too.

This observation can be taken as an explanation for some of the effects seen in the art: Sobol' and Korobov points used in the array-(R) QMC simulation are worse up to an order of magnitude in variance reduction than their transformed counterparts (Gray-code for Sobol', Baker transform for Korobov). This can be explained by the structure of the points. The sequence of (t, m, s)-nets extracted from the Sobol' sequence is locally worse than its Gray-code variant. The same goes for the Korobov lattice and its transformed variant.

While this observation did not hold for the shown experiments (comparing the standard Halton sequence and its Faure scrambled variant in FIG. 36), this may be due to the effect only becoming apparent for a really large amount of simultaneously simulated chains. (The art also provides an example where the variance reduction increases superproportionally for the scrambled variants). As the average distance of neighboring states will be decreased for an increasing number of chains, the local uniform distribution of the used QMC samples is becoming more and more important as the problem will locally be reduced to uniformly sampling a hemisphere (see FIGS. 37 and 35). FIG. 36 illustrates the change in local distribution for a subset of the Halton sequence and scrambled variants. Note that the maximum minimum distance of successive samples is increased when using Faure scrambling, while the standard Halton sequence features the worst possible distribution for successive samples. In addition, maximizing the minimum distance of successive samples over all possible subsets, the best local uniformity should be received.

FIG. 36 is a series of diagrams that compare successive samples drawn from the Halton sequences in base 7 and 31 and its Faure (see Section 3.3.1) and randomly scrambled variants. Note that the maximum minimum distance of successive samples is increased for the Faure scrambled variant.

Using scrambling techniques might be avoidable by only using sequences and point sets based on small $b_i$. As for (t, s)-sequences, the definition of (t, m, s)-nets already expresses that it is advantageous to use a small base b as it will result in a smaller t parameter for a decreasing amount of total points $b^m$, thus resulting in a full stratification for successive samples of a (t, s) sequence down to a level of ideally only b points in one subset. However, scrambling will still help to decorrelate low-dimensional projections of high-dimensional point sets (see Section 3.3.1).

This finding additionally allows the optimization of the implementation of the QMC samplers, as concentrating on base 2 sequences such as Sobol' will result in very efficient code (see Section 3.3.2).

FIG. 37 shows a series of diagrams illustrating two neighboring states and uniformly sampling their corresponding hemispheres (e.g., when using splitting techniques). As the distance of the states decreases, the uniform distribution of the combined sample sets should still be as uniform as possible. Note that the illustration can only show the projected samples, as plotting the 3-dimensional ray directions (as in FIG. 38) does not allow to spot uniform distributions as easily.

Figure 38:
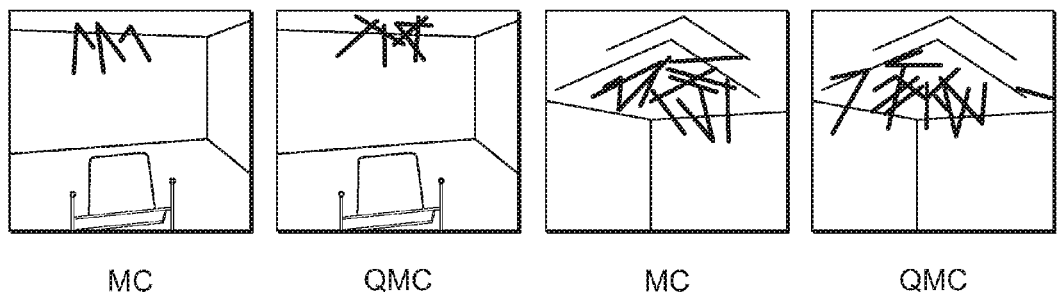
FIG. 38 shows a series of images illustrating the use of sorted QMC for higher dimensions of the Markov chain simulation.

FIG. 38 shows a series of images illustrating the use of sorted QMC for higher dimensions of the Markov chain simulation will result in the same effect as the illustrated sampling of the initial 4-dimensional particle distribution of a scene light source by QMC instead of MC: Samples will be distributed more uniformly, resulting in better stratification properties.

3.4.3 Sorting Strategies

In order to have the states as closely together as possible, they have to be enumerated in an order such that the sum of the distances of neighboring states is minimal. This in fact relates to the traveling salesman problem, where for a given set of cities and the costs of traveling from one city to another city, the cheapest round trip is sought that visits each city exactly once and then returns to the starting city.

The present problem is very similar except that it is not necessary to return from the last state of the route to the first state. Some techniques are already available to efficiently calculate approximate, but close to optimal, solutions for the traveling salesman problem. However, runtimes of these techniques are not acceptable in MC and QMC simulations, as the calculation of the distance matrix alone exhibits an $\mathcal{O}(N^2)$ complexity, while the technique should be kept as close as possible to the $\mathcal{O}(N)$ complexity of classic Monte Carlo methods.

In the following some possible orders to achieve fast sorting for high-dimensional state spaces are discussed.

Norm of State

The average complexity of quicksort is $\mathcal{O}(N \log N)$, but for certain scenarios even $\mathcal{O}(N)$ techniques exist, e.g., radix sort, which, however, requires additional temporary memory. In order to use one-dimensional sorting techniques, the multi-dimensional state must be reduced to one dimension. Amongst many choices often some norm $\|X_{n,i}\|$ is used to define an order on the state space. However, similar norms do not necessarily indicate proximity in state space. A simple example for this is similar energy of particles in a transport simulation that are located far away in space (as it is the case in symmetrical scenes like Shirley's "Scene 6."

Spatial Hierarchy

Figure 39:
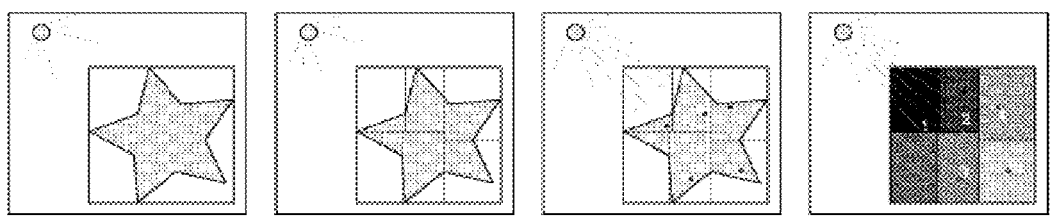
FIG. 39 shows a series of drawings illustrating the sorting of states into the leaves of a spatial hierarchy.

FIG. 39 is a series of drawings illustrating that sorting the states into the leaves of a spatial hierarchy defines an order of proximity by traversing the hierarchy in in-order.

A second possibility to enable multidimensional sorting is to use a spatial hierarchy to define an order on the states. Efficient data structures for this purpose are the BSP-tree, its specialized axis-aligned subset, the kd-tree, or bounding volume hierarchies. The construction of such binary hierarchies is simple: The space is recursively subdivided using planes selected by some heuristic (see Section 2.4). The construction runs in $\mathcal{O}(n \log n)$ on the average. Traversing the hierarchy in in-order enumerates the leaves in an order of proximity. This traversal even becomes trivial, if the tree is left-balanced and in consequence can be stored in an array.

If a spatial hierarchy must be used anyway, for example to accelerate ray tracing (as it is the case in the presently described implementation), there is no additional construction time for the hierarchy. The particles are then stored as linked lists attached to the leaves of the hierarchy (see FIG. 39). Unfortunately, the quality of this order is strongly determined by the quality of the spatial hierarchy used for simulation, which is especially problematic if the number of leaves in the hierarchy is much smaller than the number of chains N as this results in several states being mapped to the same leaf.

Still, experiments using an already present ray tracing hierarchy (kd-tree or BIH) demonstrated that the results can be comparable to using an additional bucket sort (see Section 3.4.3), as soon as the leaves of the hierarchy are small enough to only keep an average of 10 to 20 or less particles at a time. While this is obviously only the case for detailed geometry, it will allow for a complete merge of the usually separated ray tracing and sampling step at almost no additional costs.

Bucket Sorting and Space-Filling Curves

In order to guarantee linear time complexity, bucket sorting can be used. In the 5-dimensional extension of the simple technique sketched in Section 3.4.1, multidimensional states were sorted into buckets by the first dimension of the state, then the states of each bucket were sorted into buckets according to the second dimension, and so forth. This procedure works well, but has the problem that states close in state space can still be separated by the sorting procedure. In addition, a stratification of each dimension has to be used, which induces the curse of dimension in the number of Markov chains to be simulated simultaneously.

Therefore the state space is divided into equal voxels, which serve as buckets. The bucket of each state is found by truncating the state coordinates according to the resolution of the voxel grid. Note that this applies for continuous as well as discrete state spaces. Enumerating the voxels by proximity yields the desired order on the states and can be done in linear time in the number of voxels.

Orders that enumerate the voxels by proximity are given by space filling curves such as, for example, the Peano curve, Hilbert curve, or H-indexing. These curves guarantee every voxel to be visited exactly once along with an overall path length that is relatively short. For problems with large geometry, which is the case in industrial simulations, this can be even one of the few possibilities to generate fast and memory efficient approximate solutions to the traveling salesman problem. However, these curves are rather costly to evaluate, need to be tabulated to be efficient, or are not available for higher dimensions.

Fortunately, the Z-curve, also known as Lebesgue-curve or Morton order, avoids these problems. Given integer coordinates of a bucket in multidimensional space, its one dimensional Z-curve index is simply calculated by bitwise interleaving the coordinate values (see FIG. 40). This is very easy and fast to compute for any dimension and problem size, and requires no additional memory. Unfortunately, the results are not as good as for example the Hilbert-curve in a global context. However, the average case partitioning quality and average/worst case logarithmic index ranges are comparably good. Problems can arise in highly symmetrical scenes: States on the walls parallel to the (x, y)-plane will be sorted very well, but the states located on the other two walls parallel to the (y, z)-plane will be visited by the curve in an alternating manner, which can lead to correlation artifacts in some scenarios.

Figure 40:
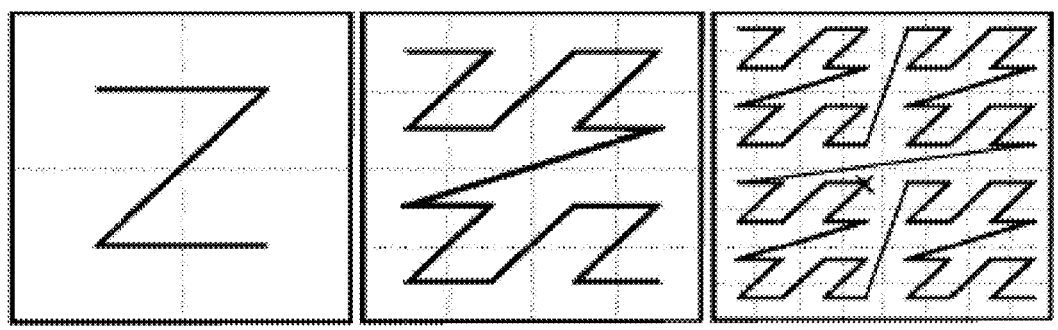
FIG. 40 illustrates the Z-curve in two dimensions for 2×2, 4×4, and 16×16 buckets.

FIG. 40 illustrates the Z-curve in two dimensions for 2×2, 4×4, and 16×16 buckets. With the origin (0, 0) top left the point marked by x has the integer coordinates (3, 4), which corresponds to $(011, 100)_2$ in the binary system. Its binary Z-curve index $100101_2$ is computed by bitwise interleaving the binary coordinates.

While the Z-curve offers an elegant and very efficient solution to enumerating the buckets, special care has to be taken when using the sorted array along with a QMC sampling technique. As the Z-curve is based on base 2 calculations, any QMC sequence that is working in the same base will result in correlations between neighboring voxels. Using real-life scenarios though, this correlation will not be as distinct anymore as it is very unlikely that each and every voxel will feature exactly one sample. Still, avoiding the same base can be achieved trivially by either using a different base for QMC sampling or defining a curve similar to the Morton ordering, but in base b>2.

On-the-Fly Sorting and Sampling

As the additional sorting step requires the temporary storage of states and thus introduces an implicit delay of a recursive Markov chain implementation (which becomes an issue when evaluating user-written recursive shaders in a rendering system), an on-the-fly solution might be preferable. Given the position of a state, it is possible to determine its Z-curve index in a fixed size regular grid by using an inverse mapping from the j-dimensional coordinates to the 1-dimensional index.

By taking this index as an estimate for the position in a sorted array, the index can directly be used to draw a sample out of a QMC sequence. Unfortunately, this technique is not even consistent as it cannot be guaranteed that all samples of the QMC sequence will be used over time due to the probability of states' positions in space (which can simply be 0 for some voxels). Additionally, using voxel sizes that will not match the distribution of the states will result in strong correlation artifacts. While it is possible to tweak the implementation, e.g., by using an additional memory block to store counters for each voxel so that each state is guaranteed to receive a unique sample, it still cannot be implemented to result in consistent behavior.

However, the presented technique can be used in simulations where each cell is guaranteed to feature at least one particle. It may also be possible to achieve an on-the-fly simulation in the context of merging the particle transport itself with the sampling, as this would allow for a direct estimation of local state distributions and remove the need for an explicit sorting step.

3.4.4 Application to Light Transport Simulation

For numerical evidence, the technique developed in the previous sections is applied to light transport simulation for synthesizing realistic images. To solve the path integral, one can think of two basic strategies, which are either using high-dimensional, low-discrepancy points or padding low-dimensional, low-discrepancy points. The latter approach fits our findings in Section 3.4.2, where high dimensional events are composed as subsequent transitions of a Markov chain. As measured in the art, the difference compared with using high-dimensional sequences for Markov chain simulations is next to none. However, using padded sequences is computationally faster and requires less implementation effort (see Section 3.3.2). It is also simpler for practitioners in the rendering industry.

In addition the low-dimensional approach allows for much better results, because the stratification properties of (t, s)-sequences or the Halton sequence and its scrambled variants are much better for small dimensions (see Section 3.4.2).

FIG. 41 is a series of drawings illustrating photon trajectories that are started from the light sources. Upon hitting a surface after tracing a ray, the bidirectional reflectance distribution function is sampled to determine a direction of scattering to continue the path.

Choosing Between a Fredholm or a Volterra Integral

The integral equation underlying light transport can be considered either as a Fredholm or Volterra integral equation, which matters for implementation.

$$L_r(x, \omega) = \int_{S^2(x)} f_r(\omega, x, \omega')L(x, \omega')(n(x)\cdot\omega')d\sigma(\omega')$$

is the radiance reflected off a surface in point x in direction ω, where the domain $S^2(x)$ of the integral operator is the hemisphere aligned to the normal n(x) in x (see the illustration in FIGS. 41 and 42). $f_r$ is the bidirectional reflectance distribution function describing the optical surface properties and L is the incident radiance. Using this integral operator results in a Volterra integral equation of the second kind, as the integration domain depends on x.

$$L_r(x, \omega) = \int_{S^2} f_r(\omega, x, \omega')L(x, \omega')\max\{-n(x)\cdot\omega', 0\}d\sigma(\omega')$$

on the other hand results in a Fredholm integral equation of the second kind, as we are integrating over all directions of the unit sphere $S^2$ independent of x.

Using the approach of generating global directions and rejecting directions with negative scalar product with respect to the surface normal n(x) is computationally attractive (for low-dimensional point sets or MC sampling), while the first approach requires the generation of directions in the hemisphere that have to be transformed into the local surface frame, which is more expensive. Mappings from the unit square to $S^2$ or $S^2(x)$ are found in the art, with some positive and negative aspects illustrated in FIG. 42.

FIG. 42 is a series of drawings illustrating one problem of considering light transport as a Volterra integral equation: Spatially neighboring states that are located on surfaces with different orientations will demand an additional transformation from the unit coordinate system to the local coordinate system, thus potentially destroying uniformity properties induced by the additional sorting step. Two possible transformations are: (a) generating samples on the unit sphere and mirroring samples that are located beneath the surface (which is computationally fast, but loses some of the uniformity properties) and (b) generating samples directly on the unit hemisphere and a transformation to the local coordinate system (which is computationally slower and loses all of the global uniformity properties). FIG. 42(c) considers light transport as a Fredholm integral equation and uses rejection sampling. This was found to offer the best tradeoff between efficient implementation and keeping full global uniformity of the samples.

An even more important argument for generating global directions is related to our approach (see Section 3.4.2): By sorting, it can happen that two close by surface points with different surface normals (e.g., in a corner) use subsequent samples of a (t, s)-sequence to generate scattering directions. Generating global directions now works fine, whereas generating directions in the two different local frames using subsequent samples will destroy the low discrepancy properties. These discontinuities become clearly visible. Using global directions, however, does not allow for importance sampling according to $f_r$ or the cosine term, which often is a major disadvantage and deserves further investigation.

Note that it may also help to incorporate surface properties into the sorting process, so states on differently oriented surfaces, but close to each other, will automatically be separated. This can be achieved by including the surface normal into the sorting step, increasing the sorted dimensions to six.

Numerical Evidence

Following the arguments in Section 3.4.2, the Halton sequence is used with permutations by Faure randomized by a Cranley-Patterson-rotation in order to have unbiased error estimates. For the sorting step, the Z-curve order (see Section 3.4.3) worked best in our setting and was used for the following experiments. Note that it was numerically verified that omitting the randomization has no notable effect on the precision of the results.

In our numerical experiments we compared four approaches to simulate Markov chains:

MC: Uniform random numbers generated by the Mersenne Twister were used for classical Monte Carlo sampling.

RQMC: Used the high-dimensional Halton sequence with permutations by Faure randomized by a Cranley-Patterson rotation, where pairs of components were used to sample the two dimensional emission and scattering events.

lo-dim RQMCS: Used the two-dimensional Halton sequence randomized by a Cranley-Patterson rotation. The Z-curve was used to enumerate the bucket-sorted states.

hi-dim RQMCS: Used the high-dimensional Halton sequence with permutations by Faure randomized by a Cranley-Patterson rotation. The Z-curve was used to enumerate the bucket-sorted states.

In a first experiment the robust global illumination technique was used to compute the path integrals. The resulting graphs depicted the RMS error to a master solution and the variance averaged over the whole image as well as the pixel-based variance. The numbers were obtained by averaging 10 independent runs for a varying number of Markov chains. The measured numbers were convincing for only the simple test scene. In the complicated cases even no performance gain over Monte Carlo sampling can be measured, because the number of independent runs is too small and more experiments were not possible due to excessive runtimes. However, the visual error tells a dramatically different story as can be seen in other examples, where a clear superiority of the new technique in even very difficult settings becomes obvious. This case is not an exception, but can be observed for many test cases. It only emphasizes that standard error measures are not appropriate error measures for visual quality, which is a known but unsolved problem in computer graphics.

Figure 43:
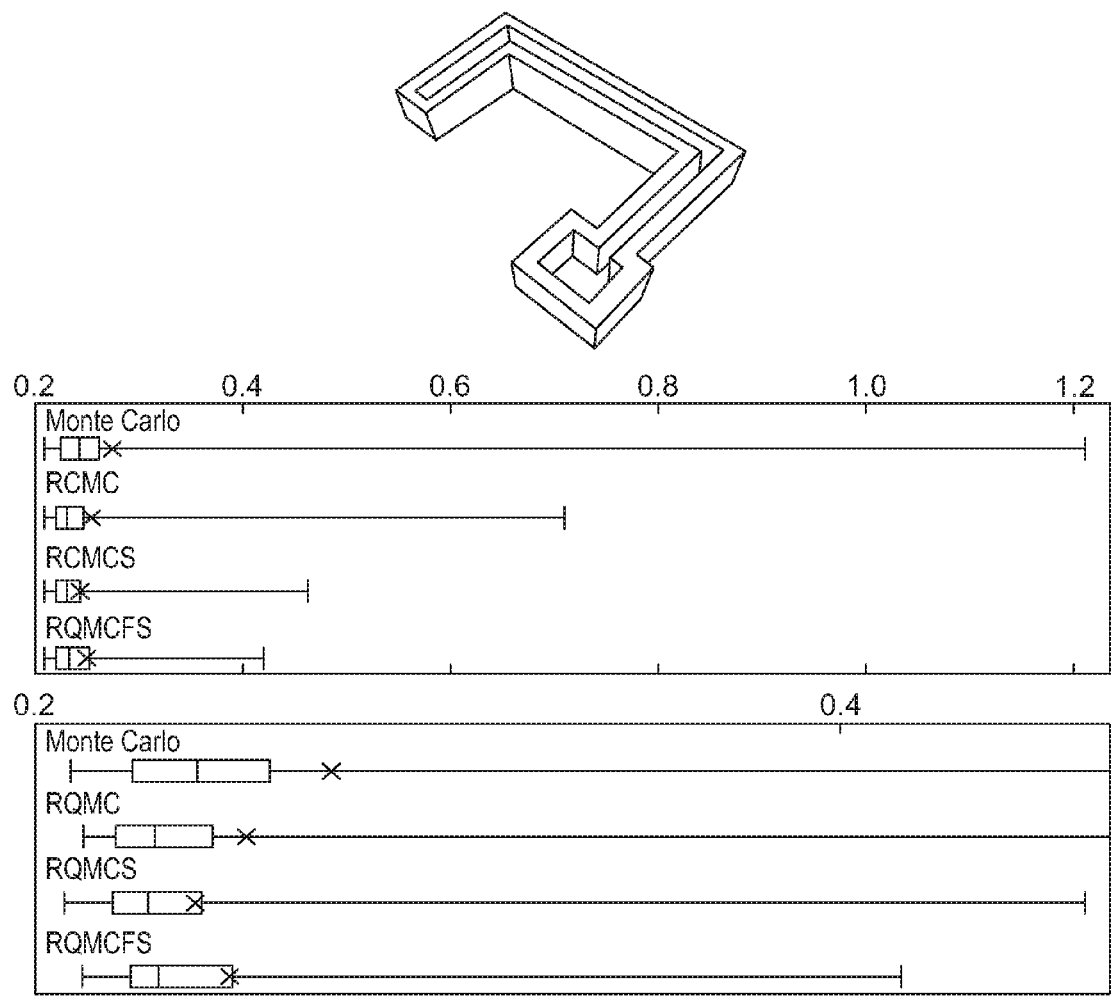
FIG. 43 illustrates a light transport problem, in which photons are traced directly from the light sources, and where their final path segment is connected to the camera.

FIG. 43 shows measurements for a very difficult light transport problem, where photons are traced directly from the light sources and their final path segment is connected to the camera (one technique of bidirectional path tracing). Opposite to the above measurements only one number of simultaneously simulated Markov chains is considered. Now a sufficient amount of experiments was computationally feasible and the superiority of the new technique became clearly visible.

3.5 Summary of Section 3

The presently described techniques for the simultaneously simulation of Markov chains were successfully streamlined, and a framework was provided as to when and why sorting the states can improve convergence, i.e., reduce the visible noise in images. In addition, the technique is no longer bounded by the curse of dimension. The restriction to homogenous Markov chains is easily removed by using transition probabilities $P \equiv P_n$ that are time dependent.

As global directions are used, i.e., an integration over product of spheres, it is also interesting to establish connections to recent research in that direction. However, an intrinsic problem of that approach is that importance sampling of BRDFs cannot be incorporated.

The numerical experiments also revealed that not all (t, s)-sequences and radical inversion based point sequences are equally good. This deserves further characterization and certainly is related to scrambling permutations (see Equation 3.1 and Section 3.3.5). Related to this, the technique could be streamlined even further if rank-1 lattice sequences could be applied. The constructions so far, however, lack the properties of (t, s)-sequences that are required for the improved performance.

FIG. 43 shows a schematic view of the labyrinth test scene, where floor and roof have been removed for illustration, two graphs, and a table. The camera is situated in the room at the bottom, while a light source is located on the other end of the connecting tunnel. The graphs show the Box-and-Whisker plots and the average amount (marked by x) of the total radiance received by the camera for 1048576 simulated light paths for 50 independent realizations using each technique. The lower graph enlarges the interesting part of the upper graph. The table finally displays the deviation from a master solution using the L1- and L2-norm (variance) for the total radiance received by the camera and received by each pixel (256×256 pixels resolution) averaged over the 50 independent realizations. In this difficult setting the new method (RQMCS (low dimensional Halton, randomized by Cranley Patterson rotation) and RQMCFS (high dimensional, Faure scrambled Halton, randomized by Cranley Patterson rotation)) is clearly superior. Note that RQMCFS, due to single but distinct outliers in one realization, features a slightly increased per pixel variance.

4. Applications and Results

This section illustrates the benefits of the research results in practical applications. Note that although the application scenario is computer graphics, the described techniques can readily be applied to other domains of scientific computing, especially transport simulation.

4.1 Compact Code: A 4 KB Demo

The ray tracing kernel based on the BIH can be implemented in such an efficient manner that it is possible to use it in a just 4 KB sized standalone executable, without having to do further size optimizations that would otherwise decrease rendering performance, limit flexibility, increase memory footprint, or decrease numerical precision. As such, the 4 KBs include the almost unchanged (on demand) ray tracing kernel that was used to ray trace all other BIH pictures and statistics in this work (except for the massive geometry, see Section 4.3 that of course needs additional disk swapping functionality).

Note that the 4 KBs additionally include a procedural generation of the geometry and the fog, two shaders (one of them approximating global illumination), picture post-processing, simple memory management, windows setup and blitting of the final picture to this window. Note that no additional libraries or data except for the standard Windows-API to open the window and handle keyboard input are utilized. The executable was released at the procedural graphics compo at the Buenzli demoparty. See the art for an introduction to the world of the demoscene.

This demonstrates the simplicity of the proposed implementation (and the included partitioning heuristics as presented in Section 2.4), while the performance is outperforming, or at least competitive with, existing (and far more complex) ray tracing engines (see provided statistics in Section 2.3.4).

4.2 Realtime Ray Tracing

To get an impression of the real life needs that games demand from a rendering engine, the Quake II game engine (originally developed and designed by id software) was used to test the ray tracing implementation with. As the complete original source code of the game is available under the GPL, this work's ray tracing kernel and some custom made shaders were incorporated into the game as an optional renderer.

Two possibilities were thought of to design the plugin: Either use the existing separation of dynamic objects and static geometry to accelerate the hierarchy construction and rendering (as non-visible geometry can be optionally pre-culled by the Quake II engine), or think of all triangles as an unordered triangle soup, thus allowing unmatched flexibility and stress testing the acceleration data structure implementation. By choosing the second option, the actual port of the engine from using a traditional rasterizing approach to real-time ray tracing is exceptionally easy, as the implementation can work on a per frame basis and as such can be fully separated from the rest of the engine:

1. All triangles of the level and the inherited objects and enemies are collected in a single array, along with textures and other material information like transparency.

2. The ray tracing kernel constructs the complete acceleration structure for the scene. Note that using an on demand policy is of course possible, but was found unnecessary due to the fast construction.

3. Rays are shot by using 8×8 shafts (see Section 2.6.2) and optionally split into 2×2 ray bundles if the applied corner ray technique to trace a shaft fails.

4. The 2×2 packets are immediately textured and shaded, and optional secondary rays are shot to include refractions, glossy reflections and point light shadows.

5. The picture is blitted and additional 2-dimensional effects like particles, HUD, and menus are rendered on top.

Note that unlike other released implementations of ray traced Quake "engines" (which in fact are only advanced level viewers), the presented ray traced version is based on the complete game code, thus the inclusion of Quake II mods, demos or even (internet) multi-player support does not pose any problem at all.

The implementation proves the superiority of the used hierarchy construction algorithm(s), as it hardly influences the performance at all (for both d-tree and the BIH), even when using a non-parallelized version on a multi-core system. The achievable frame-rate mainly depends on the overall number of rays shot (up to four per camera sample) and especially the shading calculations (involving interpolating multiple texture maps and the full per-pixel lighting for all light sources). Note that this is subject to change with modern games as the amount of (dynamic) geometry used in "next generation" titles is clearly not feasible for current ray tracing implementations, even when using specialized algorithms as presented in Sections 2.5.3 and 2.5.7.

At a resolution of 640×480, using 2×2 ray bundles only, the average performance is 11.6 fps (using the "timedemo" command on a Core2Duo 1.66 GHz) using up to 4 rays per pixel for the whole screen. Utilizing 8×8 shafts (see Section 2.6.2), the performance can be further increased.

4.3 Interactive Visualization of Massive Scenes

Using the implementation presented in Section 2.5.7, it is possible to render pictures of a fully detailed Boeing 777 mesh out of a completely unsorted triangle soup in 2-8 minutes from scratch on a single CPU. Actually, the data structure setup times that made ray tracing infamous are indeed thrashed and not only static walkthroughs of massive models, but interactive changes of the data-sets become feasible.

Additionally, it is possible to limit the memory to a user chosen value and the implementation will fall back to include disk swapping. Note that the results not even use the proposed compression scheme (see Section 2.3.3) to further reduce the necessary hard disk swapping.

Moderately complex scenes can even be constructed in realtime using a multicore system and one of the proposed parallelization schemes (see Section 2.6.4).

4.4 Realtime Photorealistic Image Synthesis

This section will demonstrate the tight coupling of accelerated ray tracing and numerical algorithms to solve the light transport equation (see Equation 1.2) by using the path integral formulation of Section 1.1.1. All efficient algorithms generate path segments from the light sources and the camera and try to connect both subpaths in order to find contributing paths. By applying the results of the previous chapter, the strategy is to first generate an ensemble of paths starting from the light sources and connect them with an array of paths starting from the camera. The goal is to deliver a high quality image in close to realtime.

4.4.1 Path Generation for the Robust Global Illumination Technique

The general class to solve light transport is bidirectional path tracing (see Section 1.1.1). The simplest unbiased algorithm of this class certainly is the Robust Global Illumination (RGI) algorithm, whose path generation will be explained in the following, and later refined to be used in combination with the simultaneous Markov chain simulation and sorted quasi-Monte Carlo of Section 3.4.

Technique

RGI is similar to the Instant Radiosity technique, but in contrast provides finite variance at unbiased results.

Starting from the light sources (partial) transport paths are generated and continued using a classical random walk technique:

Upon interaction with a material, a point light source is stored for each particle in order to be able to connect with transport paths starting from the camera later on;

New directions are sampled for each particle and the energy of a particle is changed to accompany the measurement contribution function and the probability density of the path; and Ray tracing is used to continue the paths The simulation stops as all paths have been terminated by Russian roulette.

In a second pass, the point light sources are connected with camera paths to form complete transport paths Numerically Robust Handling of the Weak Singularity As the connection of a camera path with the point light sources requires to evaluate the geometric term (see Section 1.1.1, Equation 1.7)

$$G(x \leftrightarrow y) = \frac{|\cos\theta_x||\cos\theta_y|}{\|y - x\|^2},$$

resulting in $G(x \leftrightarrow y) = \infty$ for points x and y close in space, a classic solution to prevent overmodulation due to the weak singularity, is to clip the function:

$$G'(x \leftrightarrow y) := \begin{cases} G(x \leftrightarrow y) & \text{if } G(x \leftrightarrow y) < b \\ b & \text{otherwise} \end{cases}$$

As this introduces a bias into the simulation that will result in an overall too dark image (especially for all concave geometry). The bias of the bounded version $L'(y \to z)$ is $$L(y \to z) - L'(y \to z) = \int_{\partial v} L(x \to y) f(x \to y \to z) \max\{G(x \leftrightarrow y) - b, 0\} V(x \leftrightarrow y) d\lambda(x)$$

$$= \int_{\partial v} L(x \to y) f(x \to y \to z)$$

$$\frac{\max\{G(x \leftrightarrow y) - b, 0\}}{G(x \leftrightarrow y)} G(x \leftrightarrow y) V(x \leftrightarrow y) d\lambda(x)$$

$$= \int_{S^2} L(h(y, -\omega) \to y) f(h(y, -\omega) \to y \to z) \cdot$$

$$\frac{\max\{G(h(y, -\omega) \leftrightarrow y) - b, 0\}}{G(h(y, -\omega) \leftrightarrow y)} |\cos\theta_y| d\sigma(\omega).$$

The art has proposed the usage of a correction term for cases $$G(x \leftrightarrow y) \geq b \Leftrightarrow \frac{|\cos\theta_x||\cos\theta_y|}{\|y - x\|^2} \geq b \Leftrightarrow \|y - x\| \leq \sqrt{\frac{|\cos\theta_x||\cos\theta_y|}{b}},$$

and evaluate by integration over the hemisphere instead of area. The actual implementation is fairly simple as the rays that sample the hemisphere will just recursively call the existing shader on an interaction with the intersected geometry Note that these rays can actually be bound by length $$t_{max} = \sqrt{\frac{\cos^+\theta_y}{b}},$$

thus avoiding a lot of calculations for the bias compensation as a large fraction of the shot rays actually ends in empty space. In fact this is similar to terminating the camera path by using Russian roulette. Still, the correction term will introduce additional noise to the image in regions featuring concave geometry, a common problem for brute force hemisphere sampling techniques. However, it results in a fully unbiased algorithm if using MC or RQMC sampling techniques.

4.4.2 Simultaneous Simulation of Markov Chains

As shown in the previous chapter, the noise level can be reduced by applying the simultaneous simulation of Markov chains and sorting. By using sorted QMC for the random walks, the local distribution of the point light sources is becoming more uniform, thus decreasing the "variance" of the results over standard QMC and MC techniques.

Sampling the image plane does not demand an explicit sorting step, as it is possible to directly enumerate the screen samples using the Z-curve ordering (see Section 3.4.3). To handle the scattering events for the initial random walks and the bias compensation step, the implementation utilizes a ray-front based simulation. Upon an interaction with the surfaces, the particles are resorted and subsequent QMC samples are drawn to sample the hemisphere.

Increasing Performance by Omitting Shadow Rays

To make global illumination calculations possible in close to realtime on current hardware, additional tricks must be utilized. Apart from using a hybrid solution that calculates the random walks on the CPU and the shading on optional graphics hardware, it is also possible to just use a subset of the light sources for shading, depending on a coarsely sampled estimation of the contribution to the final image. Note that the latter can be made unbiased by randomly selecting additional light sources from the whole set. Advanced techniques that incorporate more advanced estimators can be found in the art Although the mentioned algorithms can already discard a large portion of the complete set of light sources, it is possible to further decrease the number of locally used light sources by utilizing local estimators. Related to proposals found in the art, the set of light sources is sorted by the contribution they add to a single sample of the image. So instead of connecting the sample to the complete set of light sources, only x point lights with the largest contributions are taken into account. The introduced bias can optionally be removed by adding additional randomly picked light sources. Note that discarding of the shadow rays will usually still result in comparable images but at a fraction of the rendering time.

4.4.3 Photon Mapping by Trajectory Splitting in the RGI Algorithm

All bidirectional path tracing algorithms suffer the problem of insufficient techniques, i.e., paths that are difficult to generate. To support the generation and evaluation of such light transport paths, it is possible to add biased techniques, such as photon maps, to the RGI implementation. Unlike the original algorithm though, separate photon maps are generated at each vertex of the initial random walk paths by splitting the path into N new subpaths. The new photons are then used to only simulate scattering along highly glossy and refractive surfaces, as the more diffuse effects are perfectly captured by the RGI algorithm already, resulting in a drastic decrease of memory usage and construction time of the smaller photon map. Incorporating the sorted quasi-Monte Carlo method is actually fairly easy (see Section 3.4.2), as one can simply draw more samples out of the utilized (t, s)-sequence for the split subpaths. Optionally, it is also possible to use a stratified point set (such as rank-1 lattices as in Section 3.3.3) for the sampling of the hemisphere at path-vertices to be split (which in fact is very similar to the principle of using shadow maps), which further enhances the local uniformity of path space sampling.

In addition, an optimized variant could be thought of that uses importance sampling to prefer regions of the hemisphere where highly glossy and refractive surfaces are likely to be expected.

Although the inclusion of photon maps is rather easy and produces nice results in little additional time, it must be noted that using only few paths for the initial random walk (like it is the case for realtime and interactive visualizations) results in distinct artifacts in the caustics, an effect once again similar to shadow maps, which also suffers from undersampling in the form of aliasing and thus shadowing artifacts. Still, accumulating over multiple frames is possible and the caustic artifacts will vanish.

4.5 Interactive Car Visualization

While it is possible to easily SIMD optimize shaders and even the whole framework for a fixed function rendering engine like Quake II, this is clearly not possible anymore for user defined recursive shaders. While there has been a proposal on automatic recompiling of shaders to incorporate SIMD tracing and partially SIMD shading recently, the freedom for shader writers is clearly decreased, thus making it impractical for professional off-line rendering packages.

Also note, that rendering times are not relying by 80-95 percent on ray tracing anymore, but are almost on par with the involved shading calculations, especially when using complex analytic BRDF models like the Ashikhmin-Shirley model or measured BRDF data (see Section 1.1.2), which are additionally hard to optimize using SIMD opcodes. This ratio is shifted even more when incorporating currently popular shaft tracing techniques to accelerate primary rays and some of the secondary effects.

While high quality, straight forward solutions to visualize a car lit from a HDRI environment map take several minutes to get a more or less noise and artifact free picture, a custom shader, designed especially for car visualization, can deliver comparable results within seconds.

The implementation is based on path tracing, but uses adaptive splitting to reduce noise, and ambient occlusion to approximate global illumination effects inside the car and for the shadowing on the geometrically not existing ground.

By using the Halton points to uniformly distribute samples over the whole screen (accompanied by a Z-curve ordering (see Section 3.4.3) of the samples to increase coherency), aliasing can be reduced more efficiently but at the price of additional memory necessary for tabulation. Additionally, the simulation features multi-pass rendering utilizing QMC sequences for sampling to deliver a fast realtime preview. On no user interaction, the image is automatically refined without discarding the samples of the preview.

Optionally the simulation can use sorted QMC sampling (see Section 3.4.2), however, it must be noted that the additional sorting step only becomes valuable when using multiple samples per pixel. Otherwise the performance decrease due to the additional sorting step outweighs the perceptual noise reduction as seen in Section 3.4.4.

Estimating the pixel value by using a box filter to integrate the samples can optionally be replaced by a higher order approximation of the Gauss filter, incorporating tone mapping and an optional bloom filter to allow bright spots in the picture to distribute energy onto surrounding pixels. Note that the last steps should obviously be omitted if storing HDR pictures. While bloom and glow filters are commonly used in current game engines to increase "realism", most photorealistic renderings will look worse. The reason can be found in the psychological effect of the uncanny valley: While slightly realistic renderings can often be tweaked to look more realistic by simple filter operations, a full physically based simulation demands high quality, locally adaptive tone mapping to preserve realism. With the possibly upcoming broad usage of high dynamic range displays this problem will solve itself in the future, though.

An additional problem of using floating point based BRDFs, HDRIs, and image buffers for the simulation is the drastically increased memory usage. While a block based quantization similar to texture compression found on graphics hardware is an option, it will at the same time increase rendering time as the decompression must be done in software. A simple way to cut down memory requirements to one-third without removing too much precision for floating point colors is the use of the RGBE format. The simple scheme did not reduce the rendering performance at all, as the additional operations are outweighed by reduced cache thrashing and less memory transfers.

While using a simple Phong based BRDF model in combination with a Fresnel approximation seems like a valid option to decrease the memory usage, the price paid for the image quality disqualifies this solution for commercial usage.

Note that a common problem for physically correct simulations that must use HDRI environment maps to light a scene is the wrong energy of bright spots (like the sun) in the map. As the dynamic range of the measurements is limited by the currently available hardware, bright spots are implicitly darkened and as such the overall energy is reduced. This results in scene geometry looking "too dark" when compared to the surrounding environment map. This can only be "solved" by breaking with the rule of physically correctness and thus energy conserving BRDFs, so the materials will distribute more energy into the camera.

4.5.1 Example: Car

Although the presented application already delivers convincing results, a true simulation poses more demands on the underlying geometry and the rendering methods.

Free Form Surfaces: To avoid artifacts in reflection, refraction and shadowing (see Section 2.1.3), full floating point precision ray tracing of the original CAD data set is necessary. One step in that direction was presented in the art.

Coating and Sparkles: The coating of a car is usually varying in structure and thickness along with additional microfacet effects that become visible upon close inspection. The simulation of such effects can hardly be simulated by only using additional procedural bump/normal maps.

Some car coatings even contain particles that must be either fully simulated by micro geometry or more commonly approximated by simple techniques.

An even bigger problem is the simulation of spectral variations in the coating (ranging from subtle color variations to a full flip-flop effect), as these demand an increase in the amount of samples due to the multiple wavelength simulation and increased memory usage due to bloated BRDF data.

Polarization: A subtle, but necessary effect to simulate is the change of polarization of light. This will become visible especially on the reflections on the car glass. Simulating polarization generally demands more samples and results in vastly increased computation.

Exponential Ray Tree: Visualizing the headlight of a car will result in an exponential increase in the number of rays due to the nature of the shading tree that induces several rays on each interaction with a material. By omitting such splitting techniques, additional noise will be introduced to the image.

Fast Global Illumination: Simulating transport paths that pass through the car glass, bounce in the inside, back through the car glass and into the camera lens, is a very difficult setting for every sampling based renderer. The only algorithms capable to visualize correct and unbiased images are full path tracing techniques, resulting in extremely long render times, as these paths are difficult to generate. While photon mapping can decrease the rendering time, it also introduces a bias into the calculations and features additional memory usage. In addition, precision problems due to ignoring topology (especially at corners) are introduced.

Having described various novel aspects of the present invention, there is next presented a description of a digital processing environment in which aspects of the invention can be implemented. (See, e.g., U.S. patent application Ser. No. 11/474,517, which is incorporated herein by reference.)

5. Digital Processing Environment Efficient Construction of Acceleration Data Structures There is now provided a description of a digital processing environment in which aspects of the invention can be implemented. There is further provided a description of methods, structures, and systems in accordance with ray tracing techniques, in particular with respect to the efficient construction of acceleration data structures useful for fast ray tracing.

Digital Processing Environment in which Invention can be Implemented

Figure 44:
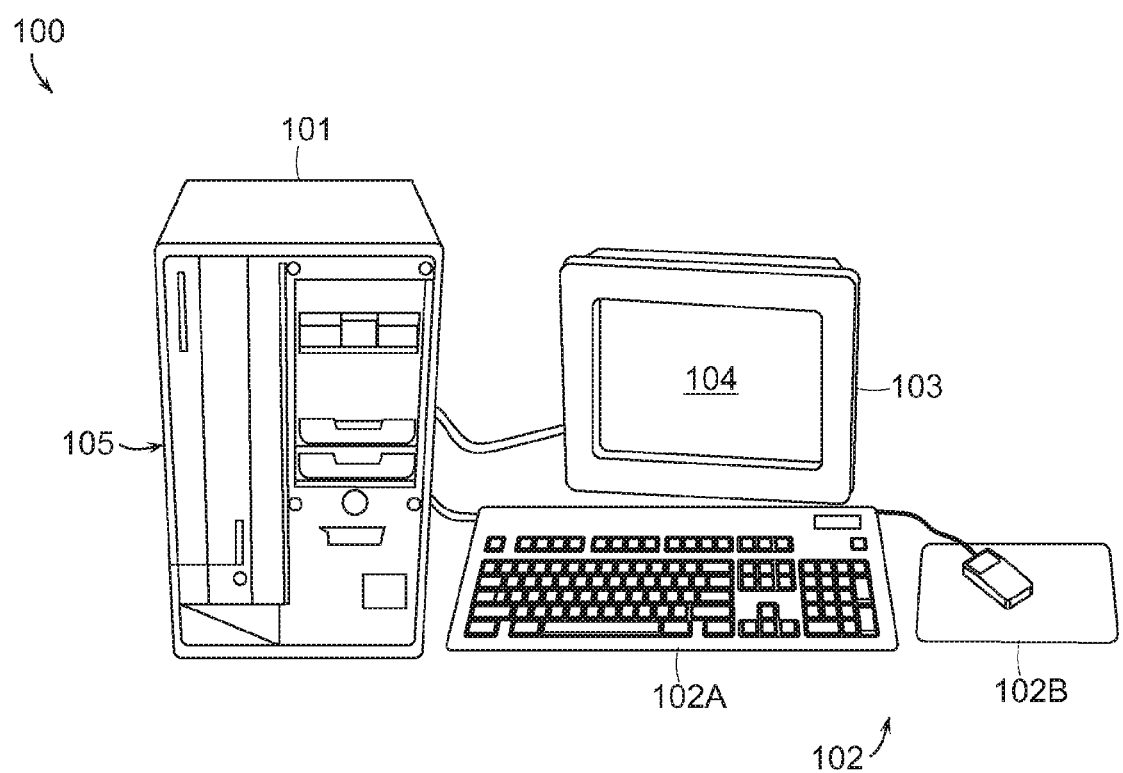
FIGS. 44, 45A and 45B are a series of schematic diagrams illustrating a suitable digital processing environment for use in practice various described aspects of the present invention.
Figure 45A:
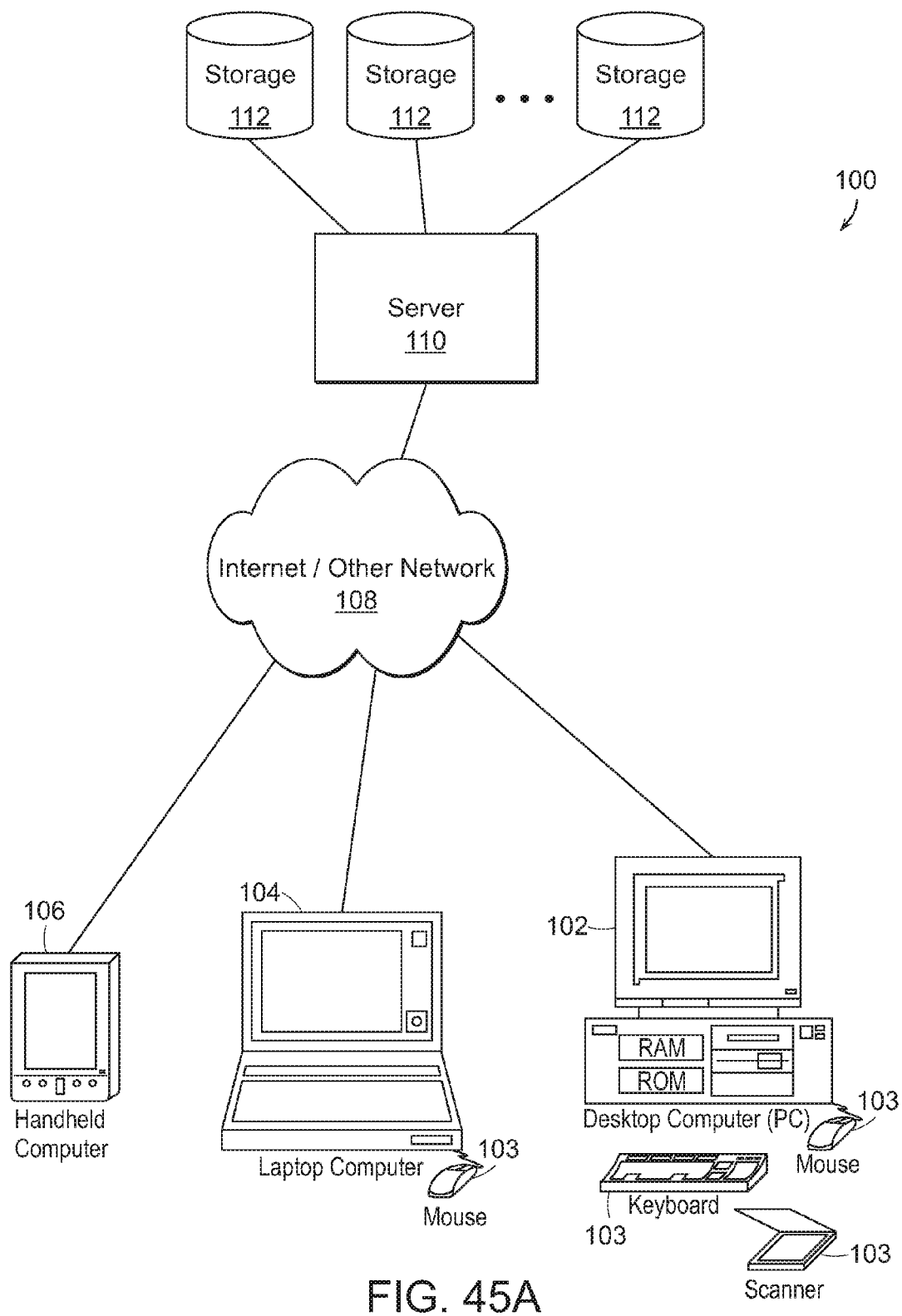
Figure 45B:
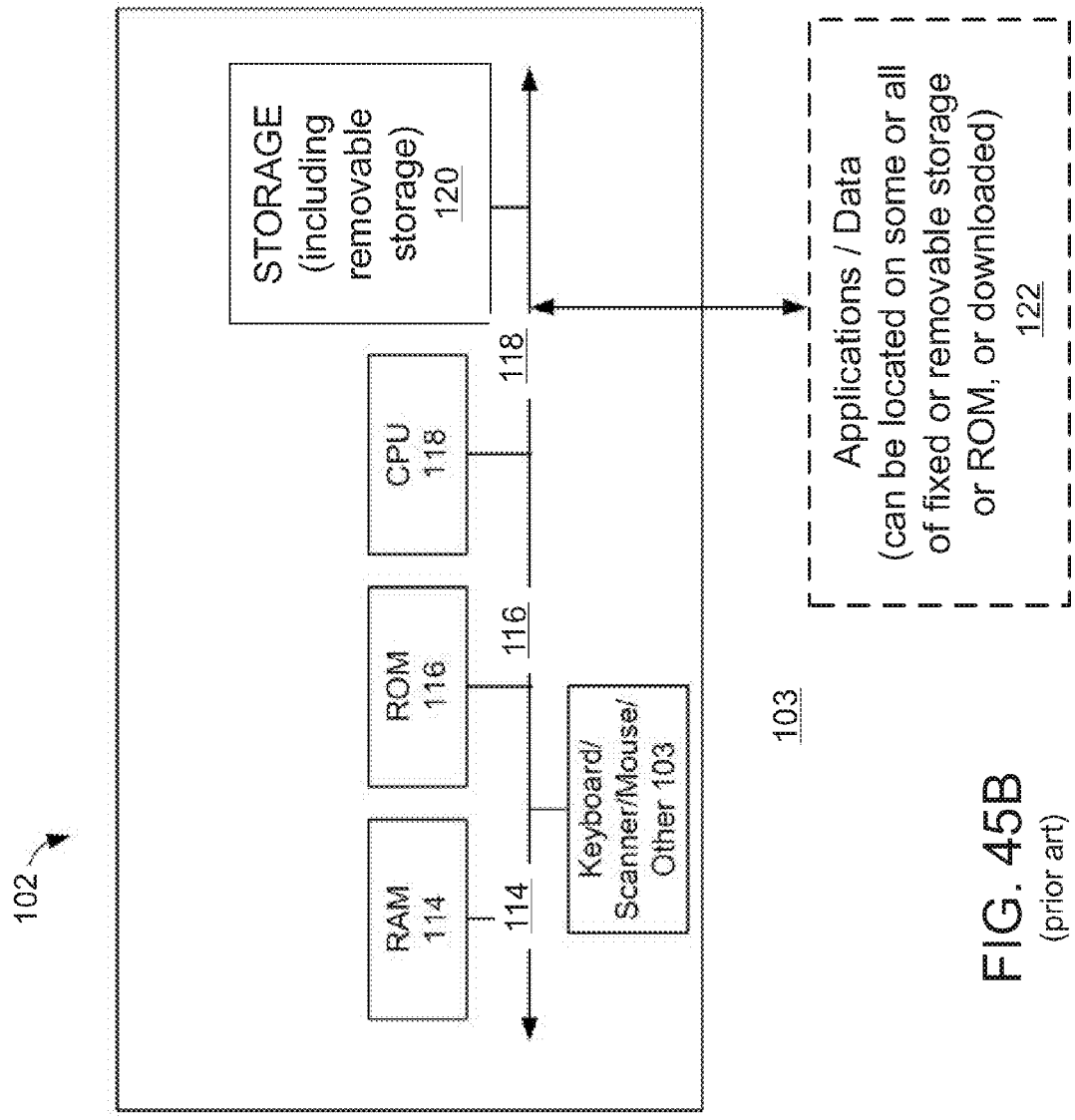

The following is a discussion, to be read in connection with FIGS. 44 and 45A-45B, of typical, relatively conventional digital processing structures and environments in which the above-described invention may be implemented and practiced.

It will be understood by those skilled in the art that the present invention, as described above, provides methods, systems, devices and computer program products that enable the creation of the appearance of rounded corners and edges and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The previous detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 44 attached hereto depicts an illustrative computer system 100 that can carry out such computer graphics processes. With reference to FIG. 44, the computer system 100 in one embodiment includes a processor module 101 and operator interface elements comprising operator input components such as a keyboard 102A and/or a mouse 102D (or digitizing tablet or other analogous element(s), generally identified as operator input elements) 102) and an operator output element such as a video display device 103. The illustrative computer system 100 can be of a conventional stored-program computer architecture. The processor module 101 can include, for example, one or more processor, memory and mass storage devices, such as disk and/or tape storage elements (not separately shown), which perform processing and storage operations in connection with digital data provided thereto. The operator input element(s) 102 can be provided to permit an operator to input information for processing. The video display device 103 can be provided to display output information generated by the processor module 101 on a screen 104 to the operator, including data that the operator may input for processing, information that the operator may input to control processing, as well as information generated during processing. The processor module 101 can generate information for display by the video display device 103 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and/or stored on a computer readable medium, whether that medium is fixed or removable, permanent or erasable, or otherwise. As noted, for example, in block 122 of the schematic block diagram of FIG. 45B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 100 is shown as comprising particular components, such as the keyboard 102a and mouse 102b for receiving input information from an operator, and a video display device 103 for displaying output information to the operator, it will be appreciated that the computer system 100 may include a variety of components in addition to or instead of those depicted in FIG. 11.

In addition, the processor module 101 can include one or more network ports, generally identified by reference numeral 105, which are connected to communication links which connect the computer system 100 in a computer network The network ports enable the computer system 100 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system 100 shown in the drawings, methods, devices or software products in accordance with the present invention can operate on any of a wide range of conventional computing devices and systems, such as those depicted by way of example in FIGS. 45A and 45B (e.g., network system 100), whether standalone, networked, portable or fixed, including conventional PCs 102, laptops 104, handheld or mobile computers 106, or across the Internet or other networks 108, which may in turn include servers 110 and storage 112.

In line with conventional computer software and hardware practice, a software application configured in accordance with the invention can operate within, e.g., a PC 102 like that shown in FIGS. 45A-45B, in which program instructions can be read from ROM or CD-ROM 116 (FIG. 45B), magnetic disk or other storage 120 and loaded into RAM 114 for execution by CPU 118. Data can be input into the system via any known device or means, including a conventional keyboard, scanner, mouse, digitizing tablet, or other elements 103. As shown in FIG. 45B, the depicted storage 120 includes removable storage. As further shown in FIG. 45B, applications and data 122 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention, as discussed herein.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts are not necessarily part of the present invention, and their selection can be left to the implementer.

Efficient Construction of Acceleration Data Structures

Figure 46:
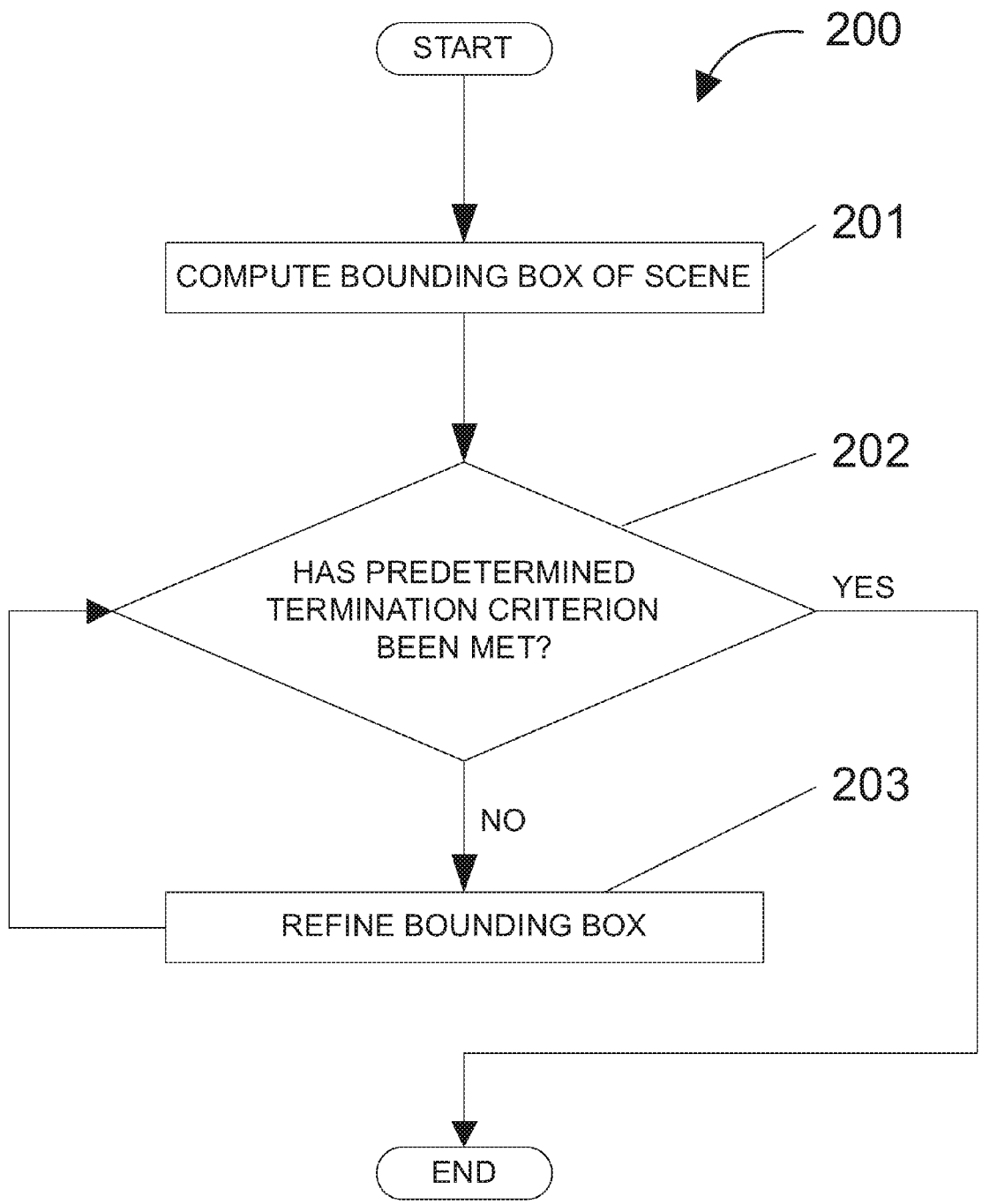
FIG. 46 is a diagram illustrating an overall method in accordance with a first aspect of the present invention.

FIG. 46 is a diagram depicting an overall method 200 in accordance with an aspect of the present invention. The method is practiced in the context of a computer graphics system, in which a pixel value is generated for each pixel in an image. Each generated pixel value is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction (or from the scene into the pixel), and further includes calculations of the intersections of rays and objects (and/or surfaces of objects) in the scene.

In the FIG. 46 method 200, bounding volume hierarchies are used to calculate the intersections of rays and surfaces in the scene. In step 201, a bounding box of a scene is computed. In step 202, it is determined whether a predetermined termination criterion is met. If not, then in step 203 the axis-aligned bounding box is refined. The process continues recursively until the termination criterion is met. According to an aspect of the invention, the termination criterion is defined as a condition at which the bounding box coordinates differ only in one unit of resolution from a floating point representation of the ray/surface intersection point. However, the scope of the present invention extends to other termination criteria.

The use of bounding volume hierarchies as an acceleration structure is advantageous for a number of reasons. The memory requirements for bounding volume hierarchies can be linearly bounded in the number of objects to be ray traced. Also, as described below, bounding volume hierarchies can be constructed much more efficiently than 3D-trees, which makes them very suitable for an amortized analysis, as required for fully animated scenes.

Figure 47:
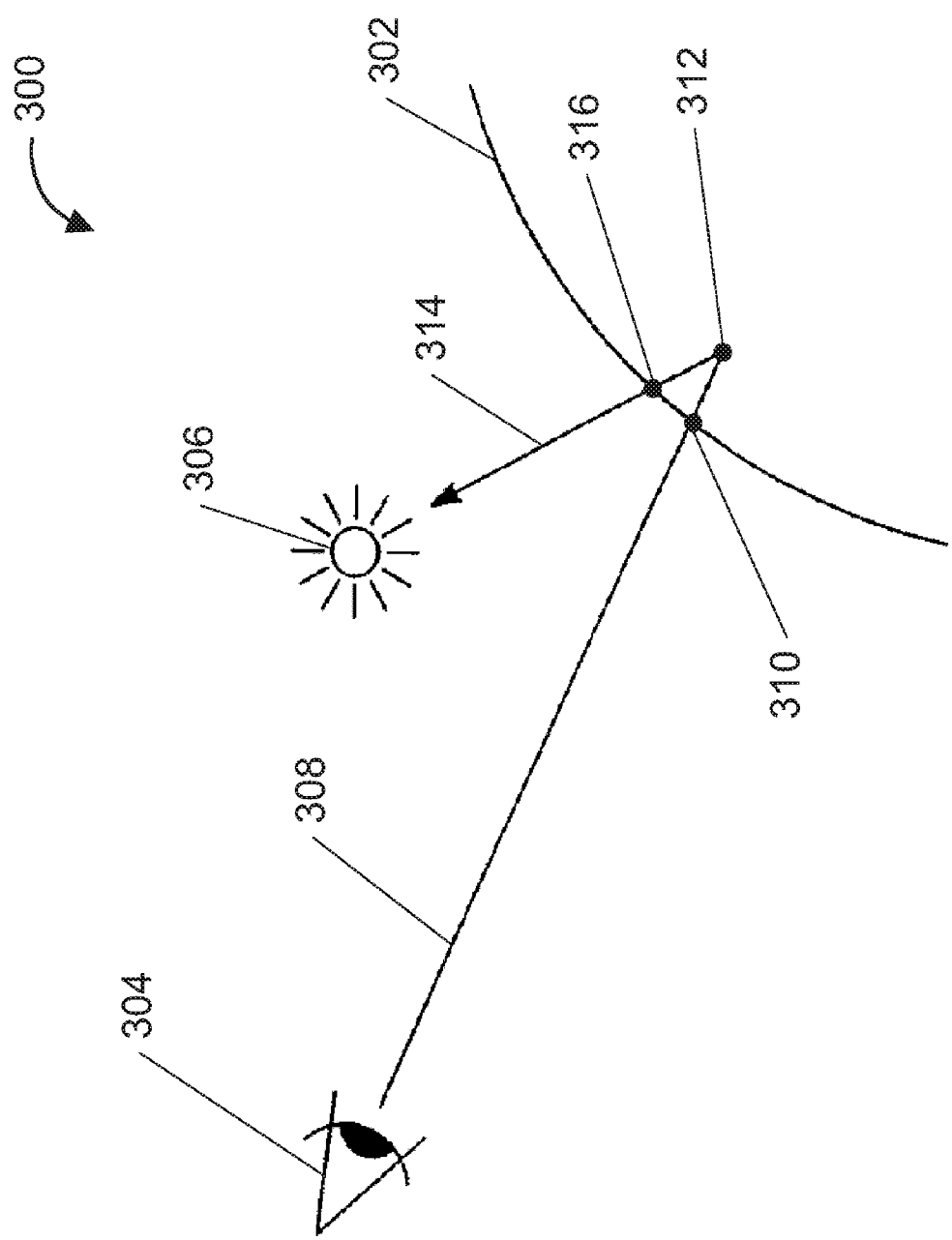
FIG. 47 is diagram of a ray tracing procedure, illustrating the problem of self-intersection.

The following discussion describes in greater detail certain issues in ray tracing technology, and particular aspects of the invention that address those issues. FIG. 47 is a diagram illustrating the "self-intersection" problem. FIG. 47 shows a ray tracing procedure 300, including an image surface 302, an observation point 304, and a light source 306. In order to synthesize an image of the surface, a series of computations are performed in order to locate rays extending between the observation point 304 and the surface 302. FIG. 47 shows one such ray 308. Ideally, there is then calculated the exact point of intersection 310 between the ray 308 and the surface 302.

However, due to floating point arithmetic computations on computers, it is sometimes possible for the calculated ray/surface intersection point 312 to be different from the actual intersection point 310. Further, as illustrated in FIG. 47, it is possible for the calculated point 312 to be located on the "wrong" side of the surface 302. In that case, when computations are performed to locate a secondary ray 314 extending from the calculated ray/surface intersection point 312 to the light source 306, these computations indicate that the secondary ray 314 hits the surface 302 at a second intersection point 316 rather than extending directly to the light source 306, thus resulting in an imaging error.

One known solution to the self-intersection problem is to start each ray 308 at a safe distance from the surface 302. This safe distance is typically expressed as a global floating point $\epsilon$. However, the determination of the global floating point $\epsilon$ depends heavily on the scene, and the particular location within the scene itself, for which an image is being synthesized.

An aspect of the invention provides a more precise alternative. After arriving at a calculated ray/surface intersection point 312, the calculated point 312 and the direction of the ray 308 are then used to re-compute an intersection point that is closer to the actual intersection point 310. This re-computation of the intersection point is incorporated into the ray tracing technique as an iteration that increases precision. If the iteratively computed intersection point turns out to be on the "wrong" side of the surface 302, it is moved to the "correct" side of the surface 302. The iteratively computed intersection point can be moved along the surface normal, or along the axis determined by the longest component of the normal. Instead of using a global floating point $\epsilon$, the point is moved by an integer $\epsilon$ to the last bits of the floating point mantissas.

The described procedure avoids computations in double precision and has the advantage that it implicitly adapts to the scale of the floating point number, which is determined by its exponent. Thus, in this implementation, all secondary rays directly start from these modified points making an $\epsilon$-offset unnecessary. During intersection computation, it can therefore be assumed that the ray interval of validity to begin at 0 rather than some offset (excluding 0 from the interval, as explained hereinbelow).

Modifying the integer representation of the mantissa also avoids numerical problems when intersecting a triangle and a plane in order to decide which points are on what side.

Exploiting the convex hull property of convex combinations, intersections of rays and freeform surfaces can be found by refining an axis-aligned bounding box, which contains the point of intersection nearest to the ray origin. This refinement can be continued until the resolution of floating point numbers is reached, i.e., until the bounding box coordinates differ only in one unit of resolution from the floating point representation. The self-intersection problem then is avoided by selecting the bounding box corner that is closest to the surface normal in the center of the bounding box. This corner point then is used to start the secondary ray. This "ray object intersection test" is very efficient and benefits from the avoidance of the self-intersection problem.

After constructing the acceleration data structure, the triangles are transformed in-place. The new representation encodes degenerate triangles so that the intersection test can handle them without extra effort. It of course is also possible to just prevent degenerate triangles to enter the graphics pipeline.

The test first determines the intersection of the ray and the plane of the triangle and then excludes intersections outside the valid interval [0, result.tfar] on the ray. This is achieved by only one integer test. Note that the +0 is excluded from the valid interval. This is important if denormalized floating point numbers are not supported. If this first determination is successful, the test proceeds by computing the Barycentric coordinates of the intersection. Note that again only an integer test, i.e., more specifically only testing two bits, is required to perform the complete inclusion test. Thus the number of branches is minimal. In order to enable this efficient test, the edges and the normal of the triangle are scaled appropriately in the transformation step.

The precision of the test is sufficient to avoid wrong or missed ray intersections. However, during traversal situations may occur in which it is appropriate to extend the triangles for a robust intersection test. This can be done before transforming the triangles. Since the triangles are projected along the axis identified by the longest component of their normal, this projection case has to be stored. This is achieved by counters in the leaf nodes of the acceleration data structure: The triangle references are sorted by the projection case and a leaf contains a byte for the number of triangles in each class.

A further aspect of the present invention provides an improved approach for constructing acceleration data structures for ray tracing. Compared with prior software implementations that follow a number of different optimizations, the approach described herein yields significantly flatter trees with superior ray tracing performance.

Candidates for splitting planes are given by the coordinates of the triangle vertices inside the axis-aligned bounding box to be partitioned. Note that this includes vertices that actually lie outside the bounding box, but have at least one coordinate that lies in one of the three intervals defined by the bounding box. Out of these candidates, there is selected the plane closest to middle of the longest side of the current axis-aligned bounding box. A further optimization selects only coordinates of triangles whose longest component of the surface normal matches the normal of the potential splitting plane. This procedure yields much flatter trees, since placing splitting planes through the triangle vertices implicitly reduces the number of triangles split by splitting planes. In addition, the surface is approximated tightly and empty space is maximized. If the number of triangles is higher than a specified threshold and there are no more candidates for splitting planes, the box is split in the middle along its longest side. This avoids inefficiencies of other approaches, including the use, for example, of long diagonal objects.

The recursive procedure of deciding which triangles belong to the left and right child of a node in the hierarchy has typically required extensive bookkeeping and memory allocation. There is a much simpler approach that only fails in exceptional cases. Only two arrays of references to the objects to be ray traced are allocated. The first array is initialized with the object references. During recursive space partition, a stack of the elements on the left is grown from the beginning of the array, while the elements, which are classified right, are kept on a stack growing from the end of the array towards the middle. In order to be able to quickly restore the elements that are intersecting a split plane, i.e., are both left and right, the second array keeps a stack of them. Thus backtracking is efficient and simple.

Instead of pruning branches of the tree by using the surface area heuristic, tree depth is pruned by approximately left-balancing the binary space partition starting from a fixed depth. As observed by exhaustive experimentation, a global fixed depth parameter can be specified across a vast variety of scenes. This can be understood by observing that after a certain amount of binary space partitions usually there remain connected components that are relatively flat in space.

Using bounding volume hierarchies, each object to be ray traced is referenced exactly once. As a consequence, and in contrast with 3D-trees, no mailbox mechanisms are required to prevent the multiple intersection of an object with a ray during the traversal of the hierarchy. This is a significant advantage from the viewpoint of system performance and makes implementations on a shared memory system much simpler. A second important consequence is that there cannot be more inner nodes in the tree of a bounding volume hierarchy than the total number of objects to be ray-traced. Thus the memory footprint of the acceleration data structure can be linearly bounded in the number of objects before construction. Such an a priori bound is not available for the construction of a 3D-tree, where the memory complexity is expected to increase quadratically with the number of objects to be ray-traced.

Thus, there is now described a new concept of bounding volume hierarchies that are significantly faster than current 3D-tree ray tracing techniques, and in which the memory requirements grow linearly, rather than expected quadratically, with the number of objects to be ray-traced. The core concept that allows bounding volume hierarchies to outperform 3D-trees is to focus on how space can be partitioned, rather than focusing on the bounding volumes themselves.

Figure 48:
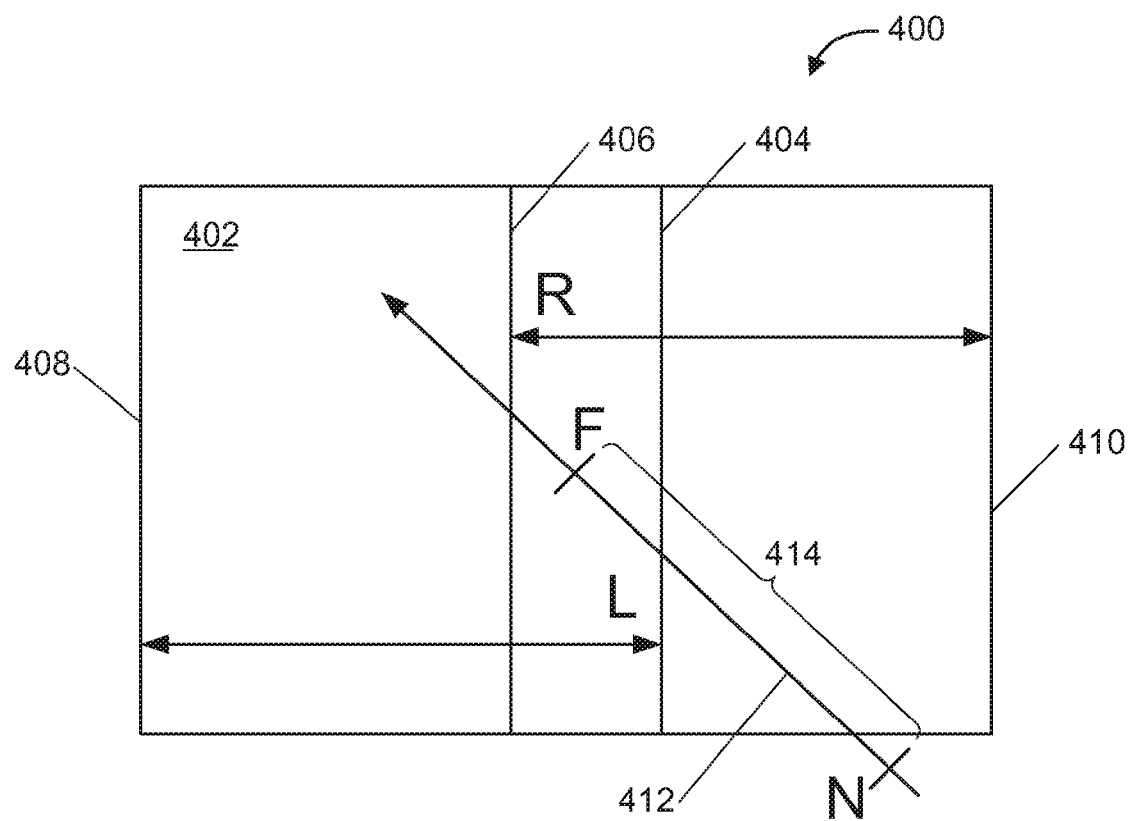
FIG. 48 shows a diagram, in elevation view, of a partitioned axis-aligned bounding box that is used as an acceleration data structure in accordance with a further aspect of the invention.

In a 3D-tree, a bounding box is partitioned by a single plane. According to the present aspect of the invention, two parallel planes are used to define two axis-aligned bounding boxes. FIG. 48 is a diagram illustrating the principal data structure 400.

FIG. 48 shows an axis-aligned bounding box 402, in elevation view. An L-plane 402 and an R-plane 404, which are axis-aligned and parallel with each other, are used to partition bounding box 402 into left and right axis-aligned bounding box. The left bounding box extends from the left wall 406 of the original bounding box 402 to the L-plane 402. The right bounding box extends from the R-plane 404 to the right wall 408 of the original bounding box 402. Thus, the left and right bounding boxes may overlap each other. The traversal of ray 412 is determined by the positions of intersection with the L- and R-planes 402 and 404 relative to the interval of validity [N, F] 412 of the ray 410.

In the FIG. 48 data structure 400, the L- and R-planes 402 and 404 are positioned with respect to each other to partition the set of objects contained within the original bounding box 402, rather than the space contained within the bounding box 402. In contrast with a 3D-tree partition, having two planes offers the possibility of maximizing the empty space between the two planes. Consequently the boundary of the scene can be approximated much faster.

Figure 49:
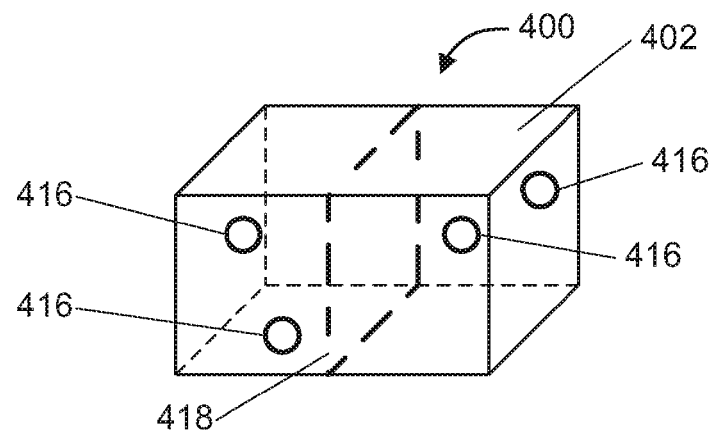

FIGS. 49-51 are a series of three-dimensional diagrams further illustrating data structure 400. FIG. 49 shows a diagram of bounding box 402. For purposes of illustration, virtual objects within bounding box 402 are depicted as abstract circles 416. As shown in FIGS. 50 and 51, L-plane 404 and R-plane 406 are then used to partition bounding box 402 into a left bounding box 402a and a right bounding box 402b. The L- and R-planes are selected such that the empty space between them is maximized. Each virtual object 416 ends up in either the left bounding box 402a or the right bounding box 402b. As shown at the bottom of FIG. 51, the virtual objects 416 are partitioned into "left" objects 416a and "right" objects 416b. Each of the resulting bounding boxes 402a and 402b are themselves partitioned, and so on, until a termination criterion has been satisfied.

Figure 52:
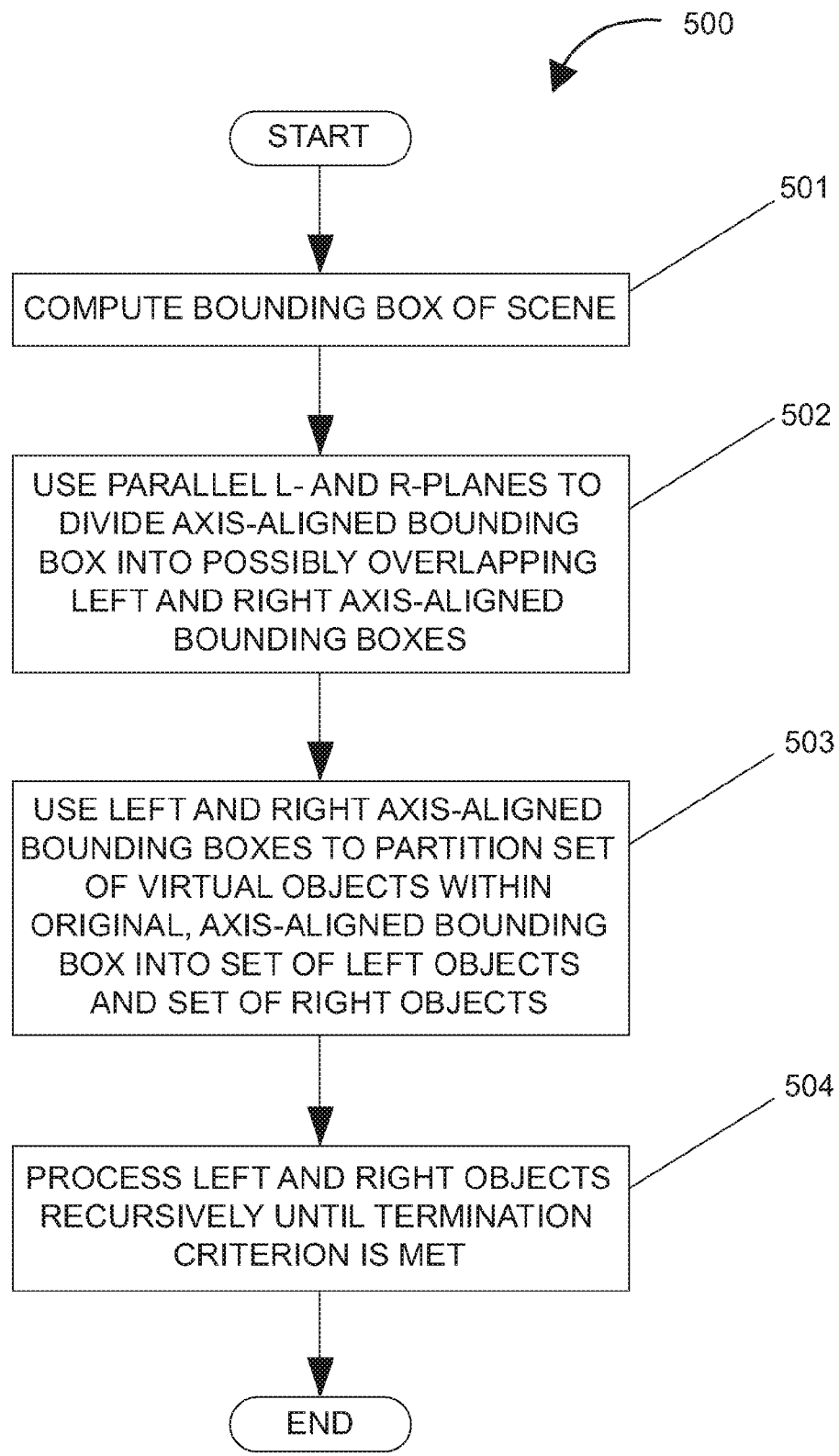
FIGS. 52 and 53 are flowcharts of ray tracing methods providing efficient construction of data acceleration structures.

FIG. 52 is a flowchart of the described method 500. In step 501, a bounding box of a scene is computed. In step 502, parallel L- and R-planes are used to partition the axis-aligned bounding box left and right axis-aligned bounding boxes, which may overlap. In step 503, the left and right bounding boxes are used to partition the set of virtual objects contained with the original axis-aligned bounding box into a set of left objects and a set of right objects. In step 504, the left and right objects are processed recursively until a termination criterion is met.

Instead of one split parameter, used in earlier implementations, two split parameters are stored within a node. Since the number of nodes is linearly bounded by the number of objects to be ray traced, an array of all nodes can be allocated once. Thus, the costly memory management of 3D-trees during construction becomes unnecessary.

The construction technique is much simpler than the analog for 3D-tree construction and is easily implemented in a recursive way, or by using an iterative version and a stack. Given a list of objects and an axis-aligned bounding box, the L- and R-planes are determined, and the set of objects is determined accordingly. The left and right objects are then processed recursively until some termination criterion is met. Since the number of inner nodes is bounded, it is safe to rely on termination when there is only one object left.

It should be noted that the partition only relies on sorting objects along planes that are perpendicular to the x-, y-, and z-axes, which is very efficient and numerically absolutely stable. In contrast with 3D-trees, no exact intersections of objects with splitting planes need to be computed, which is more costly and hard to achieve in a numerically robust way. Numerical problems of 3D-trees, such as missed triangles at vertices and along edges, can be avoided by extending the triangles before the construction of the bounding volume hierarchy. Also, in a 3D-tree, overlapping objects have to be sorted both into the left and right axis-aligned bounding boxes, thereby causing an expected quadratic growth of the tree.

Various techniques may be used to determine the L- and R-planes, and thus the actual tree layout. Returning to FIGS. 49-51, one technique is to determine a plane M 418 using the 3D-tree construction technique described above and partition the objects such that the overlap of the resulting L-plane and R-plane of the new axis-aligned bounding boxes minimally overlaps the suggested splitting plane M 418. The resulting tree is very similar to the corresponding 3D-tree, however, since the object sets are partitioned rather than space, the resulting tree is much flatter. Another approach is to select the R-plane and L-plane in such a way that the overlap of child boxes is minimal and the empty space is maximized if possible. It should be noted that for some objects axis-aligned bounding boxes are inefficient. An example of such a situation is a long cylinder with small radius on the diagonal of an axis-aligned bounding box.

Figure 53:
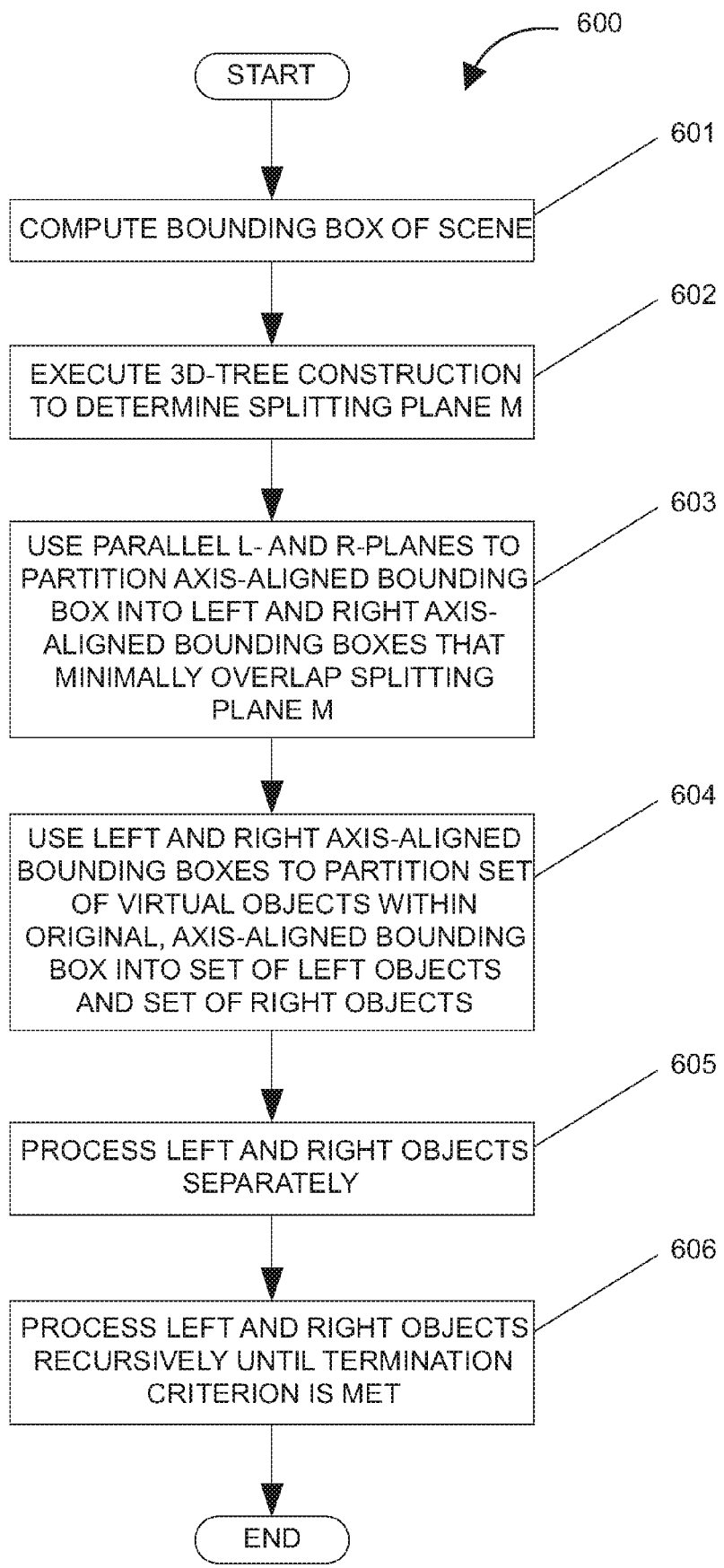

FIG. 53 is a flowchart of a method 600 according to this aspect of the invention. In step 601, a bounding box of a scene is computed. In step 602, a 3D-tree construction is executed to determine a splitting plane M. In step 603, parallel L- and R-planes are used to partition the axis-aligned bounding box into left and right axis-aligned bounding boxes that minimally overlap the splitting plane M. In step 604, the left and right bounding boxes are used to partition the set of virtual objects contained within the original axis-aligned bounding box into a set of left objects and a set of right objects. In step 605, the left and right objects are processed recursively until a termination criterion is met. It should be noted that the method 600 illustrated in FIG. 53, as well as the method 200 illustrated in FIG. 46, may be combined with other techniques described herein, including techniques relating to 3D-tree construction, real-time processing, bucket sorting, self-intersection, and the like.

In the case of the 3D-tree, the spatial subdivision is continued so as to cut off the empty portions of the space around the object. In the case of the described bounding volume hierarchy, partitioning such objects into smaller ones results in a similar behavior. In order to maintain the predictability of the memory requirements, a maximum bounding box size is defined. All objects with an extent that exceeds the maximum bounding box size are split into smaller portions to meet the requirement. The maximum allowed size can be found by scanning the data set for the minimal extent among all objects.

The data structure described herein allows the transfer of the principles of fast 3D-tree traversal to bounding volume hierarchies. The cases of traversal are similar: (1) only the left child; (2) only the right child; (3) the left child and then the right child; (4) the right child and then the left child; or (5) the ray is between split planes (i.e., empty space). Since one node in the described technique is split by two parallel planes, the order of how to traverse the boxes is determined by the ray direction.

Previous bounding volume hierarchy techniques could not efficiently determine the order of how to traverse the child nodes or required additional effort, such as updating a heap data structure. In addition a whole bounding volume had to be loaded and tested against the ray, while the present approach only requires the two plane distances. Checking the ray against the two planes in software seems to be more expensive, however. The traversal is the bottle neck in 3D-trees, and doing some more computation here better hides the latencies of memory access. In addition, the bounding volume hierarchy trees tend to be much smaller than corresponding 3D-trees of same performance.

Although there is herein described a new bounding volume hierarchy, there is a strong link to traversing 3D-trees: Setting L=R, the classical binary space partition is obtained, and the traversal algorithm collapses to the traversal algorithm for 3D-trees.

The described bounding volume hierarchy also can be applied to efficiently find ray freeform surface intersections by subdividing the freeform surface. Doing so allows the intersection of a freeform surface with a convex hull property and a subdivision algorithm efficiently to be computed up to floating point precision, depending on the actual floating point arithmetic. A subdivision step is performed, for example, for polynomial surfaces, rational surfaces, and approximating subdivision surfaces. For each axis in space the possibly overlapping bounding boxes are determined as discussed above. In case of a binary subdivision, the intersection of the L-boxes and the intersection of the R-boxes for new bounding boxes of the new meshes. Now the above-described traversal can be efficiently performed, since the spatial order of the boxes is known. Instead of pre-computing the hierarchy of bounding volumes, it can be computed on the fly. This procedure is efficient for freeform surfaces and allows one to save the memory for the acceleration data structure, which is replaced by a small stack of the bounding volumes that have to be traversed by backtracking. The subdivision is continued until the ray surface intersection lies in a bounding volume that collapsed to a point in floating point precision or an interval of a small size.

Using regular grids as an acceleration data structure in ray tracing is simple, but efficiency suffers from a lack of spatial adaptivity and the subsequent traversal of many empty grid cells. Hierarchical regular grids can improve on the situation, but still are inferior as compared to bounding volume hierarchies and 3D-trees. However, regular grids can be used to improve on the construction speed of acceleration data structures. The technique for constructing the acceleration data structures are similar to quick sorting and are expected to run in O(n log n). An improvement can be obtained by applying bucket sorting, which runs in linear time. Therefore the axis-aligned bounding box of the objects is partitioned into $n_x \times n_y \times n_z$ axis-aligned boxes. Each object then is sorted into exactly one of these boxes by one selected point, e.g., the center of gravity or the first vertex of each triangle could be used. Then the actual axis-aligned bounding box of the objects in each grid cell is determined. These axis-aligned bounding boxes are used instead of the objects they contain as long as the box does not intersect one of the division planes. In that case the box is unpacked and instead the objects in the box will be used directly. This procedure saves a lot of comparisons and memory accesses, noticeably improves the constant of the order of the construction techniques, and also can be applied recursively. The above technique is especially appealing to hardware implementations, since it can be realized by processing a stream of objects.

The acceleration data structures can be built on demand, i.e., at the time when a ray is traversing a specific axis-aligned bounding box with its objects. Then on the one hand the acceleration data structure never becomes refined in regions of space, which are invisible to the rays, and caches are not polluted by data that is never touched. On the other hand after refinement the objects possibly intersected by a ray are already in the caches.

From the above discussion, it will be seen that the present invention addresses long known issues in ray tracing and provides techniques for ray tracing having improved precision, overall speed and memory footprint of the acceleration data structures. The improvements in numerical precision transfer to other number systems as well as, for example, to the logarithmic number system used in the hardware of the ART ray tracing chips. It is noted that the specific implementation of the IEEE floating point standard on a processor or a dedicated hardware can severely influence performance. For example, on a Pentium 4 chip denormalized numbers can degrade performance by a factor of 100 and more. As discussed above, an implementation of the invention avoids these exceptions. The view of bounding volume hierarchies described herein makes them suited for realtime ray tracing. In an amortized analysis, the described techniques outperform the previous state of the art, thus allowing more precise techniques to be used, for example, for computing motion blur in fully animated scene, as in a production setting or the like. It will be apparent from the above discussion that the described bounding volume hierarchies have significant advantages when compared with 3D-trees and other techniques, particularly in hardware implementations, such for huge scenes. In an amortized analysis, the described bounding volume hierarchies outperform current 3D-trees by at least a factor of two. In addition, the memory footprint can be determined beforehand and is linear in the number of objects.

6. Overall Techniques

FIGS. 54-62 are a series of flowcharts illustrating various techniques and sub-techniques according to the present invention. It should be noted that the flowcharts are intended to be illustrative, rather than exhaustive, and that the present invention may be practiced using combinations of some or all of the described techniques, sub-techniques, or components thereof, either with each other or with other systems and techniques not explicitly set forth in the flowcharts. Further, within each flowchart, it will be understood that the invention may be practiced using alternative orderings, groupings, or combinations of the listed elements.

FIG. 54 is a flowchart of a technique 650 including the following:

Box 651: Allocate a contiguous block of memory.

Box 652: Construct an acceleration data structure in that contiguous block of memory completely ahead of ray tracing or on demand during ray tracing.

Box 653: Compute illumination samples from transport paths assembled out of segments found by tracing rays.

Box 654: Use the samples to compute an image.

FIG. 55 is a flowchart of a technique 700 including the following:

Box 701: Configure ray-tracing methodology, as set forth in Boxes 702 and 703.

Box 702: Simulate ray shot from given pixel into scene (or from scene into pixel) along a selected direction; calculate intersections of rays and surfaces of objects in scene; and simulate trajectories of rays illuminating objects in scene.

Box 703: Employ bounding interval hierarchy (BIH) using quantized planes to reduce memory requirements while maintaining selected degree of precision (can utilize variants including one-plane version or quad-plane version).

FIG. 56 is a flowchart of a technique 710 including the following:

Box 711: Configure ray-tracing methodology, as set forth in Boxes 712 and 713.

Box 712: Simulate ray shot from given pixel into scene (or from scene into pixel) along a selected direction; calculate intersections of rays and surfaces of objects in scene; and simulate trajectories of rays illuminating objects in scene.

Box 713: Employ unified data structure that can utilize either or both of spatial partitioning and object list partitioning to accelerate ray tracing, wherein unified data structure can be constructed on demand and in-place within an a priori selected amount of memory.

FIG. 57 is a flowchart of a technique 720 including the following:

Box 721: Configure ray-tracing methodology, as set forth in Boxes 722 and 723.

Box 722: Simulate ray shot from given pixel into scene (or from scene into pixel) along a selected direction; calculate intersections of rays and surfaces of objects in scene; simulate trajectories of rays illuminating objects in scene.

Box 723: Construct object list partitioning in linear time, in a bottom up manner, as set forth in Boxes 732a-f. (Partitioning can comprise BVH, BIH, single plane, or quad plane.) (Partitioning can be executed in parallel or substantially parallel manner.)

Box 723a: Create bounding boxes based on regular grid to enable bucket sort operation.

Box 723b: Store, in counters, original resolution of grid utilized for bucket sort.

Box 723c: Utilize round-robin approach to select a counter having a non-zero value.

Box 723d: Divide counter value of selected counter by selected value and utilize an axis assigned to the selected counter (selected value can be 2).

Box 723e: Loop over all boxes, including merging directly neighboring boxes along the axis and creating a partitioning node if all directly neighboring boxes are non-empty, or if only one is non-empty, determining whether an additional partitioning node for empty space cut-off is to be created.

Box 723f: Continue at least 723b through 723e until only a root box remains.

FIG. 58 is a flowchart of a technique 730 including the following:

Box 731: Configure ray-tracing methodology, as set forth in Boxes 732 and 733.

Box 732: Simulate ray shot from given pixel into scene (or from scene into pixel) along a selected direction; calculate intersections of rays and surfaces of objects in scene; simulate trajectories of rays illuminating objects in scene.

Box 733: Sort given set of rays into ray tracing acceleration data structure (ray tracing acceleration data structure can comprise spatial hierarchy, object list partitioning hierarchy, hybrid hierarchy, or combination of above).

FIG. 59 is a flowchart of a technique 740 including the following:

Box 741: Sorting given set of rays into ray tracing acceleration data structure comprises, as set forth in Boxes 742-744.

Box 742: Within computer, passing plurality of rays in the set of rays in a first array, along with a second array of references 0 . . . N−1 for each ray (first array can be an un-ordered array).

Box 743: Initialize all rays and clip them to an associated scene bounding box, wherein the ray references are re-sorted in-place into a first group of rays that intersect the bounding box, which define a left side of the array and a second group of rays that miss the bounding box, which define a right side of the array Box 744: Pass all rays of the first group of rays to a ray traversal process that begins at a root node.

Figure 60:
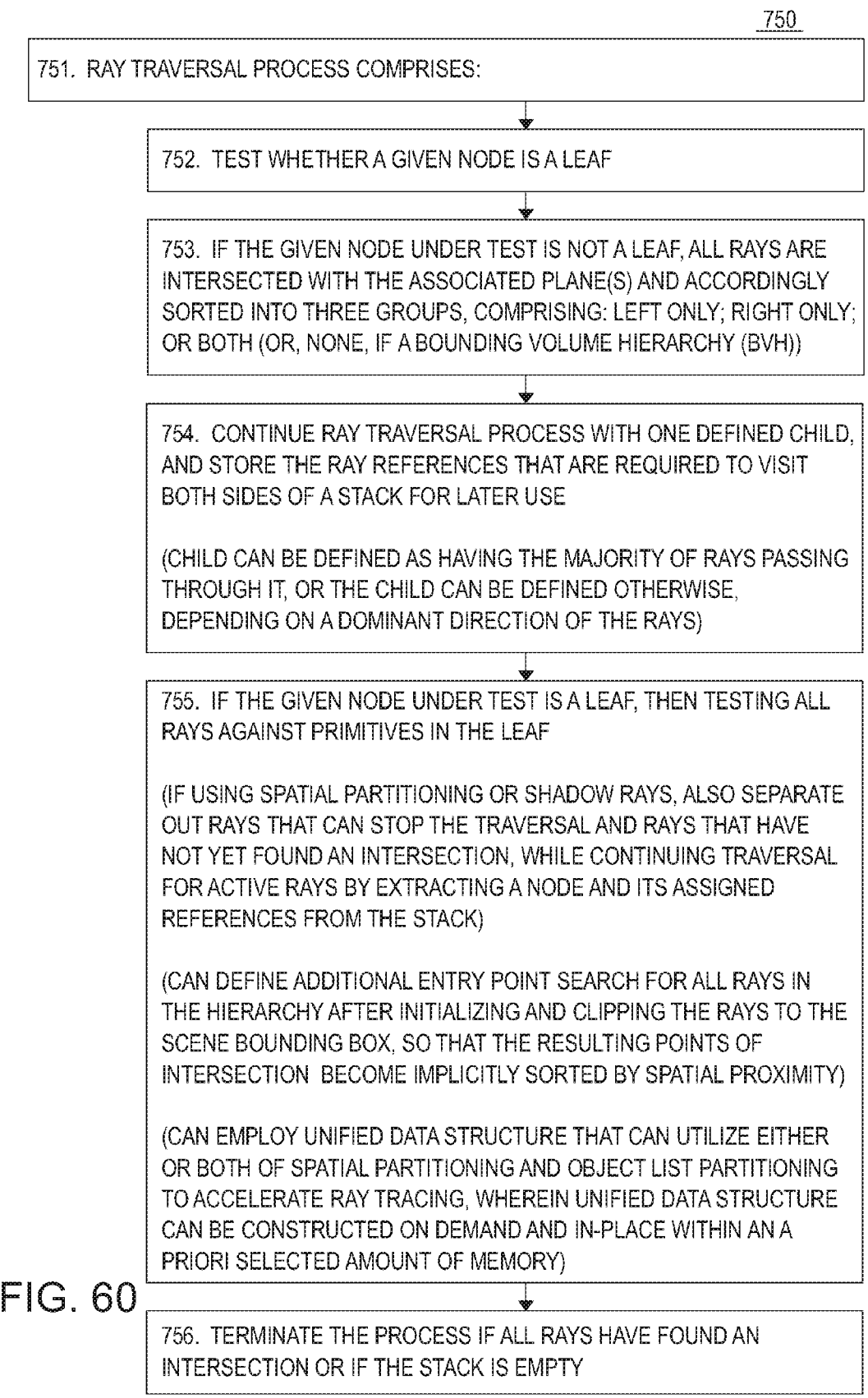

FIG. 60 is a flowchart of a technique 750 including the following:

Box 751: Ray traversal process, as set forth in Boxes 752-756.

Box 752: Test whether a given node is a leaf.

Box 753: If the given node under test is not a leaf, all rays are intersected with the associated plane(s) and accordingly sorted into three groups, comprising: left only; right only; or both (or, none, if a bounding volume hierarchy (BVH)).

Box 754: Continue ray traversal process with one defined child, and store the ray references that are required to visit both sides of a stack for later use (child can be defined as having the majority of rays passing through it, or the child can be defined otherwise, depending on a dominant direction of the rays).

Box 755: If the given node under test is a leaf, then testing all rays against primitives in the leaf. (If using spatial partitioning or shadow rays, also separate out rays that can stop the traversal and rays that have not yet found an intersection, while continuing traversal for active rays by extracting a node and its assigned references from the stack.) (It is possible to define additional entry point search for all rays in the hierarchy after initializing and clipping the rays to the scene bounding box, so that the resulting points of intersection become implicitly sorted by spatial proximity.) (It is further possible to employ unified data structure that can utilize either or both of spatial partitioning and object list partitioning to accelerate ray tracing, wherein unified data structure can be constructed on demand and in-place within an a priori selected amount of memory.)

Box 756: Terminate the process if all rays have found an intersection or if the stack is empty.

FIG. 61 is a flowchart of a technique 760 including the following:

Box 761: Configure ray-tracing methodology, as set forth in Boxes 762 and 763.

Box 762: Simulate ray shot from given pixel into scene (or from scene into pixel) along a selected direction; calculate intersections of rays and surfaces of objects in scene; simulate trajectories of rays illuminating objects in scene.

Box 763: Extend selected global illumination algorithm by utilizing deterministically selected subset of generated point light sources, which is made consistent or unbiased by selecting a subset of remaining point light sources in a consistent or unbiased way.

FIG. 62 is a flowchart of a technique 770 including the following:

Box 771: Configure ray-tracing methodology, as set forth in Boxes 772 and 773.

Box 772: Simulate ray shot from given pixel into scene (or from scene into pixel) along a selected direction; calculate intersections of rays and surfaces of objects in scene; and simulate trajectories of rays illuminating objects in scene.

Box 773: Extend selected global illumination algorithm, path tracing algorithms, and bi-directional path tracing algorithms, wherein:

(1) vertices of the light paths are sorted by spatial proximity; and then (2) trajectory splitting from a sorted quasi-Monte Carlo operation is used to generate photon maps.

CONCLUSION

The presented unified ray tracing framework allows the rendering of massive geometry within a strictly limited memory block at unmatched performance, while the same framework is able to effectively visualize fully dynamic scenes, such as games. The tight coupling of construction, partitioning heuristic and ray traversal even allows to further decrease the total time to image by introducing a better amortization of the construction time of the hierarchy. As demonstrated, upcoming ray tracing hardware will also profit from the findings, as the proposed algorithms are exceptionally simple to implement and can optionally run in a priori fixed memory blocks.

In the same spirit, the simplified quasi-Monte Carlo Markov Chain simulation algorithm features a close to trivial implementation, but notable convergence improvements. The research shed light on the effects of scrambling and the enumeration order when implementing (t, s)-sequences. This certainly is a good entry point for better understanding the relation of (t, s)-sequences and lattice-sequences and finding better point sequences for simulation purposes.

The work successfully applied the principle of understanding and identifying remaining degrees of freedom. Further research results are to be expected by closely integrating simulation and visualization, i.e., ray tracing, acceleration data structures, shading and dynamics, to further simplify the algorithms and improve performance.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method, executable in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene, the method comprising:

within the computer, constructing an object list partitioning in linear time, in a bottom up manner,
(1) creating bounding boxes based on a regular grid to enable a bucket sort operation,
(2) storing an original resolution of the grid utilized for the bucket sort in counters,
(3) utilizing a round-robin approach to select a counter having a non-zero value,
(4) dividing the counter value of the selected counter by a selected value and utilizing an axis assigned to the selected counter,
(5) looping over all boxes, including merging directly neighboring boxes along the axis and creating a partitioning node if all directly neighboring boxes are non-empty, or if only one is non-empty, determining whether an additional partitioning node for empty space cut-off is to be created, and
(6) continuing at least (2) through (5) until only a root box remains.

2. The method of claim 1, wherein the partitioning uses binary trees, and wherein the selected value, by which the counter value of the selected counter is divided, is 2.

3. The method of claim 1, wherein the object list partitioning comprises one or more of a bounding volume hierarchy (BVH), bounding interval hierarchy (BIH), single plane or quad-plane partitioning.

4. The method of claim 1, further comprising executing partitioning in a parallel or substantially parallel manner within the computer.

5. A method, executable in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene, the method comprising:

within the computer, sorting a given set of rays into a ray tracing acceleration data structure, wherein the ray tracing acceleration data structure can comprise any of a spatial hierarchy, an object list partitioning hierarchy, or a hybrid hierarchy, wherein sorting a given set of rays into a ray tracing acceleration data structure comprises:
(1) within the computer, passing a plurality of rays in the set of rays in a first array, along with a second array of references 0 . . . N−1 for each ray,
(2) initializing all rays and clipping them to an associated scene bounding box, and wherein the ray references are re-sorted in-place into a first group of rays that intersect the bounding box, which define a left side of the array and a second group of rays that miss the bounding box, which define a right side of the array, (3) passing all rays of the first group of rays to a ray traversal process that begins at a root node, the ray traversal process comprising:
  (3a) testing whether a given node under test is a leaf,
  (3b) if the given node under test is not a leaf, all rays are intersected with the associated plane(s) and accordingly sorted into three groups, comprising: Left only; Right only; or Both, or, None, if a Bounding Volume Hierarchy,
  (3c) continuing the ray traversal process with one defined child, and storing the ray references that are required to visit both sides of a stack for later use;
  (3d) if the given node under test is a leaf, then testing all rays against primitives in the leaf and
(4) terminating the process if all rays have found an intersection or if the stack is empty.

6. The method of claim 5, further comprising:
within the computer, employing a unified data structure that can utilize either or both of spatial partitioning and object list partitioning to accelerate ray tracing, and
wherein the unified data structure can be constructed on demand and in-place within an a-priori selected amount of memory.

7. The method of claim 5, wherein the child can be defined as having the majority of rays passing through it.

8. The method of claim 5, wherein the child can be defined in a manner depending on a dominant direction of the rays.

9. The method of claim 5, further comprising:
if using spatial partitioning or shadow rays, also executing the following:
separating out rays that can stop the traversal and rays that have not yet found an intersection, while continuing traversal for active rays by extracting a node and its assigned references from the stack.

10. The method of claim 5, wherein the first array is an unordered array.

11. The method of claim 5, further comprising:
defining an additional entry point search for all rays in the hierarchy after initializing and clipping the rays to the scene bounding box, and wherein the resulting points of intersection become implicitly sorted by spatial proximity.

12. A computer program product comprising a non-transitory, physical computer-readable storage medium and computer-executable program code stored on a the computer-readable storage medium, the computer-executable program code being executable in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene, the computer-executable program code comprising:
computer program code executable by the computer to enable the computer to construct an object list partitioning in linear time, in a bottom up manner, by
(1) creating bounding boxes based on a regular grid to enable a bucket sort operation,
(2) storing an original resolution of the grid utilized for the bucket sort in counters,
(3) utilizing a round-robin approach to select a counter having a non-zero value,
(4) dividing the counter value of the selected counter by a selected value and utilizing an axis assigned to the selected counter,
(5) looping over all boxes, including merging directly neighboring boxes along the axis and creating a partitioning node if all directly neighboring boxes are non-empty, or if only one is non-empty, determining whether an additional partitioning node for empty space cut-off is to be created, and
(6) continuing at least (2) through (5) until only a root box remains.

13. A sub-system operable in a computer graphics system, the computer graphics system comprising a computer and a display element, the display element being operable to display a human-perceptible image in response to a display-controlling electrical output from the computer, the computer being operable to generate the display controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot front the pixel into a scene, or from the scene to a pixel, along a selected direction, the ray-tracing methodology further comprising, the calculating of the interactions of rays and surfaces of objects in the scene and the simulating of trajectories of rays illuminating objects in the scene, the sub-system comprising:
means operable to construct an object list partitioning in a linear time, in a bottom up manner, the means operable to construct an object list partitioning in linear time comprising:
(1) means for creating bounding boxes based on a regular grid to enable a bucket sort operation,
(2) means for storing an original resolution, of the grid utilized for the bucket sort in Counters,
(3) means utilizing a round-robin approach to select a counter having a non-zero value,
(4) means for dividing the counter value of the selected counter by a selected value and utilizing an axis assigned to the selected counter,
(5) means for looping over all boxes, including merging directly neighboring boxes along the axis and creating a partitioning node if all directly neighboring boxes are non-empty, or if only one is non-empty, determining whether an additional partitioning node for empty space cut-off is to be created, and
(6) means for continuing operation of at least means (2) through (5) until only a root box remains.

\* \* \* \* \*